(12) United States Patent
Bora et al.

(10) Patent No.: US 9,295,144 B2
(45) Date of Patent: *Mar. 22, 2016

(54) WIRELESS LIGHTING CONTROL SYSTEM

(71) Applicant: iLumi Solutions, Inc., Plano, TX (US)

(72) Inventors: Swapnil Bora, Plano, TX (US); Corey Egan, Dallas, TX (US)

(73) Assignee: ILUMI SOLUTIONS, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,200

(22) Filed: Nov. 11, 2013

(65) Prior Publication Data
US 2014/0062297 A1    Mar. 6, 2014

Related U.S. Application Data

(63) Continuation-in-part of application No. 13/836,280, filed on Mar. 15, 2013, now Pat. No. 8,922,126, and a continuation of application No. 13/417,322, filed on Mar. 11, 2012, now Pat. No. 8,890,435.

(60) Provisional application No. 61/724,651, filed on Nov. 9, 2012, provisional application No. 61/464,917, filed on Mar. 11, 2011.

(51) Int. Cl.
*H05B 37/02* (2006.01)
*H05B 33/08* (2006.01)

(52) U.S. Cl.
CPC ........ *H05B 37/0281* (2013.01); *H05B 33/0842* (2013.01); *H05B 33/0845* (2013.01); *H05B 33/0863* (2013.01); *H05B 33/0869* (2013.01); *H05B 37/0218* (2013.01); *H05B 37/0272* (2013.01)

(58) Field of Classification Search
CPC ........................ H05B 33/0854; H05B 33/0863
USPC .................... 315/292, 294, 297, 307
See application file for complete search history.

(56) References Cited

U.S. PATENT DOCUMENTS

| 6,016,038 A | 1/2000 | Mueller et al. |
| 6,028,871 A * | 2/2000 | Vaughan et al. ........... 372/38.02 |

(Continued)

FOREIGN PATENT DOCUMENTS

| JP | 2003-241714 A | 8/2003 |
| JP | 2004-093761 A | 3/2004 |

(Continued)

OTHER PUBLICATIONS

Philips Color Kinetics, "eColor Graze Powercore Product Guide," (2011), 12 pages.

(Continued)

*Primary Examiner* — Don Le
(74) *Attorney, Agent, or Firm* — Daniel J. Chalker; Edwin S. Flores; Chalker Flores, LLP

(57) ABSTRACT

A lighting device includes a AC/DC or DC/DC power converter, a controller/processor electrically connected to the AC/DC or DC/DC power converter, a light emitting diode (LED) current control circuit communicably coupled to the controller/processor and electrically connected to the AC/DC or DC/DC power converter, and one or more LEDs electrically connected to the LED current control circuit.

84 Claims, 70 Drawing Sheets

(56) References Cited

U.S. PATENT DOCUMENTS

| | | | |
|---|---|---|---|
| 6,150,774 A | 11/2000 | Mueller et al. |
| 6,166,496 A | 12/2000 | Lys et al. |
| 6,211,626 B1 | 4/2001 | Lys et al. |
| 6,292,901 B1 | 9/2001 | Lys et al. |
| 6,459,919 B1 | 10/2002 | Lys et al. |
| 6,528,954 B1 | 3/2003 | Lys et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,655,817 B2 | 12/2003 | Devlin et al. |
| 6,720,745 B2 | 4/2004 | Lys et al. |
| 6,746,139 B2 | 6/2004 | Sinzawa et al. |
| 6,777,891 B2 | 8/2004 | Lys et al. |
| 6,788,011 B2 | 9/2004 | Mueller et al. |
| 6,806,659 B1 | 10/2004 | Mueller et al. |
| 6,965,205 B2 | 11/2005 | Piepgras et al. |
| 6,967,448 B2 | 11/2005 | Morgan et al. |
| 7,014,336 B1 | 3/2006 | Ducharme et al. |
| 7,038,398 B1 | 5/2006 | Lys et al. |
| 7,038,399 B2 | 5/2006 | Lys et al. |
| 7,079,808 B2 | 7/2006 | Striemer |
| 7,113,541 B1 | 9/2006 | Lys et al. |
| 7,126,291 B2 | 10/2006 | Kruse et al. |
| 7,167,777 B2 | 1/2007 | Budike, Jr. |
| 7,186,003 B2 | 3/2007 | Dowling et al. |
| 7,202,613 B2 | 4/2007 | Morgan et al. |
| 7,228,190 B2 | 6/2007 | Dowling et al. |
| 7,231,060 B2 | 6/2007 | Dowling et al. |
| 7,303,300 B2 | 12/2007 | Dowling et al. |
| 7,308,296 B2 | 12/2007 | Lys et al. |
| 7,332,878 B1 | 2/2008 | Smith |
| 7,348,736 B2 | 3/2008 | Piepgras et al. |
| 7,348,949 B2 | 3/2008 | Lee et al. |
| 7,352,339 B2 | 4/2008 | Morgan et al. |
| 7,353,071 B2 | 4/2008 | Blackwell et al. |
| 7,358,679 B2 | 4/2008 | Lys et al. |
| 7,384,150 B2 | 6/2008 | Prince |
| 7,385,359 B2 | 6/2008 | Dowling et al. |
| 7,401,934 B2 | 7/2008 | Hunt |
| 7,436,132 B1 | 10/2008 | Null |
| 7,462,103 B2 | 12/2008 | Mattice et al. |
| 7,462,997 B2 | 12/2008 | Mueller et al. |
| 7,471,051 B1 | 12/2008 | Wacknov et al. |
| 7,482,763 B2 | 1/2009 | Rodriguez et al. |
| 7,490,957 B2 | 2/2009 | Leong et al. |
| 7,508,141 B2 | 3/2009 | Wong |
| 7,511,695 B2 | 3/2009 | Furukawa et al. |
| 7,518,319 B2 | 4/2009 | Konno et al. |
| 7,550,931 B2 | 6/2009 | Lys et al. |
| 7,597,455 B2 | 10/2009 | Smith et al. |
| 7,612,843 B2 | 11/2009 | Chou |
| 7,619,538 B1 | 11/2009 | Zarian |
| 7,623,042 B2 | 11/2009 | Huizenga |
| 7,652,236 B2 | 1/2010 | Cortenraad et al. |
| 7,658,506 B2 | 2/2010 | Dowling |
| 7,659,674 B2 | 2/2010 | Mueller et al. |
| 7,675,238 B2 | 3/2010 | Cortenraad et al. |
| 7,701,078 B1 | 4/2010 | Johnson et al. |
| 7,719,208 B2 | 5/2010 | Li et al. |
| 7,731,371 B2 | 6/2010 | Prince |
| 7,731,383 B2 | 6/2010 | Myer |
| 7,745,769 B2 | 6/2010 | Tracy et al. |
| 7,764,026 B2 | 7/2010 | Dowling et al. |
| 7,777,427 B2 | 8/2010 | Stalker, III |
| 7,777,430 B2 | 8/2010 | Catalano et al. |
| 7,781,713 B2 | 8/2010 | Papamichael et al. |
| 7,781,979 B2 | 8/2010 | Lys |
| 7,809,448 B2 | 10/2010 | Lys et al. |
| 7,812,297 B2 | 10/2010 | Blaut et al. |
| 7,845,823 B2 | 12/2010 | Mueller et al. |
| 7,856,152 B2 | 12/2010 | Diederiks et al. |
| 7,863,829 B2 | 1/2011 | Sayers et al. |
| 7,863,831 B2 | 1/2011 | Vos |
| 7,878,671 B2 | 2/2011 | Hunt |
| 7,893,633 B2 | 2/2011 | Pedersen |
| 7,914,172 B2 | 3/2011 | Nagara et al. |
| 7,919,937 B2 | 4/2011 | Tracy et al. |
| 7,920,053 B2 | 4/2011 | Pattok et al. |
| 7,926,975 B2 | 4/2011 | Siemiet et al. |
| 7,936,562 B2 | 5/2011 | Nagamura et al. |
| 7,936,904 B2 | 5/2011 | Furusawa |
| 7,946,729 B2 | 5/2011 | Ivey et al. |
| 7,961,113 B2 | 6/2011 | Rabiner et al. |
| 7,972,028 B2 | 7/2011 | Durand et al. |
| 7,976,196 B2 | 7/2011 | Ivey et al. |
| 7,990,080 B2 | 8/2011 | Chang et al. |
| 7,999,491 B2 | 8/2011 | Peng et al. |
| 8,004,211 B2 | 8/2011 | Van Erp |
| 8,008,871 B2 | 8/2011 | Wang et al. |
| 8,016,470 B2 | 9/2011 | Li et al. |
| 8,021,021 B2 | 9/2011 | Paolini |
| 8,025,417 B2 | 9/2011 | Pohlert et al. |
| 8,026,673 B2 | 9/2011 | Lys |
| 8,029,154 B2 | 10/2011 | Myer |
| 8,035,320 B2 | 10/2011 | Sibert |
| 8,035,609 B2 | 10/2011 | Kerr et al. |
| 8,049,434 B2 | 11/2011 | Crouse et al. |
| 8,049,437 B2 | 11/2011 | Chang et al. |
| 8,070,325 B2 | 12/2011 | Zampini et al. |
| 8,203,260 B2 | 6/2012 | Li et al. |
| 8,324,832 B2 * | 12/2012 | Yan et al. ........................ 315/291 |
| 8,378,588 B2 | 2/2013 | Kuo et al. |
| 8,427,063 B2 | 4/2013 | Hulett |
| 8,482,223 B2 * | 7/2013 | Draper et al. ................. 315/307 |
| 8,581,521 B2 | 11/2013 | Welten et al. |
| 8,638,045 B2 | 1/2014 | Kunst et al. |
| 8,890,435 B2 | 11/2014 | Bora et al. |
| 2004/0042234 A1 | 3/2004 | Otake |
| 2006/0214603 A1 * | 9/2006 | Oh et al. ........................ 315/246 |
| 2007/0121319 A1 | 5/2007 | Wolf et al. |
| 2008/0062678 A1 * | 3/2008 | Levy et al. .................... 362/109 |
| 2009/0059603 A1 | 3/2009 | Recker et al. |
| 2010/0213859 A1 * | 8/2010 | Shteynberg et al. .......... 315/224 |
| 2010/0277076 A1 * | 11/2010 | Tracy et al. .................... 315/149 |
| 2011/0095687 A1 | 4/2011 | Jonsson |
| 2012/0098655 A1 | 4/2012 | Preta et al. |
| 2013/0063042 A1 | 3/2013 | Bora et al. |
| 2013/0113291 A1 | 5/2013 | Recker et al. |
| 2013/0234598 A1 | 9/2013 | Bora et al. |
| 2013/0249392 A1 | 9/2013 | Kim |
| 2013/0249402 A1 | 9/2013 | Bora et al. |
| 2013/0249403 A1 | 9/2013 | Bora et al. |
| 2013/0264943 A1 | 10/2013 | Bora et al. |
| 2013/0285558 A1 | 10/2013 | Recker et al. |
| 2013/0293112 A1 | 11/2013 | Reed et al. |
| 2013/0293117 A1 | 11/2013 | Verfuerth |
| 2013/0320861 A1 | 12/2013 | Sinai et al. |
| 2014/0001961 A1 | 1/2014 | Anderson et al. |
| 2014/0062297 A1 | 3/2014 | Bora et al. |

FOREIGN PATENT DOCUMENTS

| | | |
|---|---|---|
| JP | 2005-233982 A | 9/2005 |
| KR | 10-2008-0020608 A | 3/2008 |
| WO | 2006/114725 A1 | 11/2006 |
| WO | 2012145766 A2 | 10/2012 |

OTHER PUBLICATIONS

Philips Color Kinetics,"ColorBurst Powercore Product Guide," (2010-2011), 24 pages.

International Search Report and Written Opinion for PCT/US2012/037369 dated Nov. 5, 2012, 10 pp.

Koninklijke Philips Electronics N.V., Korea Patent Publication No. 10-2008-0009140—Abstract Only—Jan. 24, 2008.

European Patent Office, Supplementary European Search Report for Appl. No. EP 12774216, dated Sep. 9, 2015, 5 pp.

* cited by examiner

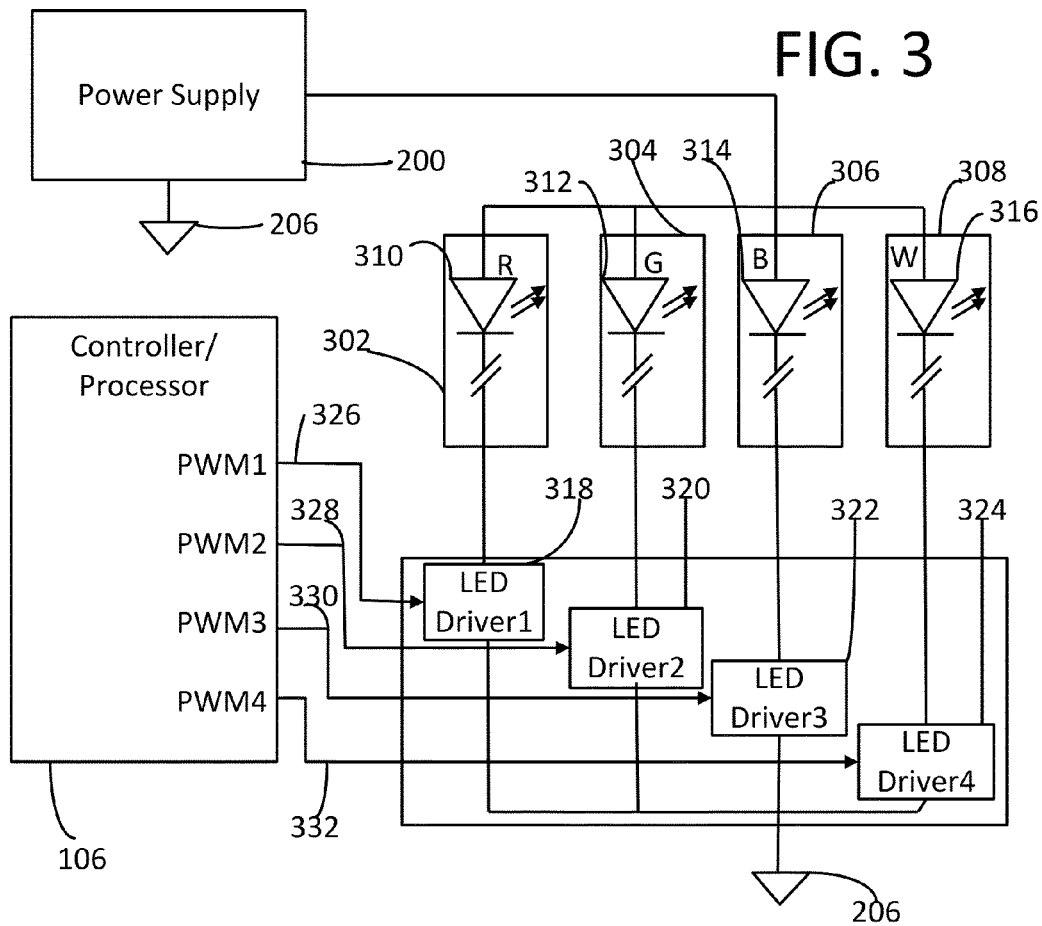
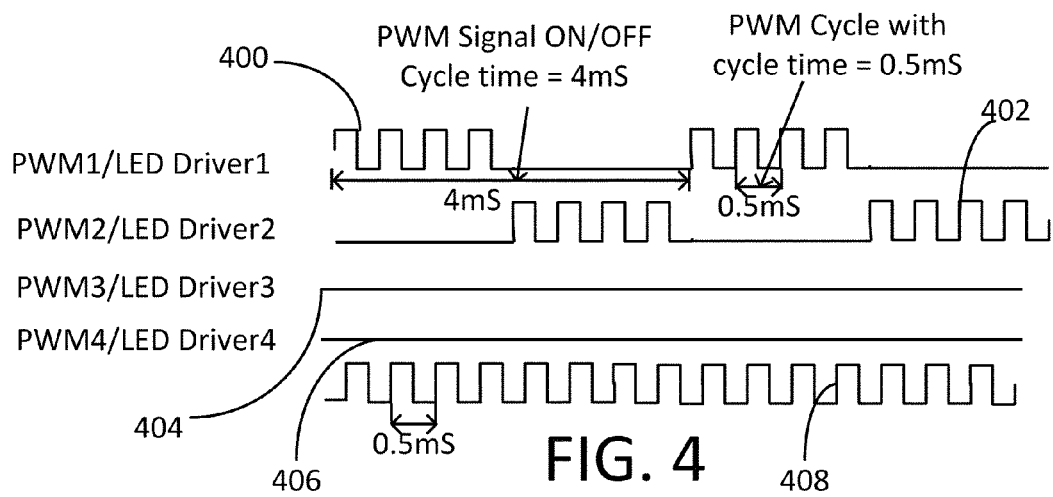

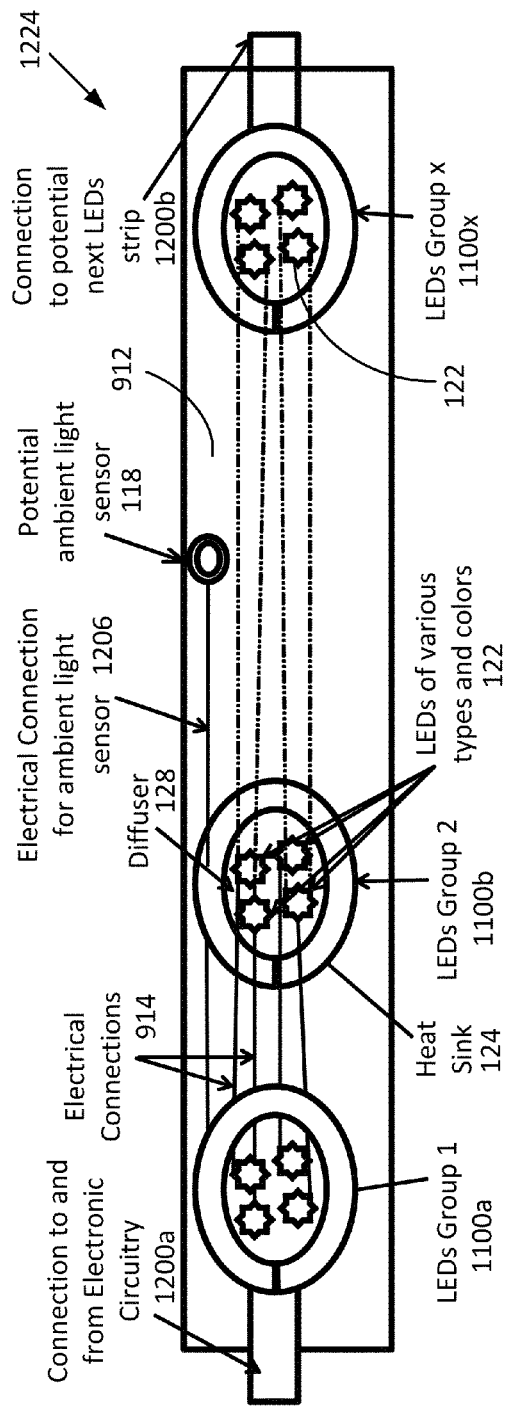
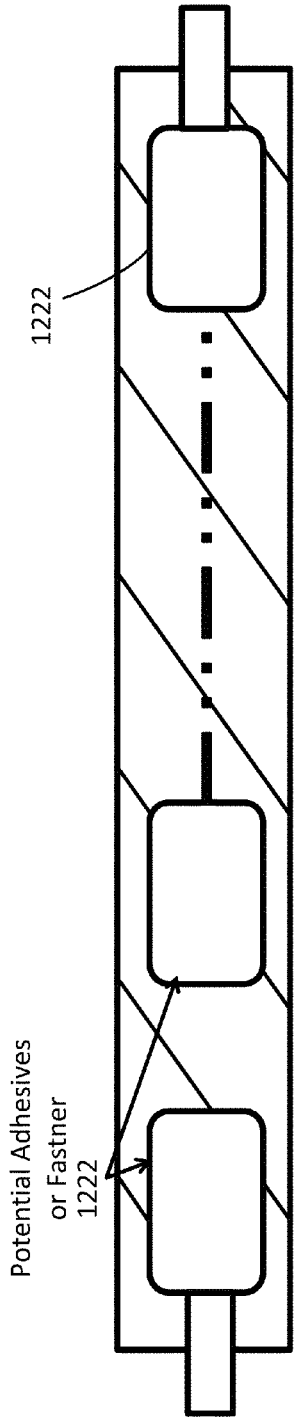
FIG. 12A-1 (front view)
FIG. 12A-2 (back view)

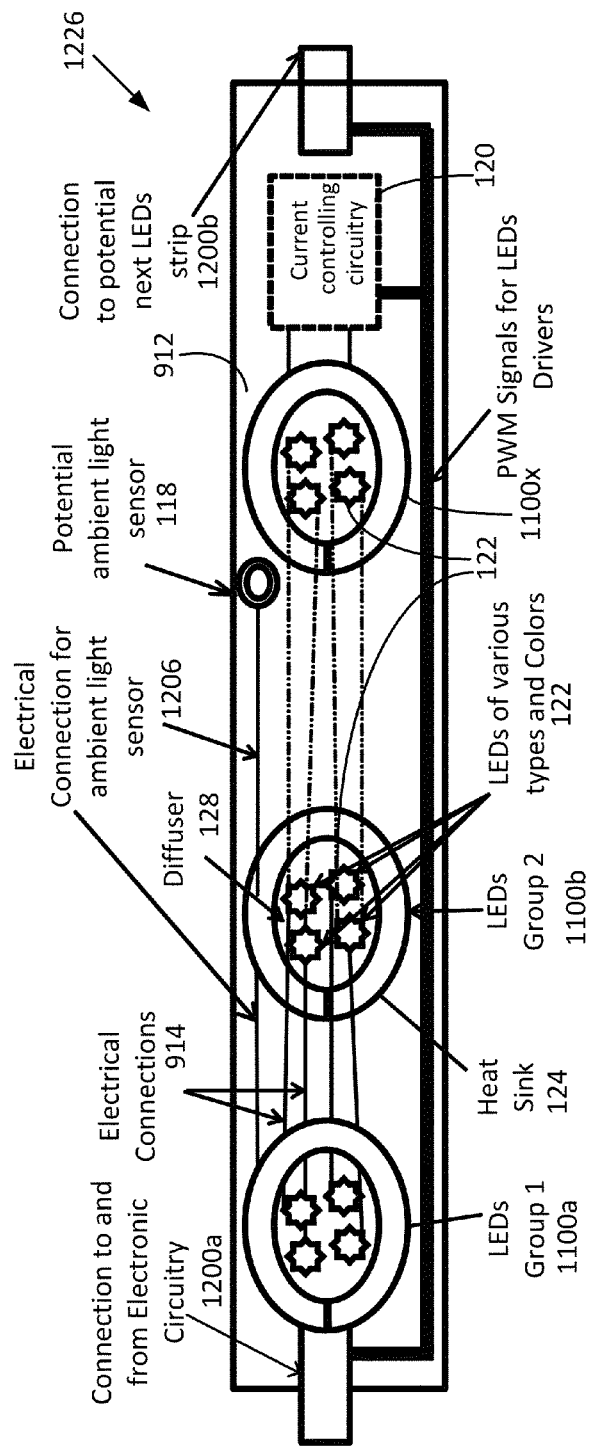
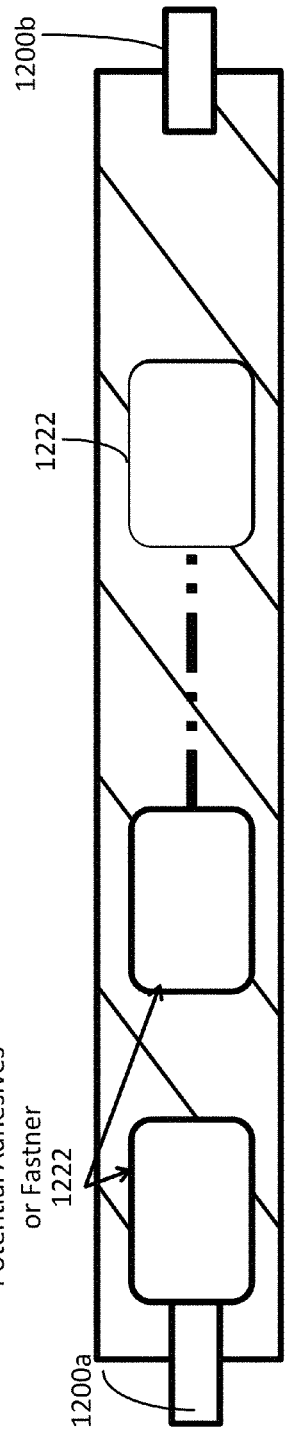
FIG. 12B-1 (front view)
FIG. 12B-2 (back view)

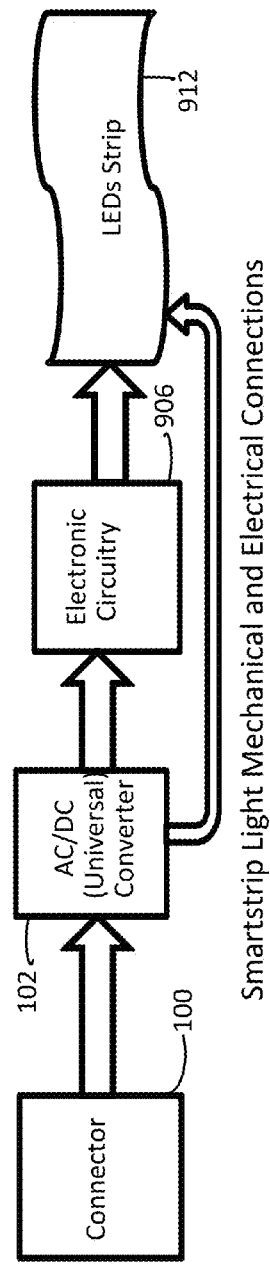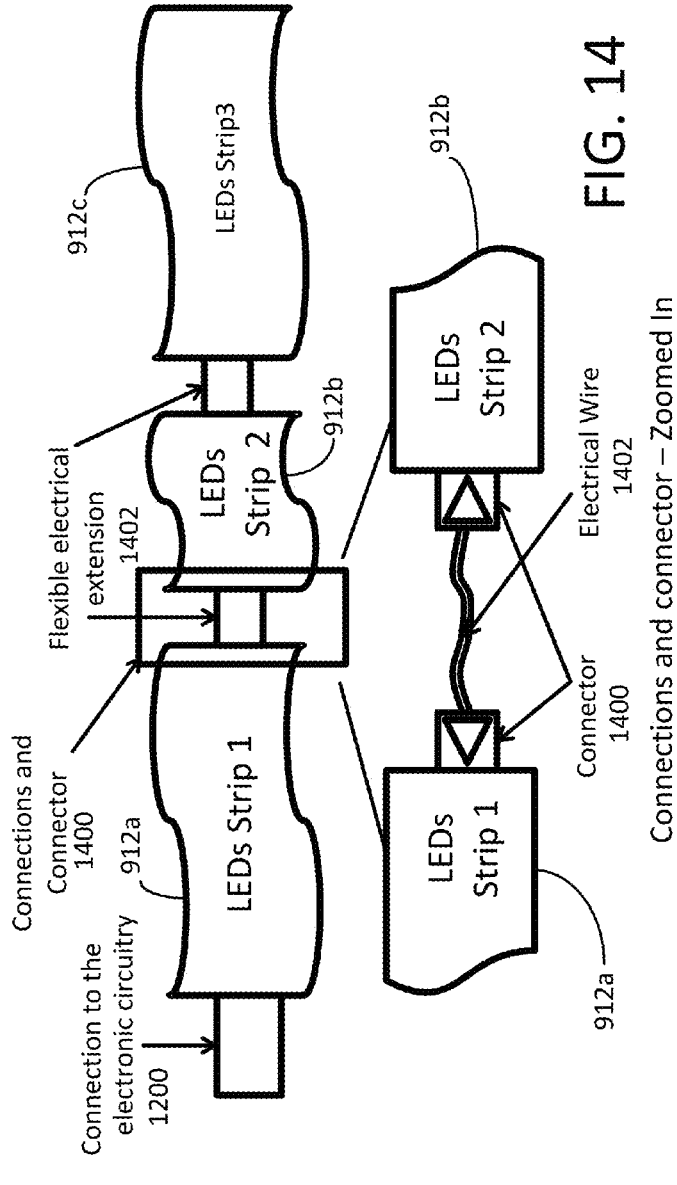

LEDs Strips Connection through Wire

LEDs Strips Direct Connection

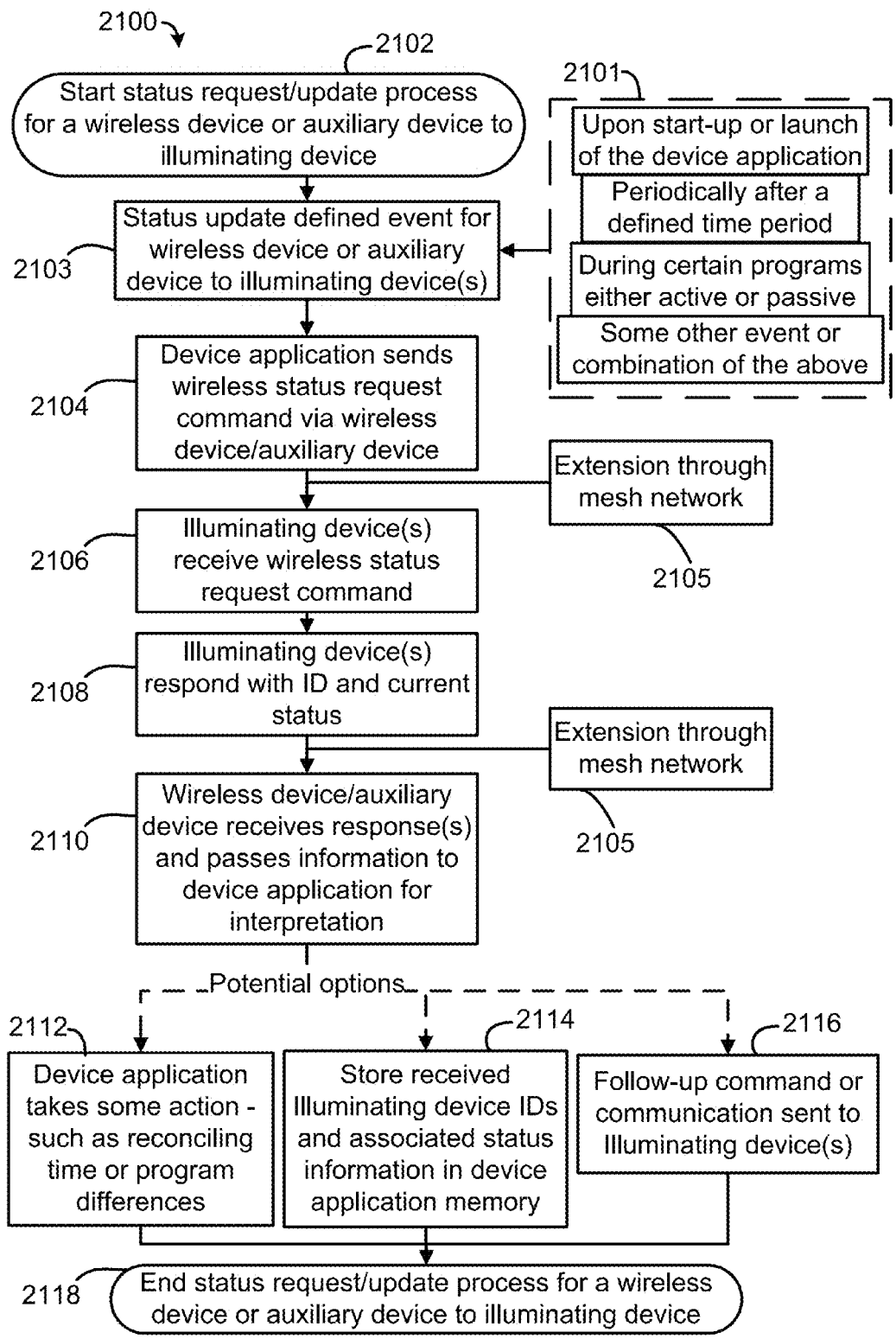

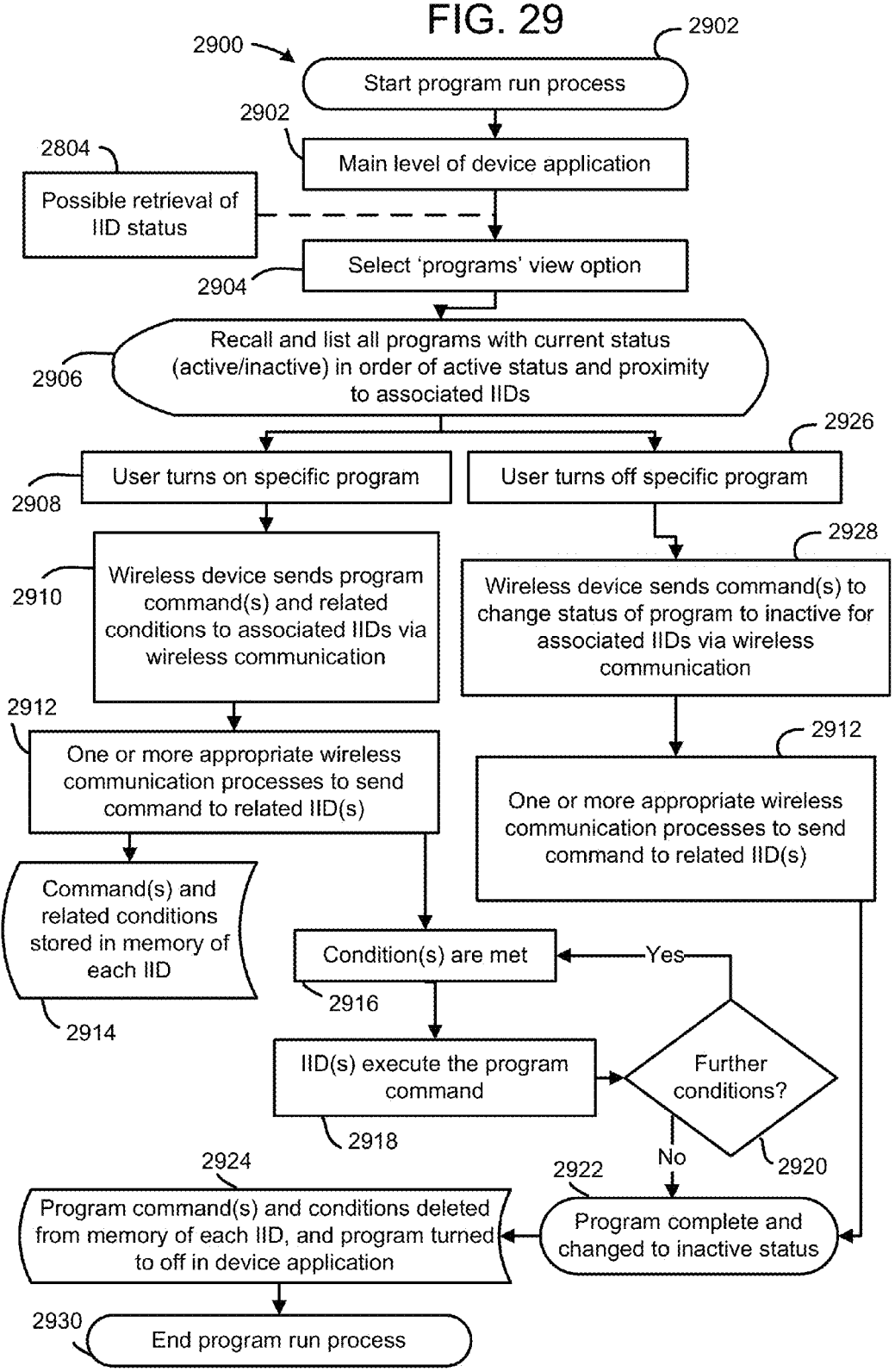

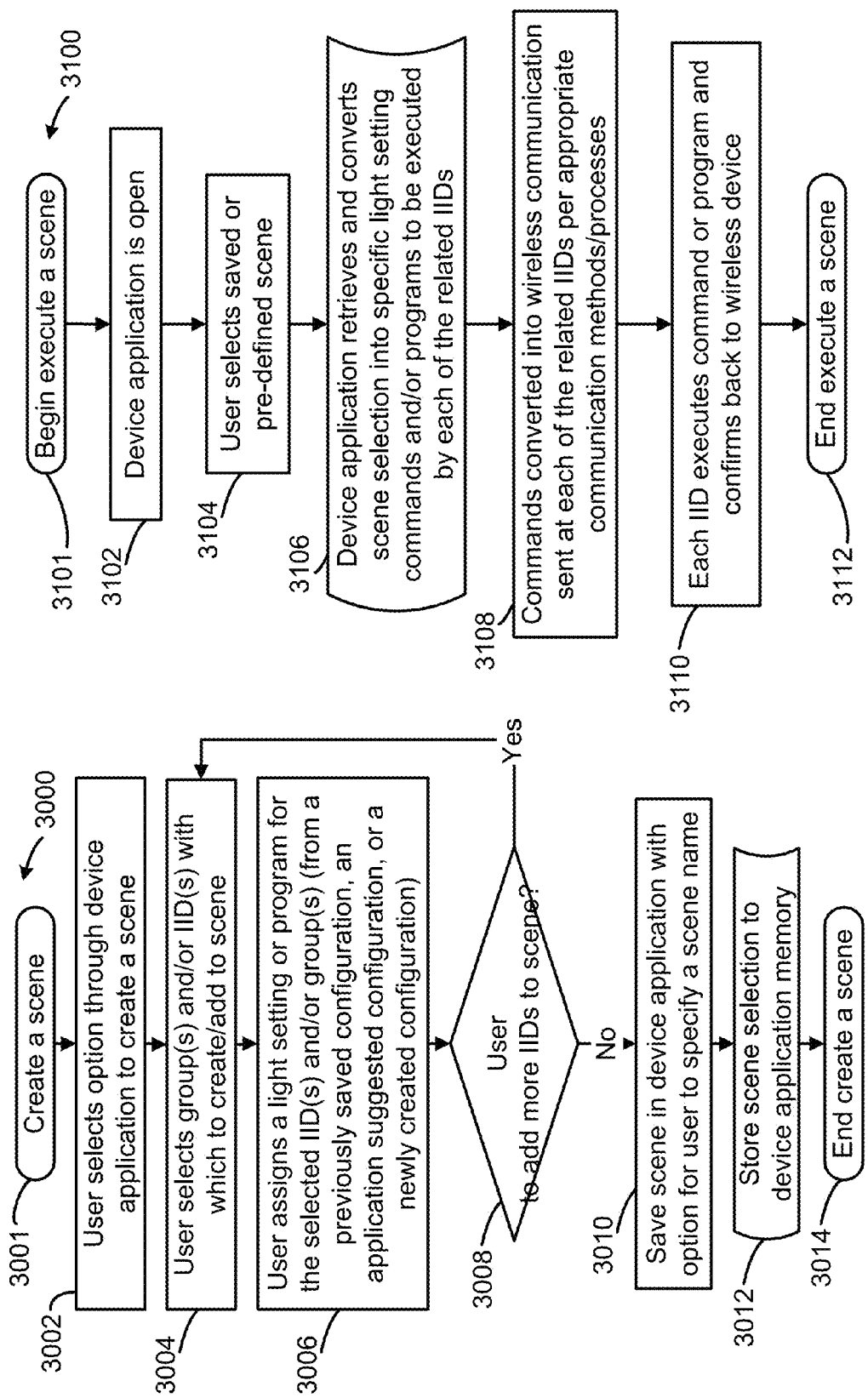

F: Favorites, G: Groups, S: Screens, P: Programs, M: More

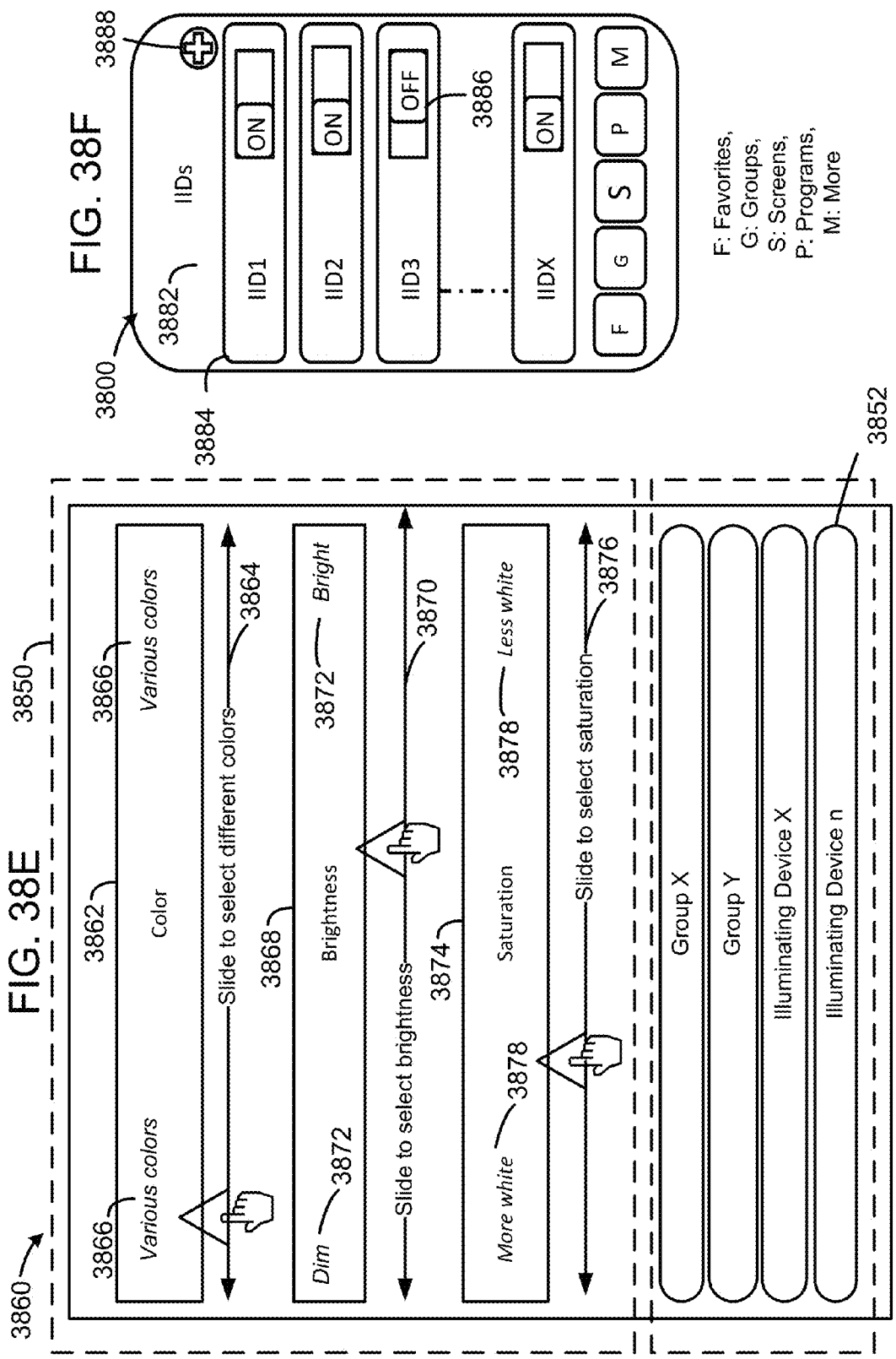

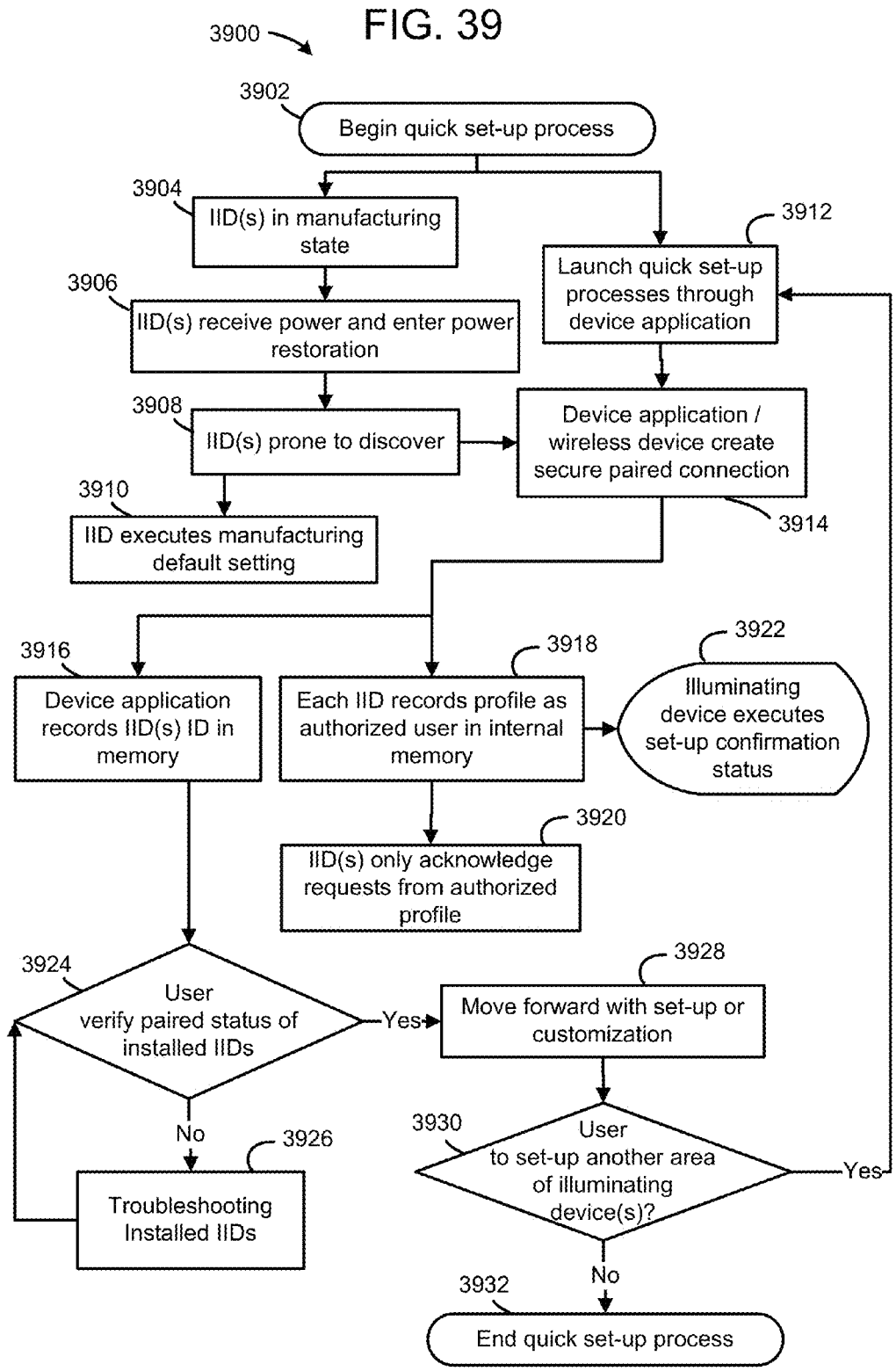

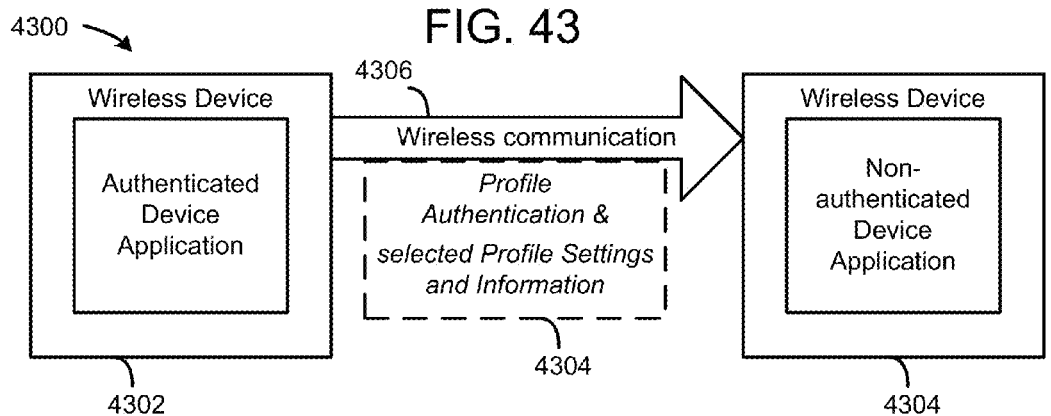
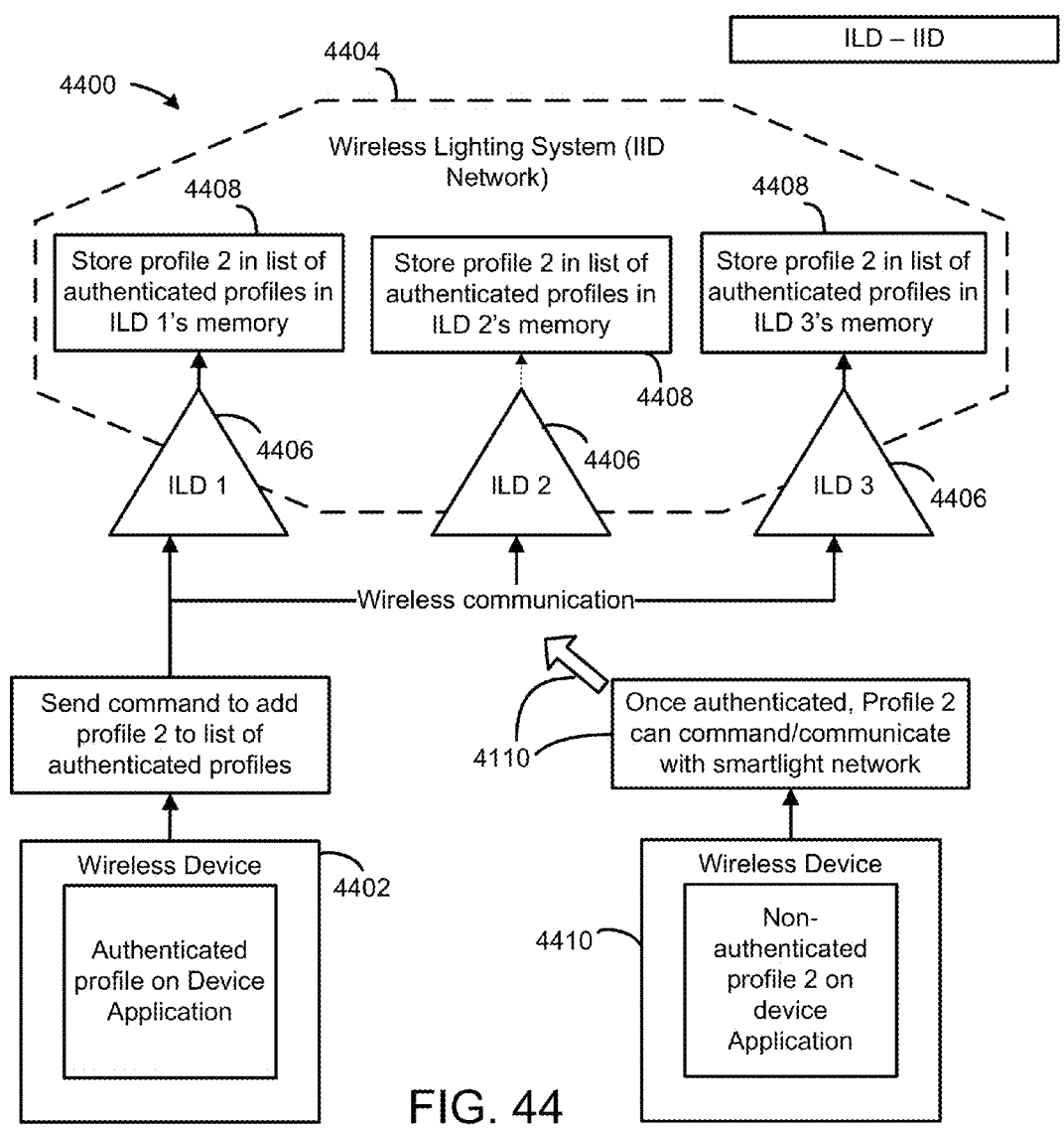

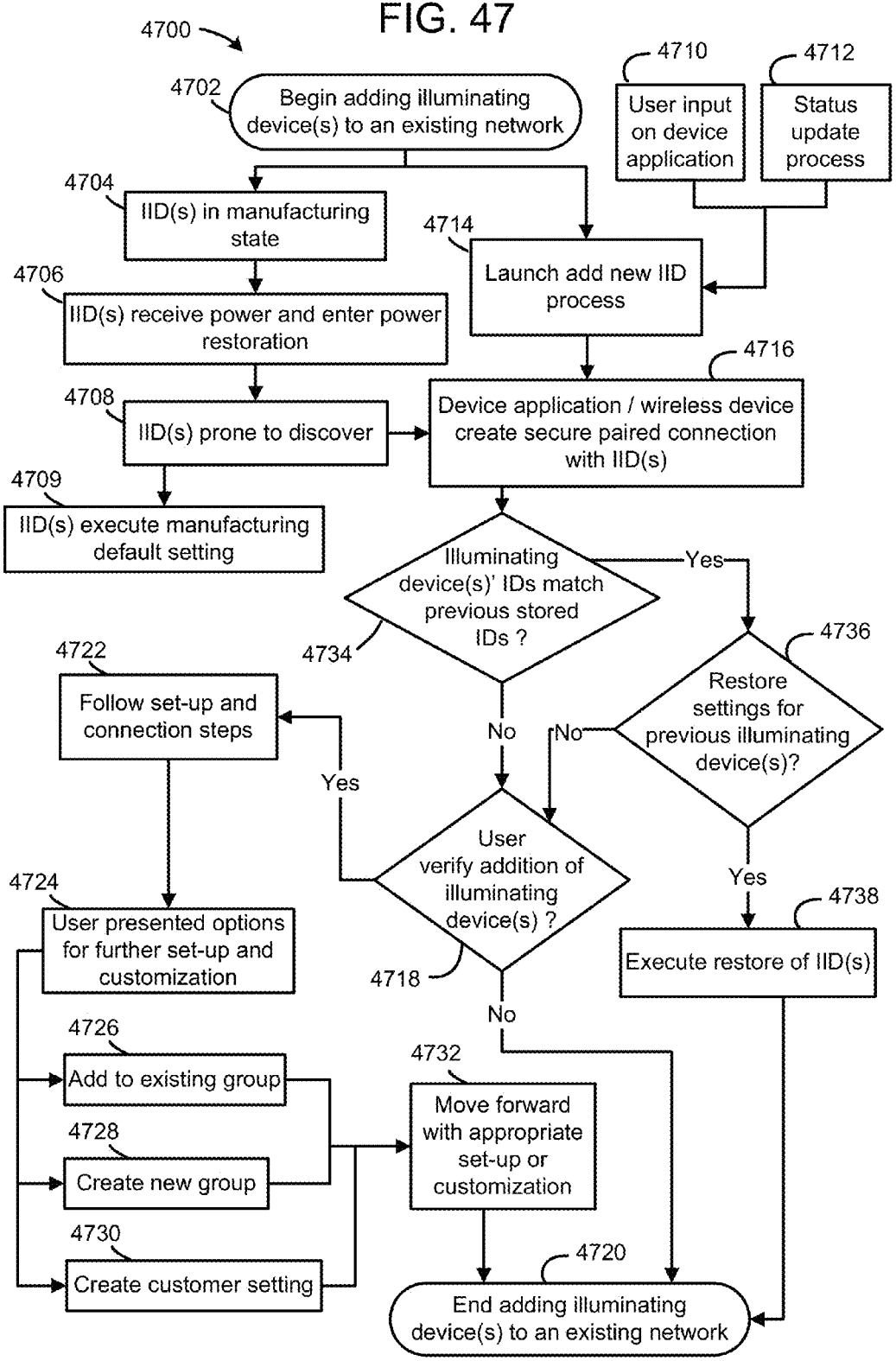

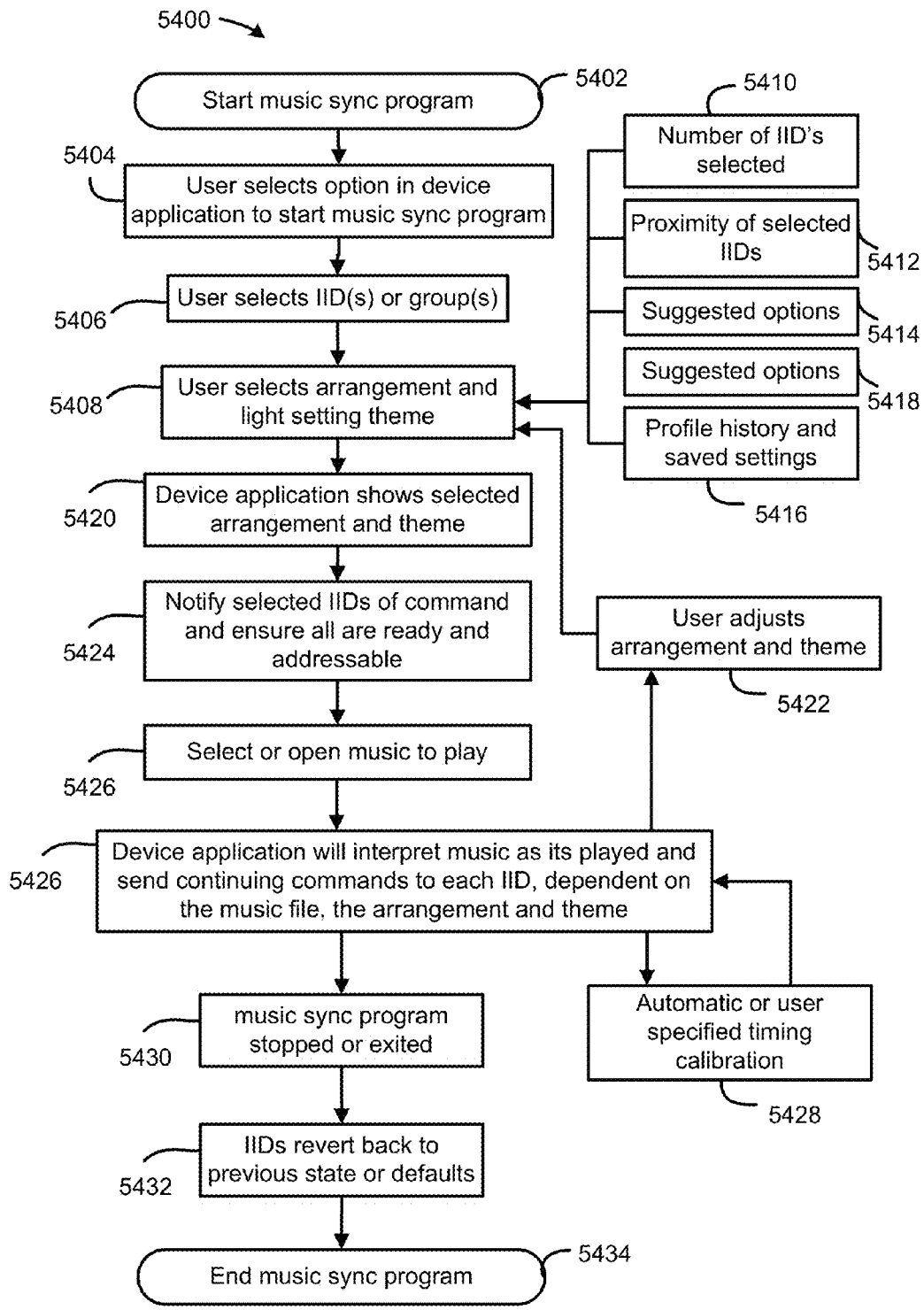

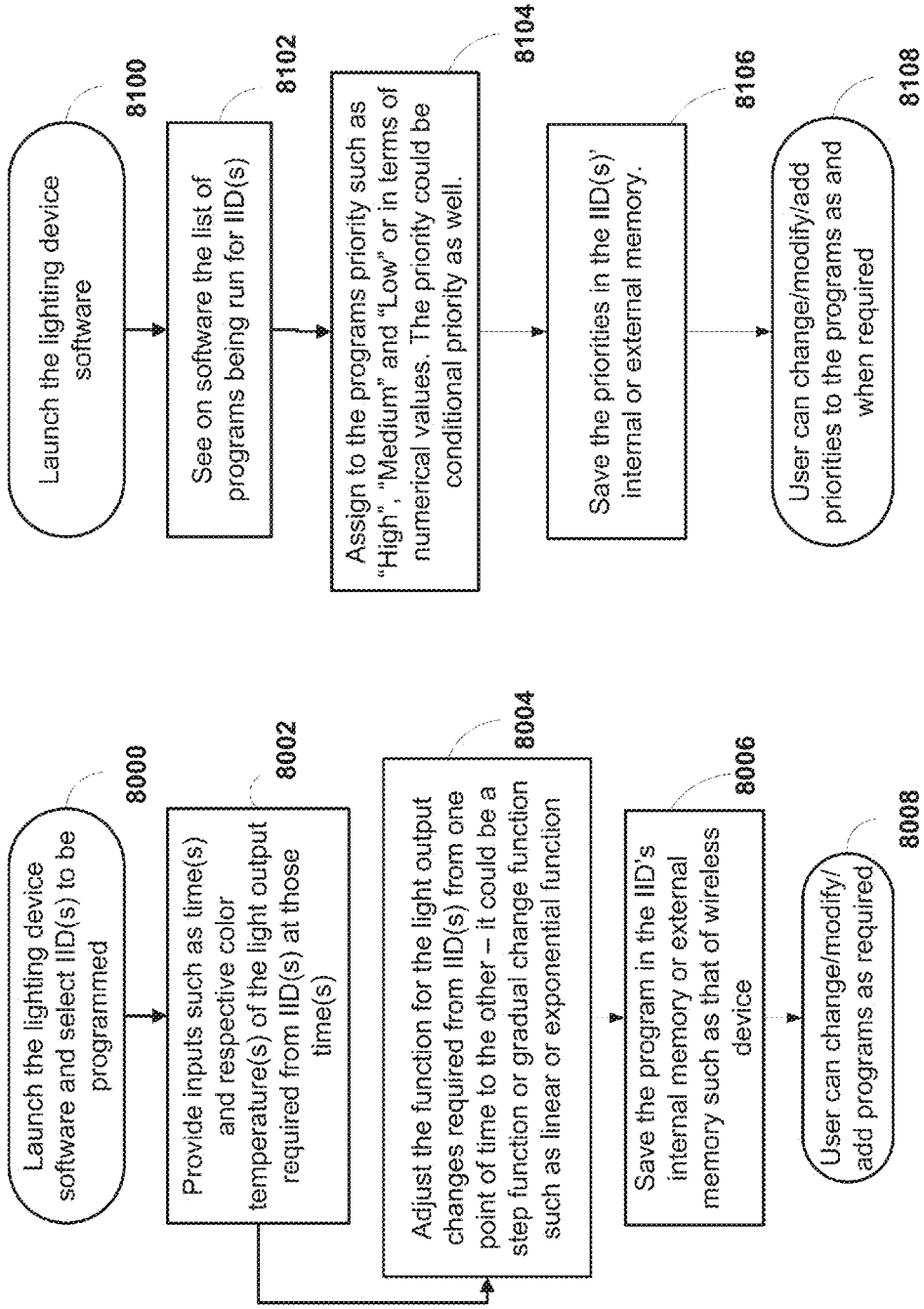

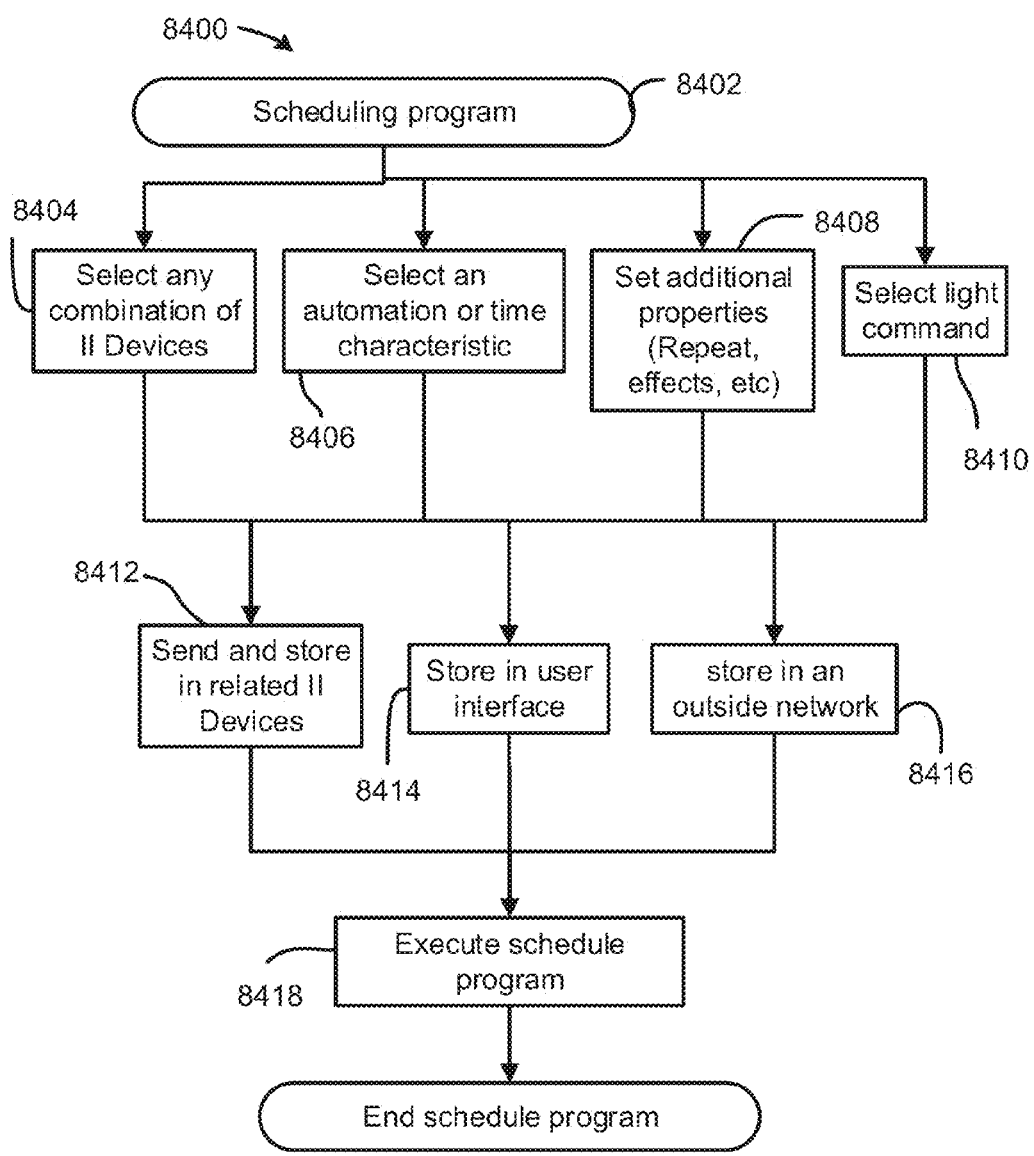

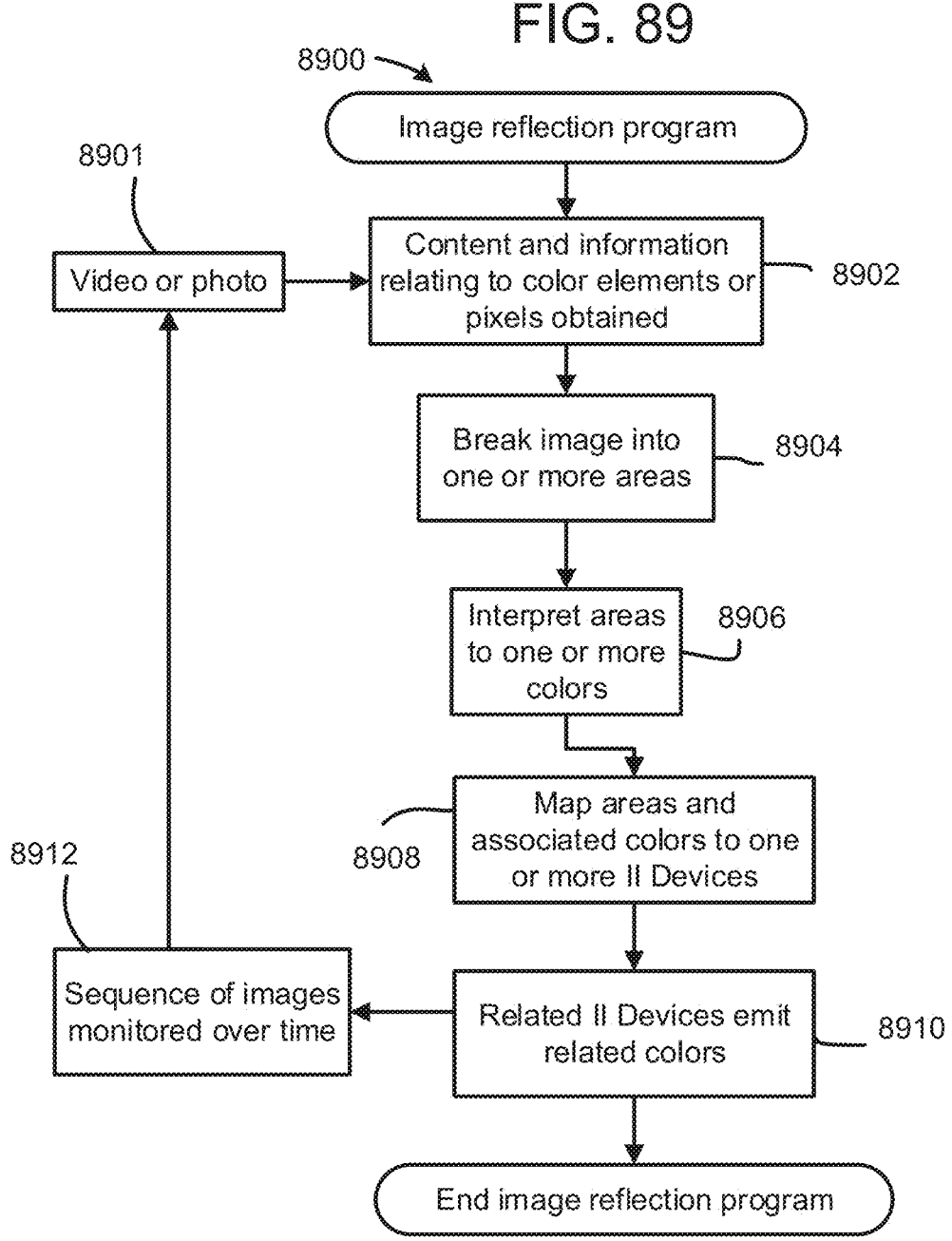

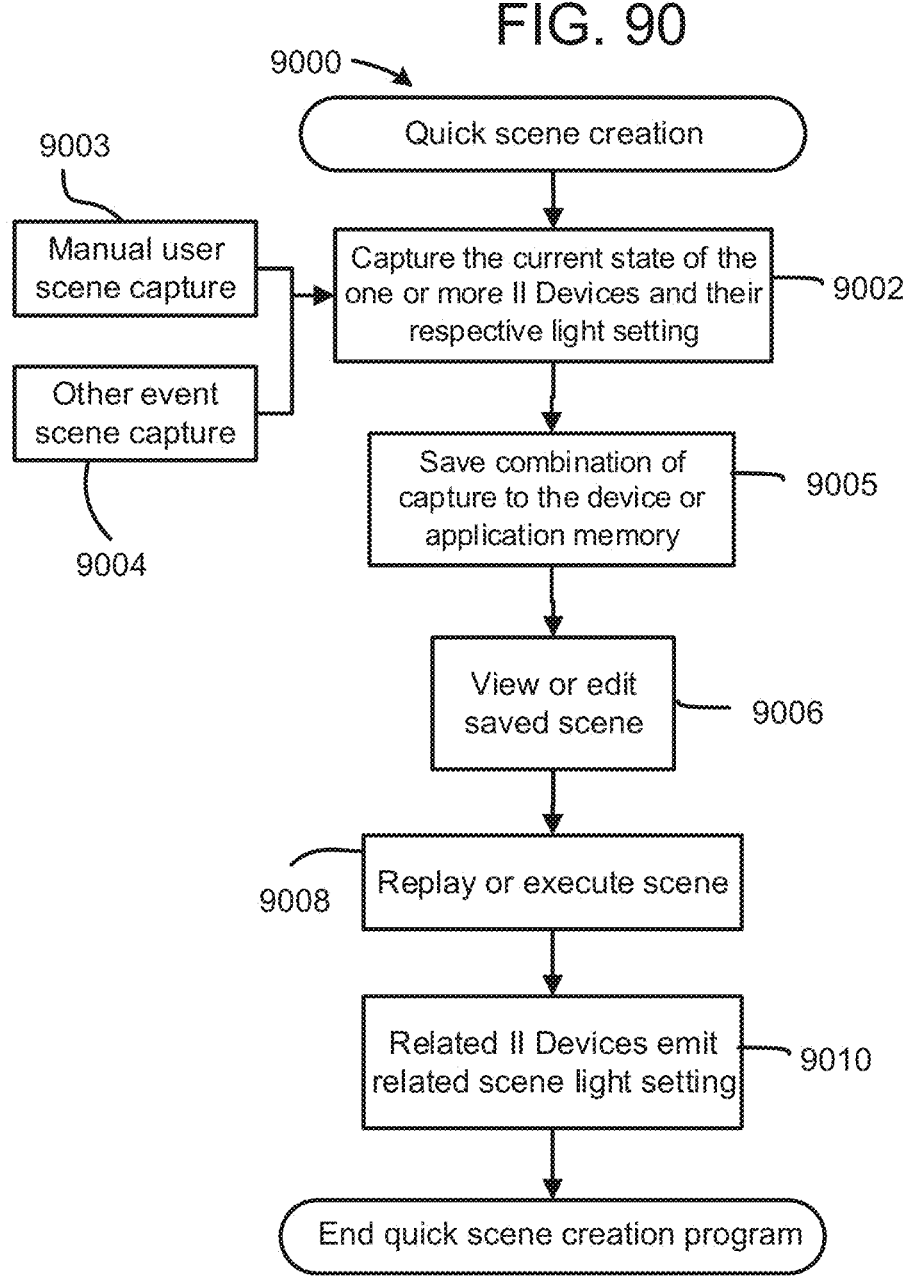

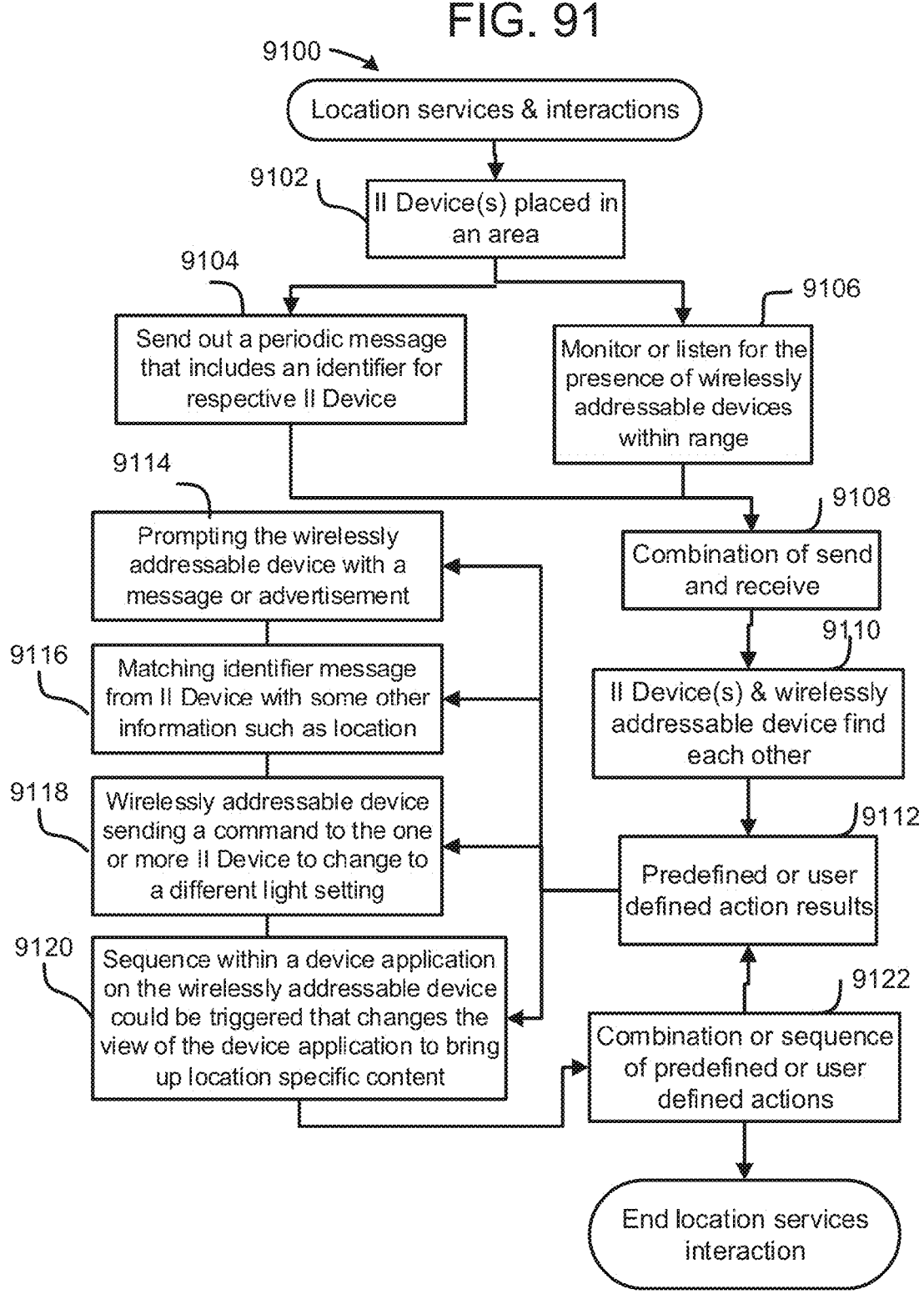

WIRELESS LIGHTING CONTROL SYSTEM

CROSS-REFERENCE TO RELATED APPLICATIONS

This application claims priority to and is: (1) a non-provisional patent application of U.S. Provisional Patent Application Ser. No. 61/724,651, filed on Nov. 9, 2012, and entitled "Wireless Lighting Control System"; and (2) a continuation-in-part application of U.S. patent application Ser. No. 13/836,280, filed on Mar. 15, 2013, and entitled "Wireless Lighting Control System", which (a) is a continuation application of U.S. patent application Ser. No. 13/417,322, filed Mar. 11, 2012, and entitled "Wireless Lighting Control System", which is a non-provisional patent application of U.S. Provisional Application Ser. No. 61/464,917, filed Mar. 11, 2011, and entitled "Specialty Lighting and Control Therefor", and (b) claimed priority to PCT Patent Application Serial Number PCT/US2012/037369, filed May 10, 2012, and entitled "Wireless Lighting Control System." The foregoing applications are hereby incorporated by reference in their entirety.

This application is also related to: (1) U.S. patent application Ser. No. 13/837,232, filed on Mar. 15, 2013, and entitled "Wireless Lighting Control System"; (2) U.S. patent application Ser. No. 13/838,648, filed on Mar. 15, 2013, and entitled "Wireless Lighting Control System"; and (3) U.S. patent application Ser. No. 13/839,738, filed on Mar. 15, 2013, and entitled "Wireless Lighting Control System". The foregoing applications are hereby incorporated by reference in their entirety.

FIELD OF THE INVENTION

The present invention relates generally to the field of lighting and, more particularly, to a specialty lighting device and control process for individual or simultaneous adjustment, automation, and programming of an individual or network of such light bulbs through a wireless interface.

BACKGROUND OF THE INVENTION

In response to government mandates, new lighting technologies, such as light emitting diodes(LEDs) or compact fluorescent lamps(CFLs), are entering the market at a rapid pace. However, these bulbs have limitations that make them unattractive to some users. CFLs have dimming limitations, take a few minutes to warm-up, and have problems with their color output. Additionally, CFLs contain mercury, a toxic and regulated substance, which creates issues with disposal. LEDs are currently very expensive in comparison and the high cost has dissuaded many consumers from their purchase.

Additionally, current lighting control and automation solutions are limited in their use in rental or temporary situations where the systems high price, required installation, and expertise in set-up are a problem. Further, as mobile computing systems continue to evolve, many people have shown a preference towards using their mobile device as a converged platform to control and execute multiple other tasks. Although a multitude of types of light types and luminaries have been created to help create a mood or environment, most if not all of these solutions only exist in a single state and are limited by the network power line. This has driven the complexity in bulb wattage, fixtures, wall-switches, shades, and other attempts at creating the ability to augment the atmosphere created by a light. If you want to dim one bulb, current solutions generally only allow for a wall-switch dimmer. The ability to address and adjust a single light individually or network of lights simultaneously is currently not possible without extensive installation.

SUMMARY OF THE INVENTION

The present invention provides an easily installed and transferable lighting and home automation solution because special or customized installation is not required. The present invention presents a solution to controlling and programming lighting devices such that the color and brightness of any individual light or a group of lights can be manually or automatically controlled using a wireless interface. A user has the flexibility to personalize the color, atmosphere, and mood of a room to better fit ones preference, time of day, or occasion at hand.

Additionally, since the present invention requires no installation, the solution is fully portable and can be removed and reused in other locations throughout the long life of the device. Essentially, the present invention is an automation and custom lighting solution that can travel with you.

Automation and dimming of the lighting devices save more energy than is consumed by the additional components of the lighting device. Moreover, using on/off signals having specified cycle times to produce a blended light reduce the current requirements of the lighting device. Lastly, holistically speaking the iLumi solution itself will help to drive the adoption of LED bulbs, providing an LED solution whose value outweighs its price.

More specifically, the present invention provides a lighting device that includes a AC/DC or DC/DC power converter, a controller/processor electrically connected to the AC/DC or DC/DC power converter, a light emitting diode (LED) current control circuit communicably coupled to the controller/processor and electrically connected to the AC/DC or DC/DC power converter, and one or more LEDs electrically connected to the LED current control circuit.

Moreover, the present invention provides a lighting device that includes a flexible strip, an electrical connector affixed to the flexible strip and two or more LEDs affixed to the flexible strip and electrically connected to the electrical connector. In addition, an AC/DC or DC/DC power converter, a controller/processor and a LED current control circuit are remotely located with respect to the flexible strip and electrically connected to the electrical connector via a wire, a cable or a connecting strip.

Furthermore, the present invention provides a lighting device that includes a housing, an AC/DC or DC/DC power converter, a controller/processor electrically connected to the AC/DC or DC/DC power converter, a light emitting diode (LED) current control circuit communicably coupled to the controller/processor and electrically connected to the AC/DC or DC/DC power converter, and one or more LEDs electrically connected to the LED current control circuit. The AC/DC or DC/DC power converter, the controller/processor and the LED current control circuit are disposed within the housing, and the one or more LEDs are proximate to or within an aperture of the housing.

In addition, the present invention provides a lighting system that includes two or more lighting devices. Each lighting device includes an AC/DC or DC/DC power converter, a controller/processor electrically connected to the AC/DC or DC/DC power converter, a light emitting diode (LED) current control circuit communicably coupled to the controller/processor and electrically connected to the AC/DC or DC/DC power converter, and one or more LEDs electrically connected to the LED current control circuit. The controller/ processors of the two or more lighting devices communicate with one another using the wireless transceivers and antennas of the two or more lighting devices.

The present invention also provides method for controlling one or more lighting devices by providing the one or more lighting devices, wherein each lighting device includes an AC/DC or DC/DC power converter, a controller/processor electrically connected to the AC/DC or DC/DC power converter, a light emitting diode (LED) current control circuit communicably coupled to the controller/processor and electrically connected to the AC/DC or DC/DC power converter, and one or more LEDs electrically connected to the LED current control circuit.

These and other objects, advantages and features of this invention will be apparent from the following description taken with reference to the accompanying drawing, wherein is shown a preferred embodiment of the invention.

BRIEF DESCRIPTION OF THE DRAWINGS

The above and further advantages of the invention may be better understood by referring to the following description in conjunction with the accompanying drawings, in which:

FIG. 3 is a circuit diagram of a solely LED Drivers scheme in accordance with one embodiment of the present invention;

FIG. 4 is a timing diagram for the solely LED drivers scheme of FIG. 3;

FIGS. 12A-1 and 12A-2 are block diagrams of a front view and a rear view, respectively, of a LED strip in accordance with one embodiment of the present invention;

FIGS. 12B-1 and 12B-2 are block diagrams of a front view and a rear view, respectively, of an extendible LED strip in accordance with one embodiment of the present invention;

FIG. 13 is a block diagram of the mechanical and electrical connections for the Smartstrip in accordance with one embodiment of the present invention;

FIG. 14 is a block diagram of an extendible LED strip in accordance with one embodiment of the present invention;

FIG. 21 is a flow chart of a status request/update process for a wireless device or auxiliary device to Intelligent Illuminating Device in accordance with one embodiment of the present invention;

FIG. 29 is a flow chart of a programming process in accordance with one embodiment of the present invention;

FIG. 30 is a flow chart of a process for creating a scene in accordance with one embodiment of the present invention;

FIG. 31 is a flow chart of a process for executing a scene command in accordance with one embodiment of the present invention;

FIG. 38A-F are diagrams of various screens on device application in accordance with one embodiment of the present invention;

FIG. 39 is a flow chart of a quick set-up process for connected lights in accordance with one embodiment of the present invention;

FIG. 43 is a block diagram of a device to device profile sharing process in accordance with one embodiment of the present invention;

FIG. 44 is a flow chart of a process for adding an authenticated profile directly through the Intelligent Illuminating Device in accordance with one embodiment of the present invention;

FIG. 47 is a flow chart of a process for adding a new Intelligent Illuminating Device into an existing Intelligent Illuminating Device network in accordance with one embodiment of the present invention;

FIG. 54 is a flow chart of a music sync process in accordance with one embodiment of the present invention;

FIG. 80 is a flow chart illustrating how a user can define the color temperature of the light output as a function of time in accordance with one embodiment of the present invention;

FIG. 81 is a flow chart illustrating how a user assigns the priority for various programs through the user interface software running on the wireless device for controlling a lighting device in accordance with one embodiment of the present invention;

FIG. 84 is a flow chart of a scheduling program for a lighting device in accordance with one embodiment of the present invention;

FIG. 89 is a flow chart of image reflection program for a lighting device in accordance with one embodiment of the present invention;

FIG. 90 is a flow chart of quick scene creation program for a lighting device in accordance with one embodiment of the present invention; and FIG. 91 is a flow chart of location services and interaction program for a lighting device in accordance with one embodiment of the present invention.

DETAILED DESCRIPTION OF THE INVENTION

Figure 1:
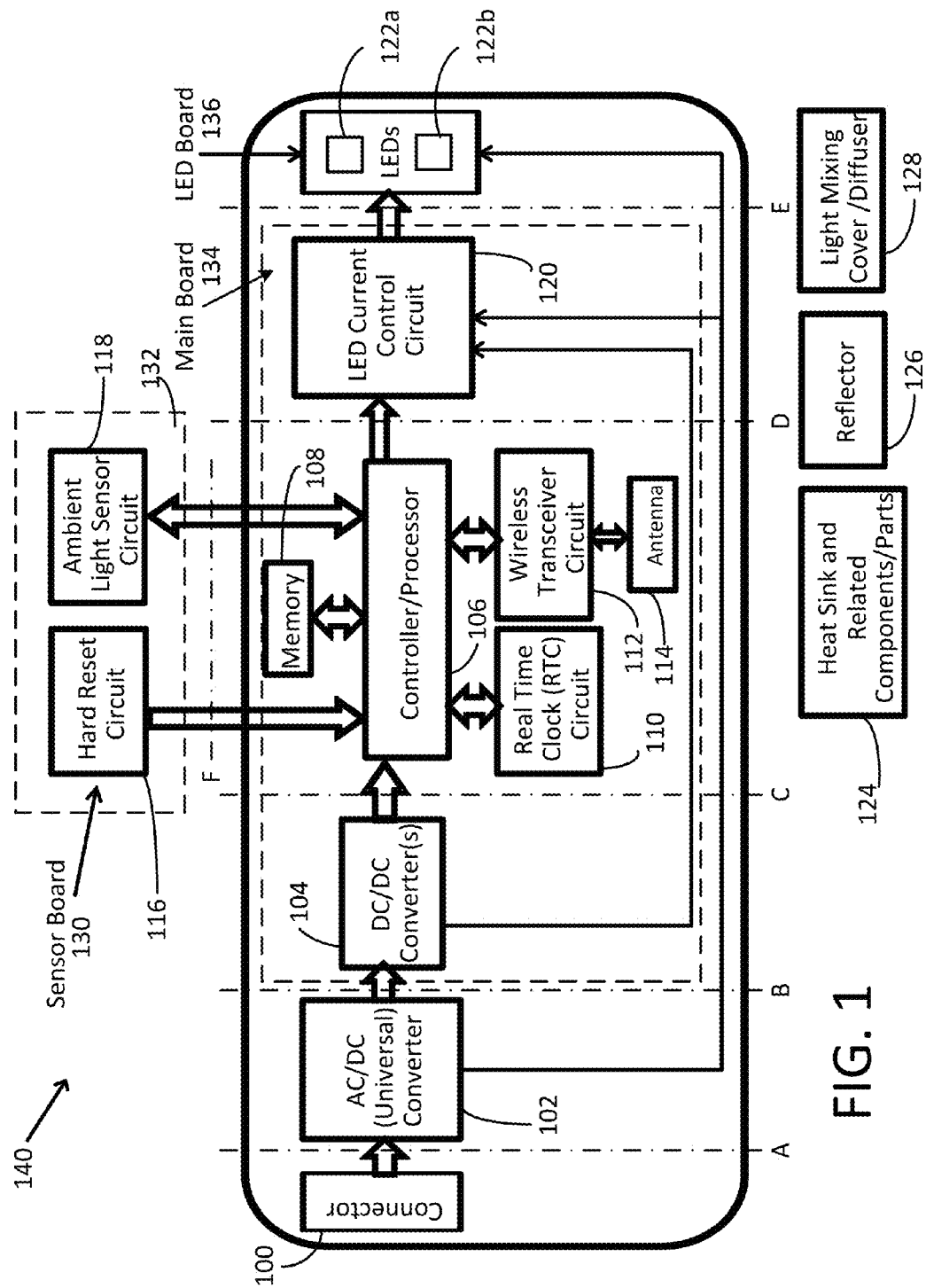
FIG. 1 is a block diagram of a lighting device in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention provides an easily installed and transferable lighting and home automation solution because special or customized installation is not required. The present invention presents a solution to controlling, programming, and automating lighting devices, such that the color and brightness of any individual light or a group of lights can be manually or automatically controlled using a wireless interface. A user has the flexibility to personalize the color, atmosphere, and mood of a room to better fit ones preference, time of day, or occasion at hand. Additionally, since the present invention requires no installation, the solution is fully portable and can be removed and reused in other locations throughout the long life of the lighting device. Automation and dimming of the lighting devices save more energy than is consumed by the additional components of the lighting device. Moreover, using on/off signals having specified cycle times to produce a blended light reduce the current requirements of the lighting device.

The present invention, a wireless lighting control system, consists of methods, apparatuses, and associated software (device application) for controlling, programming, and automating one and/or multiple 'Intelligent Illuminating Devices' (II Device) utilizing a wireless communication protocol executed between one or many wireless devices and one or many II Devices (II Device network). The methods and apparatuses presented here would allow one to adjust and control a single or network of II Devices with high flexibility, user control, and intuitive user interaction, with minimal installation or complexity.

For the purposes of discussing this invention the following terms will be used to describe the primary aspects of the invention. An II Device is a single wirelessly enabled lighting apparatus. A wireless device is a computing device such as a smartphone, computer, tablet, smartTV, remote, etc. A device application is a user facing software application run on the wireless device. A mesh network is a wireless communication protocol used to connect one or many II Devices and/or one or many wireless devices.

The light is a combination of a light generator, a light detector, a communicator, a power source, and a computer processor. In one embodiment these components are contained within one form factor similar to a standard light bulb. In other embodiments these elements will be separate from the other elements. For example, the light generator can be separate from the remaining components. In other embodiments, not all of the components are required. For example, one embodiment may consist solely of the lighting generator, communicator and computer processor. In other embodiments, an outside light-sensing component may be used. For example, an outside light-sensing component might be disparately connected to the remaining components.

An II Device in the context of this invention is a lighting apparatus containing additional electronic circuits and components. In one embodiment, the II Device will produce some measure or effect of luminosity dependent on commands sent wirelessly through a wireless device and associated device application. The II Device can receive wireless communications, take immediate action (in terms of a lighting output) based on the wireless communication, execute a sequence of actions, and store one or more commands to be executed at a specified time in the future or upon a specified condition being met. In addition, one embodiment of the II Device can intelligently relay/transmit wireless communication commands received from a device application (or II Device) to other II Devices within proximity. Similarly, one embodiment of the II Device would confirm receipt of the command through a wireless communication back to the wireless device and device application, possibly relaying the confirmation back through other II Devices. The communication means for to execute these processes can be seen in the mesh network section.

Now referring to FIG. 1, a block diagram of a lighting device in accordance with one embodiment of the present invention is shown. The lighting device (II Device) 140 might take numerous forms or embodiments in design, but certain components are common to the various designs while others will be used as is necessary for a specific embodiment. These components may or may not be part of II Device 140 and might be arranged in different fashion and with slight alteration to create different intelligent illuminating embodiments. For example, the II Device 140 includes a DC/DC power converter 104, a controller/processor 106 electrically connected to the DC/DC power converter 104, a light emitting diode (LED) current control circuit 120 communicably coupled to the controller/processor 106 and electrically connected to the DC/DC power converter 104, and two or more LEDs 122 electrically connected to the LED current control circuit 120. The LED current control circuit 120 can be a PWM driver, switching or multiplexer circuit, or light emitting diodes (LEDs) driver(s) circuit. The two or more LEDs 122 will include at least a first color LED 122*a* and a second color LED 122*b*. Moreover, at least one of the LEDs 122 may include a series of LEDs, a group of LEDs, an array of LEDs, two or more series-connected LEDs, two or more parallel-connected LEDs or a combination thereof. Typically, the first color LED 122*a* and the second color LED 122*b* will be selected from a red LED, a green LED, a blue LED, a red LED, a white LED, a tri-color LED and a four-color LED.

As will be explained in more detail below, a method for controlling one or more lighting devices 140 includes the steps of providing the one or more lighting devices 140, sending one or more control signals from the controller/processor 106 to the LED current control circuit 120 corresponding to a blended light having a specified color, and sending an on/off signal having a cycle time from the LED current control circuit 120 to each LED 122 in response to the one or more control signals such that the two or more LEDs 122 produce the blended light having the specified color based on how long each LED 122 is turned ON and/or OFF during the cycle time. The LED current control circuit 120 provides an on/off signal having a cycle time to each LED 122 in response to one or more control signals received from the controller/processor 106 such that the two or more LEDs 122 produce a blended light having a specified color based on how long each LED is turned ON and/or OFF during the cycle time. These on/off signals with specified cycle times to produce a blended light can be used to reduce the current requirements of the II Device 140.

Other embodiments will include additional components. For example, the additional components may include: a power supply connector/fastener 100; an AC/DC power converter 102 electrically connected to the power supply connector/fastener 100 and the DC/DC power converter 104; a real time clock (RTC) circuit 110 communicably coupled to the controller/processor 106; a memory 108 communicably coupled to the controller/processor 106; a wireless transceiver circuit 112 communicably coupled to the controller/processor 106; an antenna 114 communicably coupled to the wireless transceiver circuit 112; a hard reset circuit 116 communicably coupled to the controller/processor 106; an ambient light sensor circuit 118 communicably coupled to the controller/processor 106; a heat sink 124; a reflector 126 disposed behind or around the two or more LEDs 122; and/or a diffuser or lens 128 disposed above the two or more LEDs 122.

The components of the II Device 140 can be modularized to provide easy enhancement, customization, modification and repair of the II Device 140. For example, a main circuit board 134 may include the DC/DC power converter 104, the controller/processor 106, the LED current control circuit 120, the memory 108, the real time clock circuit 110, and the wireless transceiver circuit 112 and antenna 114. A sensor board 130 may include the hard reset circuit 116 and the ambient light sensor circuit 118. A LED board 136 may include the two or more LEDs 122 and additional LED related circuitry (e.g., LED arms).

The connector 100 performs at least one of two functions. One, it can physically connect the II Device 140 to a surface and two, it can provide access to a power source. The connector 100 could fasten to a standard surface, light socket, or electrical socket, or combination of the like. Similarly, the connector 100 could provide a connection to a power source as an Edison base (multiple sizes), Plug in, Bi-pin, or Battery connected connection (including water activated battery), etc. The connector 100 would conduct the electrical current through to the AC to DC converter 102. In some embodiments, such as the Intelligent Illuminating Strip (II Strip or Smartstrip) 900 (FIG. 9), the fastener and power connection means of the connector 100 might be separated. For example, an electrical plug is connected via a wire to the rest of the Smartstrip and the Smartstrip is fastened in some other manner (such as screws or adhesive) to a surface. In other embodiments, such as the Intelligent Illuminating Bulb (II Bulb) 1800 (FIG. 18), the connector 100 would be an Edison base or bi-pin for which when the connector is inserted into the appropriate light socket, the connector 100 would provide appropriate contact to extend the AC or DC power source or supply into the body of the II Bulb 1800. In addition, the connector 100 might provide some structural stability in fastening the II Device 140 to a surface.

The AC to DC converter 102 receives power from the connector 100 and outputs the appropriate DC power to the DC/DC converter 104, the LED current controlling 120 circuit, and LED circuit 122. Note that a single AC to DC converter 102 can be used in place of the combination of the AC to DC converter 102 and the DC/DC converter 104. The exact power input might vary depending on country specific standards or power sources, but as a universal converter, the power output will always be DC voltage such as 12 VDC or 18 VDC or 24 VDC. Examples of power inputs include AC power 60V-290V/45-65 Hz or (Examples: 230 VAC/50 Hz (European/Indian Standard), 110 VAC/60 Hz (US Standard), or a range of DC power from 12 VDC to 1000 VDC. The AC to DC converter 102 might be housed within the connector 100 or separate from the connector 100, depending on the specific II Device embodiment.

The DC/DC converter(s) 104 receives a power input from the AC/DC converter 102, it then converts that power to DC power(s) required for driving the internal components/modules of the II Device 140. These components include the controller/processor 106, memory 108, the real time clock (RTC) circuit 110, the wireless transceiver circuit 112, antenna 114, and possibly components within the LED current control circuit 120. It might also supply power to other components, such as the hard reset circuit 116, the ambient light sensor circuit 118, and other potential added circuits. There might be multiple converters dependent on the output DC voltages required by different component requirements. Similarly, the power output would very dependent on the exact component requirements, for example the output might be 5 VDC, 3.3 VDC, or 1.3 VDC.

The controller/processor 106 processes signals received from the memory 108, the real time clock (RTC) circuit 110, and the wireless transceiver circuit 112. It might also process signals from other components, such as the hard reset circuit 116, the ambient light sensor circuit 118, and other potential added circuits. It also takes action and sends commands to the memory 108, the real time clock (RTC) circuit 110, and the wireless transceiver circuit 112. It might also take action and send signals to other components, such as the ambient light sensor circuit 118 and other potential added circuits. In one embodiment, the computer processor includes a real time clock, processor 106, and memory chip.

The processor 106 processes the signals received by the various other components of the embodiment, computes necessary actions, and sends signals back out to various other components of the embodiment. The processor 106 will vary in terms of power, speed, and size in different embodiments. Additionally, the processor 106 is not limited to the contents listed above and may include other components.

The memory 108 stores data from factory defined settings and from user defined settings. The controller/processor 106 will read/write data in memory 108. Data might include factory-defined settings, such as communication protocols, identification and security protocols, and other data. Data might also include user-defined settings, such as user profiles, default commands, programs, and other data. The memory 108 could be inside the processor 106 and/or external to the processor 106 as a different integrated circuit or chip(s). The controller/processor 106 and memory 108 circuits might take a number of different technical specifications. In one embodiment, the processor 106 includes a real time clock, processor, and memory chip. The memory 108 receives information from the processor 106 and stores the commands for retrieval by the processor 106.

The real time clock circuit 110 includes a battery and a date and time clock based RTC. The controller/processor 106 will set the date and time data in the RTC 110 and also read the date and time data from the RTC 110. The RTC 110 could be internal to the controller/processor 106 or it could be an external circuit with respect to the controller/processor 106. The RTC 110 will run on the DC/DC power unless no power is provided, in which case it will run on the battery included within the real time clock circuit 106. The battery could be a rechargeable battery, in which case the DC/DC power when supplied would also charge the rechargeable battery through recharging circuitry. The battery could also be a non-chargeable battery. In one embodiment, the processor 106 includes a real time clock, processor, and memory chip. The real-time clock is battery powered and could be set for any time and date.

The wireless transceiver circuit 112 allows the II Device 140 to communicate with other wireless devices and/or other II Devices. The wireless transceiver circuit 112 includes a transmitter and receiver circuit based on established wireless protocols. These protocols could differ based on different II Device embodiments and changing wireless communication standards. Example wireless protocols include but are not limited to Bluetooth, ZigBee, Wi-Fi, and their related variants. The wireless transceiver circuit 112 will be connected to the controller/processor 106 and the antenna 114. In one embodiment, the wireless transceiver circuit 112 is composed of a transmitter and receiver circuit based on Bluetooth protocols. In other embodiments, the wireless transceiver circuit 112 might utilize other protocols including but not limited to ZigBee, WiFi, infrared, WiMax, LTE, ZWave, or other protocols not listed. In other embodiments, the wireless transceiver circuit 112 might include other component parts or circuitry.

The antenna 114 captures wireless communication signals and passes them to the wireless transceiver circuit 112 to decode those signals. The antenna 114 could take multiple forms depending on the protocol and signal frequency required. The physical location of the antenna 114 and/or wireless transceiver circuit 112 could be placed in multiple physical locations related to the II Device 140. For example, it might be placed outside of the II Device 140 or inside the II Device 140. Placing it outside, might increase the range of wireless communication for the II Device 140, especially when installed in locations with poor reception. Alternatively, the antenna might be built into the physical structure of the II Device 140 or be part of the main board 134 inside the II Device 140.

In some embodiments, the hard reset circuit 116 of the II Device 140 includes a button or switch mechanism and related circuitry. The button or switch would be connected to the controller/processor 106 either directly on the same board or through a wired connection. When the button or switch is activated, it will send a specific signal to the controller/processor 106 to execute the hard reset program for that II Device 140. The actual button or switch mechanism might be different dependent on the II Device 140 and its application. As example, the reset circuit might be a simple resistant button type switch, it might be a rotational type switch, or it might be a conductive type switch, it might be a compression switch based on pushing in some part of the mechanical structure. The location of the hard reset circuit might be co-located with other external components such as the ambient light sensor, LEDs, diffuser housing, or other II Device components or structural parts. In this sense the physical location with respect to the II Device 140 might vary. The hard reset function in most embodiments will require access to the DC/DC power, and thus the II Device 140 would need to be connected to an active power source. In some embodiments though, the hard reset circuit 116 would have access to a separate power source such as a battery to provide the controller and related circuitry enough power to execute the hard reset command.

In some embodiments, the II Device 140 might have an ambient light sensor circuit 118. The ambient light sensor circuit 118 consists of one or more ambient light sensors (photosensor or similar light detecting component) and supporting circuit. The ambient light sensor(s) in the ambient light sensor circuit 118 detects a level of captured ambient light, converts that level into an analog signal, and sends that data to the controller/processor via an analog to digital (A/D) converter that could be a part of the ambient light sensor circuit 118 or controller/processor 106. The ambient light sensor circuit 118 would consist of one or more ambient light sensors per one or multiple II Devices. In some embodiments the ambient light sensor circuit 118 could be embedded in the II Device 140 itself and in others it might be a separate peripheral device to the wireless lighting control system. Additionally, the placement of the sensor(s) 118 and related circuitry need not be exactly collocated, but possibly separated by a wire.

For example, the light sensor(s) 118 could be placed in multiple locations in relation to the II Device 140: (a) placement of sensor 118 requires external light to reach the light sensor; (b) the sensor(s) 118 could be placed on the exterior of the light, on the housing; (c) the sensor(s) 118 could be at the end of an extension or wire protruding; or (d) the sensor(s) 118 could be part of an external peripheral to the light, connected via wireless communication (e.g., the sensor could be housed with other electronic components such as a processor, communication source (Bluetooth module, Zigbee, Wi-Fi, or other)). There could also be multiple types of II Device sensors used: (a) one which senses a range of overall luminosity; (b) one that senses a combination of red, green and blue components or cyan, yellow, magenta or black components, or hue, saturation and lumens components of the light on it; or (c) in different scenarios the light measured could be in absolute or respective values. The ambient light sensor 118 can be located to detect an ambient light and a light emitted by the II Device 140 such that the controller/processor 106 adjusts one or more of the on/off signals provided to the LEDs 122.

LEDs 122 refer to a combination of LEDs or LED arms that are illuminated depending on current passed through from the LED current control circuit 120. The combination of LED arms or LEDs could be of various types and various colors dependent on the II Device embodiment. For example, the LEDs might vary in color such as red, green, blue, and/or white LEDs. The LEDs might also vary in their maximum output luminosity. The combination of illuminations of these LEDs could produce various levels of brightness and/or color.

The LED current control circuit 120 executes commands from the controller/processor 106 to control the current passed through the LEDs 122. The LED current control circuit 120 might take different forms dependent on the II Device embodiment as per the following schemes: solely LED drivers scheme (FIG. 3), switches and LED driver scheme (FIG. 5), multiplexer and LED driver scheme (FIG. 7), and current limiting circuit scheme (FIG. 8). In general, the controller/processor 106 sends commands to LED drivers (208 or 318, 320, 322, 324, or 508), switches or multiplexer (500, 502, 504, 506 or 702), which in turn controls the light output by controlling the average current passed through the LEDs 122. The average current would affect the overall luminosity of the II Device 140, such as that at lower average currents passed through the LED driver then the II Device would be dimmer.

For embodiments where multiple LED arms (302, 304, 306, and 308) are present, unique to the presented schemes is a method to maximize the potential current passed through and subsequent luminosity of each LED arm with limited available current from the AC/DC converter 102. This is done by controlling the current passed through by the LED driver (208 or 318, 320, 322, 324, or 508) so that only one LED driver (208 or 318 or 320 or 322 or 324 or 508) can pass through current at a time. This allows each on/off signal to provide a maximum current supplied by the DC/DC power converter to the LED 122. By varying and alternating very short lengths of time that current is passed through different LED arms (302, 304, 306, 308) using LED current control circuit 120, the schemes also allow the multiple LED arms (302, 304, 306, 308) to produce an overall blended light that is capable of various colors, saturation, and brightness. These schemes allow the II Device 140 to provide the highest level of individual luminosity emitted related to one of the LED arms (302, 304, 306, 308), such as white, red, blue, or green, while also allowing for all combinations of color, brightness, and saturation to be achievable.

In other words, the specified color is produced by turning ON the first color LED 122a for a first portion of the cycle time and turning ON the second color LED 122b for a second portion of the cycle time. The two or more LEDs 122 are not turned ON at the same time. The cycle time is preferably short enough such that a user will not notice any flicker, which is usually around 85 Hz (about 12 ms), unless flicker is desired. The on/off signal for the first LED 122a includes two or more pulses during a portion of the cycle time that the first LED 122a is turned ON. Likewise, the on/off signal for the second LED 122b includes two or more pulses during a portion of the cycle time that the second LED 122b is turned ON. The on/off signals can be adjusted to provide a specified color, saturation and brightness or intensity. The specified brightness or intensity can be determined by a duty cycle of the on/off signals.

In one embodiment, the light generator is composed of LEDs, LED Drivers, and a light enhancement cover. The LEDs are of various types and colors. The LED Drivers are the circuitry that drives the LEDs. The LED Drivers take the commands from the processor for turning required LEDs at required brightness or intensity.

One potential scheme for the LED current control circuit 120 is the 'solely LED drivers scheme' (FIG. 3). In this scheme the controller/processor 106 would send one or multiple Pulse Width Modulation (PWM) Signals to one or many LED drivers (318, 320, 322, 324) which would control the current flowing through an associated LED arm (302, 304, 306, 308 respectively). There would be the same number of PWM signals (326/400, 328/402, 330/404, 332/406) sent as there would be LED drivers (318, 320, 322, 324) and LED arms (302, 304, 306, 308). The total number of LEDs strings (arms) and LED drivers depend upon the application. LED driver circuit is designed for a particular current level to pass through it, so the LED driver circuit (318, 320, 322, 324) will regulate the flow of current through the respective LED arm (302, 304, 306, 308) to the set current level whenever the controller 106 provides a high level signal to it. PWM consists of high and low signals at a fixed frequency. One could change the duration of high and low signals in a given time frame (defined as time period=1/frequency). Considering the controller sends one PWM signal to one LED driver to control the average current through one associated LED arm. Varying the duty cycle of the PWM signal changes the average current flowing through the LED driver to the LED arm. The average current affects the overall luminosity of the II Device, such as lower average currents pass through the LED driver then the II Device would be dimmer (i.e., lowering the average currents passed through the LED driver dims the light produced by the II Device).

LEDs 122 refer to a combination of LEDs or LED arms that are illuminated depending on current passed through from the LED current control circuit 120. The combination of LED arms or LEDs could be of various types and various colors dependent on the II Device embodiment. For example, the LEDs might vary in color such as red, green, blue, and/or white LEDs. The LEDs might also vary in their maximum output luminosity. The combination of illuminations of these LEDs could produce various levels of brightness and/or color.

The heat sink and related components and parts 124 may be required in some embodiments of the II Device 140. The heat sink and related components 124 dissipate the heat generated by the LEDs 122 and LED current control circuit 120. The heat sink 124 could take multiple sizes, shapes, and materials dependent on the II Device embodiment. 'Related components' refers to the housing and outer structure of the II Device 140. These materials and arrangement might of course differ depending on the particular II Device embodiment.

The light reflector 126 is used to amplify or focus the illumination generated by the LEDs 122. The light reflector 126 could be made of different reflective materials and come in different sizes, dependent on the specific variation and application of the II Device 140. The light reflector 126 would be placed behind and/or around the LEDs 122, most likely at an arc so that the illumination of the LEDs 122 is reflected, focused, and amplified through the diffuser 128. The exact placement, angle, and arc of the light reflector 126 would vary dependent on the variation and application of different II Devices.

The diffuser 128 is a part of the II Device 140 that spreads and/or 'mixes' the illumination produced by the LEDs 122. The diffuser 128 could be made of different materials and come in different sizes, dependent on the specific variation and application of the II Device 140. Common material might be glass, plastics, or fiber. The diffuser 128 would be placed over the LEDs 122 so that the illumination passes through the diffuser 128. The exact placement, angle, and arc of the diffuser 128 related to the LEDs 122 would vary dependent on the variation and application of different II Devices.

The II Device 140 might take other common embodiments not fully described in this disclosure, but not limited to the following: (a) an II Device integrated into a lighting fixture (e.g., could be installed fixture with all II Device circuitries built in or non-installed fixture such as a plug in lamp); (b) an II Device integrated into a fan (e.g., could be installed fixture with all II Device circuitries built in); (c) an II Device that is solely battery powered and affixed to a surface; (d) an II Device utilizing OLEDs as LEDs; (e) an II Device integrated into directly into surfaces (walls, tables, and ceilings), clothing, appliances, electronics (Displays, music equipment, etc.), musical instruments (pianos, guitars, etc.) and taking power from some source either internally or externally to that integrated part; or (f) an II Device specifically designed for emergency lighting. Considering the control of the II Device, the invention herein provides processes and methods to wirelessly control and/or program one or many II Devices through one or many wireless devices. These processes and methods shown and described provide maximum utility and range with a given communication protocol and a reliable and efficient system.

As previously mentioned, the II Device 140 could be modular (i.e., different parts of the II Device 140 as separated by a dashed-dot lines A, B, C, D, E and F could be detachable from a manufacturing or consumer standpoint). Certain parts or modules of the II Device 140 could be interchangeable with other types of the same module. As example, consider an II Device 140 that has different connector modules, plug in vs. Edison base, yet the rest of the modules are the same. The modules could be connected together through connectors, that a user could separate or place back together. The modules might also be structurally fixed together so that disassembly is required to disconnect the modules. Additionally, modules within the II Device 140 could be separated physically from each other yet connected electronically in some fashion. There could be different levels of modularity or no modularity at all, depending on the specific II Device embodiment.

Given the standard parts and connections of the II Device 140, there could be numerous potential II Device embodiments with differing arrangements, combinations, or expressions of the components disclosed. Some of these embodiments, characteristics and methods will be described below.

Figure 2:
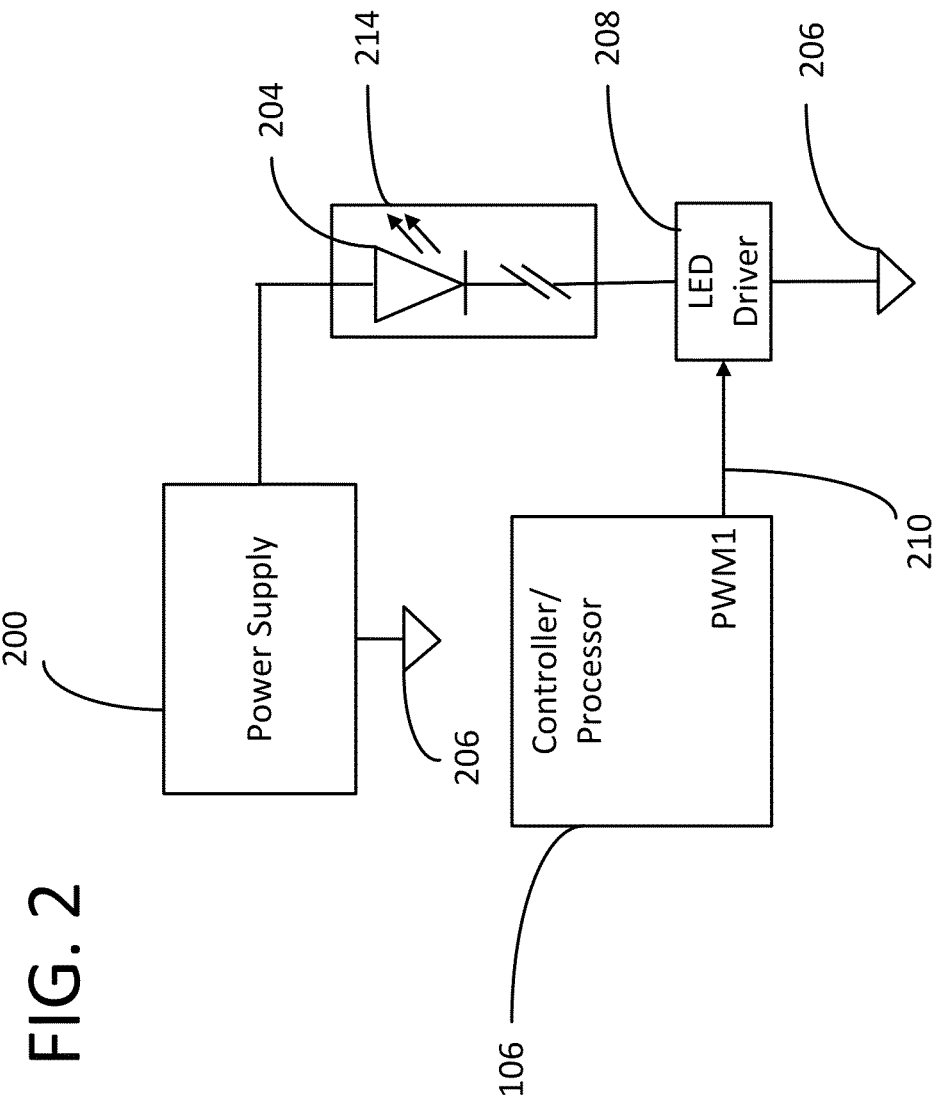
FIG. 2 is a circuit diagram of a single LED arm with single LED in accordance with one embodiment of the present invention.

Referring now to FIG. 2, a circuit diagram of a single LED arm 214 with single LED(s) 122 in accordance with one embodiment of the present invention is shown. The LED arm 214 is electrically connected to the power supply 200 and the LED driver 208. The power supply 200 and LED driver 208 are also connected to the ground or negative terminal 206 of the power supply 200. In certain embodiments, the controller/processor 106 might send multiple PWM signals 210 to multiple LED drivers 208 to control the current passed through to multiple LED arms 214. In these cases, the LED current control circuit 120 would allow to similarly change the overall brightness or luminosity of the II Device 140, but also adjust the color and/or saturation of the light emitted from the II Device 140. In this latter case of controlling color and saturation the LED arms 214 would need to be of different colors that could create different colors when mixed at different levels. The LED arm 214 can have warm yellow or other colors/types of LEDs 122.

Now referring to FIG. 3, a circuit diagram of a solely LED Drivers scheme in accordance with one embodiment of the present invention is shown. For illustrative purposes, consider here four PWM signals (326, 328, 330, 332) sent from the controller 106 annotated as PWM1 326, PWM2 328, PWM3 330 and PWM4 332 and four associated LED drivers annotated as LED Driver1 318, LED Driver2 320, LED Driver3 322 and LED Driver4 324. In addition, consider four LED arms, LED arm1 302 with red LEDs 310, LED arm2 304 with green LEDs 312, LED arm3 306 with blue LEDs 314, and LED arm4 308 with white LEDs 316. Based on established color mixing principals, the variation in the luminosity of these four colors could produce all color combinations. To achieve this variation, the controller 106 could vary and alternate the length of time that the PWM signals (326, 328, 330, 332) are sent to the LED drivers (302, 304, 306, 308). This would create variations in lengths of time when the LED drivers (302, 304, 306, 308) would receive PWM signals (326, 328, 330, 332). The length of time would also allow for a similar control in the overall brightness of the luminosity produced by the II Device 140 in addition to the control provided by variations of the duty cycle of the PWM signal itself.

Similarly, variations in the length of time that the controller 106 would alternatively send each PWM signal (326, 328, 330, 332) to the respective LED driver (318, 320, 322, 324), which would control the current passed through to the respective LED arm (302, 304, 306, 308), would also provide for a combinatory control of the average luminosity produced by each LED arm (302, 304, 306, 308) and thus allow for control of color and saturation of the light produced. The frequency of PWM signals (326, 328, 330, 332) and the rate at which LED drivers (318, 320, 322, 324) receive the PWM signals (326, 328, 330, 332) from controller/processor 106 will be high enough (still within the LEDs' and LED Drivers' technical specifications) so that due to the persistence of vision, consumers would see a constant light output, for example a yellow light instead of fast switching alternate red and green light outputs. The scheme in alternating PWM signals (326, 328, 330, 332) does not allow for simultaneous PWM signals (326, 328, 330, 332) executed by the LED driver (318, 320, 322, 324) at the same time. This maximizes the potential average current passed through LEDs arms (302, 304, 306, 308) and subsequent luminosity of each LED arm (302, 304, 306, 308) considering limited available current from the AC/DC converter 102. It allows for each LED arm (302, 304, 306, 308) to receive the full power provided by the AC/DC converter 102 and regulated by the LED driver (318, 320, 322, 324), such that when it is on all the available current could be sent through to the one LED arm.

To further illustrate these concepts, below is an example of how the solely LED driver scheme might work. Consider, the frequency of PWM signal is 2 KHz or total time period for one signal (one high and one low)=½ KHz=0.5 ms. Consider the duty cycle of each PWM1 400 and PWM2 402 is the same. The higher the duty cycle, the brighter the overall luminosity would be and vice-versa. Each LED driver (318, 320, 322, 324) is designed for a particular current level, i.e. when LED driver (318 or 320 or 322 or 324) is ON (when they get high signal from the controller 106), the current passing through the LED driver (318, 320, 322, 324) would be the lesser value of either the designed particular current level or the maximum current that power supply 200 can provide. Assume that the luminosity created per unit of average current is the same for both the red LED arm 302 and the green LED arm 304. If in 4 ms cycles, the controller turns on the PWM1 and turns off PWM2 every first 2 ms and then turns off PWM1 and turns on PWM2 for the next 2 ms with PWM3 and PWM4 are off continuously, then, the overall light output would be yellow (mixture of Red and Green color light, each with same luminosity).

Referring now to FIG. 4, a timing diagram for the solely LED drivers scheme of FIG. 3 is shown. To produce a type of orange light which consists of 70% red and 30% Green light mixed together, PWM1/LED Driver1 400 should be ON for 70% of the cycle time (here, 70% of 4 ms=2.8 ms) and PWM2/LED Driver2 402 should be ON for remaining 30% of the cycle time (here, 30% of 4 ms=1.2 ms). Similarly, to produce brighter shade of orange light which may consist of 50% RED, 20% Green and 20% White light together, PWM1/LED Driver1 400 should be ON for 50% of the cycle time (here, 50% of 4 ms=2 ms), PWM2/LED Driver2 402 should be ON for 20% of the cycle time (here, 20% of 4 ms=0.8 ms), PWM3/LED Driver3 404 should be ON for 0% of the cycle time (here, 0% of 4 ms=1 ms), PWM4/LED Driver4 406 should be ON for 20% of the cycle time (here, 20% of 4 ms=0.8 ms), and all PWM/LED Drivers (400, 402, 404, 406) should be OFF for the remaining 10% of cycle time (here, 10% of 4 ms=0.4 ms).

In a similar way, by varying PWM signal duty cycle for four LEDs Drivers (318, 320, 322, and 324) for a given PWM ON/OFF time cycle (4 ms in an example above), II Device 140 could produce any color with different shades. When duty cycle is 100% i.e. 100% ON and 0% OFF, the PWM/LED Driver1 400 and PWM/LED Driver2 402 are ON for 2 ms alternately every PWM ON/OFF cycle of 4 ms, II Device 140 will produce highest possible (100%) luminosity for the Yellow light. Thus the output luminosity can be varied by varying duty cycle of the PWM signals (326, 328, 330, 332) to LED drivers (318, 320, 322, 324), providing dimming feature to II Device 140.

The algorithm/program in the controller is such that, at a time only one LED Driver (here, 400 or 402 or 404 or 406) is given a PWM signal. This particular scheme is more useful when power supply has limited current output capability. With such algorithm one could achieve maximum luminosity for any color possible. For example, let's assume a power supply is rated at a maximum 15V/1 A output and all LEDs have rating of 1 A and LED drivers are designed for 1 A current. To achieve 100% luminosity output from RED LEDs, one has to pass 1 A current through RED LEDs Arm 302 continuously. In this case, LED Driver1 318 only will be given PWM signal for entire 4 ms of the PWM cycle and that too at 100% duty cycle. As against in other design if all four LED drivers are designed for ¼th of the possible supply of current i.e. ¼×1 A=0.25 A, maximum current will never exceed 0.25 A through any LED arm, and will thus limit the output luminosity of that particular LED arm.

The algorithm/Program makes sure that only one LED Driver (318 or 320 or 322 or 324) has its PWM signal ON at a time. To produce colors, program gives turns ON PWM signals to LED drivers (318, 320, 322, 324) in a serial manner i.e. alternately, fast enough so that due to persistence of vision, consumer sees the output light as a single defined color instead of flickering Red, Green, Blue or White lights.

Figure 5:
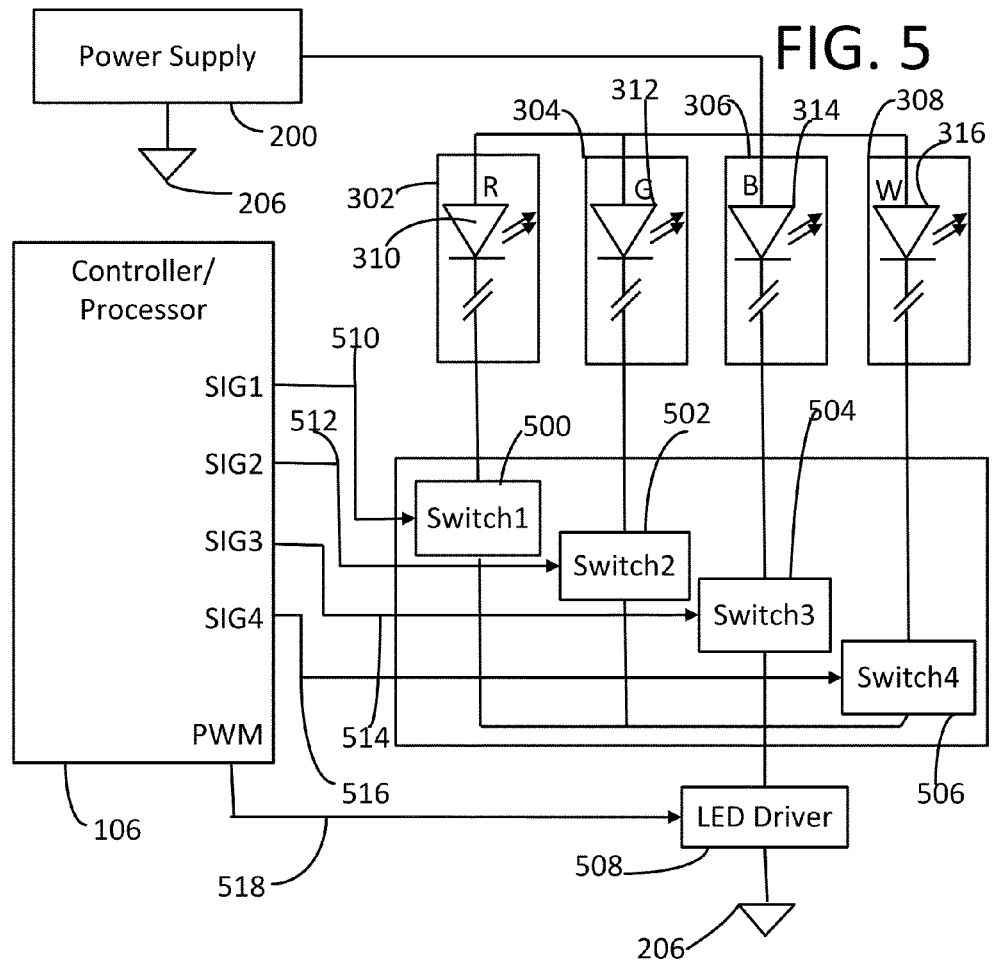
FIG. 5 is a circuit diagram of switches and LED driver scheme in accordance with one embodiment of the present invention.

Now referring to FIG. 5, a circuit diagram of switches (500, 502, 504, and 506) and LED driver 508 scheme in accordance with one embodiment of the present invention is shown. In this scheme, the controller/processor 106 would send a Pulse Width Modulation (PWM) signal to one LED driver 508 which would control the average current flowing through it. In addition, there would be a switch for every LED arm between the LED driver 508 and each LED arm (302, 304, 306, and 308). The controller is connected to each switch (500, 502, 504, and 506) and can send an on/off signal for each. Considering an embodiment with four LED arms (302, 304, 306, 308) and subsequently four switches (500, 502, 504, 506), the controller 106 would send a signal to control Switch1 500, Switch2 502, Switch3 504 and Switch4 506, while also sending a PWM signal to the LED driver 508 to allow current to pass through to the switches (500, 502, 504, 506). Variation in the average current passing through the LED driver 508 controlled by variations in the PWM sent by the controller would increase or decrease the average current passing through to the subsequent LED arms (302, 304, 306, 308), thus controlling the overall brightness of the LEDs. The switches (500, 502, 504, 506) turning on or off, would be able to create different colors and saturation produced by the light. When a switch (500, 502, 504, and 506) gets high signal from the controller 106, it provides path for current to flow from LEDs in LEDs arms (302, 304, 306, 308) to LED driver 508.

Considering the embodiment contains red, green, blue, and white LED arms (302, 304, 306 and 308 respectively), based on established color mixing principals, the variation in the luminosity of these four colors could produce all color combinations. To achieve this variation, the controller could vary and alternate the length of time that the switches are turned on. This would create variations in lengths of time when the LED driver 508 would pass through current to the LED arms and thus create variations in lengths of time when the LEDs produce light. The length of time would also allow for a similar control in the overall brightness of the luminosity produced by the II Device 140 in addition to the control provided by variations of the duty cycle of the PWM signal 518 itself.

Similarly, variations in the length of time that the controller 106 would alternatively send each switch (500, 502, 504, 506), which would control the current passed through from the LED arms (302, 304, 306, 308) to the LED driver 508, would also provide for a combinatory control of the average luminosity produced by each LED arm (302, 304, 306, 308) and thus allow for control of color and saturation of the light produced. The frequency of switch signals will be high enough (still within the LEDs' (310, 312, 314, 316) and LED Driver's 508 technical specifications) so that due to the persistence of vision, consumers would see a constant light output, for example a yellow light instead of fast switching alternate red and green light outputs.

The scheme in alternating switch signals does not allow for simultaneous switches being on at the same time. This maximizes the potential average current passed through and subsequent luminosity of each LED arm (302, 304, 306, and 308) considering limited available current from the AC/DC converter 102 in the power supply 200. It allows for each LED arm (302 or 304 or 306 or 308) to receive the full power provided by the AC/DC converter 102 and regulated by the LED driver 508, such that when it is on all the available current could be sent through to the one LED arm (302 or 304 or 306 or 308).

To further clarify the scheme, consider the following example. A yellow light with no white light added into it can be produced by the controller turning Switch 1 500 ON and Switch 2 502 OFF and then Switch 1 500 OFF and Switch 2 502 ON continuously at the same frequency, fast enough so that due to the persistence of vision, consumer sees it as a yellow light output instead of alternate Red and Green light output. LED driver 508 circuit can be designed for a particular current level i.e. it will regulate the flow of current through it to the set current level whenever the controller 106 provides a high signal to it. PWM (Pulse Width Modulation) 518 consists of high and low signals at a fixed frequency. One could change the duration of high and low signals in a given particular time (defined as time period=1/frequency).

An example of how this circuitry works will now be described. Assumptions: (1) frequency of PWM 518/608 set is 2 KHz, i.e. total time period for one signal (one high and one low)=½ KHz=0.5 ms; (2) frequency at which switches (510, 512, 514, 516/600, 602, 604, 606) are turned ON and OFF=250 Hz, i.e. total time period for switch to turn ON and OFF=1/250 Hz=4 ms; and (3) LED driver 508 is designed for 1 A current, i.e. when any switch (500, 502, 504, 506) and LED driver 508 is ON (when they get high signal from the controller 108) current passing through it is 1 A or maximum current that power supply 200 can provide, whichever is less. The user wants a Yellow light output at half the maximum luminosity possible, for which Red 310 and Green 312 LEDs should be illuminated equally by sending same amount of average current through them. Also for half the luminosity, the average current passing through RED LEDs arm 302 and Green LEDs arm 304 should be half the maximum average current possible. This is achievable by turning Switches (510, 512, 514, 516/600, 602, 604, 606/500, 502, 504, 506) ON/OFF and setting PWM 518/608 as in the timing diagram below. The power supply can provide maximum current of 1 A for any LED arm (302, 304, 306, and 308) at a time.

Figure 6:
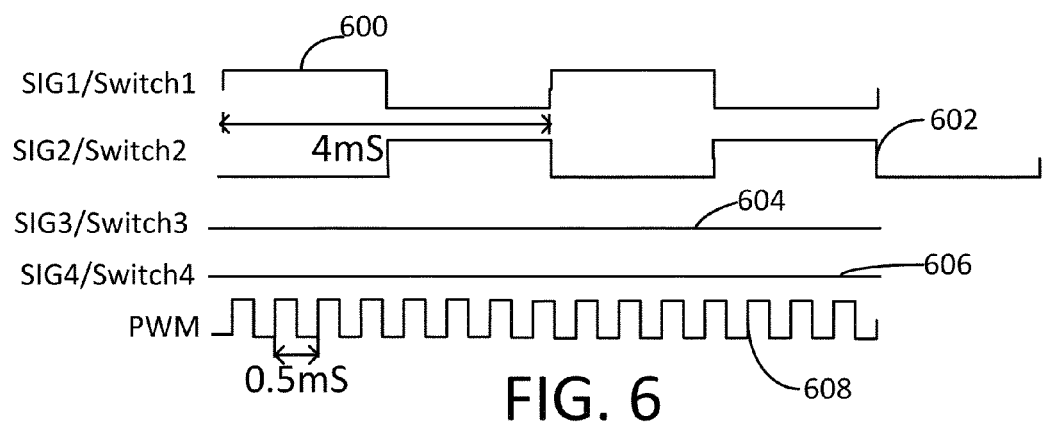
FIG. 6 is a timing diagram for the switches and LED driver scheme of FIG. 5.

Switching frequency of 250 Hz (cycle of 4 ms): When Switch1 500 is ON; Switch2 502 is OFF letting current flow through only one arm at a time. Also, time for which Switch1 500 is ON and time for which Switch2 502 is ON are equal, thus producing Yellow light as required. However, to produce a type of orange light which consists of 70% Red and 30% Green light together, SIG1/Switch1 510/600 should be ON for 70% of the cycle time (here, 70% of 4 ms=2.8 ms) and SIG2/Switch2 512/602 should be ON for remaining 30% of the cycle time (here, 30% of 4 ms=1.2 ms). Similarly, to produce brighter shade of orange light which consists of 50% RED, 20% Green and 20% White light together, SIG1/Switch1 510/600 should be ON for 50% of the cycle time (here, 50% of 4 ms=2 ms), SIG2/Switch2 512/602 should be ON for 20% of the cycle time (here, 20% of 4 ms=0.8 ms), SIG4/Switch4 516/606 should be ON for 20% of the cycle time (here, 20% of 4 ms=0.8 ms), and all switches (510, 512, 514, 516/600, 602, 604, 606) are off for the remaining 10% of cycle time (here, 10% of 4 mA=0.4 ms). FIG. 6 is a timing diagram for the switches and LED driver scheme of FIG. 5.

In a similar way, by varying the switching combinations for a given time cycle, II Device 140 could produce any color with different shades. When duty cycle is 100% i.e. 100% ON and 0% OFF, the LED driver 508 is always ON, thus letting current pass continuously through an LED arm (302, 304, 306, 308) which has its switch ON, in turn providing highest possible luminosity for the color produced. Thus the output luminosity can be varied by varying duty cycle of the PWM signal 518/608 to the LED driver 508, providing dimming feature to II Device 140. The algorithm/program in the controller 106 is such that, at a time only one switch or limited number of switches will be turned ON. Thus, making sure that maximum possible current (mainly set by LED driver 508 circuit) flows through the LED arm of that particular switch at that time. This particular scheme is more useful when power supply has limited current output capability. With such algorithm one could achieve maximum luminosity for any color possible.

For example, let's say a power supply 200 (AC/DC Converter 102) is rated at a maximum 15V/1 A output. Let's assume all LEDs have rating of 1 A. To achieve 100% luminosity output from RED LEDs arm 302, one has to pass 1 A current through RED LEDs arm 302 continuously. In this case, SIG1/Switch1 510/500/600 will be ON continuously and PWM 608 duty cycle to LED driver will be 100% as well. However, if one designs all four LED drivers to ¼th of the maximum supply current from AC/DC converter i.e. ¼×1 A=0.25 A, maximum current will never exceed 0.25 A through any LED arm, thus limiting the output luminosity of that particular LED arm and combination of LEDs to be ON. Algorithm/Program makes sure that only one LED arm is ON at a time, and to produce colors other than Red, Green, Blue and White, program turns ON/OFF the respective switches fast enough so that consumer sees the output light as a defined color due to persistence of vision.

Figure 7:
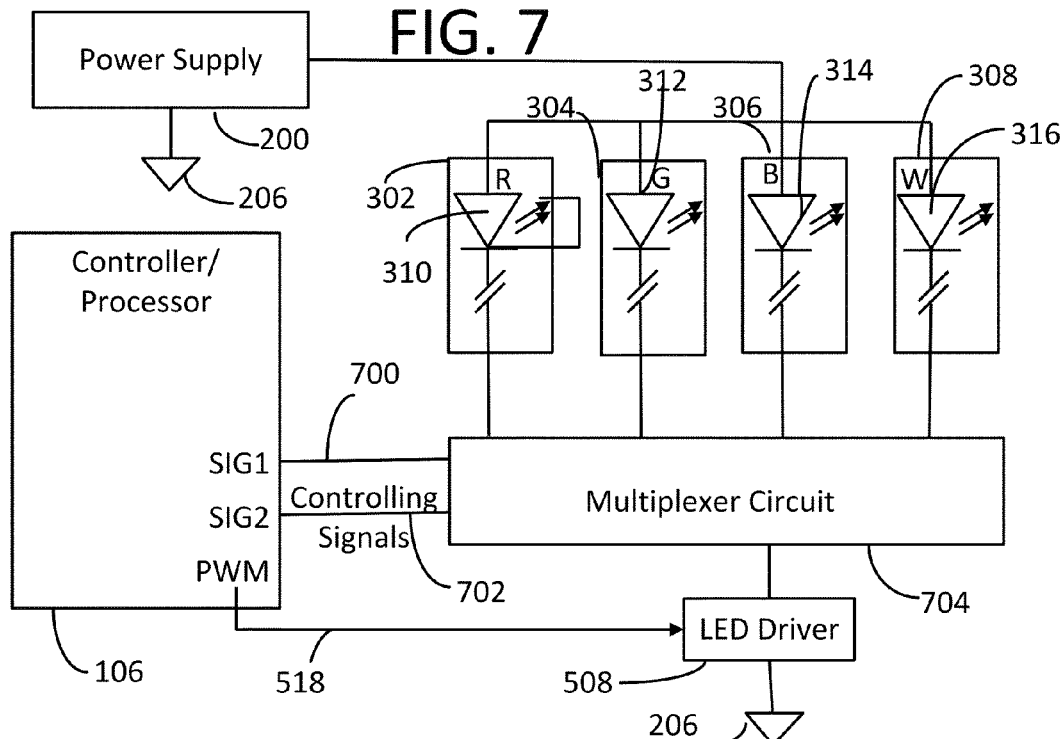
FIG. 7 is a circuit diagram of a multiplexer and a LED driver scheme in accordance with one embodiment of the present invention.
Figure 8:
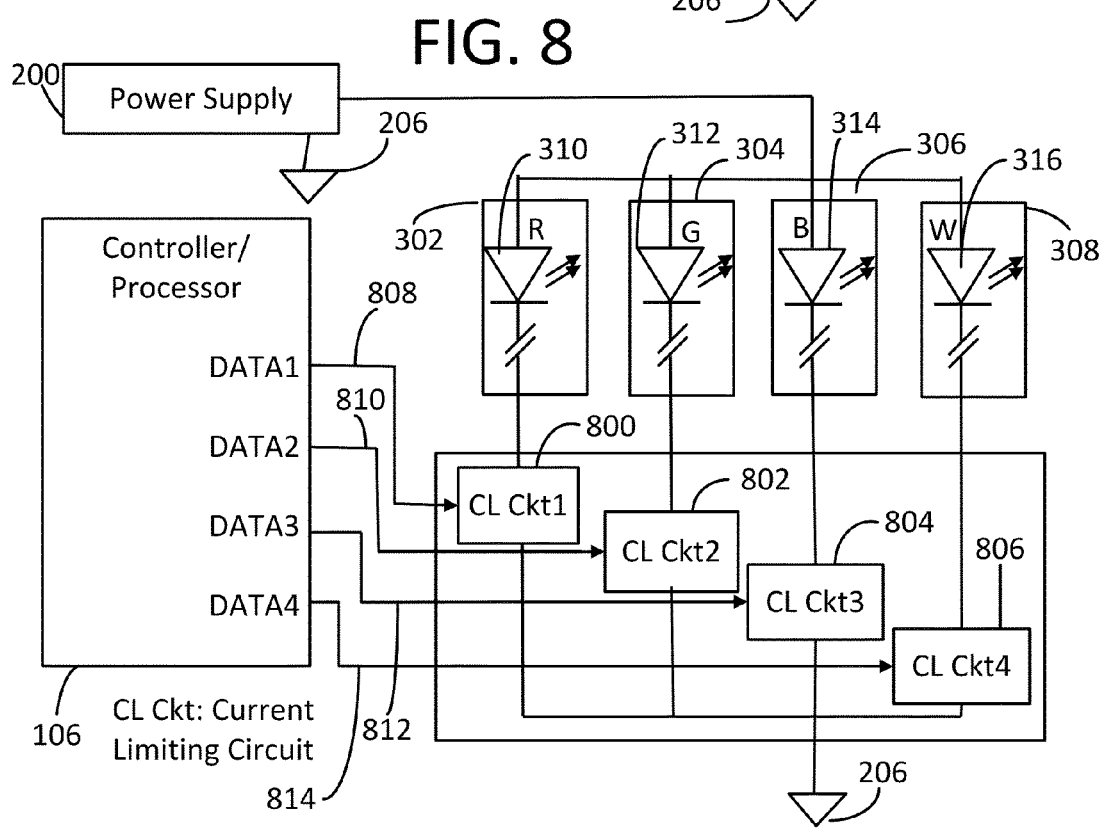
FIG. 8 is a circuit diagram of current limiting circuit scheme in accordance with one embodiment of the present invention.

Referring now to FIG. 7, a circuit diagram of a multiplexer 704 and a LED driver 508 scheme in accordance with one embodiment of the present invention is shown. In this scheme, the controller/processor 106 would send a PWM 518 signal to one LED driver 508 which would control the average current flowing through it. In addition, there would be multiplexer 704 between the LED driver 508 and each LED arm (302, 304, 306, and 308). The controller 106 is connected to the multiplexer 704 via two signals. Based on SIG1 700 and SIG2 702 signals, the multiplexer 704 selects an LED arm (302, 304, 306, and 308) to connect to the LED driver 508 at a time producing light with different colors, saturation, and brightness. Variation in the average current passing through the LED driver 508 controlled by variations in the PWM 518 sent by the controller would increase or decrease the average current passing through to the subsequent LED arms, thus controlling the overall brightness of the LEDs.

Considering the embodiment contains red, green, blue, and white LED arms (302, 304, 306 and 308 respectively), based on established color mixing principals, the variation in the luminosity of these four colors could produce all color combinations. To achieve this variation, the controller 106 could vary and alternate the length of time that the multiplexer signals are turned on to let current pass through to each of the respective LED arms (302, 304, 306, and 308). This would create variations in lengths of time when the LED driver 508 would pass through current to the LED arms (302, 304, 306, and 308) and thus create variations in lengths of time when the LEDs produce light. The length of time would also allow for a similar control in the overall brightness of the luminosity produced by the II Device in addition to the control provided by variations of the duty cycle of the PWM signal 518 itself.

Similarly, variations in the length of time that the controller 106 would alternatively send signals to the multiplexer 704, which would control the current passed through from the LED driver 508 to the LED arm (302, 304, 306, 308), would also provide for a combinatory control of the average luminosity produced by each LED arm (302, 304, 306, 308) and thus allow for control of color and saturation of the light produced. The frequency of signals sent to the multiplexer 704 will be high enough (still within the LEDs' and LED Drivers' technical specifications) so that due to the persistence of vision, consumers would see a constant light output, for example a yellow light instead of fast switching alternate red and green light outputs. The scheme in alternating multiplexer signals does not allow for simultaneous signals to allow current to pass to more than one LED arms at the same time. This maximizes the potential average current passed through and subsequent luminosity of each LED arm (302, 304, 306, and 308) considering limited available current from the AC/DC converter 102. It allows for each LED arm (302, 304, 306, 308) to receive the full power provided by the AC/DC converter 102 and regulated by the LED driver 508, such that when it is on all the available current could be sent through to the one LED arm (302, 304, 306 or 308). The timing method is similar to that of the switches and LED drivers scheme (FIG. 6). The multiplexer scheme would vary dependent on the II Device 140 requirements and total number of LED arms.

Now referring to FIG. 8, a circuit diagram of current limiting circuit scheme in accordance with one embodiment of the present invention is shown. In this scheme, current limiting circuits (800, 802, 804, and 806) control the current passed through to each LED arm (302, 304, 306, and 308). There would be as many current limiting circuits as LED arms that are required for the specific embodiment of the II Device. The controller/processor 106 sends data to the individual current limiting circuit (800, 802, 804, and 806) and defines the current to be passed through to the respective LED arm (302, 304, 306, and 308). A digital potentiometer could be used to form the current limiting circuit (302, 304, 306, and 308). The resistance of potentiometer is proportional to the data given to it by controller/processor 106.

For example, to produce a yellow light consisting of 50% Red and 50% Green light at 100% possible output luminosity, DATA1 808 and DATA2 810 will set the currents through current limiting ckt1 800 and ckt2 802 such that the current splits in half through two arms. For example, if power supply 200 is able to provide 1 A current, ckt1 800 and ckt2 802 will be set at 0.5 A each. Considering the embodiment contains red, green, blue, and white LED arms (302, 304, 306 and 308 respectively), based on established color mixing principals, the variation in the luminosity of these four colors could produce all color combinations. Setting assigned currents through all circuits (800, 802, 804, and 806), any color, saturation, and brightness within specified limits could be achieved. In other embodiments, the LEDs can be replaced or augmented with alternative lighting components and technologies including but not limited to CFLs, Halogen, and Incandescent.

Figure 9:
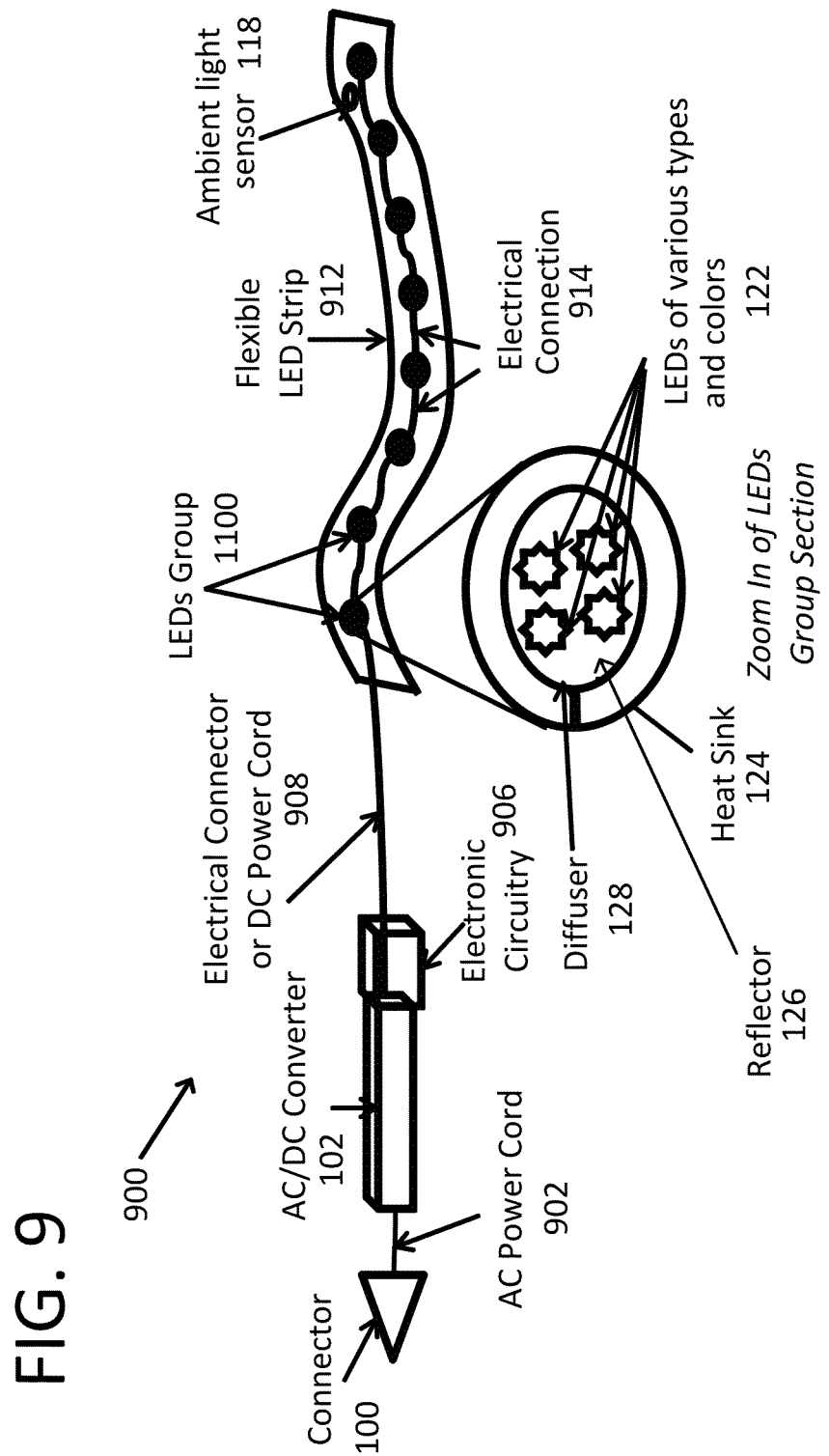
FIG. 9 is a diagram of a mechanical model for a Smartstrip Light in accordance with one embodiment of the present invention.
Figure 10:
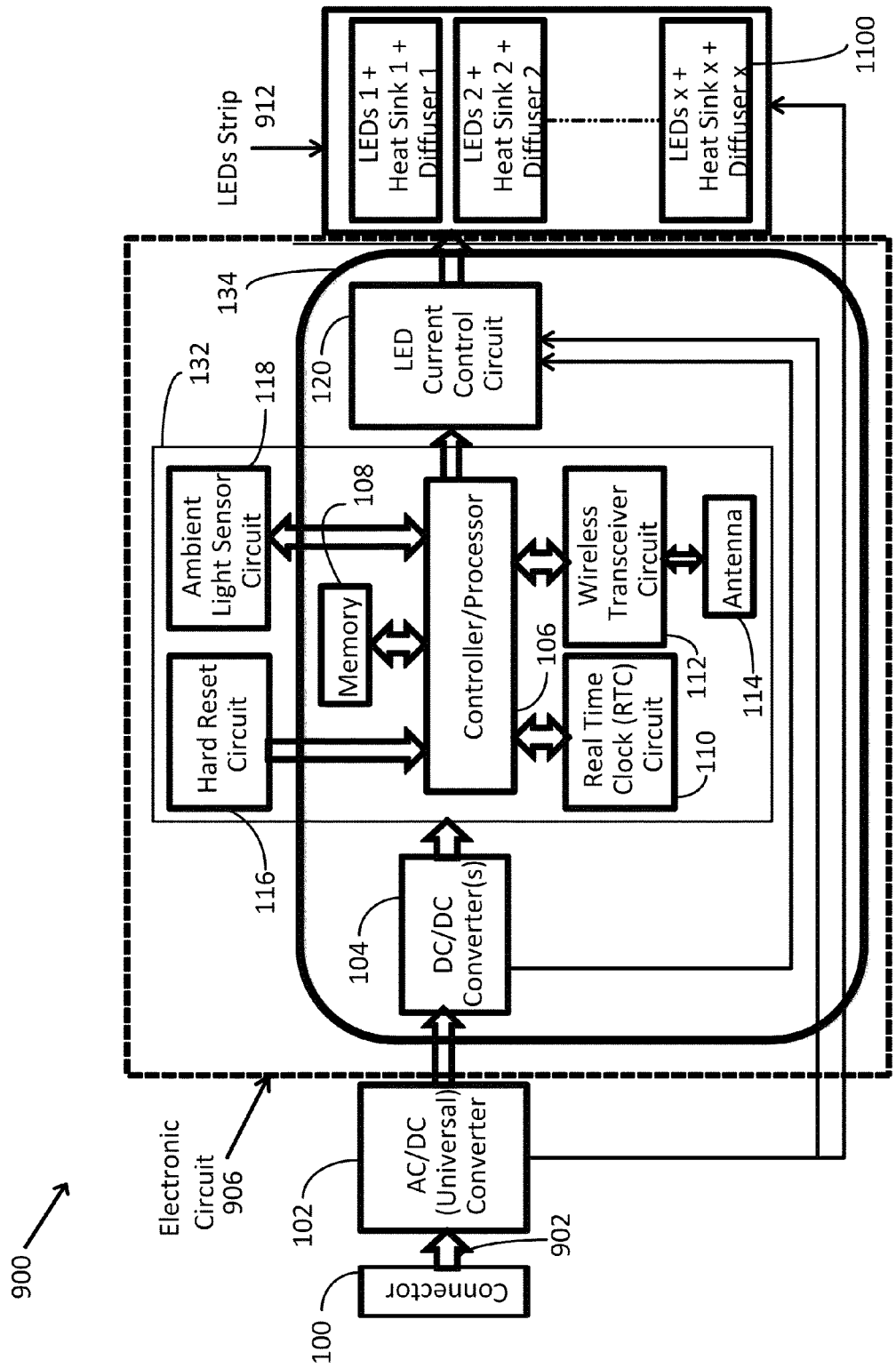
FIG. 10 is a block diagram of a Smartstrip light in accordance with one embodiment of the present invention.

Referring now to FIGS. 9 and 10, a mechanical diagram and a block diagram of a Smartstrip Light 900 in accordance with one embodiment of the present invention is shown. There could be numerous versions or like embodiments, but the general description will be disclosed herein. The Smartstrip 900 consists of the same arrangement and inclusion of all the components of an II Device 140 as previously disclosed.

The Smartstrip 900 includes a flexible strip 912, an electrical connector 908 affixed to the flexible strip 912 and two or more LEDs 122 affixed to the flexible strip 912 and electrically connected to the electrical connector 908. In addition, electrical circuitry 906 (DC/DC power converter 104, controller/processor 106 and LED current control circuit 120) is remotely located with respect to the flexible strip 912 and electrically connected to the electrical connector 908 via a wire, a cable or a connecting strip. The LED current control circuit 120 provides an on/off signal having a cycle time to each LED 122 in response to one or more control signals received from the controller/processor 106 such that the two or more LEDs 122 produce a blended light having a specified color based on how long each LED 122 is turned ON and/or OFF during the cycle time. As shown, the LEDs 122 are formed into LED Groups 1100 that may include a heat sink 124 attached to the flexible strip 912, a reflector 126 disposed behind or around the two or more LEDs 122, and/or a diffuser or lens 128 disposed above the two or more LEDs 122. The LED Groups 1100 are connected in parallel or series or a combination of both by electrical connections 914.

Other embodiments will include additional components. For example, the additional components may include: a power supply connector/fastener 100; an AC/DC power converter 102 electrically connected to the power supply connector/fastener 100 and the DC/DC power converter 104; a real time clock (RTC) circuit 110 communicably coupled to the controller/processor 106; a memory 108 communicably coupled to the controller/processor 106; a wireless transceiver circuit 112 communicably coupled to the controller/processor 106; an antenna 114 communicably coupled to the wireless transceiver circuit 112; a hard reset circuit 116 communicably coupled to the controller/processor 106; and/or an ambient light sensor circuit 118 communicably coupled to the controller/processor 106. These components were previously described in reference to FIG. 1.

The connector 100 could be one of many connectors that would provide a connection to a power source. This could be an Edison base (multiple sizes), Plug in, Bi-pin, or Battery connected connection. The connector would conduct the electrical current to the AC to DC converter 102 through an AC power cord 902, which is an electrical wire for carrying standard mains power supply.

The AC to DC converter 102 receives power from the connector 100 and outputs the appropriate DC power to the DC/DC converter(s) 104 and the LED current control circuit 120 and LED strip circuit 912. The AC to DC converter 102 might be housed within the connector 100 or separate from the connector 100, depending on the specific Smartstrip embodiment.

The DC/DC converter(s) 104 receives a power input from the AC/DC converter 102 and then converts that power to DC power(s) required for driving the internal components/modules of the Smartstrip 900. These components include the controller/processor 106, memory, the real time clock (RTC) circuit 110, the wireless transceiver circuit 112, antenna 114, and possibly components within the LED current control circuit 120. It might also supply power to components, such as the hard reset circuit 116, the ambient light sensor circuit 118, and other potential added circuitries. There might be multiple converters dependent on the output DC voltages required by different component requirements. Similarly, the power output would very dependent on the exact component requirements, for example the output might be 5 VDC, 3.3 VDC, or 1.3 VDC.

The Controller/processor 106 processes signals received from the memory 108, the real time clock (RTC) circuit 110, and the wireless transceiver circuit 112. It might also process signals from other components, such as the hard reset circuit 116, the ambient light sensor circuit 118, and other potential added circuitries. It also takes action and sends commands to the memory 108, the real time clock (RTC) circuit 110, and the wireless transceiver circuit 112. It might also take action and send signals to other components, such as the ambient light sensor circuit 118 and other potential added circuitries.

The memory 108 stores data from factory defined settings and from user defined settings. The controller/processor 106 will read/write data in memory 108. Data might include factory defined settings such as communication protocols, identification and security protocols, and other data. Data might also include user defined settings such as user profiles, default commands, programs, and other data. The memory 108 could be inside the processor 106 and/or external to the processor 106 as a different IC. The controller/processor 106 and memory 108 circuit might take a number of different technical specifications.

Figure 11:
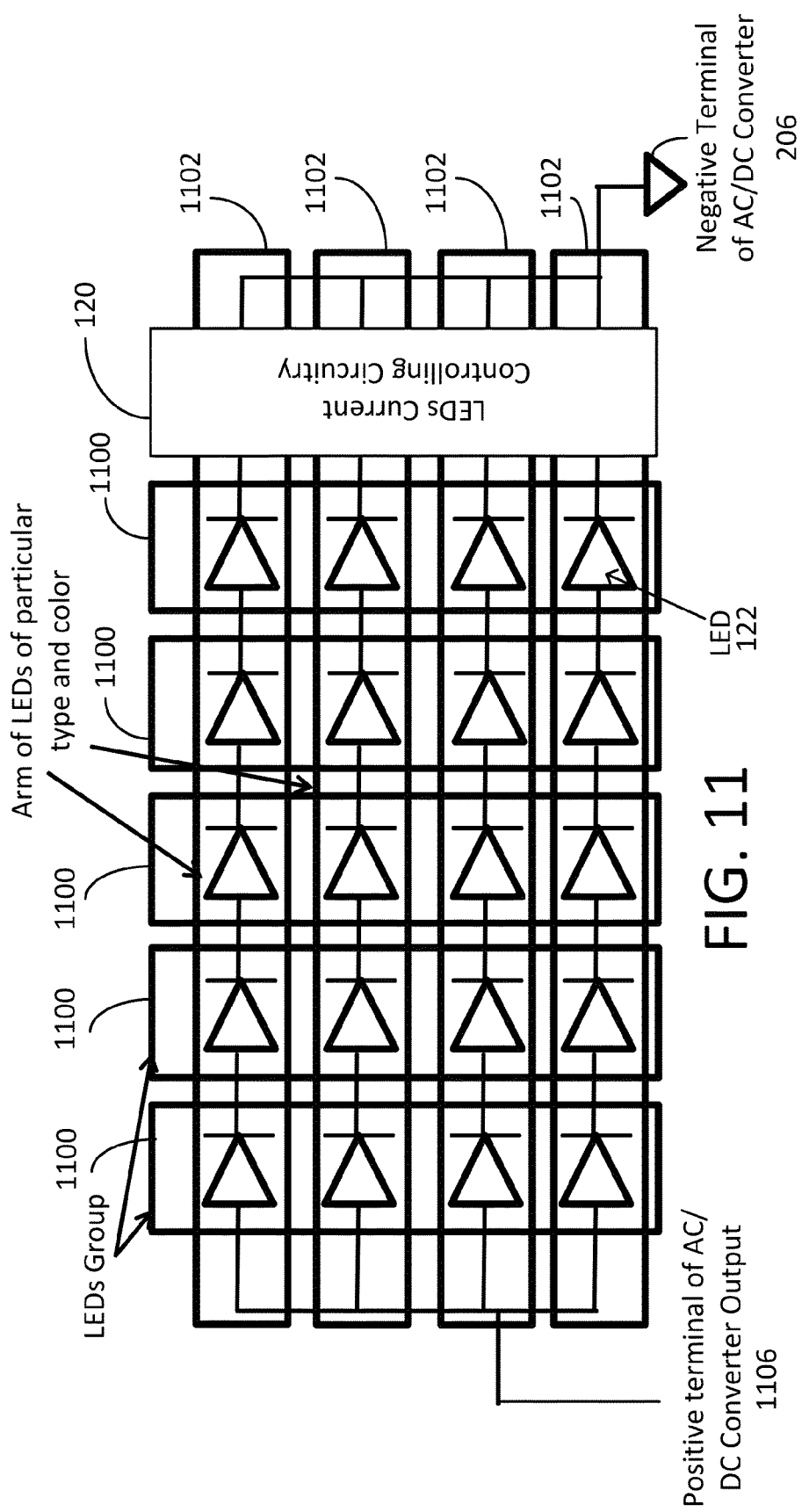
FIG. 11 is a circuit diagram of LED groups on a LED strip in accordance with one embodiment of the present invention.

Referring now to FIG. 11, a circuit diagram of LED groups 1100 on a flexible LED strip 912 in accordance with one embodiment of the present invention is shown. Here, LEDs 122 are placed group-wise on a flexible strip 912 with some distance between them. The distance depends upon the requirements of the Smartstrip light requirements. Each LEDs group 1100 might have an individual heat sink and diffuser (to mix colors, in case of different types if colored LEDs in a group). Each LEDs group 1100 has one or many LEDs 122 from each LEDs arm 1102 depending upon the Smartstrip light requirements. These LEDs 122 of a particular arm in each group are electrically connected in a series or parallel combination of LEDs depending upon the requirements of the Smartstrip 900. The LEDs arms 1102 are connected to the positive terminal 1106 and the negative terminal 206 of the AC to DC converter 102. In addition, the number of LED groups 1100 would depend upon the requirements of the Smartstrip 900.

Now referring to FIGS. 12A and 12B, block diagrams of a front view and a rear view, respectively of a LED strip 1224 and extendible LED strip 1226 in accordance with one embodiment of the present invention are shown. FIGS. 12A and 12B show that LED groups 1100 are placed a flexible material 912 with some distance between them and connected together in series, parallel or a combination of both with electrical connections 914. There could be an ambient light sensor circuit 118 on the front of the LED strip 1224 and extendible LED strip 1226 electrically connected to the electronic circuit 906. Also, there could be a connector 1200 on both the ends of the LED strip 1224 and 1226 out of which one 1200a is used to connect to the electronic circuit 906 and the other 1200b could be used to connect to the extendible LED strip 1226. There could be PWM and/or switching signals from the controller/processor 106 that are used to drive current control circuit 120 on the regular LED strip 1224 and are carried to the end connector 1200b of the strip which could eventually be used to drive current control circuit 120 on extendible LED strip 1226. In case, of the use of an extendible LED strip 1226 in addition to the regular LED strip 1224, the power requirement to drive total LEDs will increase. That could be taken care by higher power supply ratings, that is, higher ratings of FIGS. 12A and 12B show that the strips 912 have adhesive(s) or fastener(s) 1222 to fasten the strip on a surface such as ceiling or wall. The strip 912 is made up of a flexible material so that it could be routed as required during the installation at the site of its use. In addition to the LED groups 1100 and other potential components as in the regular LED strip (FIG. 12a), the extendible LED strip (FIG. 12b) has its own current control circuit 120 to control average current through LEDs 122 on the strip (FIG. 12b).

Some Smartstrip 900 embodiments and versions might have an ambient light sensor circuit 118. The ambient light sensor circuit 118 may have one or more ambient light sensors (photosensor or similar light detecting component) and supporting circuitry. The ambient light sensor(s) 118 detects a level of captured ambient light, converts that level into an analog signal, and sends that data to the controller/processor 106 via an analog to digital (A/D) converter. The ambient light sensor circuit 118 would consist of one or more ambient light sensors 118 per one or multiple Smartstrips 900 and/or II Devices 140. In some embodiments the ambient light sensor 118 could be embedded in the Smartstrip electronic circuit 906 board or on a LED strip and in others it might be a separate peripheral device to the wireless lighting control system. Additionally, the placement of the sensor(s) 118 and related circuitry need not be exactly collocated, but possibly separated by a wire 1206. In addition, some Smartstrip 900 embodiments and versions might have a heat sink(s) 124, a reflector 126 and/or a diffuser 128.

Referring now to FIG. 13, a block diagram of the mechanical and electrical connections for the Smartstrip 900 in accordance with one embodiment of the present invention is shown. The Smartstrip light 900 has four parts: a connector 100, an AC/DC converter 102, an electronic circuit 906 and LED strip 912. Any two parts could be connected by a flexible wire which would provide flexibility of distance between the two parts, routing of the Smartstrip 900 while placing it on the surface. In addition, any two parts could be connected to each other with mechanically inflexible material; in fact combined parts could look like one part. For example, connector 100, AC/DC converter 102 and electronic circuit 906 parts could be closely connected to each other and could look like one part.

Now referring to FIG. 14, a block diagram of an extendible LED strip in accordance with one embodiment of the present invention is shown. A LED strip 912a can be extended by connecting two or more LED strips 912b and 912c. LED strip 912a would have a connector 1400 at its ends which would be used to connect another strip 912b to it. As shown in the figure, LED strip 2 912b is connected to LED strip 1 912a and LED strip 3 912c by a flexible electrical extension 1402, such as an electrical wire, with connectors 1400 on the ends of the LED strips 912a, 1912b and 912c. These connectors 1400 could be of various types, for example, male connector on the right end of the strip and female connector on the left end of the strip. The connections 1400 include current controlling signals from controller/processor 106 driving lines for LEDs 122 on the strip 912 and LEDs driver signals. In addition, the strip has LEDs current control circuit 120 to control current through LEDs 122 as explained in the II Device section.

Figure 15:
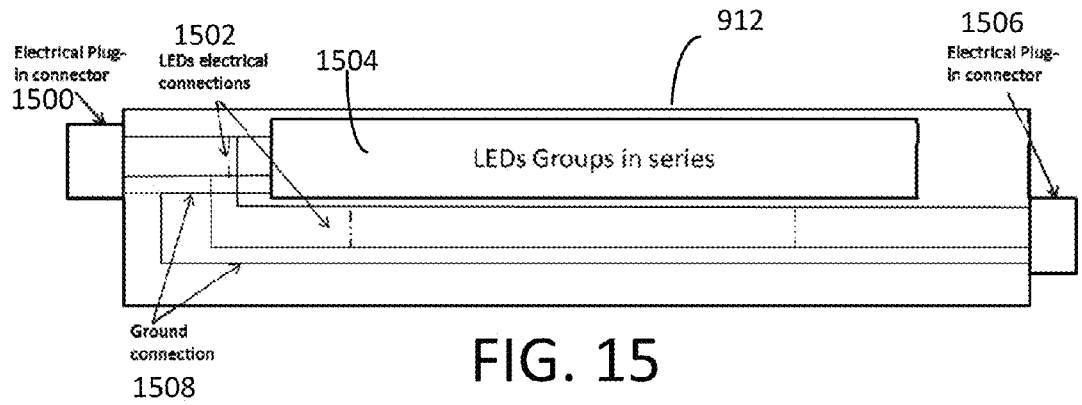
FIG. 15 is a block diagram of a LED strip extension through parallel connection in accordance with one embodiment of the present invention.

Referring to FIG. 15, a block diagram of a LED strip 912 extension through parallel connection in accordance with one embodiment of the present invention is shown. The extendable LED strip 912 has LED Groups 1504 connected in series with an electrical plug-in connector 1500 via electrical connections 1502 (positive) and 1508 (ground), and an electrical plug-in connector 1506 connected in parallel with the LED Groups 1504 via electrical connections 1502 (positive) and 1508 (ground). Electrical plug-in connectors 1500, 1506 are on the both ends of the extendable LED strip 912. On one end of the LED strip 912, there would be an intake connector 1500 and on the opposite end of the LED strip 912 an outtake 1506 connector. The intake connector 1500 would plug into the outtake connector 1506 of the previous LED strip 912 (either a regular or extendable LED strip) that would ultimately be connected in sequence to a regular LED strip and the rest of the Smartstrip components and power source.

Figure 16:
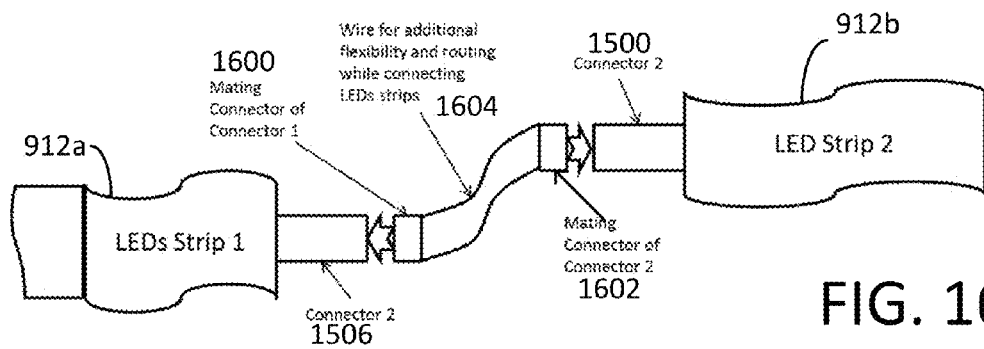
FIG. 16 is a block diagram of a LED strip direct connection in accordance with one embodiment of the present invention.
Figure 17:
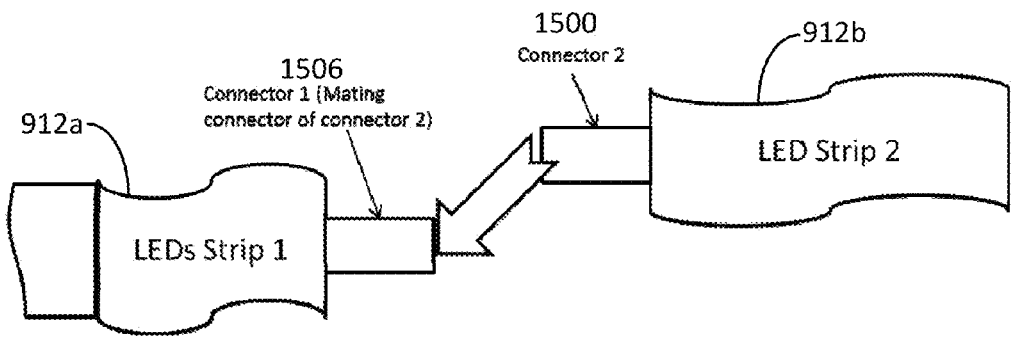
FIG. 17 is a block diagram of a LED strip connection through wire in accordance with one embodiment of the present invention.

In addition to FIG. 15, now referring to FIGS. 16 and 17, block diagrams of a LED strip 912 direct connection in accordance with one embodiment of the present invention is shown. The intake connector 1500 would have multiple electrical connections passing internally to the strip 912. There would be electrical connections 1502 to extend power through to the LED groups 1100 in series. There would also be electrical connections 1502 that would extend the power through to the other outtake electrical plug-in connector 1506 on the opposite side of the LED strip 912. When this outtake electrical plug-in connector 1506 is not in turn connected to another intake electrical plug-in connector 1500 of another strip, the connection will terminate in the outtake connector 1506. The electrical connections 1502 would include ground connection 1508 and current controlling signals such as PWM and switching signals from the controller/processor 106 for both the connection to the LEDs current control circuit 120, LED groups 1100 in series, and the connection to the outtake connector 1506. Additional LED strips could be connected in the same fashion. This number of LED strips connecting to each other could be limited by the available power source and required current for each strip 912.

As shown in the FIG. 16, the outtake connector 1506 on one strip 912a could be connected to the intake connector 1500 on another strip 912b through an electrical wire 1604 with similar mating connectors 1600, 1602 at its end. This type of connection provides additional flexibility and routing while extending the number of strip in the Smartstrip. As shown in the FIG. 17, the connecting wire 1604 might be an affixed part of the connector and Smartstrip or a separate part that could be used as needed.

Figure 18:
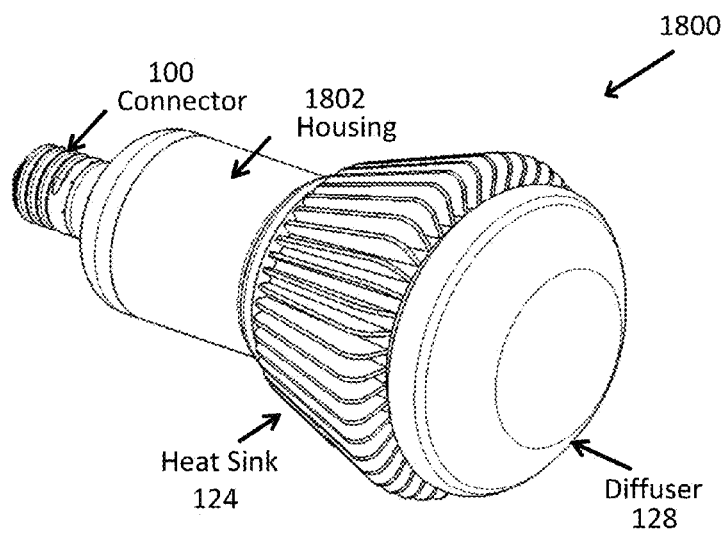
FIG. 18 is a perspective view of an Intelligent Illuminating Bulb in accordance with one embodiment of the present invention.
Figure 19:
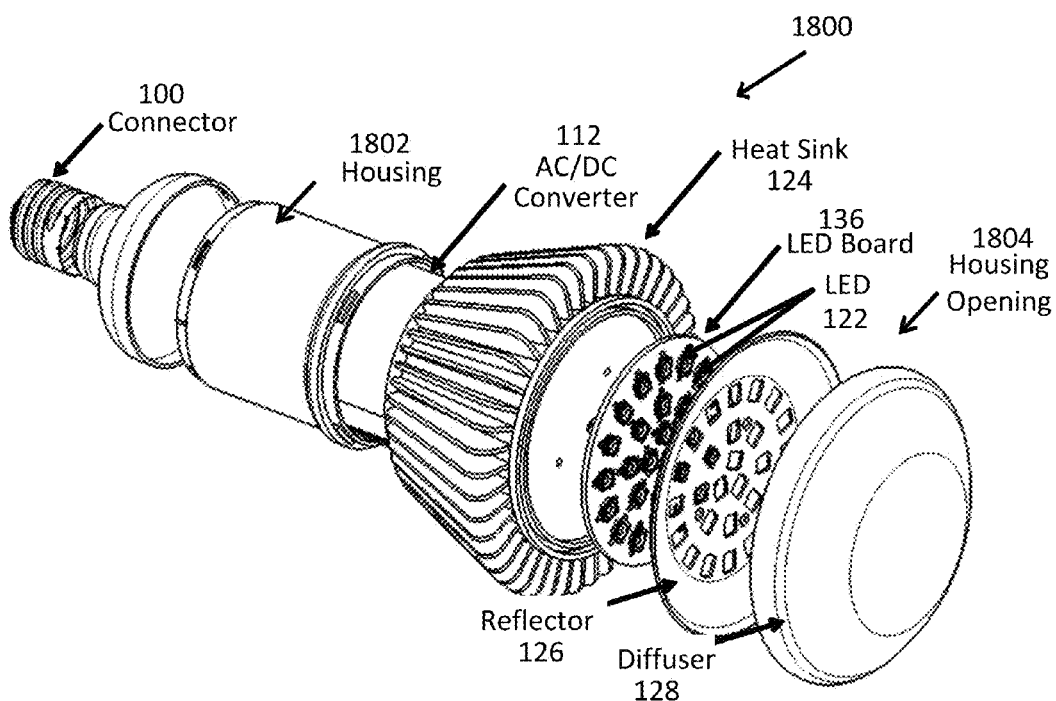
FIG. 19 is an exploded perspective view of an Intelligent Illuminating Bulb in accordance with one embodiment of the present invention.

Now referring to FIGS. 18 and 19, a perspective view and exploded perspective view, respectively, of an Intelligent Illuminating Bulb 1800 also referred as II Bulb in accordance with one embodiment of the present invention are shown. The II Bulb 1800 is a lamp or bulb like structure embodiment of an II Device 140. There could be numerous versions or like embodiments, but the general description will be disclosed herein. The II Bulb 1800 consists of the same arrangement and inclusion of some or all of the elements described above in reference to the II Device of FIG. 1.

The II Bulb 1800 includes a housing 1802, a DC/DC power converter 104, a controller/processor 106 electrically connected to the DC/DC power converter 104, a LED current control circuit 120 communicably coupled to the controller/processor 106 and electrically connected to the DC/DC power converter 104, and two or more LEDs 122 comprising at least a first color LED and a second color LED electrically connected to the LED current control circuit 120. The DC/DC power converter 104, the controller/processor 106 and the LED current control circuit 120 are disposed within the housing 1802, and the two or more LEDs 122 are proximate to or within an aperture 1804 of the housing 1802. A heat sink 124 is disposed within or outside the housing 1802. A reflector 126 is disposed within the aperture 1804 of the housing 1802 and around the two or more LEDs 122. A diffuser or lens 128 seals the aperture 1804 of the housing 1802. The LED current control circuit 120 provides an on/off signal having a cycle time to each LED 122 in response to one or more control signals received from the controller/processor 106 such that the two or more LEDs 122 produce a blended light having a specified color based on how long each LED is turned ON and/or OFF during the cycle time.

Other embodiments will include additional components. For example, the additional components may include: a real time clock (RTC) circuit 110 communicably coupled to the controller/processor 106; a memory 108 communicably coupled to the controller/processor 106; a wireless transceiver circuit 112 communicably coupled to the controller/processor 106; an antenna 114 communicably coupled to the wireless transceiver circuit 112; a hard reset circuit 116 communicably coupled to the controller/processor 106; and/or an ambient light sensor circuit 118 communicably coupled to the controller/processor 106. These components were previously described in reference to FIG. 1.

The connector 100 would be an Edison base or bi-pin for which when the connector is inserted into the appropriate light socket, the connector would provide appropriate contact to extend the power source into the body of the II Bulb 1800. In addition, the connector 100 will provide some structural stability in fastening the II Bulb 1800 into a socket. In some alternate versions of the II Bulb 1800 the connector might also be a plug-in or battery powered connector. The physical location of the antenna 114 and/or wireless transceiver circuit 112 could be placed in multiple physical locations related to the II Bulb 1800. For example, it might be placed outside of the II Bulb 1800 or inside the II Bulb 1800. Placing it outside might increase the range of wireless communication for the II Bulb 1800, especially when installed in locations with poor reception. Alternatively, the antenna 114 might be built into the physical structure of the II Bulb 1800 or be part of the main board inside the II Bulb 1800.

The LED current control circuit 120 executes commands from the controller/processor 106 to control the current passed through the LEDs 122. The LED current control circuit 120 might take different forms dependent on the II Device embodiment 1800 as previously described. Each II Bulb 1800 would have some arrangement of LEDs 122 that could vary in color and type (brightness) depending on different II Bulbs. Various types of LEDs 122 would be placed on a LEDs board 136 in a spaced and arranged fashion and connected electronically to other circuitry as explained earlier. The LEDs board 136 consists of electrically connected LEDs 122 placed on a single surface. The combination of LEDs 122 could be of various types and various colors. For example, the LEDs 122 might vary in color such as red, green, blue, and/or white LEDs. The LEDs 122 might also vary in their maximum output luminosity. The combination of illuminations of these LEDs 122 could produce various levels of brightness and/or color. LEDs 122 on the board would be arranged so that the light from them would mix well forming a uniform color and overall light from the II Bulb 1800 would spread uniformly in at a particular degree around the circumference of the diffuser 128. In addition, the LED board 136 might be combined or surround other circuitry such as the hard reset circuit 116 and/or ambient light sensor 118. For embodiments where this is the case, the LEDs 122 could take a different arrangement to accommodate for the placement of those circuitries.

Figure 20:
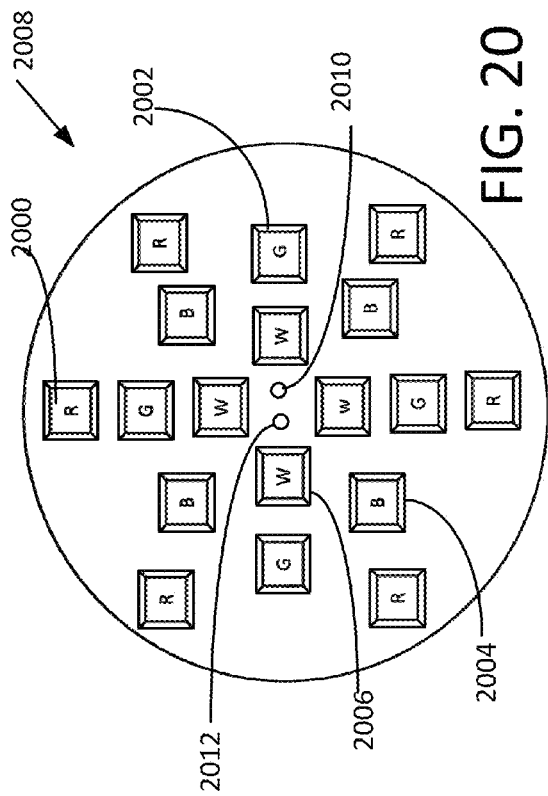
FIG. 20 is a diagram of a LED board in accordance with one embodiment of the present invention.

Referring now to FIG. 20, a diagram of a LEDs Board 2008 in accordance with one embodiment of the present invention is shown. As an example of the LEDs board arrangement, the white LEDs 2006 could be placed at the center of the LEDs board 2008 with red LEDs 2000 on the exterior and blue 2004 and green LEDs 2002 placed in between. In addition, there is an arrangement for electrical contacts 2010, 2012 on the LEDs board 2008 at some place as shown. The arrangement can be used to connect sensors such as ambient light sensor of the ambient light sensor circuit 118 and the rest switch of the hard reset circuit 116 on the on the II Device to their respective circuitry that could be on the main board 134. The arrangement might be on certain planes such as vertical, horizontal, and diagonals. In addition, the proportional relationship in the number of certain color LEDs to other types could vary dependent on the light emitted by the LED and the specific embodiment requirements.

Figure 55:
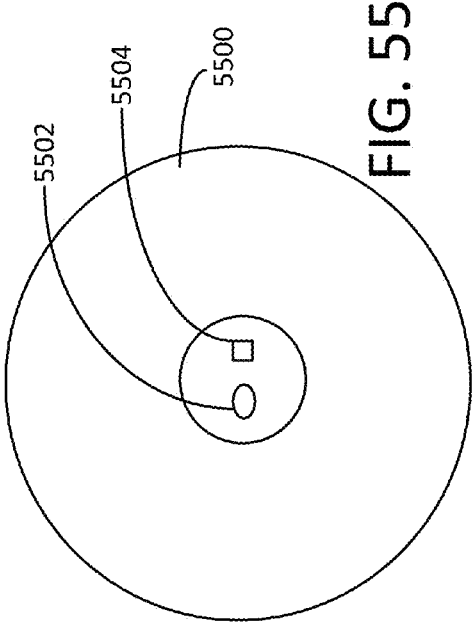
FIG. 55 is a block diagram of showing a potential placement of the photosensor and reset switch on the light mixing cover/diffuser in accordance with one embodiment of the present invention.

II Bulb 1800 may consist of Hard Reset circuit 116 as explained earlier. The location of the hard reset circuit might be co-located with other external components such as the ambient light sensor 118, LEDs 122, diffuser 128, or other II Bulb components or structural parts. In this sense the physical location with respect to the II Bulb 1800 might vary. Now referring to FIG. 55, a potential placement of the photosensor 5502 and reset switch 5504 on the light mixing cover/diffuser 128, 5500 that is on the top of LEDs board 2008 of II Bulb. The heat sink and related components and parts 124 are required in some embodiments of the II Bulb 1800. As explained earlier the heat sink and related components 124 dissipate the heat generated by the LEDs 122 and LED current control circuit 120 and it could take multiple sizes, shapes, and materials dependent on the II Bulb embodiment.

Other 'related components' refers to related parts required for the fitment of heat sink and parts required of the housing and inner or outer structure of the II Bulb 1800. These materials and arrangement might of course differ depending on the particular II Bulb embodiment.

As explained earlier, there would be a diffuser 128 that is a part of the II Bulb 1800 that spreads and/or 'mixes' the illumination produced by the LEDs 122. There could be an ambient sensor, a part of ambient sensor circuit 118 and/or hard reset button, a part of hard reset circuit 116 on the diffuser 128, in which case, the diffuser 128 could be transparent at that place. Also, the diffuser in that case, may have a through-hole arrangement for electrical and mechanical connections of the sensor and button to the II Bulb 1800. In the II Bulb as well, as explained earlier, the light reflector 126 is used to amplify or focus the illumination generated by the LEDs.

Figure 48:
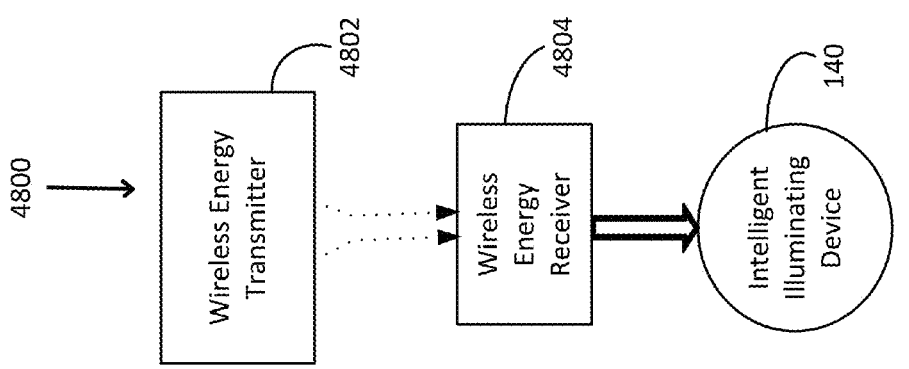
FIG. 48 is a block diagram of another embodiment of II Device system with a wireless energy receiver and transmitter in accordance with one embodiment of the present invention.

Referring now to FIG. 48, another embodiment of II Device 140 system with the wireless energy receiver 4804 and wireless energy transmitter 4802 is shown. The wireless energy transmitter 4802 transmits the energy wirelessly to the II Device 140 through wireless energy receiver 4804. The wireless energy receiver 4804 that is connected to II Device 140 feeds the energy received to the II Device 140 through its connector 100 or directly to the AC/DC converter 102. In this case, the input ratings of AC/DC converter 102 might be different than the universal ratings as explained earlier (AC power 60V-290V/45-65 Hz). Wireless energy receiver 4804 may have inbuilt AC/DC converter in which case, the DC output generated of wireless energy receiver 4804 is directly given to the DC/DC converter 104.

Figure 56:
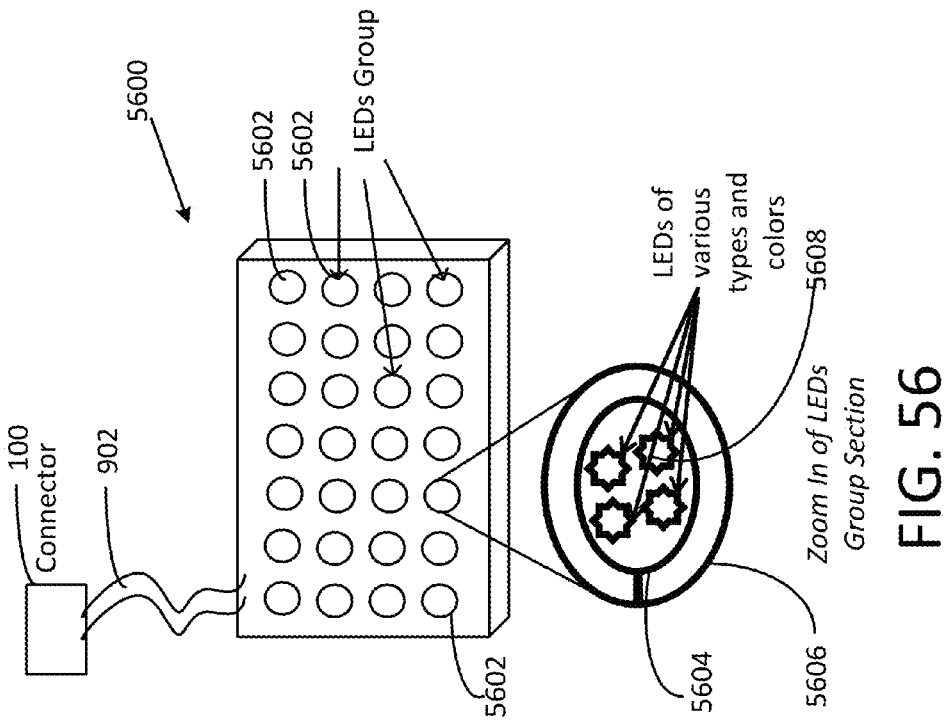
FIG. 56 is a block diagram of an Intelligent Illuminating Device network in accordance with one embodiment of the present invention.

Referring now to FIG. 56, another embodiment of II Device 140 in the form of LED lighting panel 5600 is shown. The panel is mostly used on the ceiling for down lighting. It might consist of number of LED groups 5602 on the front wall of the panel arranged in horizontal and vertical planes on LEDs board as shown in FIG. 56. The panel 5600 might also consist of LED groups 5602 on side walls of the panel 5600. The LED board could be similar to the LEDs board 2008 explained while describing II Bulb. Each LEDs group 5602 might have various types and colors of LEDs, for example—Each LEDs group may consist of Red, Green, Blue and White LEDs making LEDs Group, in turn LED lighting panel 5600 to produce light with various colors and brightness.

The LED lighting panel, an embodiment of II Device also consists of other circuitry such as LED Current control circuit 120, Real Time Clock Circuit 110, etc. as explained in FIG. 1. Here, the heat sink either connects to the LEDs through LEDs board or there could be heat transfer adhesive(s) (potentially different adhesives for different LED groups) between the LEDs board and heat sink. There could be a common light mixing cover/diffuser 128 for all LED groups 5602 or multiple light mixing covers/diffuser for each or multiple LED groups.

All the required electronic circuitry per II Device 140 would be inside the lighting panel 5600, while the positions of the ambient light sensor(s) of ambient light sensor circuitries 118 and the reset switch of the hard reset circuit could vary. They could reside on the top/front wall of the panel 5600, on the side walls of the panel 5600. The ambient light sensor and the wireless transceiver circuit 112 could also take other placements as explained earlier. There could be multiple ambient light sensor circuitries 118 on the LED lighting panel 5600 with light sensor taking the positions on side walls of the panel 5600 as well.

The panel could have single or multiple connectors 100 of various types as explained earlier while describing connector 100 in II Device 140. In addition, theses connectors could be connected to the lighting panel 5600 through an electric cable or AC power cord 902. There would be a mechanical arrangement to fit the lighting panel 5600 to the ceiling in the form of an adhesive, fastener(s), screw-in mechanism or any other possible arrangement. The panel could also be used for the recessed lighting i.e. inside the ceiling.

Figure 57:
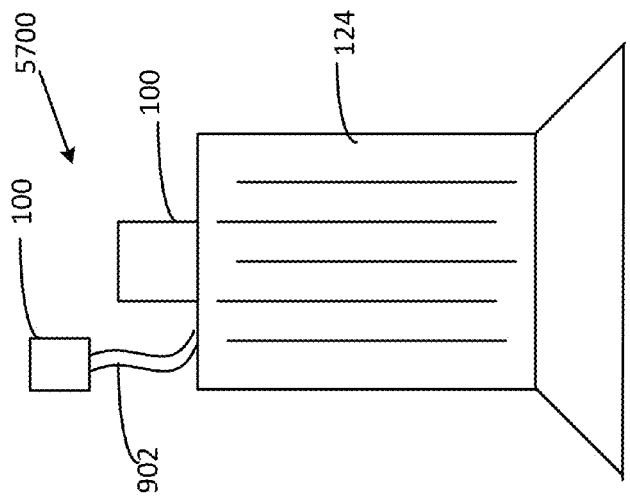
FIG. 57 is a block diagram of an Intelligent Illuminating Can in accordance with one embodiment of the present invention.

Referring now to FIG. 57, another embodiment of II Device 140 in the form of LED Can, a recessed LED downlight Can 5700 that is mostly used in ceilings is shown. It might consist of LEDs board 2008 as explained in II Bulb with LEDs facing downwards while Can is installed into the ceiling. The LED Can 5700, an embodiment of II Device also consists of other circuitry such as LED current control circuit 120, real time clock circuit 110, etc. as explained in FIG. 1. Here, the heat sink is a part of the Can fixture and is connected to the LEDs through LEDs board itself or there could be heat transfer adhesive between the LEDs board and heat sink. There would be a light mixing cover/diffuser 128 for LEDs board 2008 on top of the Can facing downwards.

All the other required electronic circuitry per FIG. 1 of II Device 140 would be inside the lighting Can 5700, while the positions of the ambient light sensor(s) of ambient light sensor circuitries 118 and the reset switch of the hard reset circuit could vary as explained while explaining II Bulb.

The Can 5700 could have single or multiple connectors 100 of any types as explained earlier while describing connector 100 in II Device 140. In addition, the connector could be connected to the lighting Can 5700 through an electric cable or AC power cord 902. There would be a mechanical arrangement to fit the lighting Can 5700 inside the ceiling through adhesive, fasteners, screw-in mechanisms or any other possible arrangement.

With a wirelessly connected II Device, it will be important for the device application to understand the current status of each II Device within the network. In addition, it would be beneficial for each smart light or an auxiliary wireless device to know the status and signal strength of other Smart lights within its proximity. This would provide a better user experience and a more efficient lighting control system.

Now referring to FIG. 21, a flow chart of a status request/update process for a wireless device or auxiliary device to II Device in accordance with one embodiment of the present invention is shown. The basic process for a status request from the wireless device or auxiliary device shown by element 2100 would begin with block 2102. Upon a status update defined event 2103, the device application will trigger a command through the wireless device or auxiliary device to send a wireless communication to all II Devices in the vicinity 2104. This command will then get extended through the mesh network 2105 (see communication and mesh network processes for reference in as needed.) Upon receipt 2106, each II Device will both respond to the command with the current status of that II Device 2108 and extend the responses of other II Devices via the mesh network 2105. Upon receipt back by the wireless device or auxiliary device, the status information will be interpreted by the device application 2110 and either store the information in the device application memory as an input to execute further commands 2114, trigger a second communication or command to the II Device network 2116, or take some other action 2112. The process completes in block 2118.

Figure 22:
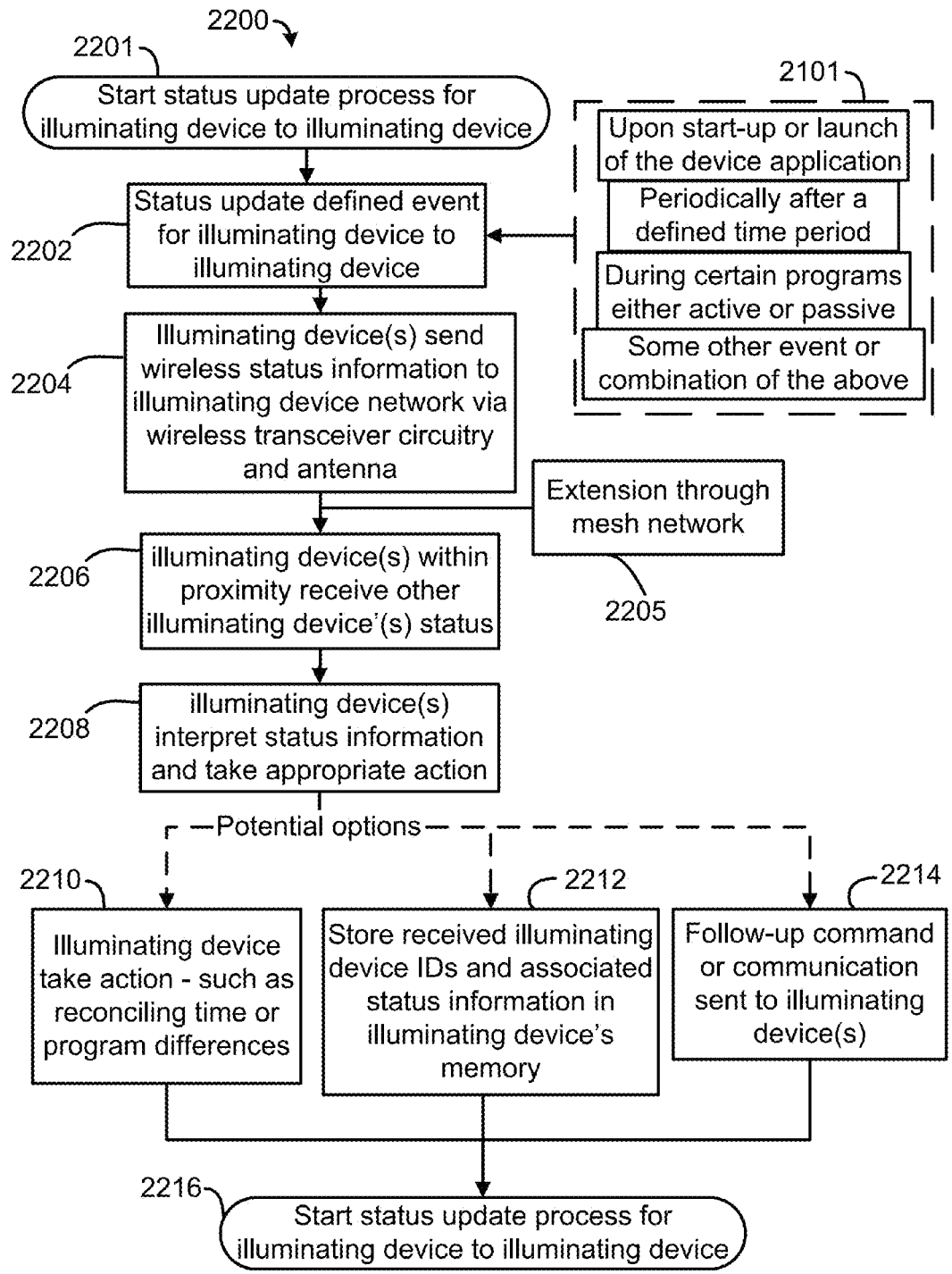
FIG. 22 is a flow chart of a status update process for Intelligent Illuminating Device to Intelligent Illuminating Device in accordance with one embodiment of the present invention.

Referring now to FIG. 22, a flow chart of a status update process for II Device to II Device in accordance with one embodiment of the present invention is shown. The basic process for an internal II Device network status refresh from II Device to II Device shown by element 2200 would begin with block 2201. Upon a status update defined event 2202, a command will be triggered in one or many Smart lights to send a wireless communication to all II Devices in the vicinity 2204. This command will then get extended through the mesh network 2205. Upon receiving status updates sent by other II Devices 2206, the status information will be interpreted by the II Device(processor) 2208 and used to either store the II Device ID's received and some associated data of the status in II Device's memory 2212, trigger a second communication or command to the II Device network 2214, or take some other action such as reconciling time or program differences 2210. The process for II Device to II Device completes with block 2216. The processes described in part 2100 and 2200 could be executed in some tandem or integrated fashion dependent on the specific program or task at hand.

The device application, auxiliary device, II Device itself and related II Devices and II Device network could update status information upon different defined events, time periods, or processes signified by 2101. For example, upon start-up or launch of the device application a command could be sent to gather the status information and subsequent layout of each Smart light within the network. As another example, after a defined time period while the device application is open, the wireless device could send a command to gather the status information and subsequent layout of each II Device within the network. As another example, given a different defined time period, each II Device could send a command to gather the status information and subsequent layout of each II Device within the network. As another example, during certain programs either actively runs through the device application or passively in the II Device network, either example b) or c) could be executed at differing times to better suit the program or application. Or it could be any combination of the previously described examples.

The actual status of each II Device may include but not limited to the following information: (a) the ID# and signal strength of other II Device within range; (b) the color and/or brightness at which the II Device is currently illuminated; (c) the status of programs, defaults, and profile information stored in the II Device's memory; and (d) the current time/date as stored in the RTC.

There are a number of different potential processes and programs that would require the current status of the II Devices communicated. For the disclosure of this invention, it will be assumed that the status of the II Devices will already be known if having the status of one or the network of II Devices is generally required to execute the program or process. In many cases the process of obtaining the status of an II Device is included in description and drawings. In other cases, the status need not be required in the program or process.

Figure 23:
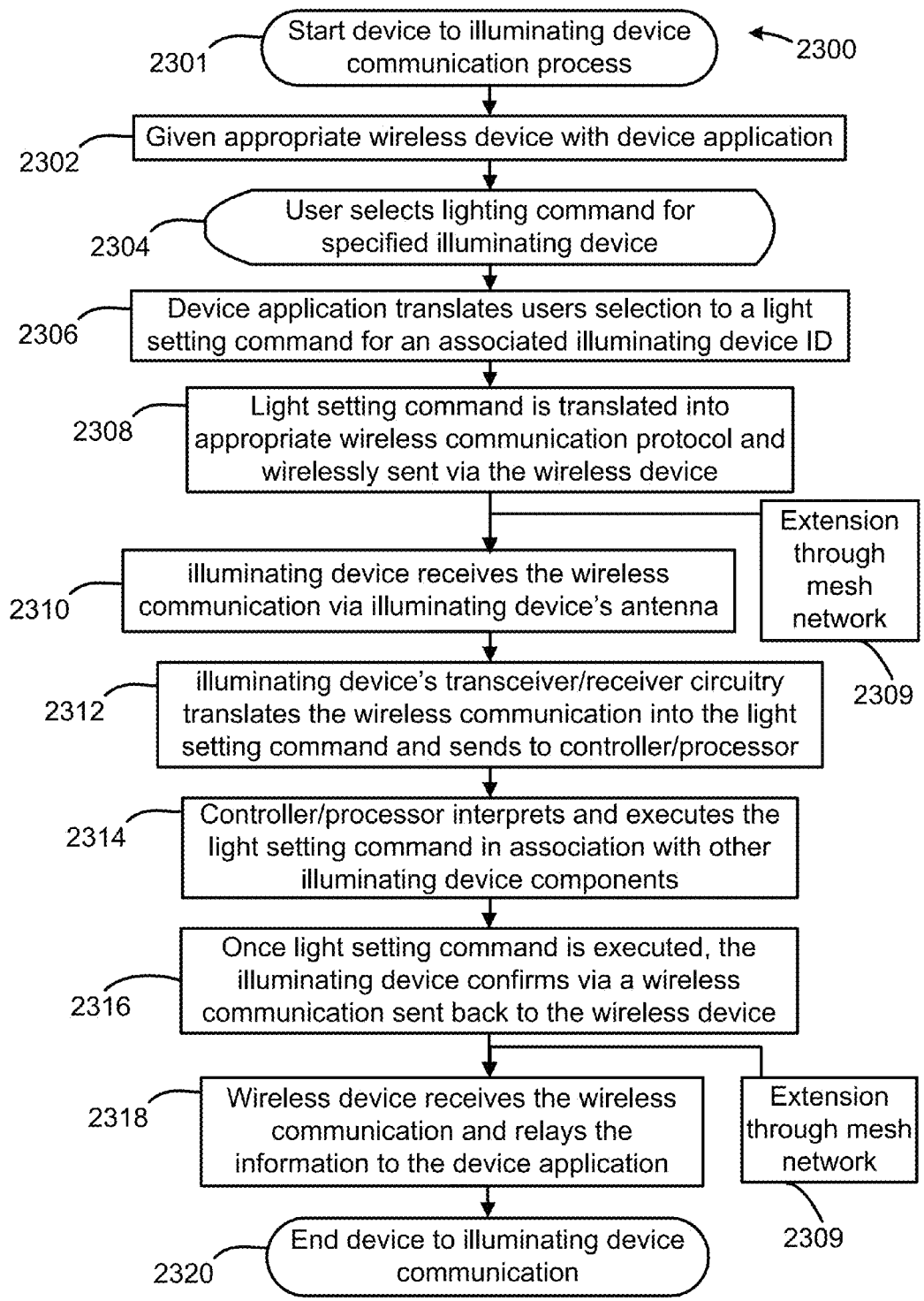
FIG. 23 is a flow chart of a communication process from a device to Intelligent Illuminating Device in accordance with one embodiment of the present invention.

Now referring to FIG. 23, a flow chart of a communication process from a device to II Device in accordance with one embodiment of the present invention is shown through element 2300. The process begins with block 2301. Given a wireless device (WD) is equipped with hardware and systems to execute wireless communication protocols (Bluetooth, Wi-Fi, ZigBee, or any other wireless protocol) as well as an appropriate device application 2302, a user could send a lighting command to an II Device by selecting the command via the device application 2304. Upon the user's selection of a command for a specific II Device, the device application would translate the user's requested command into a light setting command and the specific stored ID for the selected II Device 2306. This light setting command would include instructions for the specified II Device ID to execute such as on/off, color, brightness, or a program. The light setting command would be translated into the appropriate wireless communication protocol and wirelessly sent via the wireless device 2308. The II Device if in range of the wireless communication or mesh network 2309 relay communication would receive the protocol via the II Device's antenna 2310. The transceiver/receiver circuitry would decode the wireless protocol to find the light setting command and send that to the controller/processor 2312. The controller will execute that command with the respective II Device's related components 2314. Upon successful execution, the II Device will respond through the appropriate wireless communication that it has executed the light setting command 2316-2318. The process ends with block 2320.

Figure 24:
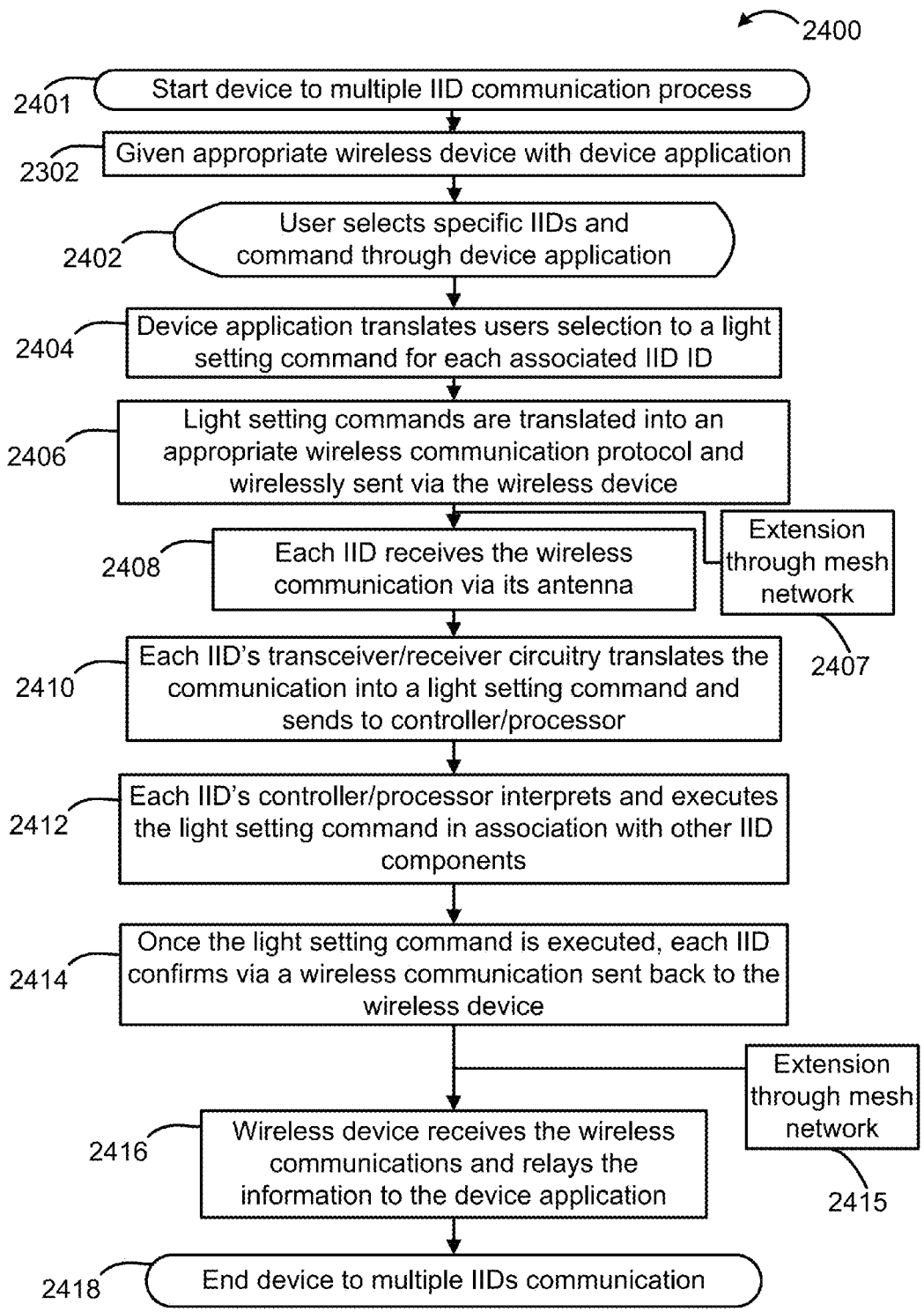
FIG. 24 is a flow chart of a communication process from a device to multiple Intelligent Illuminating Devices in accordance with one embodiment of the present invention.

Referring now to FIG. 24, a flow chart of a communication process from a device to multiple II Devices in accordance with one embodiment of the present invention is shown referred to as element 2400. The process begins with block 2401. Similar to the process of sending a light setting command from a wireless device to an II Device 2300, given an appropriate wireless device and device application 2302, a user could select a command for multiple II Devices via the device application 2402 that would send a wireless communication through the wireless device pertaining to multiple II Devices 2404, 2406, which could be extended through the mesh network 2407. Upon receiving the wireless communications 2408, the II Devices could decode 2410, execute the command 2412, and each respond to verify the command has been executed utilizing the appropriate communication methods shown as 2414-2416. The process would end with block 2418.

Now referring to FIG. 23 as well as FIG. 24, similar to the process of sending a light setting command from a wireless device to an II Device 2300 and the process for sending a light setting command from a wireless device to multiple II Devices 2400, a user could use multiple wireless devices or a combination thereof to send a command to one or multiple II Devices. As long as the wireless devices have the appropriate wireless protocol and associated hardware, has some version of the device application with an authorized profile 2302, and is in range of the II Device (or mesh network), then the wireless devices could send a command in the same way that one wireless device could, to one or multiple II Devices.

Now referring to FIG. 25, an II Device 140 within a mesh network (a lighting system) will be described. The ability for one II Device to receive a wireless communication from a wireless device equipped with the device application, and pass on the communication to another II Device to execute the command within the wireless communication. On a broader scale, having a network of II Devices be able to extend and relay a wireless device's command to extend the signal range or go beyond the limited number of devices it can communicate with directly or one-to-one. Additionally, have the II Devices within the network confirm the execution of the command and possible automated or user guided troubleshooting steps.

Consider a wireless device (WD) (2550, 2552, 2554) is equipped with hardware and systems to execute wireless communication protocols (Bluetooth, Wi-Fi, ZigBee, or any other wireless protocol) as well as the installed device application. Each wireless communication system has some limitation in terms of range (measured in meters or feet). WD1 2550 can communicate with II Device1 2500, II Device2 2502 and II Device3 2504 directly, however, it cannot communicate with other II Devices directly because of range limitation. WD1 2550 can communicate with II Device4 2506 by passing the commands and data through II Device3 2504. Similarly, by passing commands/data through II Device3 2504 and II Device4 2506, WD1 2550 and II Device5 2508 can communicate with each other. In the diagram, WD1 2550 can communicate with each II Device directly or through II Device(s). The diagram is an example of mesh network with which the controlling wireless device (WD in this case) can communicate with all II Device(s) able to communicate with each other.

In diagram above the II Devices are divided in different network levels as follow: (a) II Devices which are in direct vicinity of WD1 2550 are network level 1 called as NWL1 where II Device1 2500, II Device2 2502, II Device3 2504 are NWL1 II Devices; (b) II Devices which are in the vicinity of NWL1 II Devices, but not in direct vicinity of WD1 2550 are network level 2 called as NWL2 II Devices where II Device4 2506 is NWL2 II Device; (c) II Devices which are in the vicinity of NWL2, but not in the vicinity of WD1 2550 or NWL1 are NWL3 II Devices where II Device5 2508 and II Device1 2512 are NWL3; and (d) similarly, II Device6 2510 is NWL4 II Device.

The process for forming a mesh network will now be described. There are multiple processes that the wireless device and network of II Devices could communicate with each other to set-up a mesh network, dependent on the size of the network (number of II Devices), the dispersion in location of the II Devices (power signal), and other factors. The process would generally involve the wireless device communicating with all II Devices within its signal range, and having each II Device also communicate to other II Devices within its signal range, with an ultimate output sent back to the wireless device including the current status and ID's of all II Devices in signal range for wireless device and each II Device within the network.

WD1 2550 communicates with NWL1 II Devices and stores their ids and statuses in the memory 106 and creates a network among them. Each II Device also communicates with other II Devices and stores their ids and statuses in the memory 106 and creates a network among them. WD1 2550 then sends commands to NWL1 II Devices asking what other II Devices they can communicate with and their ids and statuses. Each NWL1 II Device responds to the commands and provides information on their connections/network with ids and statuses. WD1 2550 then sends commands to NWL2 II Devices through respective NWL1 II Device to get the information on the II Devices in their network and their statuses. NWL2 II Devices responds back to WD1 2550 through respective NWL1 II Device with their network information. WD now has all II Device ids in its memory at NWL1, NWL2 and NWL3 levels. In the same fashion, WD1 2550 continues to build its network map by sending commands to next network level II Devices (in this case, NWL4) through intermediary network level II Devices and gets information on their network. This process would continue until either the wireless device receives information from all lights set-up within the device application or selected for a particular command, or until all II Devices that can be reached through the mesh network have been captured either directly or through the mesh network to the wireless device.

Using the statuses and information from each II Device, the application device run on the wireless device 2550 would then create a map of the entire network, including what II Devices are connected to what II Device and each connection's signal strength, and store it into its memory 106. WD1 2550 can find out the most effective path to communicate with a particular II Device in the mesh network depending upon the signal strengths between WD1 2550 and that particular II Device and signal strengths between WD1 2550 and other II Devices wirelessly connected to other II Devices and that particular II Device. E.g. in diagram above, signal strength between WD1 2550 and II Device8 2514 is very low. This may cause communication errors between WD1 2550 and II Device8 2514. Therefore, WD1 2550 can chose to communicate with II Device8 2514 through II Device2 2502 as signal strength between WD1 2550 and II Device2 2502 and that between II Device2 2502 and II Device8 2514 is good, leading to less errors in communication. When a command is sent from the wireless device to an II Device through a mesh network, the II Device will respond to confirm the command has been executed in a similar path or along a more effective path given any potential changes in the network based on any changes in terms of movement of wireless device, signal strength, etc. The mesh network could be limited to NWL1 or NWL2 or any other network level based upon the criticality of application and different II Device embodiments.

Considering the fact that some types of communication protocol/methods have a limit to the number of devices that can be connected or have communication among, the device application will intuitively take these as input constraints to the formation of an optimal mesh network and path for the wireless communication of a command. As example, if the wireless communication uses Bluetooth technology, there might be some constraints. Considering a piconet topology (ad-hoc computer network using Bluetooth technology), a master Bluetooth device (Mostly a Wireless Device or II Device in this case) can communicate with a maximum of seven Bluetooth devices at a time. Understanding this constraint, the wireless device(s) and II Devices could execute the mesh network process in such a way to optimize both the total number of II Devices captured by the network and the path to send any specific command through the mesh network. This can be achieved by executing the standard mesh networking process, and the device application considering the resulting map of the network to calculate and decide which specific II Devices to keep connected within the direct connection of the wireless device and which to keep connected through other II Devices.

Considering a case where more than seven II Devices are found within the vicinity of the wireless device, the device application after receiving the initial network mapping would adjust which II Devices to directly connect to and which to connect to through another II Device to attempt to reduce the number of II Devices directly connected to the wireless device. This would open up the ability of the wireless device to search for and connect to additional II Devices within initial proximity that might not have been able to connect before due to the limit of seven devices. This process would be balanced to ensure those lights that could only connect through another II Device are also accounted for and signal strength is at the highest possible levels. Note that this constraint might not be the case for all versions of Bluetooth topology or technology.

The steps for forming a dynamic mesh network will now be described. Similarly to controlling multiple II Devices with multiple devices, multiple wireless devices, in this case, WD1 2550, WD2 2552 and WD3 2554 could control one or many II Devices via the mesh network. Each wireless device, in this case, WD1 2550, WD2 2552 and WD3 2554 would execute the mesh network process in relation to its location as explained earlier with reference to wireless device WD1 2550 and II Devices in its vicinity at different network levels such as NWL1, NWL2 and NWL3.

Along the same lines, a dynamic mesh networking is required as a wireless device (WD) can move from one place to another changing for itself the II Devices in NWL1 and possibly the II Devices in other related network levels such NWL2, NWL3, etc. In the dynamic mesh network process, the wireless device and II Devices follow the same process as explained in the formation of mesh network, but the process is repeated on a continuous basis. Specifically, the wireless device and each related II Device would keep updating their individual network as explained earlier after every defined time interval. Each II Device would also keep providing the ids and statuses of II Devices in its network to the wireless device(s) in a defined time interval. This time interval would vary from a few seconds to hours depending upon the complexity and criticality of the application being run, power consumption, dispersion of II Devices, and total no. of wireless devices and II Devices in the network.

Figure 25:
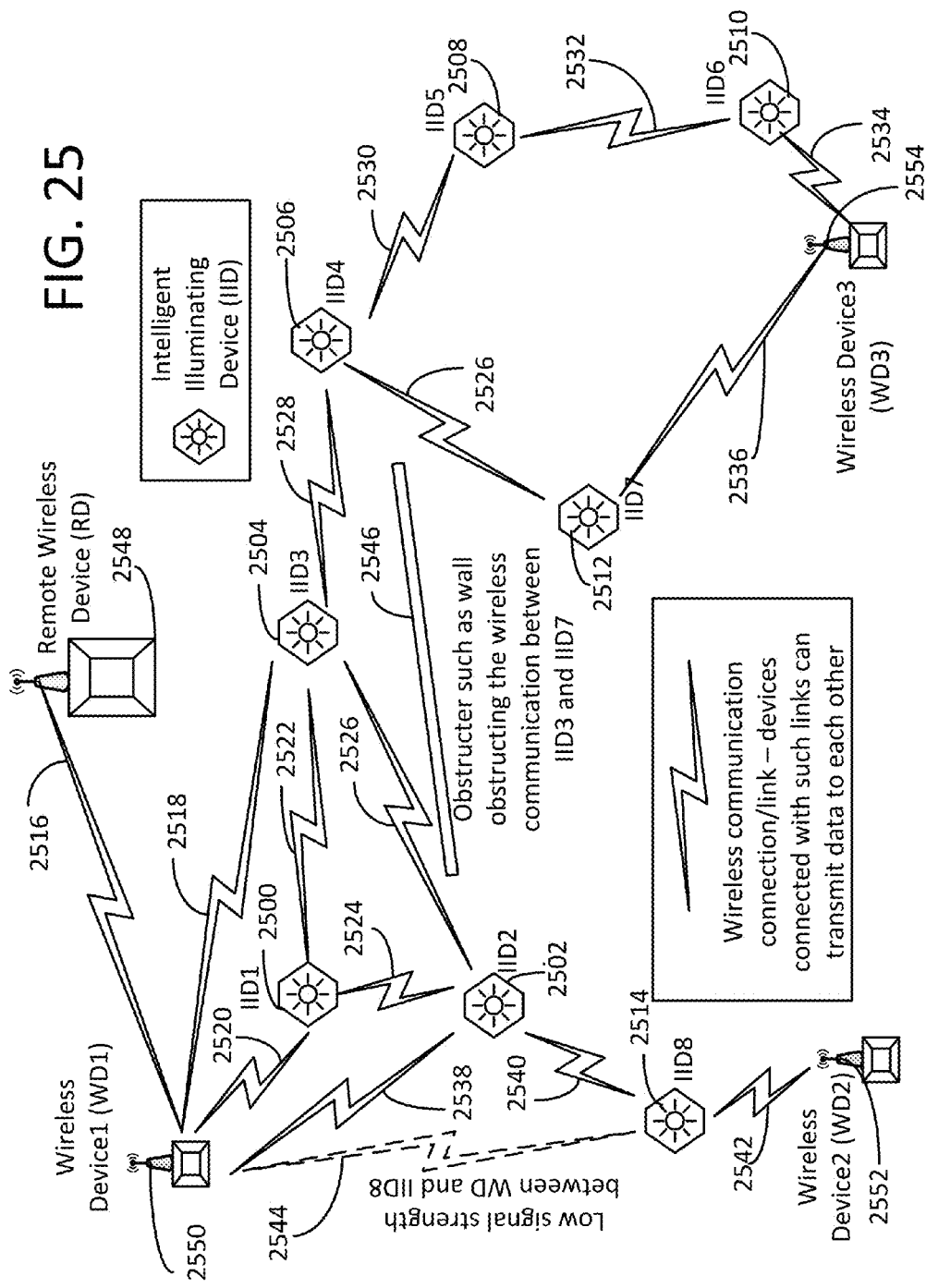
FIG. 25 is a block diagram of accessing an Intelligent Illuminating Device network through various devices in accordance with one embodiment of the present invention.

In FIG. 25, accessing an II Device network through various devices in accordance with one embodiment of the present invention is shown as well. Different types of wireless devices could work together to form, extend, and translate different communication methods to support the mesh network. These different wireless devices could be standard wireless devices such as smartphones, tablets, computers, or other standard controlling wireless devices with the device application loaded. Alternatively, these different wireless devices could be an auxiliary device with some specialized or standardized device application to either perform a specific function or general function in relation to the mesh network.

As example, a wireless device located outside of direct contact with the lighting network, but within range to another wireless device within range of the lighting network, could send commands through the wireless device to the lighting network and subsequent mesh network. In this case, the remote wireless device RD 2548 would originate the commands and then the localized wireless device WD1 2550 would act as the first network level of the mesh network. Note that the communication method between the remote wireless device RD 2548 and the localized wireless device WD1 2550 might be different than the communication method between the localized wireless device WD1 2550 and the II Devices lighting network. As an example, the remote wireless device (RD) 2548 may communicate with the localized wireless device WD1 2550 via an internet based protocol while the localized wireless device WD1 2550 communicates with the lighting network via a Bluetooth protocol. Also, remote wireless device (RD) 2548 could be another embodiment of Intelligent Illuminating Device 140.

Additionally, the remote wireless device RD 2548 might send a communication to the localized wireless device WD1 2550 to send a specific communication to the lighting network upon some defined event. In addition, the remote wireless device RD 2548 need not necessarily be outside of the range of the lighting control system. The wireless device WD1 2550 may also act as a specialized auxiliary wireless device such as an external ambient light sensor and communicate with other wireless devices.

The Real Time Clock inside of each II Device would need to be periodically updated to ensure accuracy. To achieve this, the device application on the wireless device would refer to and share its own current date and time information via the wireless communication and connection process—either as part of the status update process or an alternate process. Additionally, the II Devices themselves can update and reconcile discrepancies within the date/time without the wireless device itself being present in the network. The actual process to update the date/time setting of the RTC in an II Device from the wireless device/device application might be executed in a number of different ways.

The following are potential but not limited to all examples of how a device to II Device date/time update process would be triggered, generally represented as element 2602. The wireless device/device application might send the date/time setting upon every command sent to the II Device network, and when received the II Device(s) would update the current date/time setting in the RTC and store latest update date/time in the II Device's memory. The wireless device/device application might periodically over some time or number of processes send the date/time setting upon every command sent to the II Device network, and when received the II Device(s) would update the current date/time setting in the RTC and store latest update date/time in the II Device's memory. The wireless device/device application might send the date/time setting only when specific programming commands are sent or active that requires information from the RTC and store latest update date/time in the II Device's memory. The wireless device/device application might send the date/time setting after some time setting is changed within the wireless device/device application. Further, any combination of the above might be applicable.

Similarly, the process where II Devices share and reconcile date/time settings might be executed in a number of different ways. The following are potential but not limited to all examples of how an II Device to II Device date/time update process would be triggered, collectively represented as element 2702. The II Devices might share and reconcile their date/time at some multiple of when their status is shared. The II Devices might share and reconcile their date/time only when executing certain commands or processes. The II Devices might share and reconcile their date/time after some defined period of time. The II Devices might share but only reconcile their date/time when they are different. The II Devices might reconcile the date/time setting based on the most recent update of date/time setting. Further, any combination of the above might be applicable.

Figure 26:
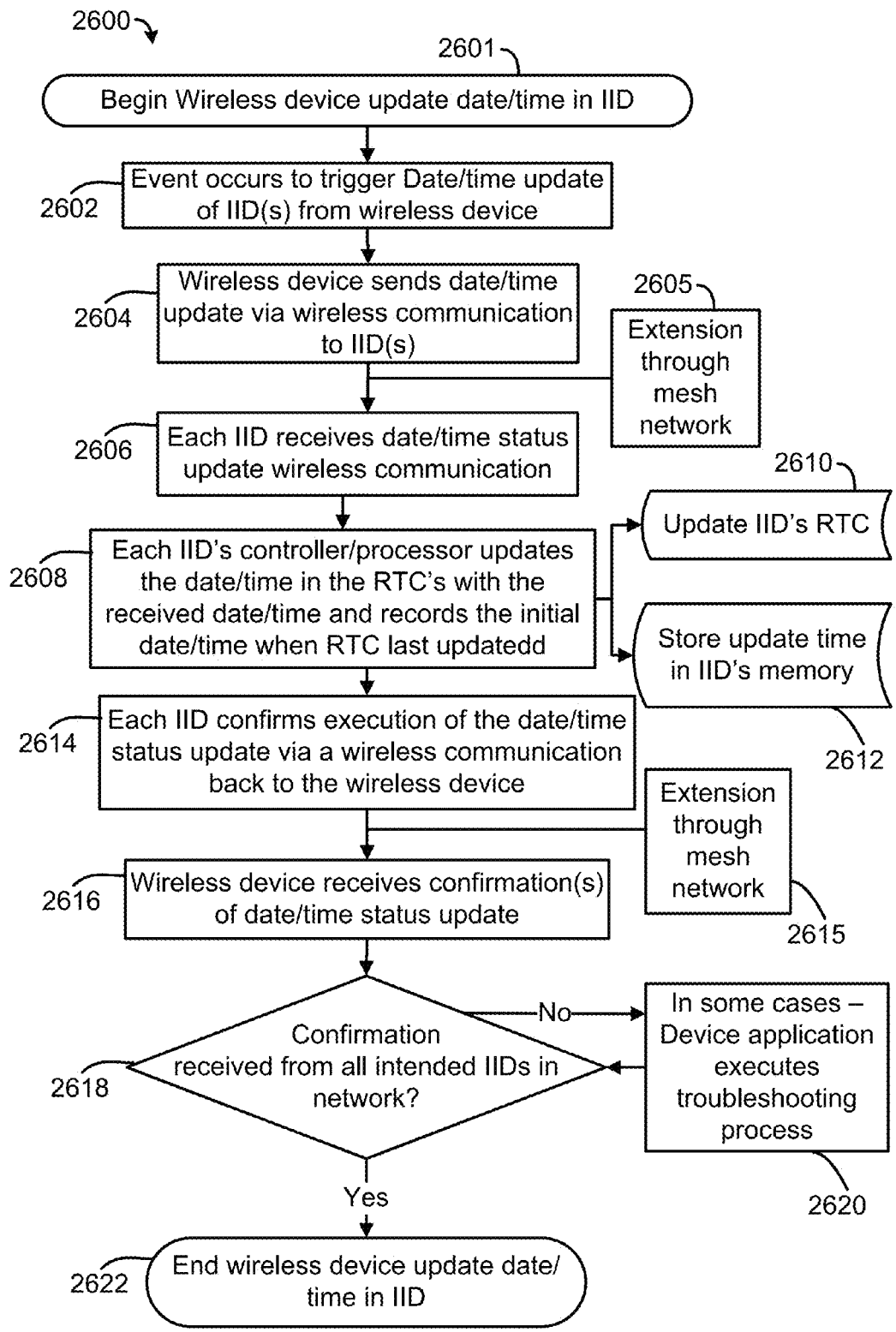
FIG. 26 is a flow chart of a wireless device update date/time process in Intelligent Illuminating Device in accordance with one embodiment of the present invention.

Now referring to FIG. 26, a flow chart of a wireless device update date/time process in II Device in accordance with one embodiment of the present invention is shown and referred to as element 2600. The actual reconciliation process and dependency in commands would proceed as follows, beginning with block 2601. Anytime the wireless device sends a date/time update to any number of II Devices 2604, 2606, the II Device will update and match its internal time via the II Device's RTC and memory 2608, 2610. The II Device's memory will also update the date/time value as the original date/time when the RTC was updated 2608, 2612. The II Device would then confirm the execution of the date/time update back to the wireless device 2614, 2616. In some cases, the wireless device might execute a troubleshooting process if not all II Devices confirm execution of the date/time status update 2618, 2620. The process would conclude with block 2622.

Figure 27:
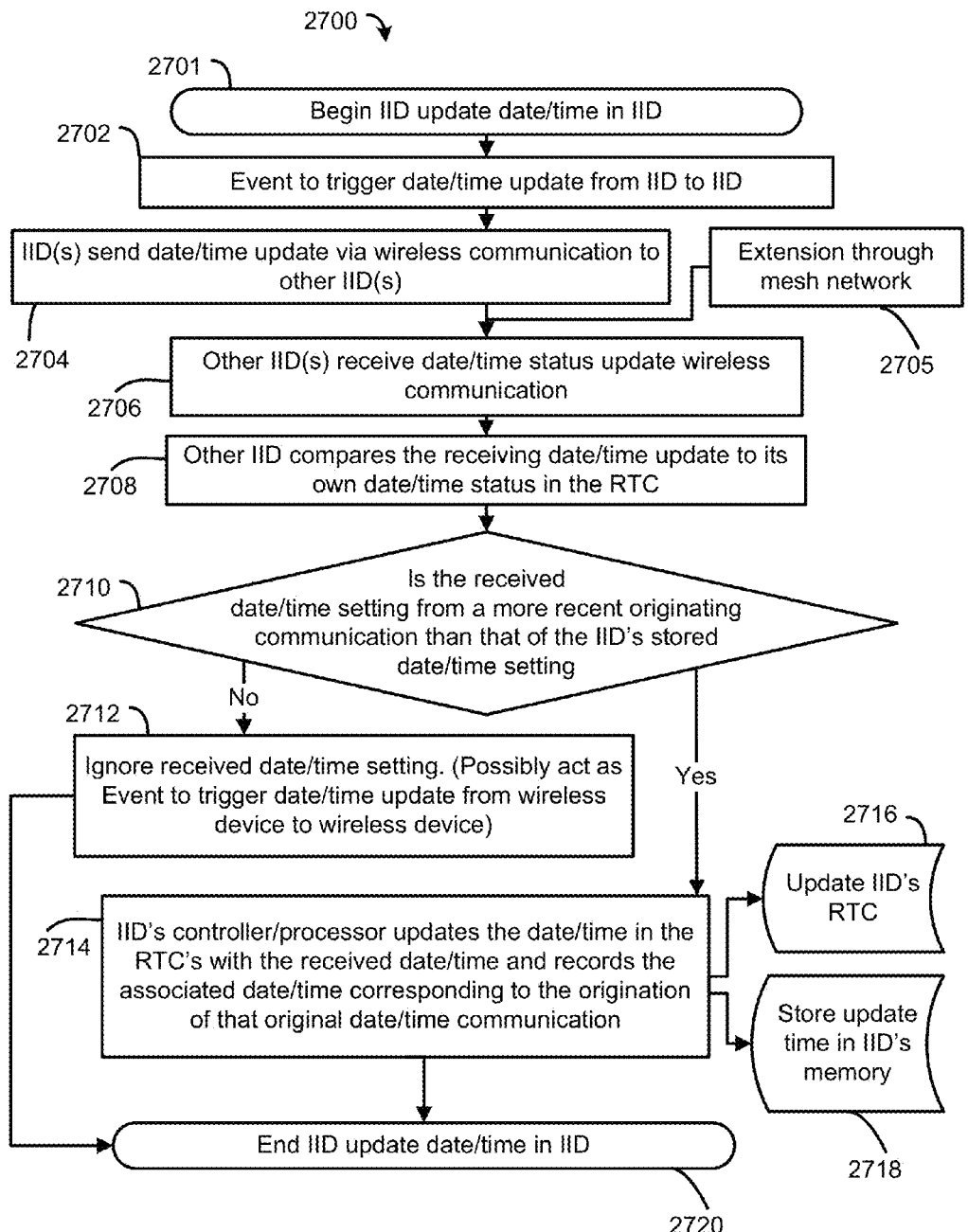
FIG. 27 is a flow chart of an Intelligent Illuminating Device update date/time in Intelligent Illuminating Device in accordance with one embodiment of the present invention.

Referring now to FIG. 27, a flow chart of an II Device update date/time in II Device in accordance with one embodiment of the present invention is shown and referred to as element 2700. When an II Device to II Device event occurs as referred to previously as 2702, either through a status update or solely a date/time communication, the II Device(s) would send a date/time communication out to any II Devices either directly within range 2704 or within range through the mesh network 2705. When an II Device(s) receive the date/time communication from another II Device 2706, the receiving II Device will compare the receiving date/time update to its own date/time status in the RTC 2708. If the received date/time communication was set more recently than that of the II Device's 2710, then the receiving II Device will update and match its internal time via the II Device's RTC and memory 2714, 2716. The II Device's memory will also update the date/time value when the RTC was updated 2714, 2718. If the values are the same or the received date/time was updated later than the receiving II Device's internally stored date/time 2710 to 2712, then the II Device takes no action 2712 and will complete the II Device to II Device date/time communication process 2720. Considering a mesh network system where there are numerous paths and scenarios, broadly the II Device's themselves will only update their date/time when the received date time originated from a more recent date/time update. Originated refers to the specific date/time when a wireless device sends an update to the II Device(s). If an II Device then passes that date/time on to another II Device, the originated date would still refer to the original date/time when the wireless device sent the update to the II Device(s).

Figure 28:
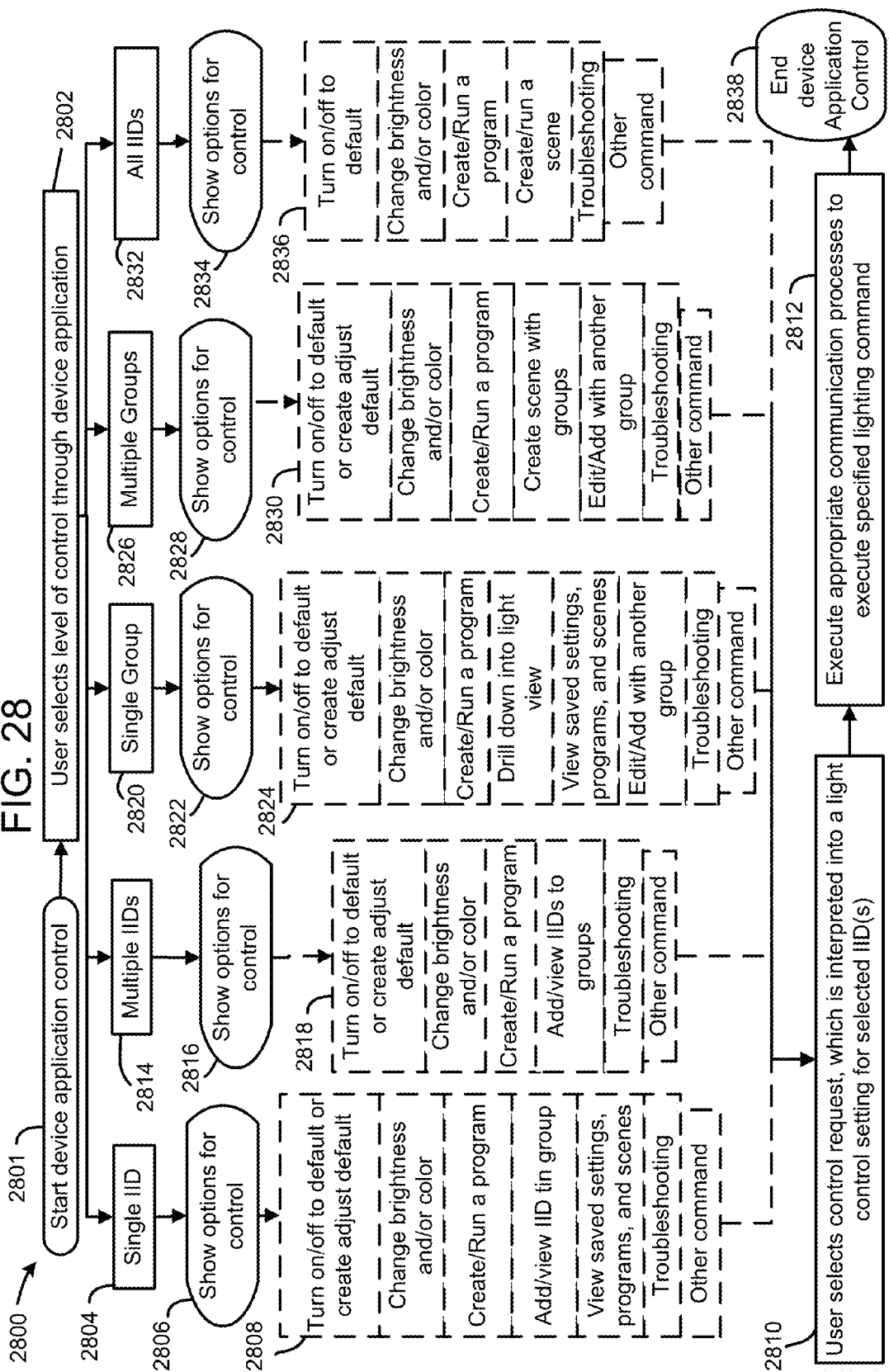
FIG. 28 is a flow chart of basic control areas in accordance with one embodiment of the present invention.

Referring now to FIG. 28, a flow chart of basic control areas in accordance with one embodiment of the present invention is shown and represented by element 2800. Using the device application on a number of different wireless devices, a user could communicate and control the wireless lighting system in a number of ways. A user could control a single II Device, a combination of II Devices, a predetermined group of II Devices, multiple groups of II Devices, and the whole set-up of networked II Devices. Control pertains to adjusting brightness, color, running a program, or setting a program to run at a future time or upon some event. All processes begin with block 2801 and continue as follows:

Controlling a single II Device through the application: (a) a user will navigate through screens on the application to select 2802 an individual II Device (e.g., can arrive by 'drilling down' into a group or selecting the unique II Device to control); (b) once the single II Device is selected 2804, the device application will display potential options for control 2806; (c) potential options for control include but are not limited to the following collectively signified by 2808: (i) turning on/off to default, (ii) changing brightness, saturation, and/or color, and (iii) running a program now or upon some condition such as time. Alternate options for user customization include but are not limited to: (i) adding the II Device to an existing or new group, (ii) viewing the II Device's group assignments, (iii) viewing a hierarchy of programs and scenes that the II Device is included in, and (iv) troubleshooting the II Device. Once a user has selected the option for control, the device application will interpret the selection into a light control setting for the selected II Device 2810 and send a wireless communication via the appropriate processes, represented here collectively by element 2812. As such, once the individual II Device receives the communication, it will then interpret the instructions and execute the command, then relay confirmation back to the wireless device per the appropriate communications processes.

Controlling multiple II Devices through the application: (a) a user will navigate through screens on the application and select multiple II Devices 2802 (e.g., can arrive by 'drilling down' into a group or selecting the unique light IDs to control; (b) once the II Device IDs are selected 2814, the user will be given options for control 2816; (c) potential options for control include but are not limited to the following collectively signified by 2818: (i) turning on/off to default, (ii) changing brightness, saturation, and/or color, and (iii) running a program now or upon some condition such as time. Alternate options for user customization include but are not limited to: (i) adding the II Device to an existing or new group, and (ii) troubleshooting the II Device. Once a user has selected the option for control, the device application will interpret the selection into a light control setting for the selected II Devices 2810 and send a wireless communication via the appropriate processes, represented here collectively by element 2812. As such, once the individual II Device receives the communication, it will then interpret the instructions and execute the command, then relay confirmation back to the wireless device per the appropriate communication processes represented by 2812.

Controlling a group or multiple groups of II Devices through the application. A user will navigate through screens on the application and select a group or multiple groups of II Devices 2802. Groups of II Devices will be user configurable combinations of individual II Devices. They will most closely relate to rooms, but can have multiple combinations. Once the group 2820 or groups 2826 are selected, the user will be given options for control 2822, 2828, including but are not limited to the following collectively represented as element 2824 for a group or 2830 for multiple groups: (i) turning on/off to default, (ii) changing brightness and/or color, (iii) running a program now or upon some condition such as time, and (iv) turning on/off a program that is set to run in the future or upon some condition.

Alternate options for user customization include but are not limited to: (i) drilling down into individual II Devices for control, (ii) adding the group to an existing or new group, (iii) viewing a hierarchy saved settings, programs, and scenes that the group is included in, and (iv) troubleshooting the group. Once a user has selected the option for control, the device application will interpret the selection into a light control setting for the each II Device within the selected group or groups 2810 and send a wireless communication via the appropriate processes, represented here collectively by element 2812. As such, once each II Device within the selected group(s) receives the communication, it will then interpret the instructions and execute the command, then relay confirmation back to the wireless device per the appropriate processes discussed in the communication processes represented by 2812.

Controlling a whole network of lights through the application is similar in fashion to controlling multiple groups, represented by a similar sequence of elements 2802, 2832, 2834, 2836, 2810, and 2812. All basic control processes end at block 2838.

Programming is a process by which an II Device, multiple II Devices, a group, or multiple groups can execute a command or sequence of commands given some other event occurs or condition is met. Similarly, an II Device, multiple II Devices, group, or multiple groups could be given a sequence of commands to execute in sequence at some time interval. Unique to the invention disclosed, a user can create programmed commands, send them wirelessly to any number of specified II Devices, and the command would execute given a condition being met. The condition will generally be related to time, but many types of conditions could be interpreted into time-based activities. For example, wireless devices able to access the Internet provide a wealth of potential conditions that could be converted to time passed or the wireless device could passively monitor the condition and send a command when met.

Generally a condition could be executed through these sources: (a) the wireless device sends a command to any number of II Devices to execute a program given a date/time passing or date/time being met (e.g., simulated sunrise, timer, etc.); (b) the wireless device sends a command to any number of II Devices to execute a program given some other conditionally based input directly available to the II Device (e.g., ambient light sensor program); (c) the wireless device sends a command to any number of II Devices to execute a program with the condition being met at that time and the action stored in the II Devices memory (e.g., reset process); (d) the wireless device sends a command to any number of II Devices to execute a program with the condition being met at that time and the action specified through the command (e.g., starry night); (e) the wireless device sends a command to any number of II Devices to execute a program given some other conditionally based input available to the lighting control network is available to said II Devices (e.g., auxiliary ambient light sensor program); (f) the wireless device sends a command to any number of II Devices to execute a program in coordination with wireless communications/commands provided sequentially through the device application (e.g., music sync); (g) the wireless device runs a program to monitor some condition and upon that condition being met sends a command to any number of II Devices to execute a specified command or sequence of commands (e.g., weather alerts); (h) any combination or sequential representation of the above program types.

Creating a program involves similar processes to basic control. A user selects an II Device, multiple II Devices, group, or multiple groups to run a program. The user then selects a program to be run by the selected II Device(s): (a) there could be predefined suggested programs based on the items selected (e.g., stored in device application memory); (b) the user could create their own program; (c) each program will consist of at least one command to be run when one or more conditions are met, or multiple commands to be run sequentially or upon further conditions being met (e.g., user to set/select condition); (d) the program can be run at that time or saved to run at a future time (e.g., the program can be set to repeat on certain dates/times, such as days of the week, every X days, or any time lapse interval). The command or series of commands is then sent via the wireless network to each associated II Device(s). This is done through the appropriate wireless communication process. Each II Device(s) then interprets the command or series of commands, executes the command, or stores the command in memory to be executed when conditions are met. Similarly, each II Device(s) would confirm the program command via the appropriate communication method process.

Now referring to FIG. 29, a flow chart of a programming process in accordance with one embodiment of the present invention is shown and referred to as element 2900. Once a program or programs are saved a user can recall and toggle those programs on/off. The process begins with block 2901. At the main level of the device application 2902, there will be a 'programs' button. When selected 2904 this will display all programs associated with the active profile. Each program will be listed with their current status as active vs. inactive. The programs will be sorted based on active vs. inactive status with active listed first. Secondly, the programs will be sorted based on the proximity of the associated II Devices to each program 2906. When toggled on 2908, the application will send the command or series of commands via the wireless network to each associated II Device(s) 2910 through one or more appropriate communication processes, collectively represented here as 2912. The actual light setting associated with the program might be stored in device application so that the wireless communication is to execute a specific program type command. The actual light setting might also be stored in the II Device itself 2914 so that the device application/wireless device only requests the II Device to run that program. Each II Device(s) then interprets the command or series of commands and their related program conditions, executes the command given a present condition, or stores the command in memory to be executed at a later condition time or event. In the latter case, once the condition is met the II Device(s) will execute the program command 2918. Then if there are further conditional commands within the program 2920, the II Device will continue to monitor for conditions until they are met 2916 and the II Device similarly follows the process to execute the program command 2918. Once no further conditional commands are in the program 2920, the program completes and changes to inactive status 2922 so that the program commands are deleted from the memory of each related II Device, and the program returned to an off status in the device application 2924. Alternately, a program that was set to run can be turned off 2908 so that the wireless device sends a command to the related II Devices to not execute the conditional command prompted by the program 2928. This command would be communicated through one or more appropriate communication processes, collectively represented here as 2912. When received, each II Device would change the program to complete and change it to inactive status 2922 so that the program commands are deleted from the memory of each related II Device, and the program returned to an off status in the device application 2924. The program might still be saved in the device application memory for future use, if a saved program. The program run process ends in block 2930.

In the case where program commands would overlap with each other, the device application will prompt the user to confirm the program selection. In such case, the selected program will overlap any conflicting previously activated program. Alternatively, if the program commands originated from multiple devices or profiles, the II Devices will execute programs in the order of profile hierarchy. Alternatively, the programs might execute in the order of the last received command.

Scenes & suggested scenes will now be described. A scene is a predefined setting or program related to multiple II Devices and/or groups, so that with one user selection any or all II Devices would execute a specified setting or program. This element is useful to support very holistic functional lighting like turning off all II Devices before going to bed, turning on some II Devices to walk to the bathroom, setting a mood for dinner or a movie, or many other personal preferences. A scene is comprised of a defined light setting and/or program for each of any number of individual II Devices and/or any number of groups. When a scene is activated, the device application recalls the defined light setting(s) and/or program and the associated II Device (s)/group(s) and sends a standard wireless command to each.

Referring now to FIG. 30, a flow chart of a process for creating a scene in accordance with one embodiment of the present invention is shown. The scene control selection can be both suggestive and user configurable. A user could drill into each established scene to view or edit the states for each II Device, add more II Devices, etc. A user could also select a scene to be run at a previous time such as through an automation program. Scenes might display graphically in the user interface with the most used scenes or the scenes containing the II Devices with the closest signal strength higher in order. Users could also drag and drop the order of scenes displayed to their preference.

Once a network of II Devices is set-up, the application might suggest some pre-configured scenes dependent on the number of II Devices set-up within the network and the names of the groups (most likely rooms) that were assigned. More specifically, the device application would refer to the list of groups configured by the user, and if certain predefined keywords or combinations of words were found within those groups, the application would suggest/show a scene related to that group or groups in the scene options. Also, the device application would refer to the number of II Devices, the number of groups, and the number of II Devices within each group to create suggested/predefined scenes. With more II Devices, groups, and II Devices within groups, more complex scenes could be suggested, or more group specific scenes could be suggested. All # of II Devices would include scenes all off and all on related to turning all II Devices off within the addressable network, or turning all II Devices on. As example, for any lighting network containing a group of lights with the word "TV", "Television", "movie", "film", or related word, the application would suggest a lighting scene related to watching a movie, such as a soft blue light emitted from each of the II Devices. The types of suggested scenes could vary dependent on different applications.

Through the device application, the user can create a new scene, referred to as element 3000 and beginning in block 3001, by first selecting the option to create a scene in the device application 3002 and selecting any number of II Device(s) and/or group(s), with which to start creating the scene 3004. The user would then select/create the lighting control setting or program for the selected II Device(s) and/or group(s) II Device. Here, the light setting might be a previously user saved configuration, an automated application suggested configuration, or a newly created configuration 3006. Once selected, the user would then have the option to add additional subsets of II Device(s) and/or groups to the scene 3008, which would revert back to a similar configuration process for that selection 3004, 3006. Once the user has configured all the II Device(s) and/or group(s) that they wish 3008, the scene, comprised of any combination of II Device (s) and/or group(s), each with a specified light setting or program, will be saved and the user could assign a specified name 3010. This information will be stored in the device application memory 3012 and the process will end in block 3014.

Note that each II Device within the scene is able to have a different II Device brightness and/or color. In addition, predefined programs for II Device(s) can also be run or activated through a scene in combination with a specific type of lighting to be executed at that time. For example, a 'time to sleep' scene might turn off all the II Devices in the network, except for one II Device on very low blue light in a child's bedroom, and activate the II Device alarms for all bedrooms in the house for a certain time. Once the user has selected the II Devices and lighting output, the user can save that scene for future use as referred to previously in 3010. The scene is saved within the device application memory 3012.

Now referring to FIG. 31, a flow chart of a process for executing a scene command in accordance with one embodiment of the present invention is shown as element 3100. The process begins in block 3101. To turn a scene on, when the device application is open 3102, the user would select (switch on) the desired saved (or suggested) scene as an option presented in the device application interface 3104. The device application would then retrieve and convert the scene selection into specific light setting commands and/or programs to be executed by each of the related II Devices in the scene 3106. The wireless device would then convert the series of II Device light setting commands or programs into the appropriate wireless communications directed at each of the related II Devices within the group 3108. Upon receipt, each II Device would execute its related light setting command or program and send the appropriate wireless communication back to the wireless device to confirm execution of the scene 3110. The process completes in block 3112.

Changing and adding unique groupings of II Device (Setting up your own groups) allows for user configurable set-up, alteration, and assignment of any number of II Device combinations of the addressable lighting network. Within the device application, each II Device has its own unique ID. Through the application a user can combine any number of II Devices and or existing groups together to form a group of II Devices. This can be done through user gestures (dragging and dropping), selecting an individual and assigning to a group, or through the easy-setup program. Once any number of lights is assigned into a group. A user can select commands to all II Devices within the group by simply selecting the group.

Figure 32:
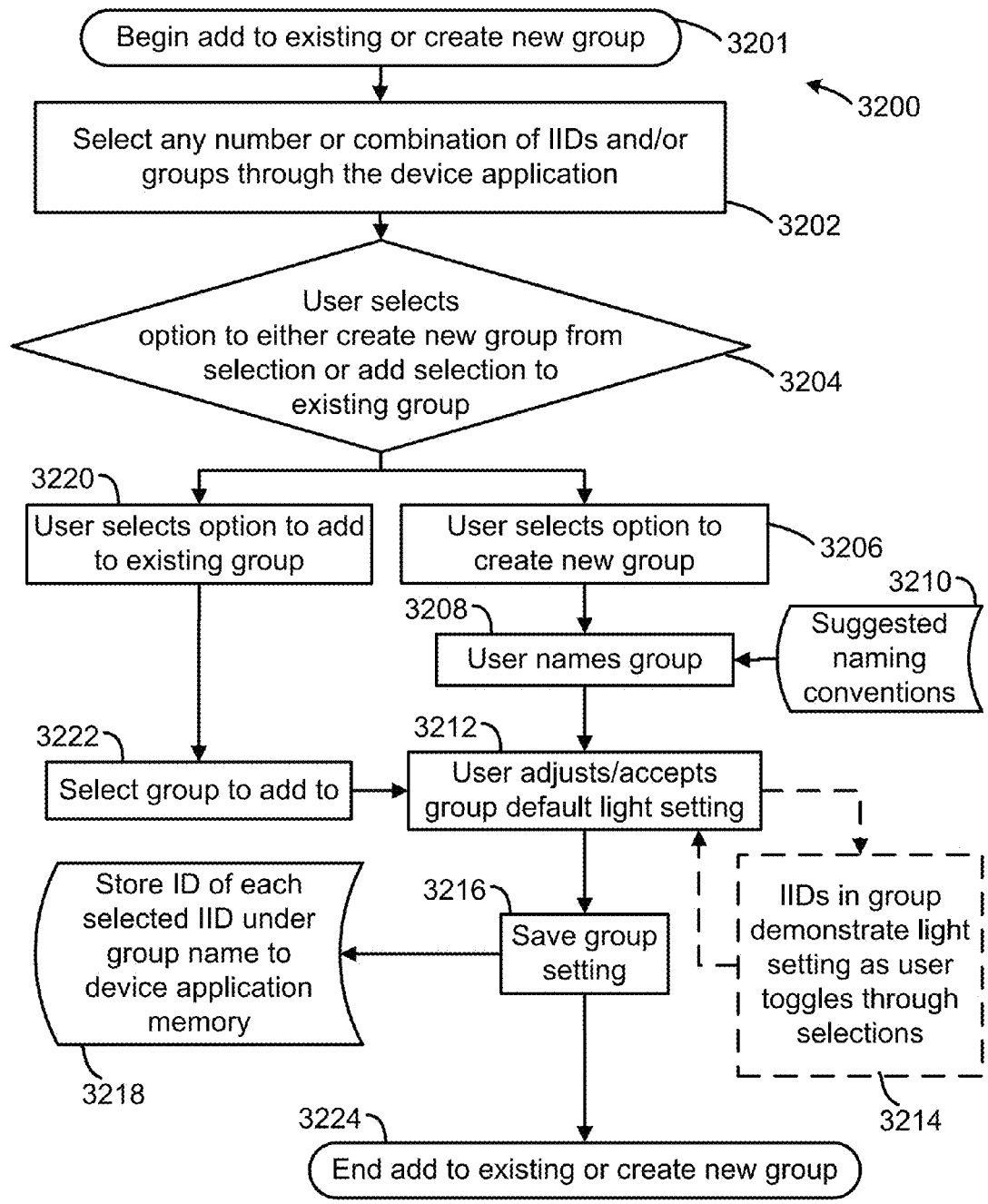
FIG. 32 is a flow chart of a process for creating a new group or adding to a new group in accordance with one embodiment of the present invention.

Referring now to FIG. 32, a flow chart of a process for creating a new group or adding to an existing group in accordance with one embodiment of the present invention is shown as element 3200. The process begins with block 3201. A user selects any number or combination of II Devices and/or groups through the device application 3202. The user then selects the option to either create a new group from the selection or add the selection to an existing group 3204. If creating a new group from selection 3206: (i) then the user will need to name the group 3208 (e.g., the device application might have a list of predefined naming conventions that a user has the option of selecting 3210, or they can type their own); (ii) the user would then be prompted through the device application to set a group default light setting for all II Devices within the group 3212 (e.g., a user could select different unique light settings for each II Device within the group that are all saved under the group light setting (see default process for more details); (iii) as the user is selecting the group default light setting, if in proximity to the actual lighting network the wireless device would adjust the related II Devices to execute the light settings as the user is toggling different options while selecting a default group setting 3214; (iv) once a user selects and sets the group default light setting 3212, then the group setting could be saved 3216 to the device application's memory to be run in the future 3218 with the process ending in block 3224. For adding the selection to an existing group 3220: (i) the user would then select what group to add the selection to via the device application 3222; (ii) the user would then be prompted to confirm extension of the default group setting to the newly selected II Devices/groups or create new light settings for the selected II Devices within the group 3212; (iii) as the user is selecting the group default light setting, if in proximity to the actual lighting network the wireless device could adjust the related II Devices to execute the light settings as the user is toggling different options 3214; and (iv) once a user selects and sets the group default light setting 3212, then the group setting could be saved 3216 to the device application's memory to be run in the future 3218 with the process ending in block 3224.

Figure 33:
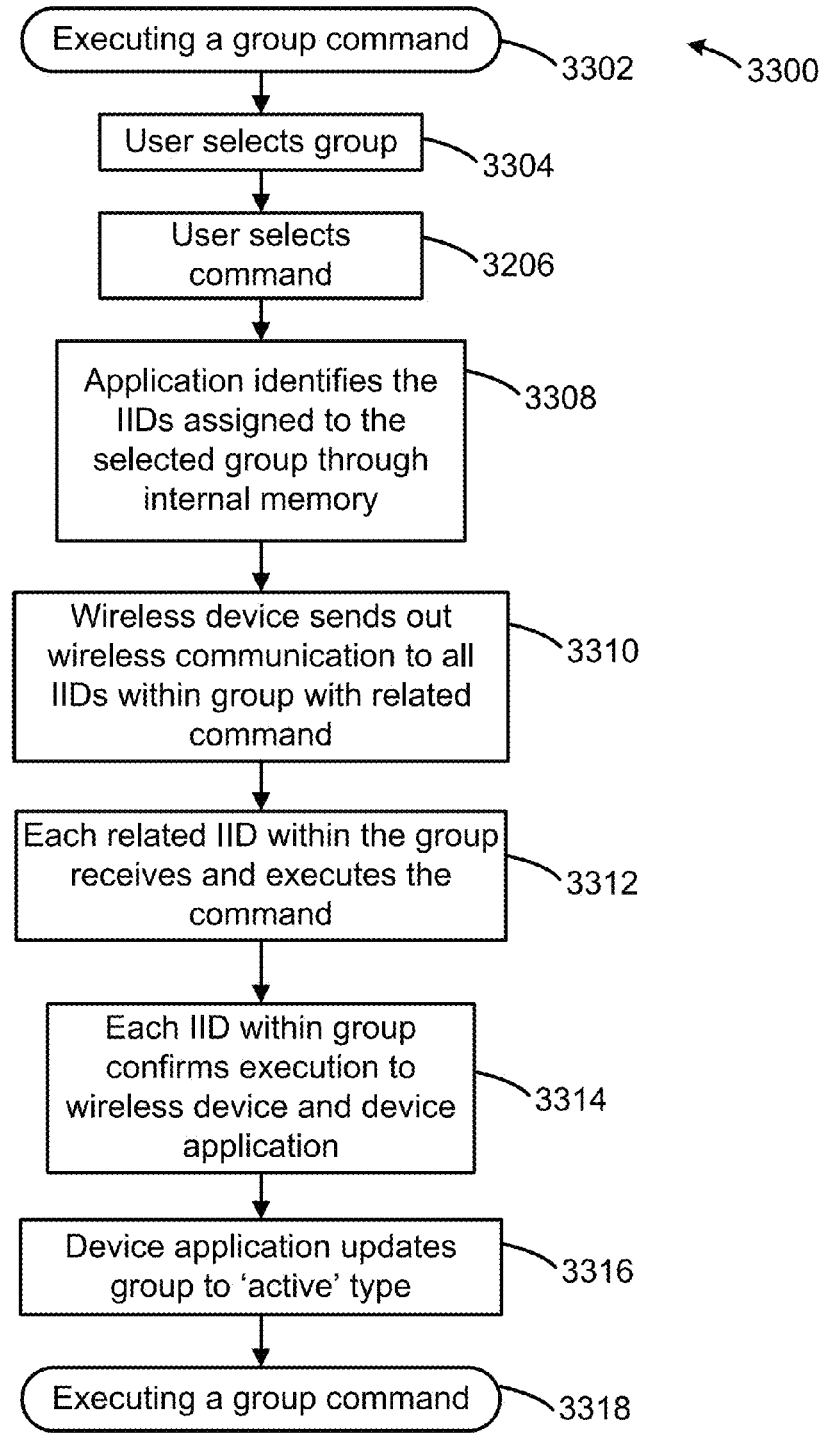
FIG. 33 is a flow chart of a process for sending a group command in accordance with one embodiment of the present invention.

Now referring to FIG. 33, a flow chart of a process for executing a group command in accordance with one embodiment of the present invention is shown as element 3300. The process begins in block 3302. User selects group(s) 3304 and related light setting command/program 3306 through the device application user interface. The application then identifies the II Devices assigned to the selected group through internal memory 3308. Wireless device running application sends commands through wireless communication for those specified II Devices in the group 3310 following the appropriate communication methods/processes. Each II Device receives and executes the intended light control setting or program 3312. Each II Device responds to the wireless device to confirm execution of the group command 3314 following the appropriate communication methods/processes. Upon receipt of all confirmations the device application would update the group to 'active' or 'on' in the user interface 3316 with the process ending in block 3318. Note that any individual II Device can be assigned to multiple groups. Multiple groups can be combined, adjusted, or used to create new groups. Also note that in some scenarios not all II Devices assigned to a group could be accessed due to signal range limitations or other problems. In these cases, the user would still have the ability to control those II Devices that are accessible at that time. Similarly, a notation could be made in the user interface signifying a group that is not fully accessible.

A process will now be described for setting, using, and changing default light levels for any number of II Devices (including switching on/off through an external switch, such as a wall switch (see FIG. 62)), so that a user can easily customize, save, and recall their standard lighting preference. Additionally, a process allowing for anyone to turn on the preset default of the II Devices, without using the application will also be described. Each II Device will always have an associated default light level. Each II Device might have multiple related default light levels with the following framework. (i) Manufacturing default—for each II Device the most basic light setting stored in each II Device's internal memory. The manufacturing default light setting will always be stored in the II Device's memory. (ii) Light default—for each II Device, the active default light setting that will be executed when the II Device is turned on directly as in the process steps of 2800 to 2804 to 2838 (not through a group command) or upon power restoration. Each II Device can only have one light default. This default light setting is stored within each II Device's memory until the II Device is reset or the light default is changed. When unassigned, the light default reverts to the manufacturing default. Group default(s)—The light setting that will be executed by each II Device within the selected group when the selected group is turned on through the device application. The group default is stored within the device application related to each group. Each II Device is able to execute multiple group defaults, dependent on which group the user has selected to turn on and their individual commands within the group default. During the set-up process, or any time after installation, a user can change the light default or group default settings through the device application.

The manufacturing default will most likely be a standard high output white type of light. This light setting will be programmed into each II Device during the manufacturing process and stored into the II Device's memory. This default will first be executed when the II Device is powered on for the first time. As such, the manufacturing default is independent of the device application. After a light default is assigned, the light default setting will take precedence over the manufacturing default; however the manufacturing default setting will still stay stored within the II Device's memory. When a light is reset to the manufacturing state, either through the hard or soft reset function, the light default will be erased and the II Device will revert back to the manufacturing default acting as the light default.

Figure 34:
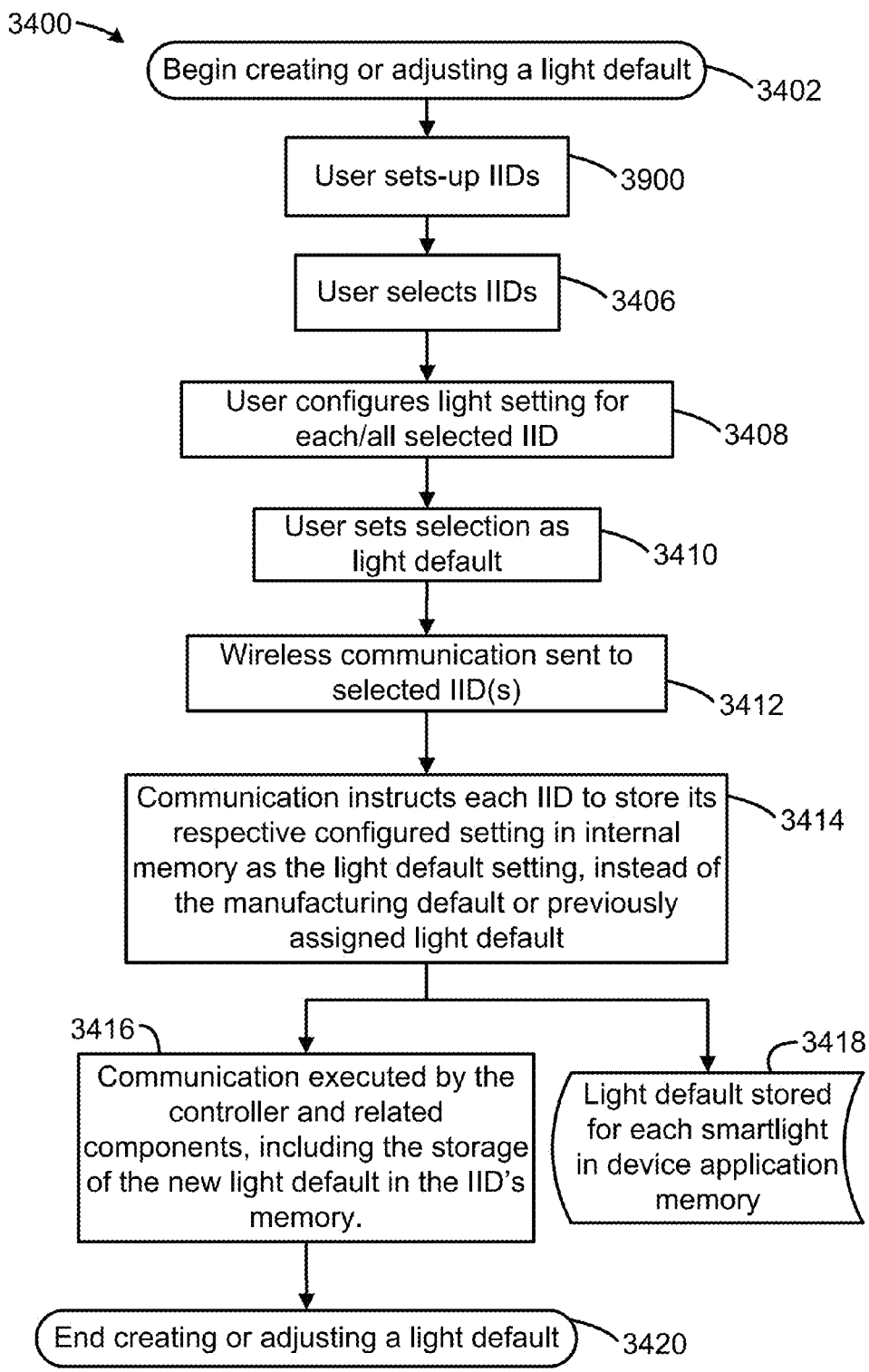
FIG. 34 is a flow chart of a process for creating or adjusting a light default in accordance with one embodiment of the present invention.

Referring now to FIG. 34, a flow chart of a process for creating or adjusting a light default in accordance with one embodiment of the present invention is shown and referred to as 3400. The process begins at block 3402. At any time after setting up an II Device with the device application such as the process described in 3900, a user can select or adjust a personalized light default setting. A user can select one or more II Device(s) through the device application 3406, adjust the color and/or brightness 3408 and set that selection as the light default for the respective II Device(s) 3410. Upon assignment of the light default, the device application via the wireless device will send a wireless communication to the related II Device(s) 3412, through an appropriate communication means. The communication will instruct each II Device to store its respective configured setting in its internal memory as the light default setting, instead of the manufacturing default or previously assigned light default 3414. This communication request will then be executed by the controller and related components, including the storage of the new light default in the II Device's memory 3416. The assigned light default light setting will also be stored in the device application memory 3418. This would end the process for setting a new or changing an existing light default setting 3420. The light default setting can be changed or adjusted at any time and would follow a similar, if not the same, process for creating a new light default as described as element 3400. Each II Device can only have one light default at a time.

Figure 35:
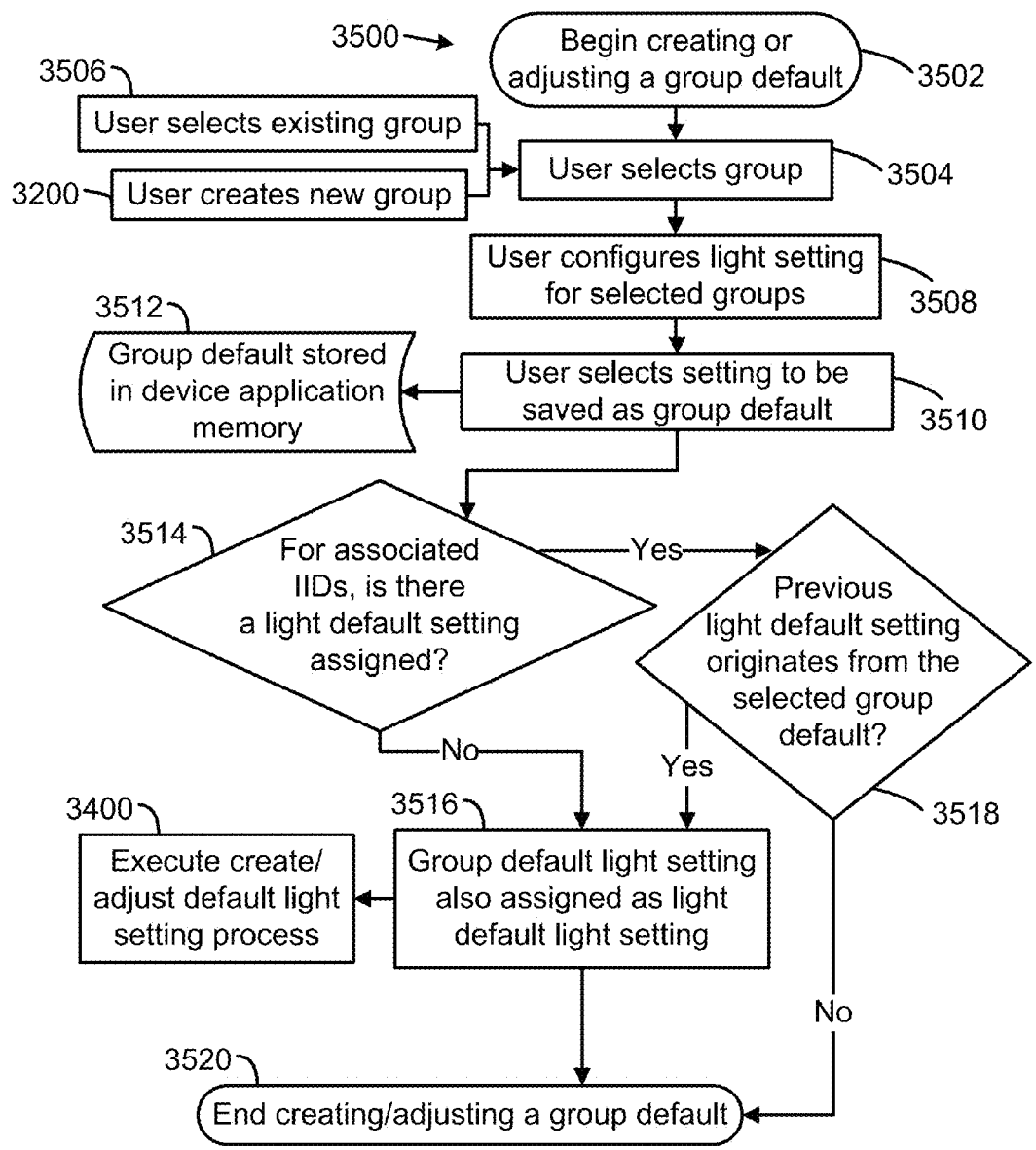
FIG. 35 is a flow chart of a process for creating or adjust a group default in accordance with one embodiment of the present invention.

Now referring to FIG. 35, a flow chart of a process for creating or adjust a group default in accordance with one embodiment of the present invention is shown and referred to as 3500. The process begins with block 3502. First, the user would select the group to assign or adjust a group default 3504. This could happen either through selection of an existing group in the device application 3506 or when a user creates a group as in the process 3200. A selected group might consist of one group or multiple groups together. The user will then need to specify the particular light setting for that selected group(s) to execute when turned on as a group 3508. Once a group default is selected for the group 3510, the associated light setting for each II Device within the group will be stored within the device application 3512, to be executed at that time or in the future. If a group default is set for associated II Devices that do not have a light default 3514, the group default light setting will also be assigned and communicated to each related II Device as the light default light setting 3516. This will most likely happen during the initial set-up and grouping process. In this scenario, the device application and related wireless device will execute the wireless command similar to that in setting a light default 3400, and the group default process will be complete as signified by block 3520. Similarly, if unedited at the light default level, future changes to the group default will similarly change the respective light default setting. When an II Device associated with the group already has an assigned light default 3514, but that light default was originally set by creating that same group default that is being configured 3518, then the light default will be adjusted as the group default it was originated from is adjusted 3516 and each II Device will execute the process to adjust its default light setting with the group default light setting as in the process 3400. The group default process will then be complete as signified by block 3520. If the light default setting did not originate from the group default being configured 3518, then the light default will not be updated and the group default process will be complete as signified by block 3520. When the group default is executed it follows a similar process as that for executing a group command or 3300.

Figure 36:
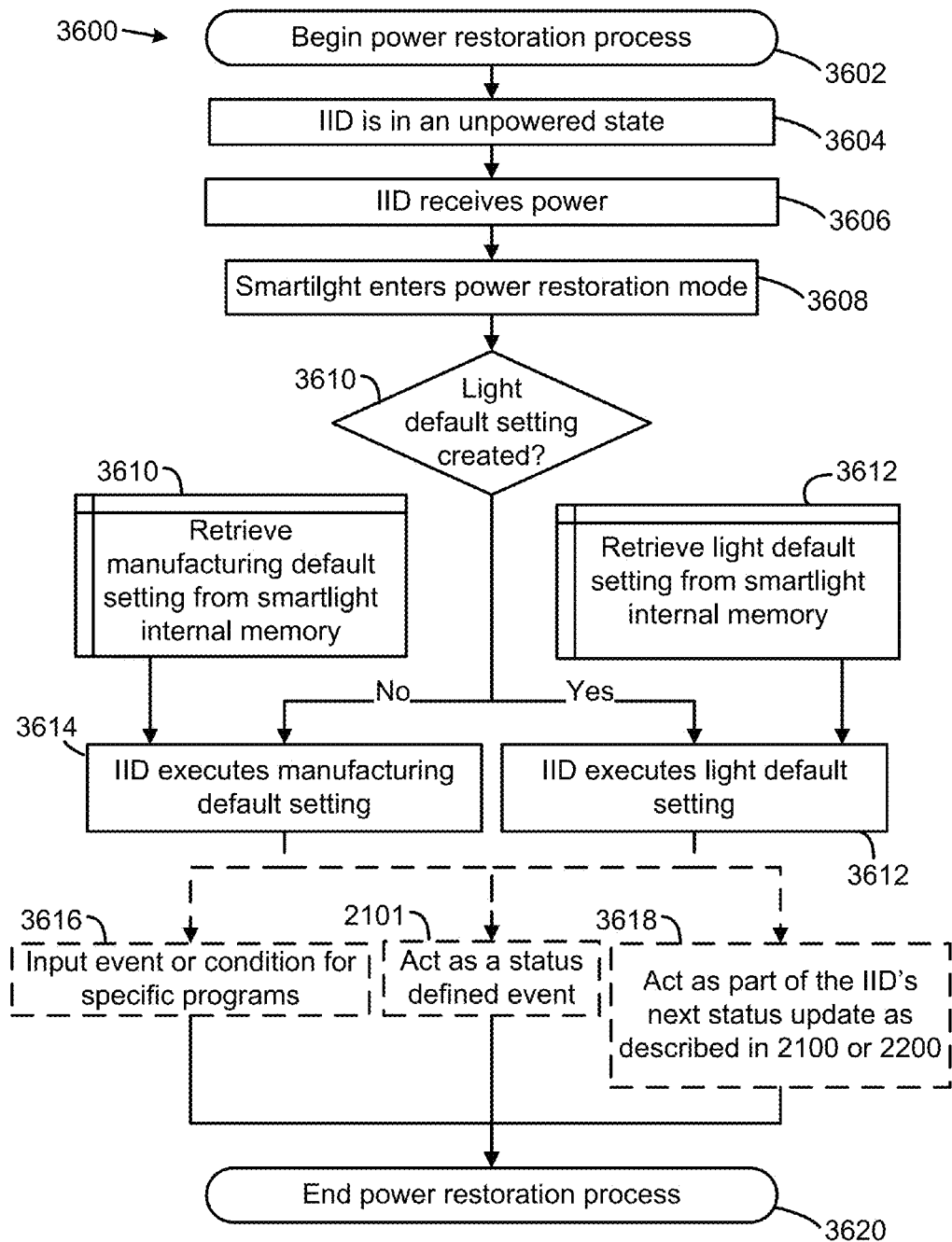
FIG. 36 is a flow chart of a power restoration process in accordance with one embodiment of the present invention.

Referring now to FIG. 36, a flow chart of a power restoration process in accordance with one embodiment of the present invention is shown and referred to as process element 3600. The process begins with block 3602. Anytime an II Device goes from not having an electric current 3604 to having an electric current 3606, for any period of time, the II Device will execute the power restoration mode 3608. If a light default is assigned to the II Device 3610, the power restoration mode will trigger the II Device to recall the light default setting from its internal memory and execute the light default setting 3612. If unassigned 3610, the II Device will recall the manufacturing default setting from its internal memory and execute the manufacturing default setting 3614. In addition, the power restoration event and/or association in executing either the light default setting or manufacturing default setting could act as an input event or condition for specific programs 3616, such as the quick set-up or quick grouping processes, or as a status defined event 2101 or part of the II Device's next status update 3618 as described in 2100 or 2200. The process ends with block 3620. This would commonly occur when a light switch is changed from 'off to on, or from on to off to on. A user would not need to utilize the device application to trigger the light default action in this sense. The power restoration mode, or more simply turning the power source to the II Device off, will cease any currently running (the II Device is executing it at that time) program, scene, or setting, but will not erase any program that is active (set to be run in the future) and its associated setting from the II Device's memory. A user could choose not to utilize the power restoration mode can by turning it off through the user's settings on the device application.

Figure 37:
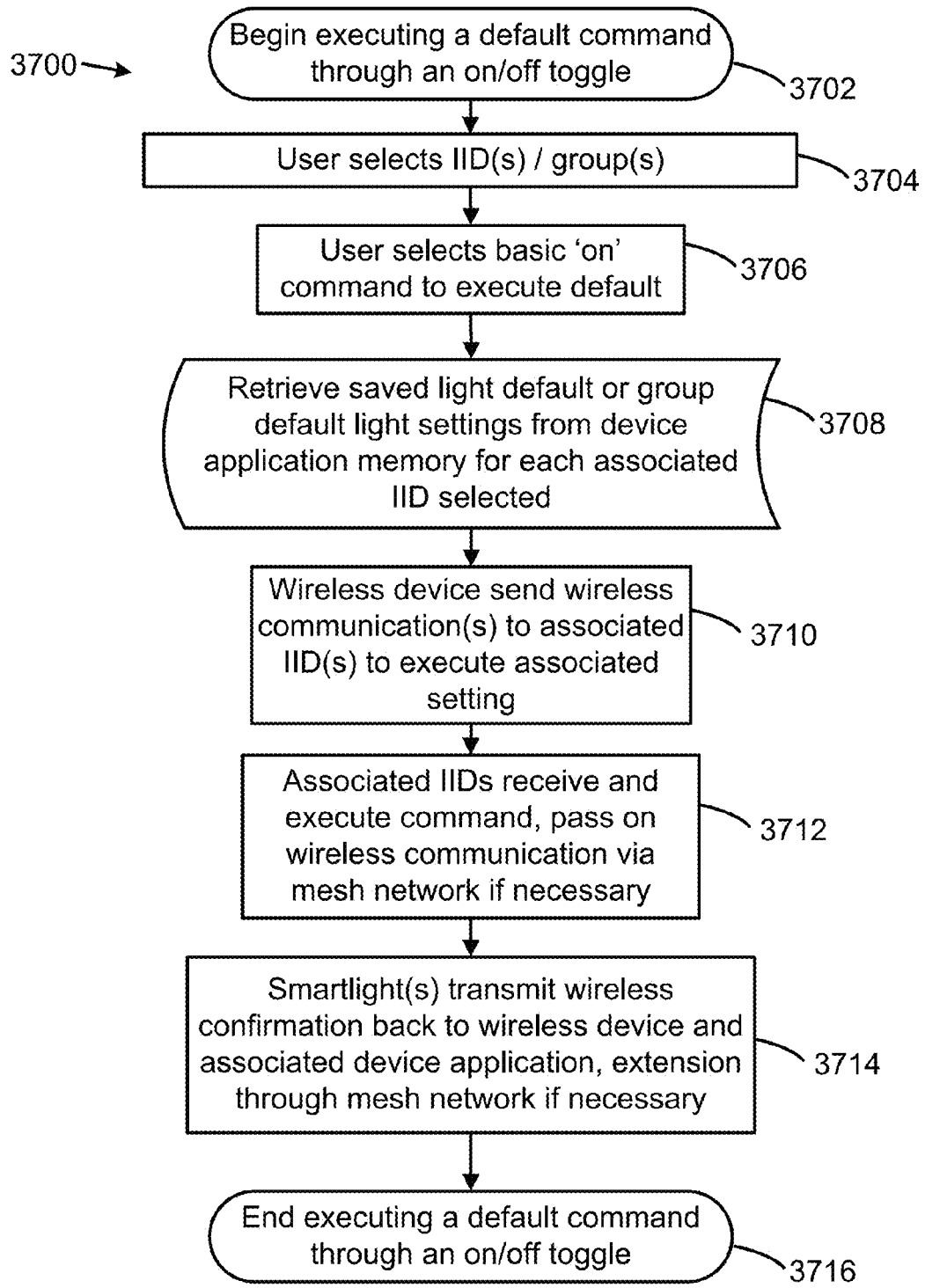
FIG. 37 is a flow chart of a process for executing a default command through an on/off toggle in accordance with one embodiment of the present invention.

Now referring to FIG. 37, a flow chart of a process for executing a default command through an on/off toggle in accordance with one embodiment of the present invention is shown and referred to as 3700. The process begins with block 3702. A user would select the desired II Device(s) and/or group(s) through the device application 3704 and toggles the basic 'on' command related to executing the selection's respective defaults 3706. When toggled 'on' the device application would retrieve the appropriate saved default including the related II Device(s) and their associated light settings 3708. The wireless device would then send an appropriate wireless communication to the II Device(s)/group(s) to execute their respective light setting 3710. Each related II Device would then receive and execute the command 3712, and then it will respond to the wireless device confirming execution of the command 3714 following the appropriate communication methods/processes. The process would end with block 3716. A user could turn off or adjust any running default command through the process outline above, 3700. Referring now to FIGS. 38A-F, diagrams of various screens on device application in accordance with one embodiment of the present invention are shown. The device application will generally be run on a wireless device such as a smartphone, table, or computer. In these cases, the device application will most likely have the below screens and sections to support user control of the wireless lighting control system. A user could toggle between screens through various human computer interaction methods, dependent on the wireless device, but most commonly will be gestures and/or touch selections.

Figure 38A:
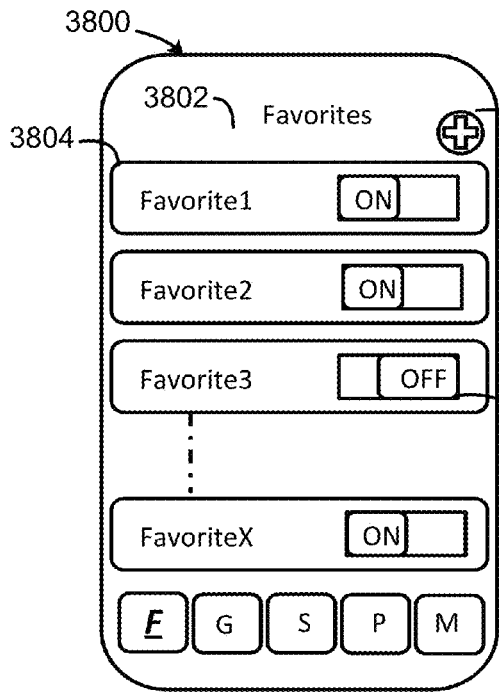

As shown in FIG. 38A, a device 3800 displaying a favorites screen 3802 will display a list of user generated favorite commands relating to II Devices, groups, programs, and scenes. Each item displayed on the screen, as exemplified by 3804 as one item, would be a specific selection of II Devices and an associated action that could be activated through toggling of the on/off button, represented by 3806. When selected, the wireless device and related II Devices will execute the related communication method for that command. A user can also add or delete favorite settings through this screen or various other screens, for example a user could select 3808 in the figure to perform this command.

Figure 38B:
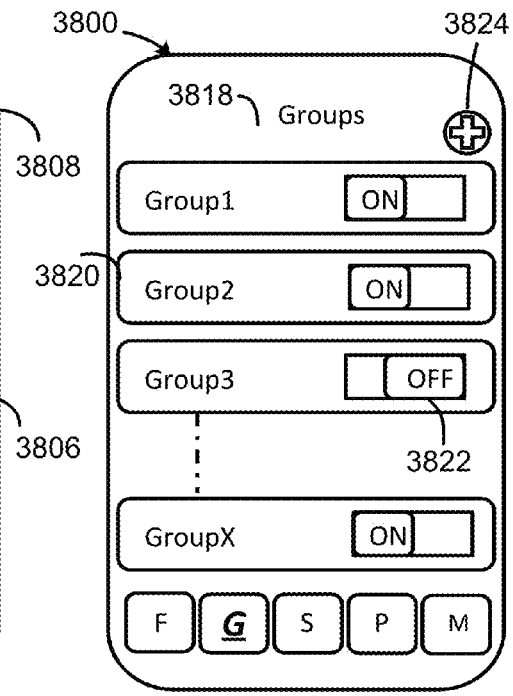

As shown in FIG. 38B, a device 3800 displaying a screen 3818 will display a list of all groups created within the device application's profile. Each or multiple groups, as exemplified by one group as 3820, could be selected to turn on to the group default setting, or off; exemplified by the selection of 3822. Each or multiple groups could also be selected and then given some specific command or other option as outlined in the groups section. When selected, the wireless device and related II Devices in the group (s) will execute the related communication method for that command. A user can also select a group to view the individual II Device screen filtered to just that group. A user can add, edit, and or delete group(s) and default group settings through this screen or various other screens, for example a user could select 3824 in the figure to perform this command.

Figure 38C:
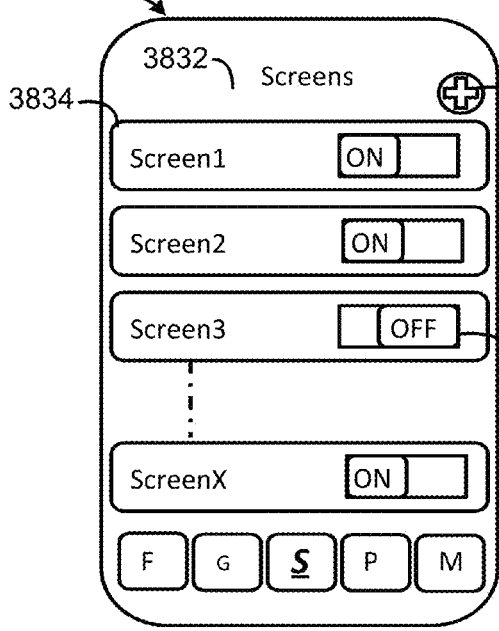

As shown in FIG. 38C, a device 3800 displaying a programs screen 3832 will display a list of all programs created or suggested (manufacturing default programs) within the device application's profile with an on/off status for each program. Each program, as exemplified as one program by 3834, could be selected to turn on or off, a command potentially executed by toggling 3836. Additionally, each program could be selected, edited, or deleted. When a program command is selected, the wireless device and related II Devices to the program will execute the related communication method for that program. A user can add or delete program(s) through this screen or various other screens, for example a user could select 3838 in the figure to perform this command.

Figure 38D:
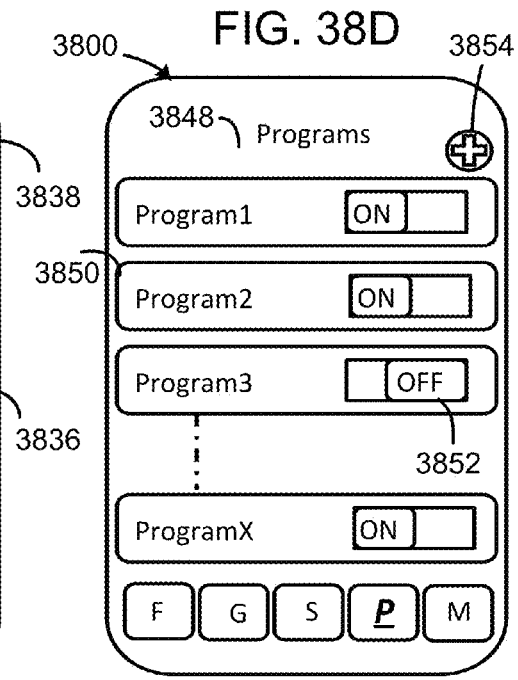

As shown in FIG. 38D, a device 3800 displaying a scene screen 3848 will display a list of all scenes created or suggested (manufacturing default scenes) within the device application's profile with an on/off status for each program. Each scene, as exemplified as one item by 3850, could be selected to turn on or off, a command potentially executed by toggling 3852. Additionally, each scene could be selected, edited, or deleted. When a scene command is selected, the wireless device and related II Devices to the scene will execute the related communication method for that scene. A user can add or delete scene(s) through this screen or various other screens, for example a user could select 3854 in the figure to perform this command.

As shown in FIG. 38E, a configure screen 3860 is used to adjust the color 3862, brightness 3868, saturation 3874, and other configuration for selections of II Device(s), group(s), program(s), and/or scene(s). The configure screen 3860 might be different depending on the selection and specific type of configuration. In general, the configuration screen 3860 will consist of the three level lighting control interface 3850 and a list of the selection (II Device(s)/group(s)) 3852. There would most likely be related configuration screens for the selection of program conditions, scene creation/editing, and other more complex configurations.

More specifically, certain II Devices with color and white could be controlled through three levels: color 3862, saturation 3868, and brightness 3874. This functionality is derived by the capabilities of the schemes in the LED controlling circuit and related LEDs and supported device application. Color levels would be derived by combining different variations and combinations in the average luminosity passed through the II Device's LEDs. A color level selection 3862 refers to an input on a user interface that would go to create any number of colors derived from the mixing of the LEDs found in the II Device. The color level could be controlled incrementally or at fixed points, for example a user could select a color level from a color slider 3864. Alternatively, a user could select specific colors from the color level such as blue, green, red, etc. as represented by 3866.

Brightness levels would be derived by either increasing or decreasing the average current passed through the LEDs of the II Device, but in the same proportion as that required for the selected color. The difference in brightness levels would only be apparent in variations in the luminosity of the light emitted from the II Device. The color will stay constant when adjusting the brightness. Similarly, a brightness level selection 3868 could be controlled incrementally or at fixed points, for example a user could select a brightness level from a slider 3870. Alternatively, a user could select specific brightness levels such as 25%, 50%, dim, bright, etc. as represented by 3872.

Saturation levels would be derived by adding or subtracting some proportional amount of average current passed through the white LEDs with respect to the average current combinations of the set color. The overall effect of increasing the saturation level would be reducing the relative amount of white light produced by the II Device in relation to the colored LEDs. The overall effect of decreasing the saturation level would be increasing the relative amount of white light produced by the II Device in relation to the colored LEDs. Similarly, the saturation level selection 3874 could be controlled incrementally or at fixed points, for example a user could select a saturation level from a slider 3876. Alternatively, a user could select specific saturation levels such as 25%, 50%, lighter, darker, etc. as represented by 3878. Note that the change in saturation selected through the device application would not necessarily have a linear relationship to the amount of white light added or reduced, but it could be exponential or through some other calculation. The overall effect and process would manage the saturation levels so that the perceived difference is gradual to the user, while managing for the constraint in the amount of current available to the LEDs.

As shown in FIG. 38F, a device 3800 displaying a II Device screen will display a list of all II Devices either selected or identified within the device application's profile, the screen represented by 3882. Each II Device, as exemplified as one II Device by 3884, could be selected to turn on or off to the light default, a command potentially executed by toggling 3886, or configured in some other fashion. Additionally, each II Device or combination of II Devices could be selected, edited, or given some other command or selection as outline in the basic control section. When an II Device command is selected, the wireless device and related II Device(s) will execute the related communication method, for example a user could select 3888 in the figure to perform these types of commands.

Now referring to FIG. 39, a flow chart of a quick set-up process for connected lights in accordance with one embodiment of the present invention is shown and referred to as 3900. A process that allows an II Device or multiple II Devices to quickly and securely establish a connection with a wireless device and the associated device application and with other connected II Devices around it. The process begins in block 3902. Each II Device when initially purchased or reset will be in a manufacturing state 3904. When in a manufacturing state, upon receiving initial power (current), the II Device(s) will enter power restoration mode 3906 as described in FIG. 36. The II Device(s) will then be prone to discovery by a wireless device with the associated device application 3908. The II Device(s) would also execute the manufacturing default light setting 3910. Upon launch of the quick set-up process on the device application 3912, the wireless device and II Device (s) in the manufacturing state will then identify and connect to each other if within range or through an extended mesh network in the manufacturing state to create a secure paired connection 3914. The device application on the wireless device will then store each detected II Device's unique ID 3916, so that it can communicate with it in the future. Each II Device would similarly recognize and store a unique ID associated to the user's device/profile 3918, so that only that smartphone/profile ID can send directions to the II Device in the future 3920. Similarly, the II Devices could send commands and communicate with each other.

In some embodiments—the set-up process could use different color light settings as cues in the set-up process. For example, the II Device would display a certain color upon initial power up, signaling to the user that the II Device is not connected to the network. Then upon establishing connection to a profile, the II Device would change colors to signal the connection has been established 3922. Next, a user might confirm that all II Devices are connected and select an option in the device application to move forward with the set-up 3924. If not all connected, then execute troubleshooting steps with user. Identify problem II Device. Execute quick troubleshooting steps 3926—step closer, screw in/secure connection to power source. User can possibly provide confirmation through the device application that all II Devices are a specific color. All II Devices become connected, and user selects option that II Devices are not all connected, then prompt to select color of light. Should be color of unpaired light or no light, if unpaired light, ask user to step closer to the II Device and select OK. Then should connect and user can continue set-up. If no light, ask user to make sure that the II Device is firmly screwed in and the light switch is on. Then proceed through set-up menu. Once user confirms set-up of installed II Devices 3924, they can continue with any further set-up or customization processes 3928, such as adding names, defaults, and favorites. A user can repeat this process to continue setting up other II Devices 3930 until all intended II Devices are set-up and the quick set-up process is complete 3932.

Figure 40:
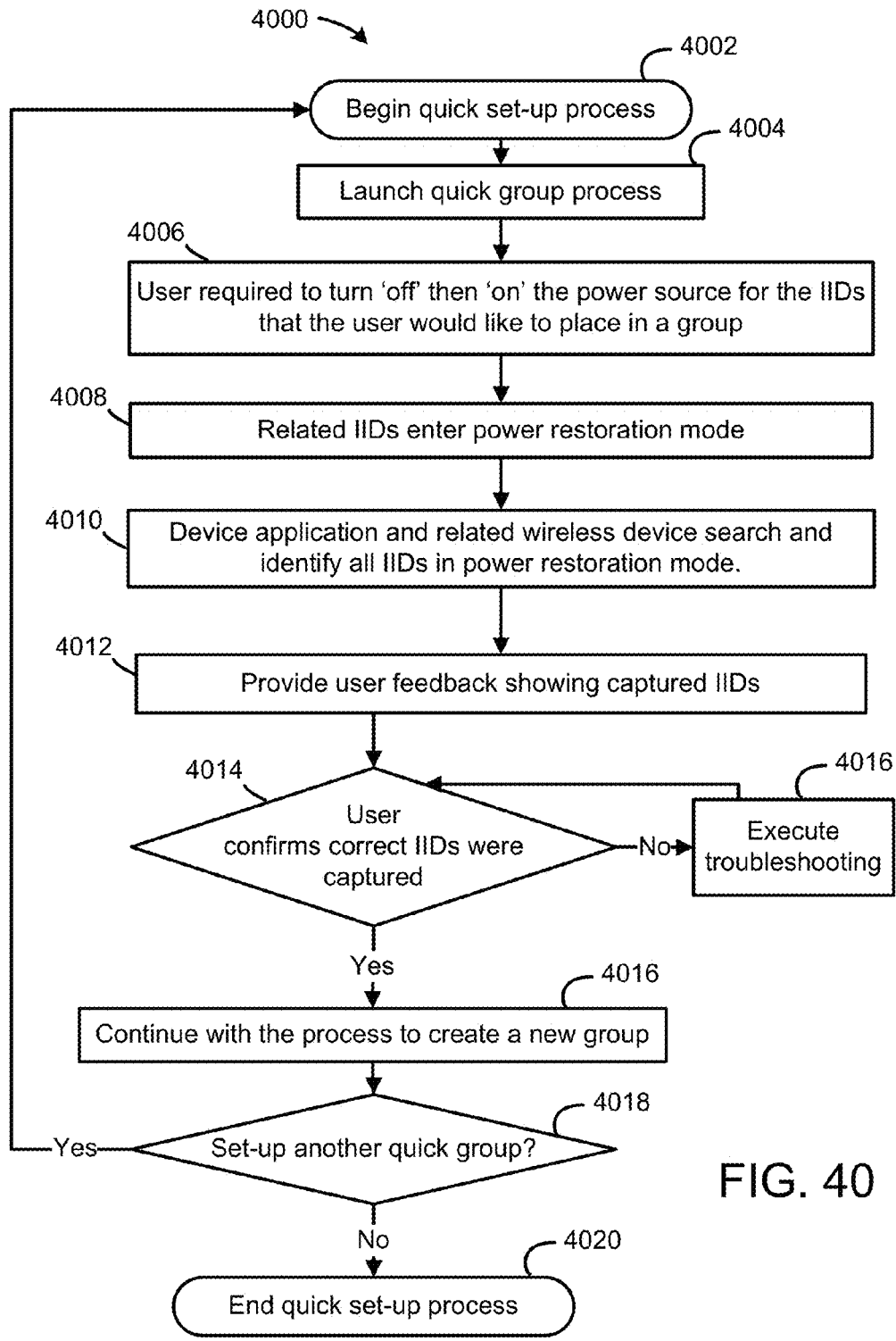
FIG. 40 is a flow chart of a quick group process through power restoration in accordance with one embodiment of the present invention.

Referring now to FIG. 40, a flow chart of a quick group process through power restoration in accordance with one embodiment of the present invention is shown and referred to as process element 4000. A quick group process through power restoration provides a quick way for a user to combine II Devices into a named group through use of the power restoration mode. It could be a guided process within the set-up process of the II Devices network through the device application as described in FIG. 39. It also could be run after the initial set-up of the II Device network. The process begins with block 4002. Upon launch of the quick group process through the device application 4004, though device application instruction, or in the natural course of set-up, the user will turn off the power source to the related II Devices that they would like to group, then turn the power source back on 4006. When done, this will prompt the related II Devices to enter the power restoration mode 4008. This action will most likely be through the use of a wall switch. The II Devices will execute the appropriate default setting as discussed in FIG. 36. The device application and related wireless device will then search for all II Devices that have entered the power restoration mode through various communication methods previously discussed, record their unique IDs 4010, and display the associated II Devices through the user interface on the device application or some other type of user feedback means 4012. The user will then be prompted to confirm that the correct II Devices were captured 4014. Could use color cues to help with the confirmation as discussed in FIG. 49. If user does not confirm, then go to troubleshooting steps 4016. If yes, then continue with the process to create a new group 4016 as outlined in FIG. 32. After setting up a quick group the user might then be asked if they would like to set-up another quick group through the device application 4018. If yes, then repeat the quick group process 4002. If no, then end quick group process 4020.

Upon initial set-up of a lighting network, a user will create a profile. Profile refers to a combination of unique username and password that would be related to one or many user's accounts. The profile would have multiple purposes—1) to provide an authentication method for communication within the wireless lighting system (network of II Devices and wireless devices), 2) to associate and save user preferences and configured settings of the wireless lighting system to the device application and possibly saved elsewhere, and 3) provide a user associated account for billing, support, or other services. Through the initial set-up process, as described in FIG. 39, each II Device within a lighting control system will store the Profile's username and password or some encrypted version of the profile's username/password in its memory. Similarly, the wireless device and device application will store all II Device ID's within the lighting control system (lighting network) to the device application memory.

Figure 42:
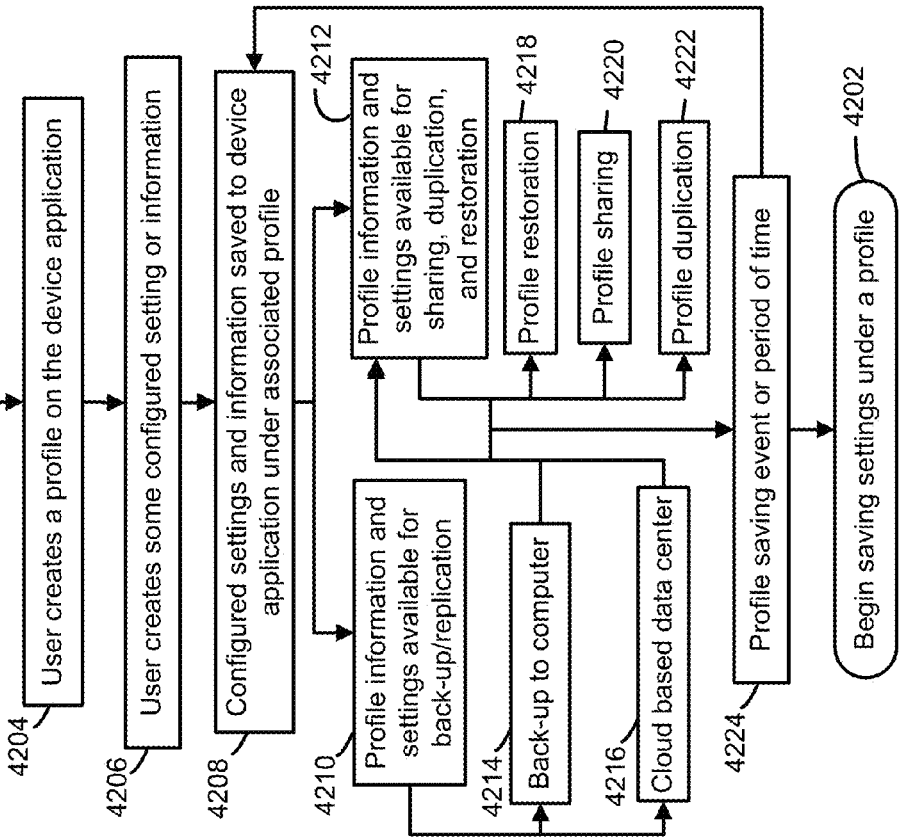
FIG. 42 is a flow chart of a process for saving settings under a profile in accordance with one embodiment of the present invention.
Figure 41:
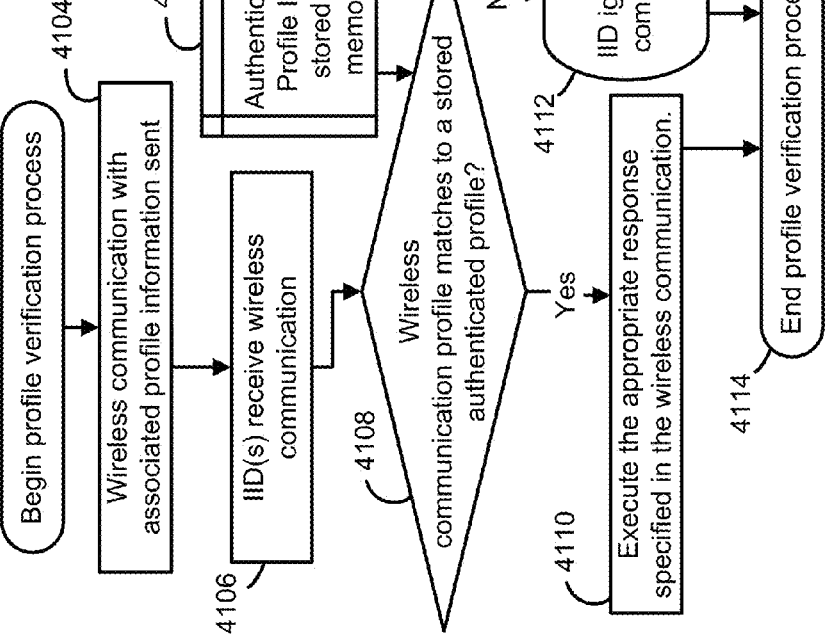
FIG. 41 is a flow chart of a profile authentication process in accordance with one embodiment of the present invention.

Now referring to FIG. 41, a flow chart of a profile authentication process in accordance with one embodiment of the present invention is shown and referred to as 4100. See also FIGS. 22-26 for other related process information. The profile authentication process begins in block 4102. Upon any communication from a wireless device or other II Device to one or many II Devices, the wireless communication will include some version, possibly encrypted, of the associated profile 4104. Upon receipt of a wireless communication 4106, each II Device will verify or authenticate the command by referring to the stored profile(s) in the communication. If the profile from the wireless communication, recovered from the II Devices memory 4114, matches that of the stored profile(s) 4108, then the II Device will execute the appropriate response specified by the wireless communication 4110. If not, then the II Device will disregard the communication 4112. The process ends then at block 4114. Referring now to FIG. 42, a flow chart of a process for saving settings under a profile in accordance with one embodiment of the present invention is shown and referred to as element 4200. The process begins in block 4202. After a user has created a profile 4204, when a user creates any number of settings or information as represented as 4206 (programs, defaults, groups, scenes, favorites or other information), the settings and related information can be saved to the device application memory under the heading of the user's profile 4208. This would allow for replication and/or back-up of user preferences to avoid loss of data and user convenience 4210. In addition, this would allow for sharing, duplication, and restoration of user settings through authentication means by referring to the user profile 4212.

In some cases, a user could save their profile and associated settings to a computer 4214, either through the back-up of the application to application management software or through some light control system specific back-up software. In addition, the profile information and settings could be saved or backed up through a direct connection or through some wireless connection. In addition, the profile information could be saved to a remote data center, or in 'the cloud' 4216.

After a profile is saved or 'backed-up', a user could restore settings and profile information to an existing or new wireless device/device application 4218. A user could share the profile information and authentication as described in FIG. 43 and included here as block 4220. A similar process would be used for adding a new wireless device with device application running the same profile or duplication 4222. Note that there may be multiple profiles assigned to one lighting control system or II Device network. Similarly, the same device application could host multiple user profiles. The same profile could be shared across multiple wireless devices. The timing and exact process of a profile saving event 4224 might differ depending on the device application. It might happen and reoccur at automatically at given time periods or events, or require some input from the user to either specify events/times, or require a user to select a save option. Though the actual process might be ongoing, for the purposes of this description, the process ends in block 4226.

All II Devices(s) will have unique id(s). Ids will depend upon the types of II Device embodiments: (a) there could be different types of II Devices depending upon the application where they will be used (e.g., II Devices made for higher light (luminosity) output and limited color range could be called as type 1 II Device, while II Device with only white light output with controllable brightness could be called as type 2 II Device. Similarly, there would be different types of II Devices based upon different shapes and/or sizes and/or features and/or light outputs in terms of colors and brightness.); (b) there could be numerous potential ID structuring of the II Devices, but consider the below as a representative example:

II Device id will have following structure with "aaabbbccc". "aaa" could be any number of characters defining the device as II Device. These characters will be common and at the same place in the ids of all II Device. "bbb" could be any number of characters defining the type of II Device. These characters will be common for a particular type of II Device, but will be different for different types of II Devices. These characters will at the same place in the id of all II Devices. "ccc" could be any number of characters and with that II Devices will get a unique id. For example, consider id "illdev001001012712", "illdev012234010512" for two different II Devices—here, first ten characters "II Device" in both the ids will identify the device as II Device. Next four characters "t001" in first id and "t012" in second id identifies the devices as different types of II Devices. Last 9 characters "001012712" in first id and "234010512" in second id combined with other characters defines a unique id for the two II Devices.

The wireless lighting control system, including both wireless devices and II Devices will be able to differentiate its related commands from other wireless communication system commands through the unique IDs prefix, such as "aaa".

Additionally, a wireless communication within the wireless lighting control system would also be associated with a profile id for authentication purposes. When a wireless device then sends a command to an II Device it will send the command directed at the specific ID required to execute that command. Similarly, there could be a command related to a specific ID that is embedded in a command sent to another II Device ID, in this case the second command would communicate to send the command to the second II Device. See mesh network processes for further information.

Profile Sharing. A user's profile including their configured settings can be transferred in a multitude of ways from an authenticated device application/wireless device to other non-authenticated device applications/wireless devices to provide authentication, share profile settings and information, or other profile related information. Utilizing the device application, there is an option to pass on authorization to the lighting control system (II Device network) from one wireless device to another wireless device. Additionally, a user can share or copy their profile (saved settings) with another wireless device. The receiving wireless device would need to have some version of the device application on their device. There are a few different processes one could take to execute profile sharing, but consider the below as an example:

Now referring to FIG. 43, a block diagram of a device to device profile sharing process in accordance with one embodiment of the present invention is shown and referred to as 4300. To execute this process, one would open the authenticated device application on one wireless device as represented by 4302. Then open the device application on the receiving or new wireless device as represented by 4304. A user would then select command on the authenticated wireless device application to share profile. Might in some cases need to select command on the non-authenticated wireless device to receive shared profile. The authenticated wireless device might then be prompted to select what aspect of the settings to share, such as provide access to network, share groupings, share programming, copy full profile settings, or mirror full profile settings. Upon selection of aspects to share, the wireless devices would then connect via a wireless communication 4306 (Bluetooth most likely) and begin transferring the selected information, as represented by 4308, from the authenticated wireless device to the receiving wireless device. Upon receiving the selected information the user should have access to whatever aspects were selected.

Referring now to FIG. 44, a flow chart of a process for adding an authenticated profile directly through the II Device in accordance with one embodiment of the present invention is shown and referred to as 4400. In this process, the authenticated profile 4402 would send a wireless communication to the wireless control system (II Device network), represented by 4404, with the command to add the non-authenticated profile 4410 to each II Device's list of authenticated profiles. Each II Device, represented here collectively as 4406, would then execute the command and add the authenticated profile to each II Device's list of authenticated profiles as represented collectively by 4408. Once complete, the non-authenticated profile would then be authenticated and able to communicate and control the lighting control system (II Device network), as represented by 4412. Also, consider that a user could share/transfer a profile to one other device through text. An alternate way to share profile and settings would be to select an option through the application to send a text message to another phone. This method would be useful when both devices are not present. And the second device is a mobile device. The text message would include a unique URL to download the application and auto-populate the profile username and possibly the password. In addition, consider that multiple devices could simply refer or log-in to an existing authenticated profile that has been saved to some accessible source. This would allow any wireless device with an associated device application to access, receive, or create and authenticate a new profile by logging in with the authenticated profile's credentials (username password).

Figure 45:
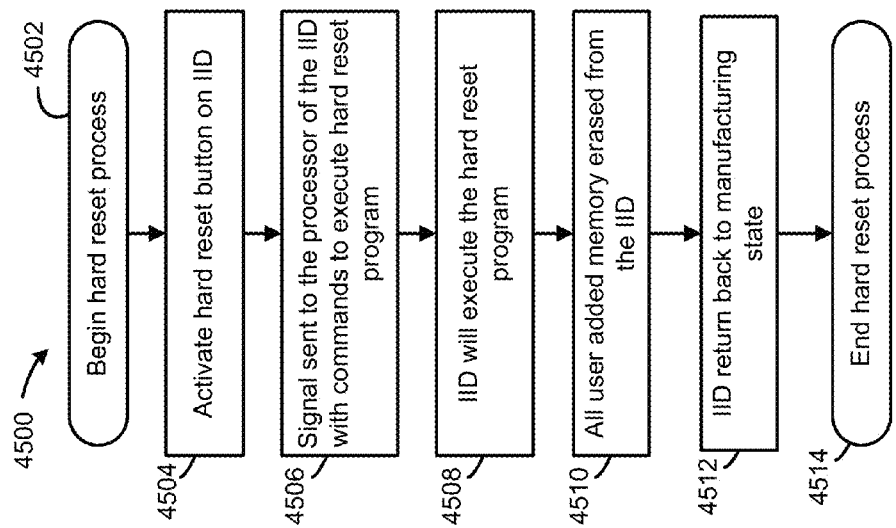
FIG. 45 is a flow chart of a hard reset process in accordance with one embodiment of the present invention.

Now referring to FIG. 45, a flow chart of a hard reset process in accordance with one embodiment of the present invention is shown. The process begins with block 4502. A hard reset with physical button, and restore to system will now be described. Included in the design of the II Device might be an external button that when pushed resets the II Device back to its original manufacturing state. This will be helpful when moving II Devices from different locations or power sources, for troubleshooting purposes, and for security purposes, especially when a user no longer has access to the application device. The physical description and system composing the hard reset can be found in the 'II Device' section HHHH. The process by which the hard reset occurs will be referred to as 4500 and is described as follows, beginning with block 4502: (a) a user will physically activate the reset button on the outside of an II Device 4504; (b) a signal will then be sent to the internal processor of the II Device with commands to execute the hard reset program that will erase all user added memory and return to the manufactured state 4506; (c) the processor and related components of the II Device will execute the required commands of the hard reset program 4508; (d) all user added memory will be erased from the II Device, not including factory added memory 4510; (e) the II Device will return back to the manufacturing state 4512. The process for set-up would continue with FIG. 48. The hard reset process ends with block 4514.

Figure 46:
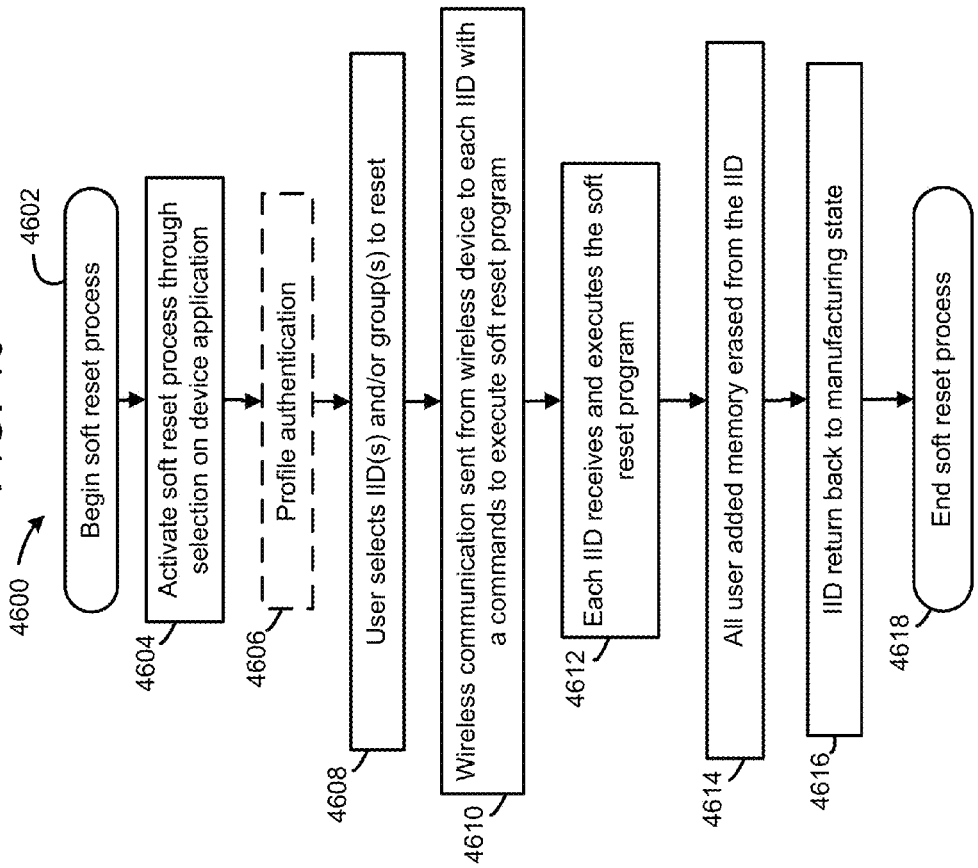
FIG. 46 is a flow chart of a soft reset through application in accordance with one embodiment of the present invention.

Referring now to FIG. 46, a flow chart of a soft reset through application in accordance with one embodiment of the present invention is shown and referred to as 4600. Included in the device application is an option that when selected will reset an II Device or multiple II Devices back to their original manufacturing state. This will be helpful when moving II Devices from different locations or power sources, for troubleshooting purposes, and for security purposes. The soft reset process begins with block 4602. Within the application device, a user would select a setting that activates the soft resets command and program 4604. This setting may or may not require authentication through entering of the users profile and password 4606. The user would then select specific the II Device(s) and/or groups, including the entire lighting network, with which to execute the soft reset function 4608. A user might use the 'color coding' process to select individual II Devices.

Upon selection, a wireless communication will be sent from the wireless device/device application to each illuminated device selected, through the appropriate communication methods 4610. When each II Device receives the communication, the processor and related components will execute the soft reset program and commands 4612, and all user added memory will be erased from the II Device 4614. Each II Device will return to the manufacturing state 4616. The process for set-up would continue with FIG. 48. The soft reset process ends with block 4618.

Now referring to FIG. 47, a flow chart of a process for adding a new II Device into an existing II Device network in accordance with one embodiment of the present invention is shown and referred to as 4700. This is the process by which a user can easily introduce into the II Device network.

Introducing a new II Device to an existing II Device network follows a similar process as first setting up an II Device for the first time. Process is similar to quick set-up and easy room set-up processes. There are many potential processes to adding an II Device(s) to an existing network, here is one example. The process begins with block 4702. The intended II Device(s) will be in a manufacturing default, either coming from initial purchase or through a reset process 4704. A user will connect the II Device(s) to a power source (most likely by screwing in and turning on a light switch, and the II Device(s) will receive power and enter the power restoration mode 4706. Upon receiving power the II Device(s) will enter II Device(s) will be prone to discovery by the device application run on a wireless device and other II Devices within proximity 4708. In addition, the II Device(s) will execute the manufacturing default light setting 4709. Then upon a user input on the device application 4710 or through a status update process where the new II Devices are found 4712, the device application will execute the process for adding an II Device to the application 4714. To elaborate, the status update process, as discussed in FIGS. 21 and 22, might call for the device application to look for all II Devices in proximity. This search will include identifying those II Devices that are not yet assigned to a profile, or in a manufacturing state. Next, the device application and associated wireless device establish a connection with the II Device(s) 4716. The device application might then provide an option for the user to confirm whether they are adding other II Devices to the II Device network 4718. If a user selects no, it will ignore the II Device's request to pair and end the process of adding a new II Device to an existing network 4720. This might happen by rare chance when people in neighboring buildings install II Devices at the same time within range from each other. If a user selects yes to confirm the addition of new II Device(s), the II Device(s) and device application will follow the process outline in FIG. 39, blocks 3916—3926, collectively represented here by block 4722. This includes storing the light ID in the device application memory and storing the profile ID in the device application memory. Then, in place of block 3938 to move forward with the set-up process, a user might then be prompted with other choices on how to set-up and customize the II Devices within the network 4724, including adding the selection to an existing group 4726, creating a new group with new or mirrored settings for the selection 4728, or creating custom settings for each II Device in the selection 4730. Depending on the user's request, the appropriate set-up would continue as described in other various set-up processes, until complete 4720.

FIG. 47 is also representative of a flow chart of a process for reintegration of II Device(s) back into an existing II Device network in accordance with one embodiment of the present invention. Considering that the adding of the II Device(s) has proceeded through until block 4716, where the device application/wireless device and II Device(s) have established a connection. If the device application finds that the II Device ID (or multiple IDs) matches that of an II Device ID stored in the device application 4734, then it should trigger the II Device reintegration sub-process. If there is no match, then the process of adding II Device(s) would continue as normal along block 4718 as described previously. After finding a match to a previous II Device, the device application might confirm that the user would like to reintegrate the detected II Device(s) 4736. If a user selects no, then the process of adding II Device(s) would continue as normal along block 4718. If the user selects yes, then the device application would then reassign or reconnect all stored information, profiles, defaults, and other settings to the associated II Device(s) ID as stored in the device application memory collectively represented as block 4738. This would require the device application/wireless device to then send a command to the II Device(s) to execute/store the following: (a) all related profile IDs (if stored or connected to the active profile ID); (b) all profile settings including light default(s), active programs, and time settings. The newly connected II Device upon receipt will execute/store the commands and respond to confirm receipt. The device application will similarly update its memory with the re-inclusion of the II Device(s), and they will then be re-integrated into the II Device network with all previously stored settings in the device application, and the process will end in block 4720.

Figure 49:
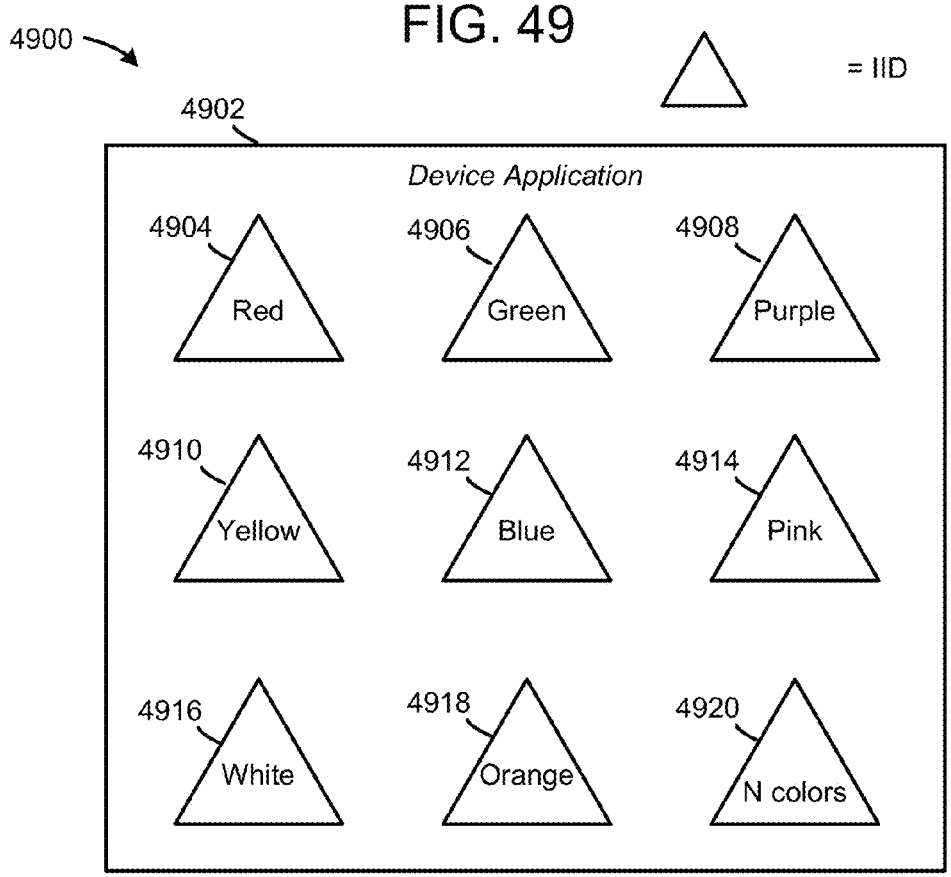
FIG. 49 is a block diagram of a color coding identification process in accordance with one embodiment of the present invention.

Now referring to FIG. 49, a block diagram of a color coding identification process in accordance with one embodiment of the present invention is shown and referred to as 4900. It might be difficult for a user to select a specific II Device(s) for troubleshooting or configuration, especially as the number of II Devices within a network increases. To improve the process of selecting specific II Device(s), described here is a method to temporarily change the color of II Devices in the II Device network and similarly provide a display of different II Devices on the device application that mimic the same colors of their representative II Devices. This process might be executed in relation to a number of different activities or processes. We'll assume for simplicity sake that any potential processes could trigger the process to color the II Devices and refer to such an event as 'color coding process trigger'.

Upon a color coding process trigger, the device application would assign a different color to each of any number of selected II Devices and/or groups. The device application/wireless device would then send a wireless communication to each of the selected II Devices to execute a light control setting relating to the assigned color for that II Device. The device application as represented by 4902, would then display all of the selected II Devices with a representation of the light that's emitted by that particular II Device each represented as 4904-4920. A user would then be able to visually see which II Device relates to the II Device representations in the device application and easily select the intended II Device(s). For example, the II Device represented by 4904 would be colored red in some fashion, and the actual corresponding II Device would emit the same red color.

Figure 50:
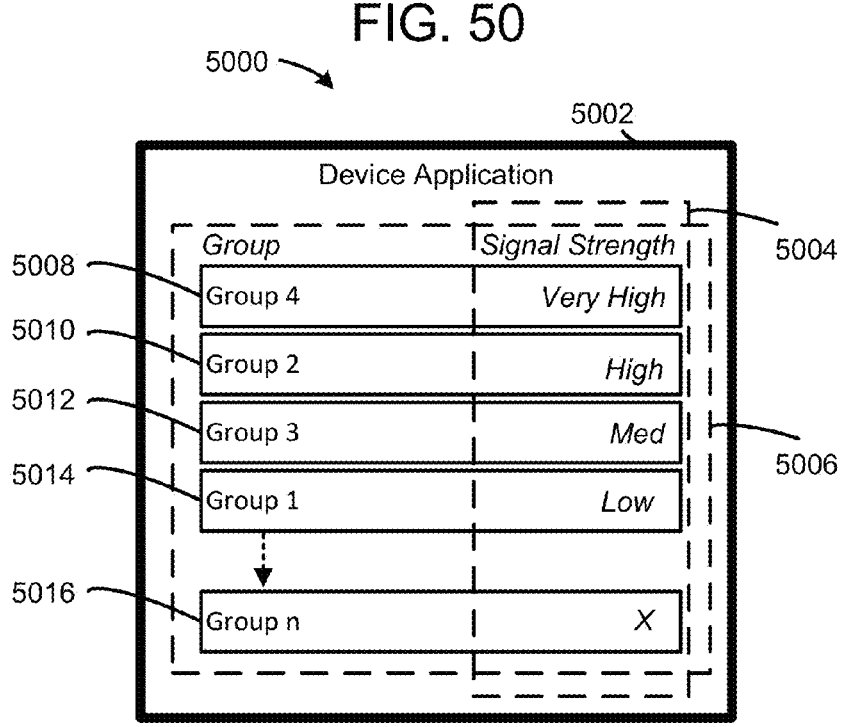
FIG. 50 is a block diagram of sorting based on signal strength in accordance with one embodiment of the present invention.
Figure 51:
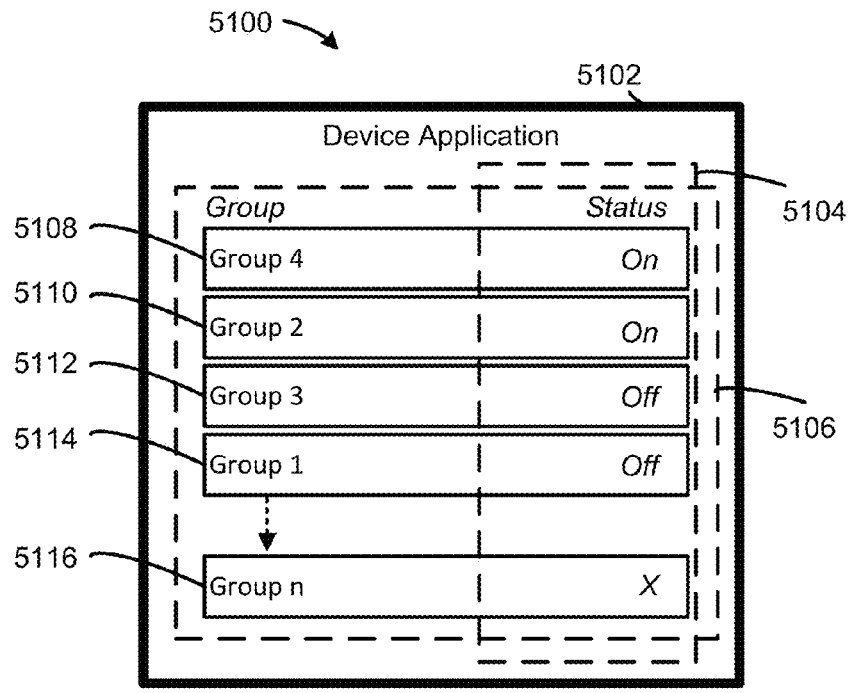
FIG. 51 is a block diagram of sorting based on status in accordance with one embodiment of the present invention.
Figure 52:
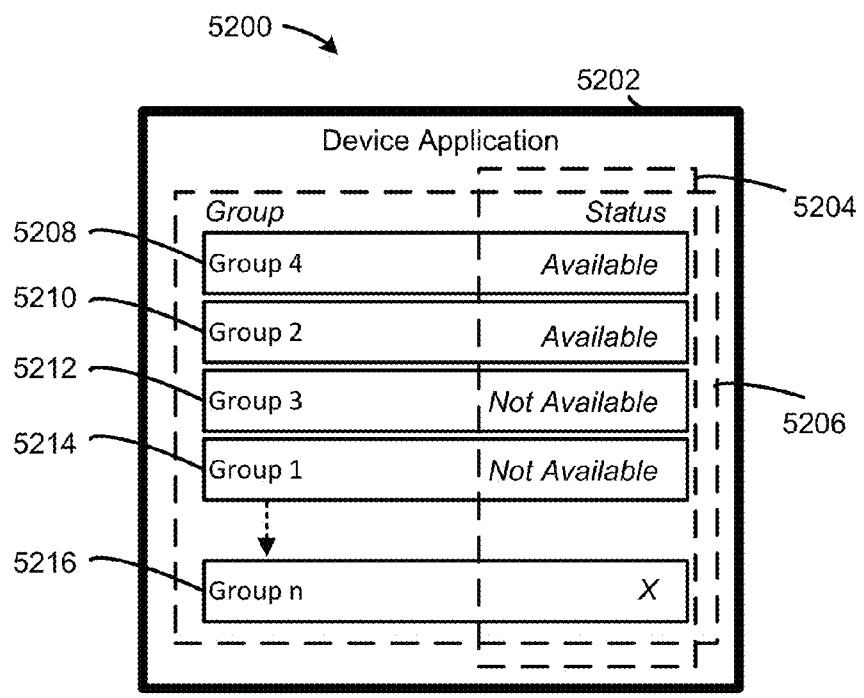
FIG. 52 is a block diagram of sorting based on available Intelligent Illuminating Devices in accordance with one embodiment of the present invention.

Referring now to FIGS. 50-52, various diagrams of sorting screens based on various criterions in accordance with one embodiment of the present invention are shown. For certain screens within the device application, it would be beneficial to sort the list of II Devices and/or groups in some fashion that would be relevant to the user. Disclosed here are some basic sorting methods with which to sort certain lists found within screens of the device application.

As shown in FIG. 50 and represented by 5000, it would often be the case that a user would want to command or control II Devices in closer physical proximity than those in further proximity to the user. To support this scenario, certain lists 5006 in the device application 5002 could be sorted by signal strength with stronger signals displayed first in the device application, represented as example by 5004. This could relate to lists of: (a) II Devices—sorted based on individual signal strength; (b) Groups—sorted based on average signal strength of related II Devices; (c) Programs/scenes—sorted based on average signal strength of related II Devices. The figure represents a list of groups sorted by signal strength, with each group and its associated signal strength represented by 5008-5016.

As shown in FIG. 51 and represented by 5100, it would often be the case that a user would want to command or control II Devices that are currently executing some command. To support this scenario, certain lists 5106 in the device application 5102 could be sorted by their active status with items that are on displayed first, represented as example by 5104. This could relate to lists of: (a) II Devices—II Devices that are on displayed first; (b) Groups—Groups that are on displayed first; (c) Programs/scenes—Programs/scenes that are active displayed first. The figure represents a list of groups sorted by active status, with each group and its associated signal strength represented by 5108-5116.

As shown in FIG. 52 and represented by 5200, considering that at times all II Devices might not be available because their power source is turned off (light switch) or they are out of range, it might be beneficial to sort/filter certain lists of items 5206 in the device application 5202 based on received statuses so that only those II Devices for which statuses are received by the wireless device are displayed or displayed first, represented as example by 5204. This would relate mostly to II Devices and groups, but possibly to programs and scenes where the un-addressable II Devices number is large. The figure represents a list of groups sorted by addressable status, with each group and its associated signal strength represented by 5208-5216.

It would often be the case that a user would want to sort or filter items in the device application based on some personal preferences or settings. This might be flexible and configurable, or permanent, depending on the application. Note that different sorting methods could be combined in different ways, so as to first sort by one method and then another. This would vary depending on the specific screen in the device application.

Figure 53:
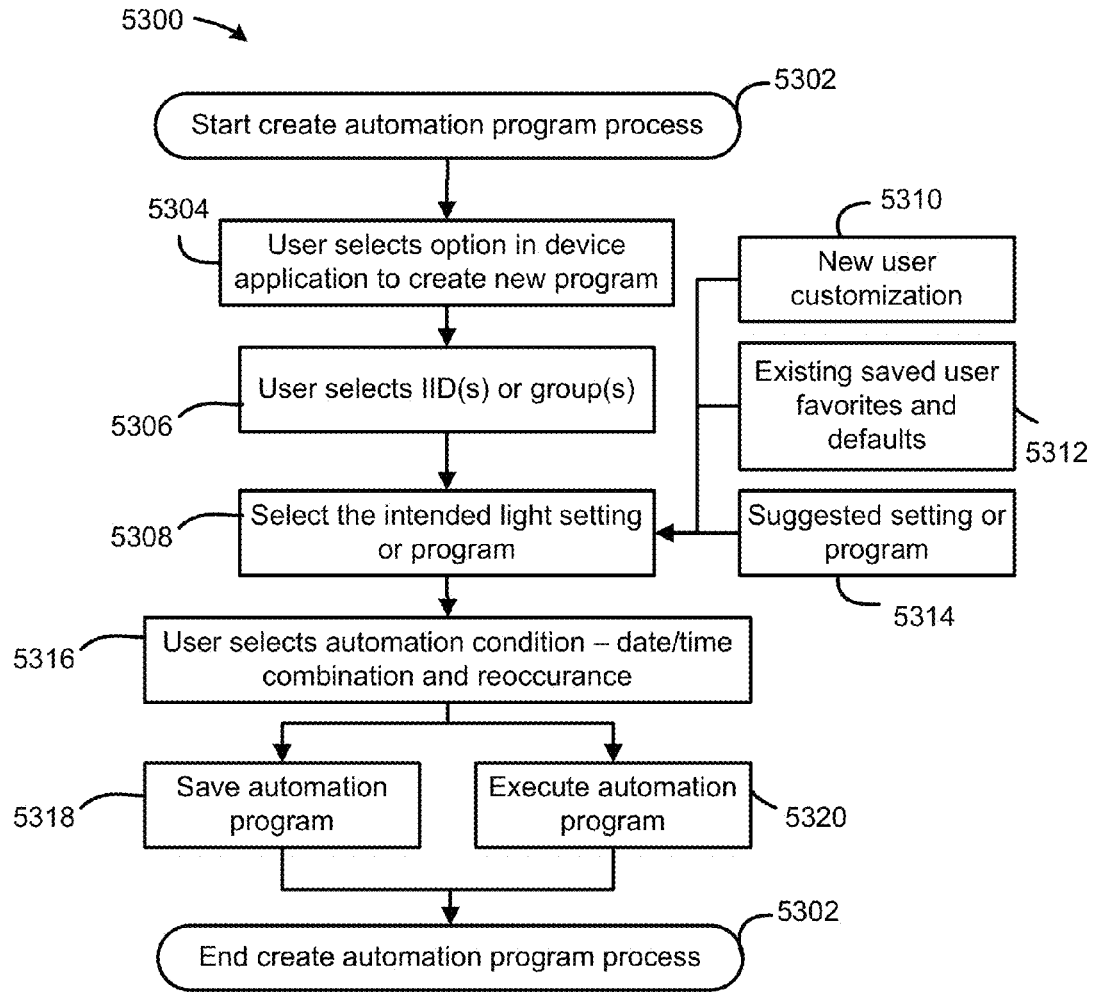
FIG. 53 is a flow chart of an automation programming process in accordance with one embodiment of the present invention.

Now referring to FIG. 53, a flow chart of an automation programming process in accordance with one embodiment of the present invention is shown and referred to as 5300. Automation refers to the program to be activated at user specified conditions pertaining to day(s) of the week, times, and/or dates. The process begins with block 5302. A user will select an option in the device application to create a program, specifically here an automation program 5304. The user will select any combination and number of II Device(s) or group(s) 5306. The user will then select the intended light setting or program to be executed based on the automation condition 5308. This might originate from new user customization 5310, existing saved user favorites and defaults 5312, or as a suggested setting or program 5314. The intended light setting might be a single action or more of a program in itself as multiple actions run successively. For example, a simple automation program would turn the II Device(s) on to a specific setting and color at a defined time. Alternately, another automation program would be to turn II Device(s) on and off successively. The user will then select a specific day(s) of the week, date, and/or time to execute the setting and/or program 5316. The request could be a single event or repeating event selected by the user. For example, start on date/time, stop on date/time. Or, run every third Monday of the month, etc. A user would have the option to save the automation program 5318 and/or execute the automation program at that time 5320. If the user saves the automation program, it can be re-run at another time by following the process described in FIG. 29. If the user chooses to execute the newly created automation program, the device application/wireless device in coordination with the respective II Devices will execute the command as described in FIG. 29 as if the program was activated as beginning with block 2908. After both cases the creation process would conclude as represented by 5322.

Similar to all programs, the user can toggle automation programs on/off via the device application. When the program is off, the II Device(s) will not store the command in memory. When the automation program is toggled on in the future, the command will be resent to the appropriate II Devices. In the case that conflicting programs are active with the user requested II Device(s) and time, the device application might notify the user and ask for the user to select which program they would like to keep active. Alternately, the II Device(s) will internally have a priority level assigned to different profiles and/or types of requests.

An alarm timer relates to a program process by which at a certain user designated time or lapse of time, an action would occur in any number of II Devices or group of II Devices. The alarm timer processes are similar to those described for general programs and automation programs. Through the device application a user would select the program to run the alarm or timer and select the II Devices and/or groups to execute the program. An alarm selection signifies that at a certain selected time, the selected II Devices and/or groups would execute an alarm command to adjust lighting to the user's requested command. The requested command might be of a dynamic nature or a program in itself so as an execution of multiple commands in sequence such as a flashing or changing of color or brightness. When an alarm program is selected, the device application would interpret the time requested by the user and send a command to the lights and/or groups selected to execute the command or series of commands at that specified time. Each II Device would receive the commands through the wireless communication, interpret the commands by the processor, and then store the request in memory to be executed at a later time. Inside each II Device, the processor would monitor the internal real time clock and look for a match in the clock's time to the alarm program request stored in memory. If it matches, then the processor would execute the alarm command(s).

A timer selection signifies that after a certain amount of time passes, an II Device or combination of II Devices would act in some predefined manor. The user would first select the II Device(s) and/or group(s), or multiple to run the program. Then the user selects the amount of time in minutes, hrs., etc. via their application. Once selected then the device running the application will send a wireless signal to the designated II Device(s) with the specific amount of time to count down from. At the point when all the II Device(s) confirm receipt of the timer request to the device's application, the timer will begin in unison with all II Device(s) applicable. Each II Device will then countdown using internal real time clock, processor, and other embedded components. If multiple II Devices, they will count down individually, but all in unison. When the timer reaches zero, the II Device(s) will execute the command requested by the user. A user can request to repeat any timer programs to count down and then repeat. The application interface might also present a timer display showing the amount of time counting down. Upon reaching zero, the application might also present some other actions within the application. This time down feature might also be valued for gaming scenarios using the II Devices as signals.

Referring now to FIG. 54, a flow chart of a music sync process in accordance with one embodiment of the present invention is shown and referred to as 5400. This is a type of program specifically for automatically synchronizing the II Device(s) to music played on the same enabled device. The process begins with block 5402. Through the device application or through a specialty device application, the user will access the music sync program 5404. The user would then select the II Device(s) with which to sync the music 5406. The user will then select the type of II Device arrangement and the light setting theme 5408. Options for selection could depend on a number of different factors, such as the number of II Devices selected 5410, the proximity of the selected II Devices 5412, suggested options 5414, user history or saved preferences 5416, or completely new customized configurations 5418. For example considering the arrangement, if the number of II Devices is 1, then the device application will only sync to a mono type interpretation of the audio. If number of II Devices is 2 or more, then the device application will evenly distribute and assign each II Device to either of the 2 primary (L, R) stereo channels within the music file. The device application will visibly show each II Device and to which channel (L, R) the II Device is assigned to.

Further considering arrangement, if a music file is able to carry multiple channels or if the music file can be broken into multiple channels based on frequency, pitch, or other aspects of sound, an II Device could similarly be assigned or distributed across multiple II Devices. Similarly, considering selection of the light theme, the device application might display potential lighting themes options for the user to select or the user can customize their own preferences. Here, there might be default settings that have a color and/or brightness theme associated with each channel. The settings will be variations of color or themes of color assigned to each channel. For example, one might include all colors available randomly assigned to each II Device. Another option might allow for the channel colors to change over time. Another option might suggest only red hued colors, or any other type of color hue. Once an arrangement and lighting theme is selected, the user will be able to see and verify the selection 5420. At any time, the user will be able to reconfigure the arrangement or light themes, 5422, such as to move or reassign lights to different channels, select between mono or stereo lighting modes, or choose a different theme. Once the configuration is selected, the application device will notify the selected II Devices of the command and ensure all II Devices are ready and addressable 5424. This will be done via the appropriate communication and control processes. The user would then select music file(s) stored on the device (or streaming music) to be played 5426. As the music is played through the device application, the device application will interpret the music file wavelengths to send continuing commands to each II Device previously selected to turn on and off, adjust brightness, and change colors depending on the music construct within that channel at that time and the selected arrangement and theme.

Possibilities for interpreting the music construct is as follows: For each music channel in the music file (L,R), when there some output of sound to be played or amplitude in the music, that would correlate with the light(s) assigned to that channel to turn on (to emit light). For example, if a bass drum is played in the left channel, the audible sound would coordinate to the visible light from that assigned left channel's II Device(s). For each channel (as previously assigned), the brightness of the light emitted by each II Device could brighten or dim dependent on the respective increase or decrease in amplitude of the music within that channels music file. Such as that louder sounds would coordinate with brighter lights and vice-versa. Respective amplitude would be the dependent variable, not true amplitude. Additionally, different pitch ranges might correlate with different color combinations of light output. Additionally, the bpm (beats per minute) might be interpreted so that after a standard measure of bars (time of playing) the color or channel assignment of the II Devices might change.

A user could also adjust the overall brightness maximum output to their preference through the device application, similarly referred to in the figure as 5422. This information would be taken into context before relaying commands through to the II Devices. The application device would automatically or through user input manage and match the output of audio to the output of lighting commands and delay the audio output to any delay in communication to the II Devices so as the actual sound heard through a speaker would match the same time that the light illuminated from the II Device(s) 5428. The application would continue to run on the device while continuing to interpret/translate the music and channels played into commands to be executed by the assigned II Device(s). When the music sync program application is stopped or exited 5430, the assigned II Devices would revert back to their previous programmed state if applicable or default level 5432. The music sync program/application would complete 5434.

A predefined program so a user can set their II Devices to slowly turn on with certain color displays at specific times to simulate the effect of a sunrise. In many parts of the world, people have to get up before the sun, this process allows for a user to select their II Devices to turn on slowly, mimicking a sunrise, before their alarm or at a certain time to help wake them up. Setting up the program through the device application, a user could select the special program through the predefined program list or through the groups menu. The sunrise program would be a suggested program for those groups containing the word 'bedroom'. The user would be able to adjust the length and type of sunrise if they choose. Type relates to variations in color schemes. The user will be asked to enter a time for the sunrise program to execute, or to create an alarm with the sunrise. If the alarm program is also set, the two could be run simultaneously or within one program. Once set and accepted, the application device will communicate the automation program request to the selected light(s). The light(s) will receive the automation program request and store the program in memory to be executed upon the requested time. The program settings could be saved for future use or set to run at any frequency similar to any automation program.

Executing the program. When the sunrise program is active, the program will be executed similar to any other automation or alarm program. The suggested colors used in the sunrise program will most likely include orange and red colors that would brighten over time until fully lit when the alarm or timer condition is met. Blue LEDs might also be included to provide the short wavelength light mimicking that of the sun.

In some embodiments, a light will be connected or equipped with an ambient light sensor that can detect the light levels present within an area, relay that information to the II Device's controller, which could be interpreted as a program input resulting in a change in the lighting brightness and/or color. Various programs are possible to utilize the II Device sensor's information as an input to causing some output in terms of a change in the brightness and/or color of one or more II Devices. In one program example, a user will select a preferred light level for II Device(s) or group(s) through the device application. Each II Device can have a different setting, giving the user to select any number of unique combinations. Selecting the preferred level might also be done through the user defined defaults for each II Device. When selected, the device application will then send a request through the controlling device to each II Device that the user has selected through the program, asking for each II Device's related ambient light sensor information. The device application upon receiving the light sensor information will store the default settings in the application or device's memory relative to each II Device. Alternatively, the II Device itself will record the sensor information in its own memory. The user can then at any other time activate an automatic adjustment program. Upon activation, the device application will send a communication to each II Device associated with the program. The communication will instruct each II Device to compare the current II Device sensor information against that associated with the preferred lighting level. This information would either stored in the II Device's memory or relayed via the device application's communication.

The II Device would then adjust its brightness and/or color depending on the light sensor data's relationship between the current and preferred lighting level. Simplified, if the current light sensor showed less luminosity than the preferred level, then the II Device would increase its own brightness. Alternately, if the current light sensor showed more luminosity than the preferred level, then the II Device would decrease its own brightness. The relationship between the difference in current and preferred light received will not be an equal or absolute relationship to the change in the brightness of the light. Alternatively, it will be some functional relationship dependent on the absolute and respective levels of light. The program and/or II Devices themselves would repeat this process for the duration that the program is active.

Figure 58:
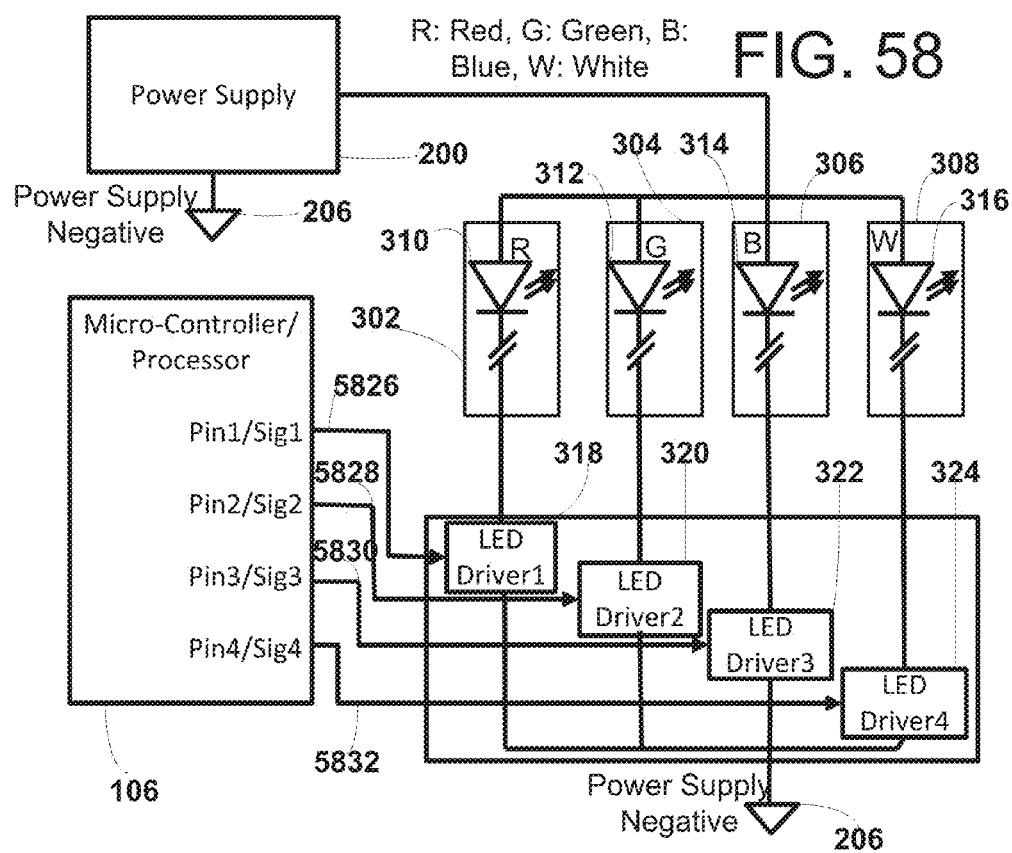
FIG. 58 is a block diagram of a LED driver scheme in accordance with one embodiment of the present invention.

Now referring to FIG. 58, a block diagram of a LED driver scheme in accordance with one embodiment of the present invention is shown. Various LEDs arms (302, 304, 306 and 308) are driven by the LED drivers (318, 320, 322 and 324) as shown. The LEDs drivers turn ON or OFF based on the ON or OFF signal provided by the microcontroller/processor 106 as shown. When LED driver is ON, current passes through its LEDs arm, and LEDs in that arm produces light. LEDs arms (LEDs1 302, LEDs2 304, LEDs3 306, and LEDs4 308) can have different types of LEDs including different colors and different electronic ratings. Each LEDs arm may have one or multiple LEDs in a series or parallel or combinations of those. With the driver scheme as per FIG. 58, color mixing can be achieved by controlling the signals to the LED Drivers (Sig1 5826, Sig2 5828, Sig3 5830 and Sig4 5832) which in turn control the ON/OFF times of the LED drivers individually i.e. by toggling the pins individually to ON or OFF states at a frequency that could be above 85 Hz. To limit the sum of the currents going through different LED drivers at a time, one could make sure not to have multiple pins controlling signals Sig1 5826, Sig2 5828, Sig3 5830 and Sig4 5832) of the LED drivers ON at a time. This could be achieved by a program running in the processor that controls the pins' ON/OFF states. In this way one need not have a PWM control of the LEDs drivers, which also helps to optimize the frequency required to run the LED drivers taking into the consideration their maximum and minimum frequency of operation and flickering issues associated with the LEDs being driven by their respective drivers.

An example of how this circuitry and program controlling the pins work will now be described with a specific case having these assumptions: (1) The high level (ON) signal if passing through each of the Pins, Pin1, Pin2, Pin3 and Pin4 in FIG. 58 passes at every 10 ms of a time period; (2) The ON signals through each of the pins are not overlapping; (3) LED drivers are designed for 1 A output current, i.e. when any Pin is set high (ON), it makes the respective driver ON allowing up to 1 A current pass through its LED arm; (4) The user wants a yellow light output at the maximum luminosity possible, for which LEDs1 302 and LEDs2 304 should be illuminated equally by sending same amount of average current through them; (5) LEDs1 302, LEDs2 304, LEDs3 306, and LEDs4 308 arms have multiple RED, Green, Blue and White LEDs in series respectively; (6) For full luminosity of yellow light that can be produced through this scheme, the average current passing through RED LEDs and Green LEDs should be half the maximum average current possible through them, which can be achieved by turning LEDs drivers ON/OFF as per the timing diagram in FIG. 60A. For 40% of the maximum luminosity of yellow light, RED LEDs should be ON for 20% time and Green LEDs should be ON for 20% time as shown with the signals SIG1 and SIG2 in FIG. 60B. Similarly, to produce a type of orange light consisting of 40% of Red, 20% Green and 10% of White could be achieved as per FIG. 61.

Figure 59:
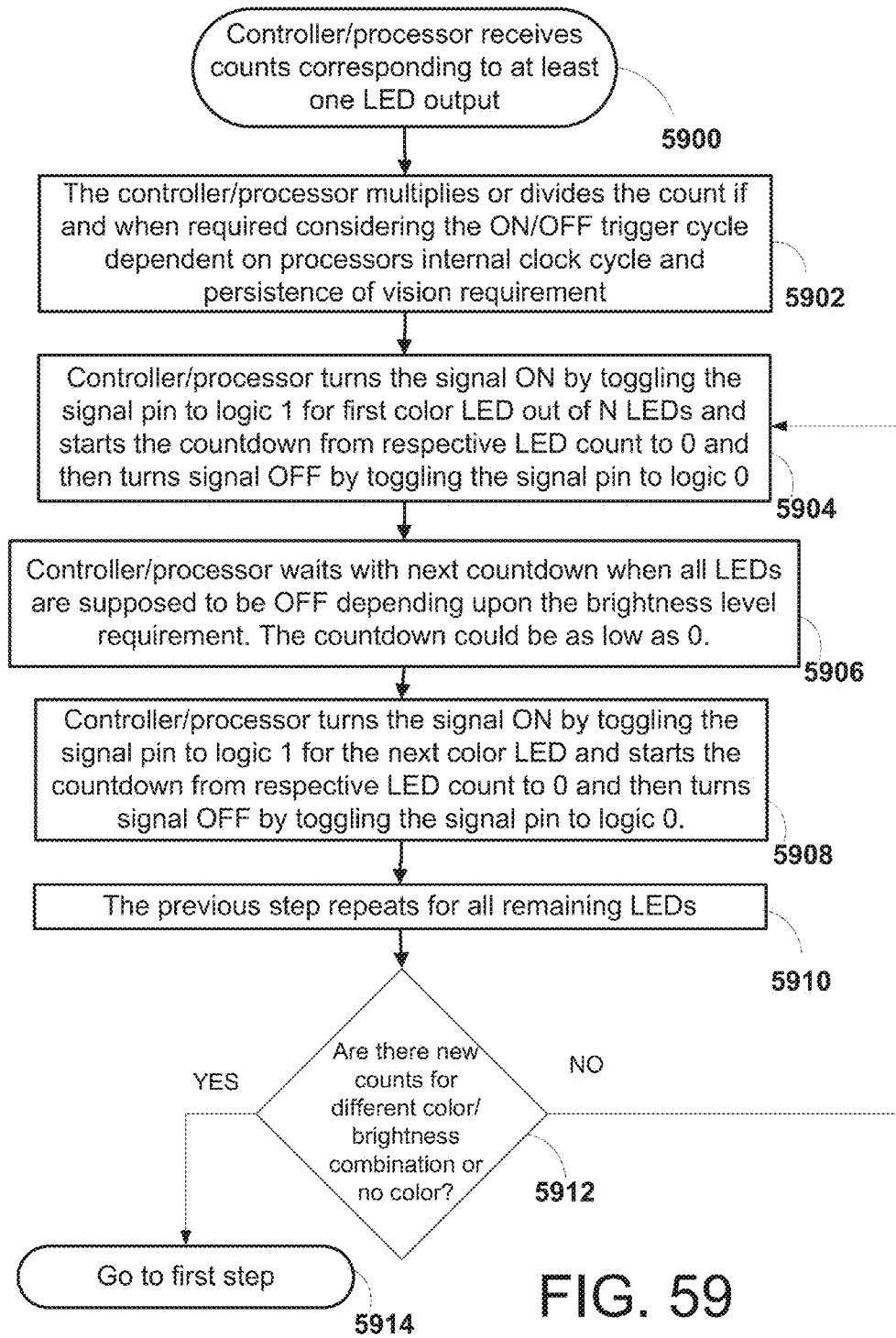
FIG. 59 is a flow chart of a controller/processor and LED driver scheme in accordance with one embodiment of the present invention.
Figure 60A:
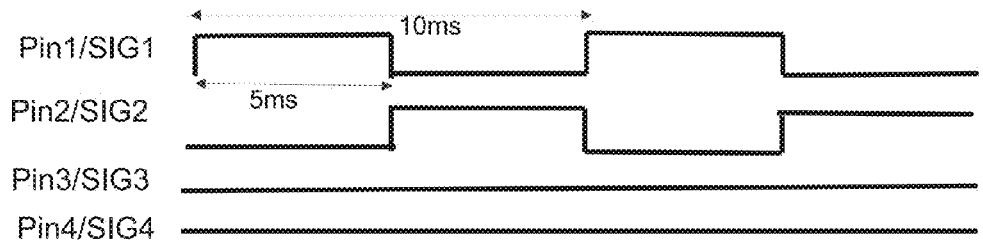
FIGS. 60A-60B and 61 are timing diagrams in accordance with various embodiments of the present invention.
Figure 60B:
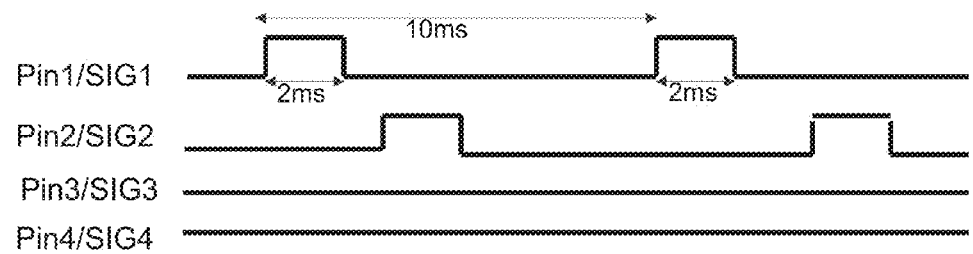
Figure 61:
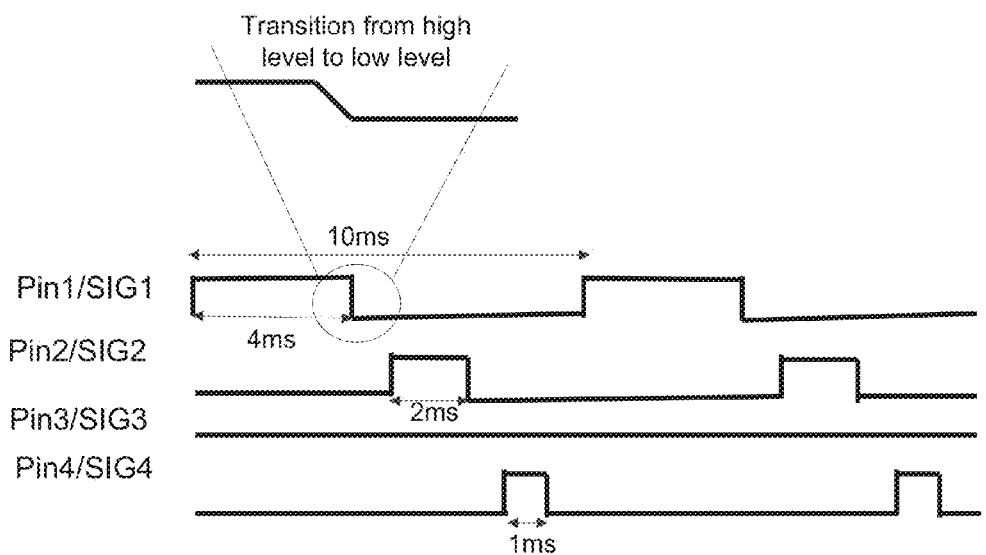

The 10 ms time period in the timing diagrams in FIGS. 60A, 60B and 61 are divided based on the count set into the controller/processor, which may come from another device communicating through various means such as Smartphone, computer, etc. connected through wires or wirelessly. Consider that the 10 ms time period is just an example. Referring to FIG. 59, this time period can vary based on the counts for respective LEDs with which the ON or OFF times for a particular LED signal are calculated. For example, consider that the RGB or equivalent counts to control the II Device are such that the Red is required to be ON for 20% of the overall time, Green is required to be ON for 30% of time and White required to be ON for 50%. Here Red (SIG1) turns ON for 2 ms and then turns OFF; as soon as Red turns OFF Green (SIG2) turns ON for 3 ms and then turns OFF; and as soon as Green turns OFF, White (SIG4) turns ON for 5 ms and then turns OFF and this cycle repeats. Here the total ON/OFF time cycle for any LED is 10 ms. Now consider a second scenario, where the RGB or equivalent counts are such that the Red is required to be ON for 50% and Green is required to be ON for 50%. Here Red (SIG1) turns ON for 2 ms then turns OFF; as soon as Red turns OFF, Green (SIG2) will turn ON for 2 ms and then turns OFF and cycle repeats. Here the total ON/OFF cycle time for LED is 4 ms which is different than the previous scenario. In addition, consider a third scenario where Red is required to be ON for 25% and Green is required to be ON for 25%. Here Red (SIG1) turns ON for 1 ms then turns OFF; as soon as Red turns OFF, Green (SIG2) will turn ON after 1 ms for ams and then turns OFF and cycle repeats. In this scenario the time cycle is still 4 ms, but the total time Red and Green are ON is 50% as compared to previous scenario giving 50% less brightness out of the Red and White LEDs in the same time cycle of 4 ms. Having flexibility in the time cycle as for different color and/or brightness combinations helps in reducing the overheads for the processor in calculating the cycle time and ON and OFF times for each LED. To further explain with an example, consider that the Red, Green, Blue and White counts for a particular color are Red equal to 255, Green equal to 127 and Blue and White equal to 0. Also consider that the processor's 106 internal clock generates the overall time period and triggers ON and OFF signals for LEDs. In this situation, the processor can count down from 255 to 0 (or count-up from 0 to 255) forming a time period, let's assume that turns out to be 2.55 ms for which Red (SIG1) will be ON. While immediately after Red turns OFF, Green (SIG2) will be triggered with the turn ON signal and will remain ON until the countdown is from 127 to 0 which making Green turned ON for 1.27 ms. Similarly, if the counts are 255 for RED, 100 for Green and 200 for Blue LED, the countdown for each of these LEDs will directly generate the time cycle where Red (SIG1) is now ON for 2.55 ms then OFF turning Green (SIG2) immediately ON for 1.00 ms and when Green (SIG2) turns OFF after 1.00 ms, Blue (SIG3) turns ON for 2.00 ms and then Turns OFF immediately turning ON Red (SIG1) and repeating the cycle. In these two scenarios as explained, the ON/OFF time cycle for LED is 3.82 ms (2.55 ms+1.27 ms) for first scenario, while ON/OFF time cycle is for LED in second situation is 5.55 ms (2.55 ms+1.00 ms+2.00 ms). In these scenarios the 100 counts countdown is equivalent to 1.00 ms, however then it could be different depending upon the processor 106 type, clock it is running ON, the clock division/multiplication being taken place inside the processor 106 and division/multiplication defined for Red, Green, Blue and White counts to ensure they are proportional to each other. For example, even if in one scenario the count for Red is 255, for Green is 100 and for Blue and White is 0, the processor may multiply or divide the count by certain number such as multiply 2 making them 510, 200, 0 and 0 for Red Green, Blue and White respectively to address any limitations of the LED driver's minimum turn ON and OFF time requirements and to ensure minimum cycle requirement for maintaining the persistence of vision requirement (which many times considered as minimum of 85 Hz cycle). This way the overheads of complex calculations for calculating the time cycle, ON/OFF time for each LED are minimized saving processor's 106 processing power for other required calculations and giving better response. In addition, there is no need of using complex PWM (Pulse Width Modulation) of the signal and calculations required to calculate parameters of PWM every time to control the light output. With this configuration a processor that is cost effective and has low processing power can be used.

In FIG. 59, the process is explained in general. Controller/processor 106 receives counts corresponding to at least one LED output in Block 5900. The controller/processor 106 multiplies or divides the count if and when required considering the ON/OFF trigger cycle that is dependent on processors internal clock cycle and persistence of vision requirement in block 5902. After the counts for LEDs are calculated, in block 5904, the controller/processor 106 turns the signal ON by toggling the signal pin to logic 1 for first color LED out of given N LEDs and starts the countdown from respective calculated LED count to 0 and then turns the signal OFF by toggling the signal pin to logic 0. In block 5906, controller/processor 106 waits with next countdown when all LEDs are supposed to be OFF depending upon the brightness level requirement. The countdown could be as low as 0. For example, the LED counts calculated for full intensity of color with Red, Blue, Green and White are 252, 100, 0 and 0 respectively, then the counts for Blue, Green and White for 75% intensity would be 189, 75, 0 and 0. For full intensity the Red signal will become high i.e. Red LED ON for countdown from 254 to 0 and then it will become low i.e. Red LED OFF. Immediately after that the Green signal will become high i.e. Green LED ON for countdown from 100 to 0 then it will turn OFF. As Blue and White counts are 0, they will not Turn ON but remain OFF. Thereafter, the cycle with RED turning ON immediately continues. However, for 50% intensity, the Red signal will turn high i.e. Red LED ON for countdown from 189 to 0 and then it will turn OFF and will remain OFF for countdown from 63 (calculated as 252-189) to 0. Immediately after that Green will turn ON for countdown from 75 to 0 and then it will turn OFF and will remain OFF for countdown from 25 (calculated as 100-75) to 0. With Blue and White counts 0, Blue and White LED will always remain OFF. The cycle repeats until new counts are available. This countdown method could be different, however, it will be intended to keep percentage of Signal of a particular LED ON out of entire time cycle same as calculated in above example. Blocks 5904, 5906, 5908 and 5910 explain the process in general. The cycle repeats until the new counts for LEDs for new color and brightness combination are provided or calculated as shown in general in blocks 5912 and 5914.

With such control of LED drivers (318, 320, 322 and 324) which include non-overlapping ON signals for two or more LED drivers, one gets the ability to get the brightest light possible from the LEDs in respective arm in the scheme with the limited power available from the power supply. One is able to design the LED drivers for the maximum possible current possible through LED arm irrespective of how many additional LED arms are required from the given power supply. For example, one can keep one LED driver ON continuously and pass maximum current possible through its LED arm and get highest possible output. Similarly, if one could pass ON signal for first half of the cycle through one LED arm by keeping its LED driver ON for that time and ON signal for the second half of the cycle through other LED arm getting maximum light output for the color formed by mixing the lights from the LED arms in the proportion of their ON times.

This also allows optimizing the frequency of the ON/OFF signal to LED drivers reducing the dependency upon limitation of the time required for drivers to change their state, i.e. from ON to OFF and vice versa as compared to the sequential non-overlapping PWM signals. It also reduces the overhead on the controller/processor as it need not create many numbers of PWM signals for controlling various drivers which in turn controls current through respective LED arms of LEDs. It is now achievable by toggling the pins from high (ON) state to low (OFF) state only. In addition, the controller can be programmed to keep OFF time between the two non-overlapping ON signals as shown in FIG. 61. This helps drivers to start earlier making sure that the current through it reaches to the required peak level i.e. turns ON fully by the time it is supposed to do so.

Figure 62:
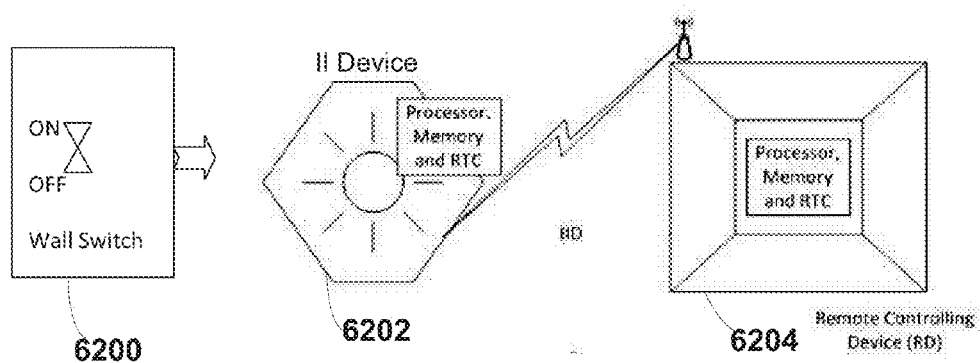
FIG. 62 is a block diagram of a lighting system in accordance with one embodiment of the present invention.

FIG. 62 is a block diagram of a lighting system in accordance with one embodiment of the present invention. II Device 140 or 6202 may have various defaults such as: (1) Manufacturing Default, which could be the basic light setting executed when one resets the controller/processor 106 of II Device 140 or 6202; (2) Active Light Default, the active default light setting that could be executed when the II Device 140 or 6202 is turned ON; and (3) many Passive Light Defaults, the light settings those could be executed when specific triggers are provided to the controller/processor 106. These defaults could be stored in its internal memory or memory on board 108 or memory of an external peripherals or controlling devices such as remote controlling device 6204 with which II Device 140 or 6202 is communicating.

All these defaults could be executed with various ON/OFF cycles provided by an external electronic switch controlling the power of the II Device 6202 such as wall switch 6200 in this case. For example, the Manufacturing Default could be executed when the wall switch 6200 associated with the II Device 6202 is turned ON and OFF two times in a specific time period such as four seconds. A particular Passive Light Default could be achieved by turning II Device 6202ON and OFF four times in five seconds through a light switch 6200. Similarly, other light defaults can be executed with other switch ON/OFF combination cycles. The ON/OFF combinations here are type of a trigger for the II Device 140 or 6202, and various such combinations form different triggers. These triggers through a switch are particular ON and OFF times those are stored during the process by controller/processor 106 in its internal memory or memory on board 108 or memory of an external peripherals or controlling devices such as that of a remote controlling device 6204 with which II Device 14 or 6202 is communicating wirelessly. Then these stored ON/OFF times are compared to check if any defined trigger in the similar memory has been generated, based on which II Device 140 or 6202 execute particular light default or light settings.

One way to achieve this is by defining various ON/OFF times defining triggers into the II Device's memory 108. When II Devices 140 or 6202 is switched ON/OFF at a particular cycle, this cycle is stored and compared by the controller/processor 104 or remote controlling device 6204 to execute the required default. The II Device's RTC 110 or clock of remote controlling device 6204 could be used to monitor and store the ON/OFF switching times the into a specific memory.

In addition, the user can provide triggers not only though a switch controlling power to II Devices, but other external devices connected through wire(s) electrically or wirelessly to the II Device 140 or 6202. Furthermore, Light Defaults could be a specific light setting with a specific color and brightness or a light program that changes the light output as a function of time or other events.

Figure 63:
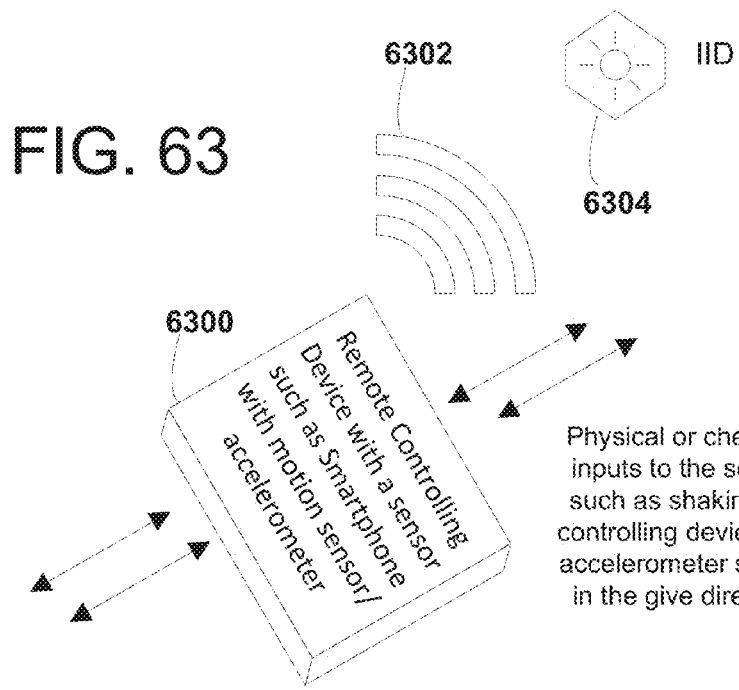
FIG. 63 is a block diagram of a sensor device capable of communicating with and controlling the IID(s) to control IID in accordance with one embodiment of the present invention.

Referring FIG. 63, II Device 6306 could be controlled through remote controlling device 6300 that has at least one or combination of built in sensor(s) in following categories:

Motion and navigation sensors including but not limited to accelerometer, gyroscopic, proximity sensor, digital compass, Global Positioning System Sensor;

Acoustic, sound and vibration sensors including but not limited to microphone, Lace sensor (guitar sensor), etc.;

Automotive and transportation sensors including but not limited to speedometer, speed sensor, torque sensor, etc.;

Chemical Sensors including but not limited to Smoke detector, Breathalyzer, Electronic Nose, Potentiometric sensor;

Electric and Magnetic sensors including but not limited to current sensor, electroscope, magnetometer, metal detector, voltage detector, etc.;

Environment, weather, moisture, humidity sensors including but not limited to dew sensor, rain gauge, rain sensor snow gauge, humidity sensor, humistor, gas detector, leaf sensor, etc.;

Flow and fluid velocity sensors including but not limited to air flow meter, water meter, Anemometer, flow sensor, gas meter, etc.;

Position, angle, displacement, distance, speed, acceleration sensors including but not limited to tachometer, accelerometer, rate sensor, etc.;

Optical, light, imaging, photon including but not limited to flame detector, ambient light sensor, photo resistor, phototransistor, infra-red sensor, fiber optic sensor, photodiodes, etc.;

Force, density, level sensors including but not limited to force gauge, load cell, piezoelectric sensor, strain gauge, etc.;

Thermal, heat, temperature sensors including but not limited to temperature gauge, thermometer, thermistor, thermocouple, infrared thermometer, etc.;

Presence sensors including but not limited to occupancy sensor, touch switch, motion detector, etc.; and Pressure sensors including but not limited to barometer, piezometer, pressure gauge, etc.

Figure 64:
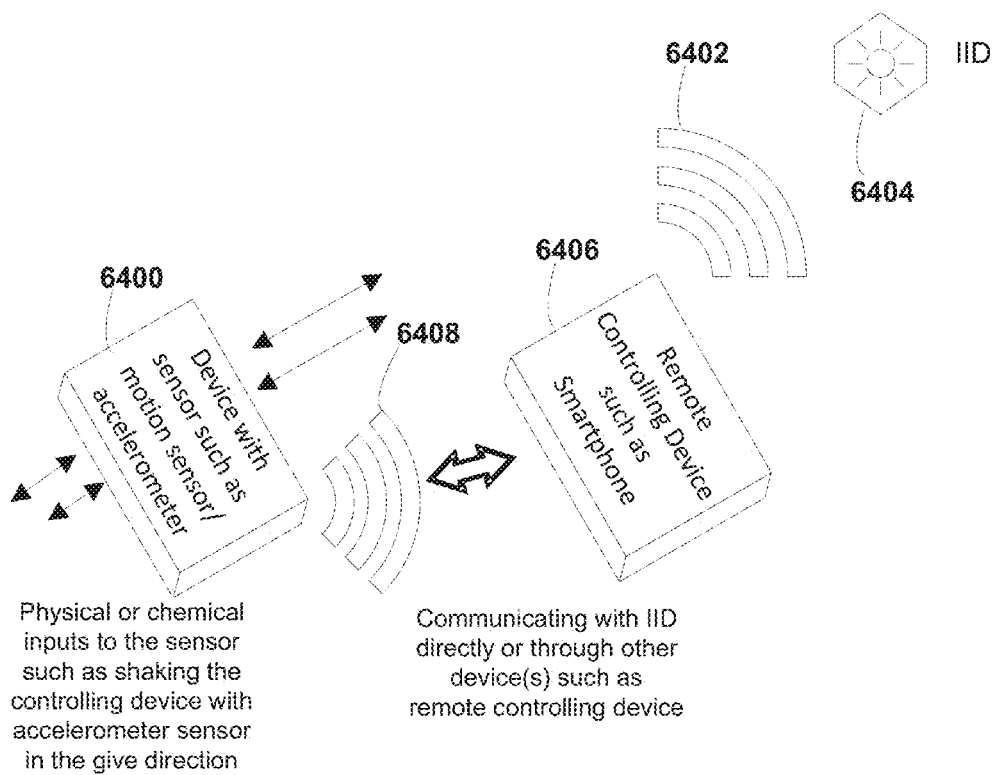
FIG. 64 is a block diagram of a remote controlling device and a sensor capable of communicating with and controlling the IID(s) to control IID in accordance with another embodiment of the present invention.

Referring FIG. 63, the above mentioned sensor could be a part of a remote controlling device 6300 capable of communicating with and controlling the II Device(s) 6304. In addition, referring to FIG. 64, above mentioned sensors could be a part of other peripheral device 6400 that could communicate with II Device(s) 6304 through other intermediate remote controlling device(s) 6406. In the FIG. 63, an example is shown where a remote controlling device 6300 with motion sensor or accelerometer is shaken or moved or rotated in a particular direction at least once to produce a predefined signal that in turn makes remote controlling device to send a command or data to the II Device 6304 to execute a particular light setting or function. Similarly, in FIG. 64, device with sensor 6400 sends command or data for such predefined signal to II Device 6404 directly or through intermediate remote controlling device 6406 to execute a particular light setting or function.

Figure 65:
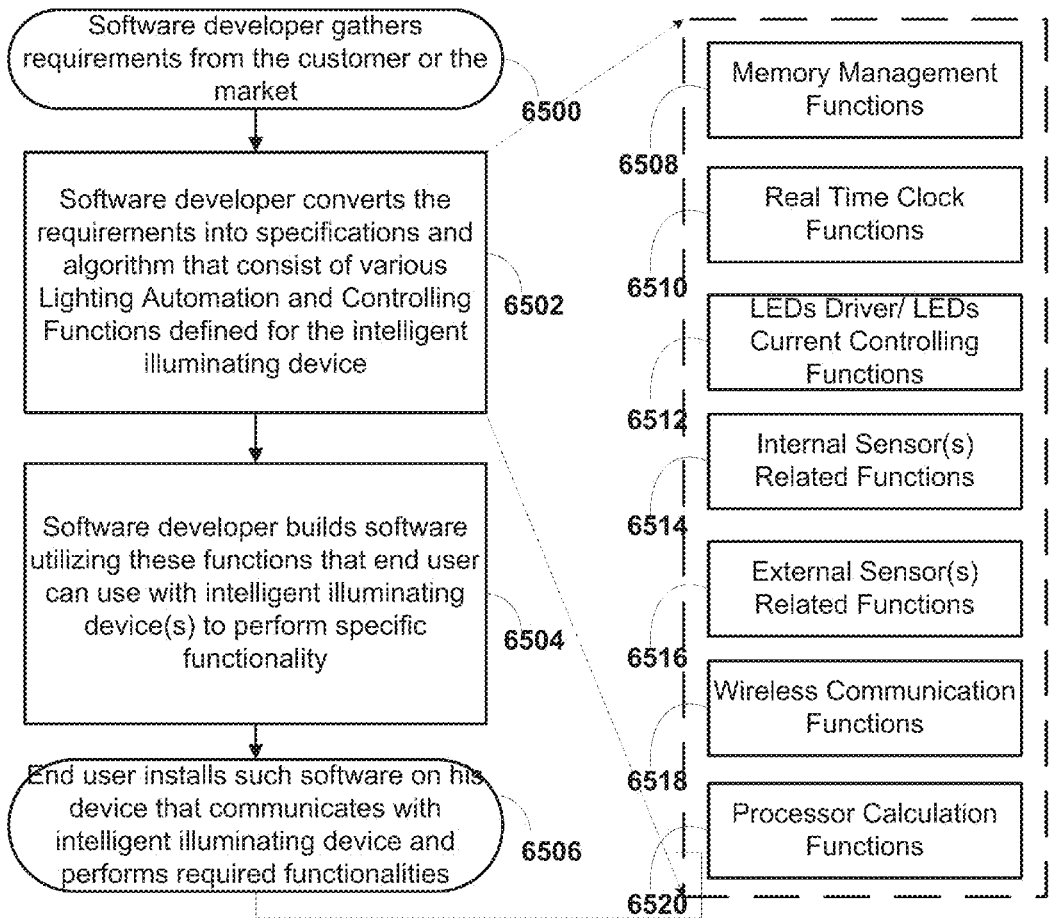
FIG. 65 is a flow chart of functions to implement different applications or features in accordance with one embodiment of the present invention.

The II Device system will have a specific Software Development Kit (SDK) and/or Application Program Interface (API) for developer(s) to build various programs and features for the II Devices(s). Referring to FIG. 65, II Device will contain unique functions which could be used by a software/application developer to implement different applications or feature. For example, the functions may include:

a) Functions for connecting and disconnecting remote controlling device(s) to II Devices(s) 140 individually or in group. The function includes the protocol to connect to the lighting device where lighting device's identification number is integral part of it.

b) Functions 6512 to send commands to II Devices(s) 140 to change the color and brightness, the command will consist of values proportional to the luminosity output of each LED arms driven by LEDs current controlling circuitry 120. These values will be read and decoded by controller/processor 106 and it will control the flow of average current through LEDs accordingly to illuminate LEDs to desired level of brightness. One of the functions will include values for defining the color and the brightness in terms of Red (R), Green (G), and Blue (B) values ranging from 0 to 255 representing standard RGB color space. Another function will include values of Cx and Cy ranging from 0 to 1 representing standard CIE color space.

c) Functions 6510 to send command to II Device(s) 140 to set date and time of RTC (Real Time Clock) 110 or read date and time values from RTC which can be used to automate the lighting output such as to turn ON/OFF at a particular color and brightness at a particular day and time.

d) Function 6508 to send command to read and write controller/processor's 106 memory or the other on board memory 108 of the II Device(s) 140.

e) Functions 6514 and 6516 to send commands to access the controller/process or programs such as reading sensor data such as that of ambient light sensor 118 or any other internal or external.

f) Functions 6518 to communicate with external wireless devices such as Remote controlling Device(s) through II Device's 140.

Figure 66:
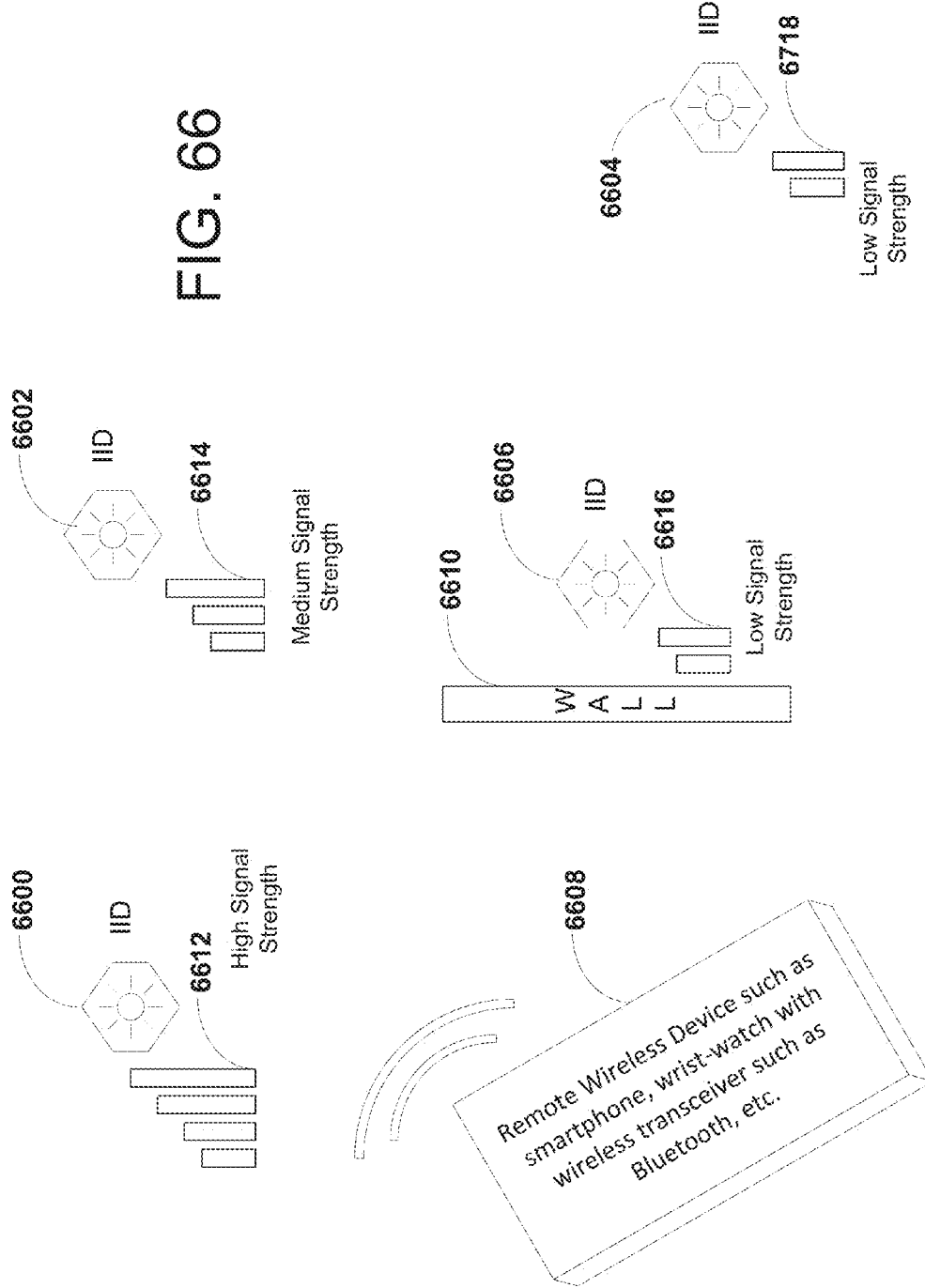
FIG. 66 is a block diagram illustrating how the signal strength can vary based on location and proximity in accordance with one embodiment of the present invention.

Referring to FIG. 66, depending on location and proximity, the wireless signal strength between an II Device 140 and a controlling device can vary. In addition any impediments, such as a wall, can also have an effect reducing the wireless signal strength between an II Device(s) 140, (6600, 6602, 6606 and 6604) and a Remote Wireless Device 6608 capable of communicating with II Device(s) 140 (6600, 6602, 6606 and 6604). The remote wireless device 6608 and II Device(s) 140 (6600, 6602, 6606 and 6604) can then be put in a state where when signal strengths are detected beyond a certain threshold then the II Device 140 should execute a command.

The exact threshold and the command could be user adjusted or preset. In this scenario, a user with the remote wireless device 6608 which could be remote controlling device for II Device(s) 140 (6600, 6602, 6606 and 6604) could move around an area where the II Device(s) are stationary, and while moving around the signal strengths would vary and only those II Device(s) with a signal strength above the certain threshold would be activated. Similarly, when the remote wireless device 6608 continues to move and the signal strength diminishes past the threshold then the II Device(s) 140 (6600, 6602, 6606 and 6604) can have a separate command such as turning off.

The II Device(s) 140 (6600, 6602, 6606 and 6604) and the remote wireless device 6608 might be set by a user in a state to monitor signal strength and thus execute the proximity program. It might also be scheduled by a user to be executed at set times. In some scenarios the controlling device will search for II Devices, assess their signal strength, and send commands to the II Devices that have signal strengths above the threshold. In other scenarios, the II Devices will search for the remote wireless or controlling device to come into direct range, assess the signal strength, and take action accordingly. Or it can be some combination of the two. The search between the II Devices and the remote wireless or controlling device can be continuous or intermittent at some defined time, e.g., every second.

In some cases, variations or some effect on signal strength can be interpreted as some barrier, such as a wall 6610, between the II Device 6606 and the remote wireless or controlling device 6608. If the signal strength is interpreted as having a barrier, such as a wall, between the II Device and the controlling device, then the command to turn on might be disregarded even if the signal strength is above the threshold for activation. In addition, the controlling device or II Devices might have information related to the general layout of the II Devices and barriers in between. This can come from user generated information, historical use patterns, or II Devices relative signal strengths from each other. The remote wireless or controlling device might use this information to similarly make assumptions on whether an II Device is intended to be controlled within proximity. For example, assume II Device 1 and 2 are in room A, and II Device 3 and 4 are within room B. If in Room A then the true signal strength for II Device 1 and 2 would be beyond the proximity threshold, but consider II Device 3 is also beyond the proximity threshold but II Device 4 is not beyond the proximity threshold. Here, the controlling device could interpret this as the user being in room A and only send a proximity command to II Device 1 and 2, ignoring II Device 3.

Various application interfaces will now be described. On the controlling device for II Device 140 the user interface for the application can be made to be intuitive and representative of the lighting environment. There are multiple potential facets that could be combined to create an intuitive user interface not limited to a real-time representation of some or all lights, their status, and any active programs.

Figure 67:
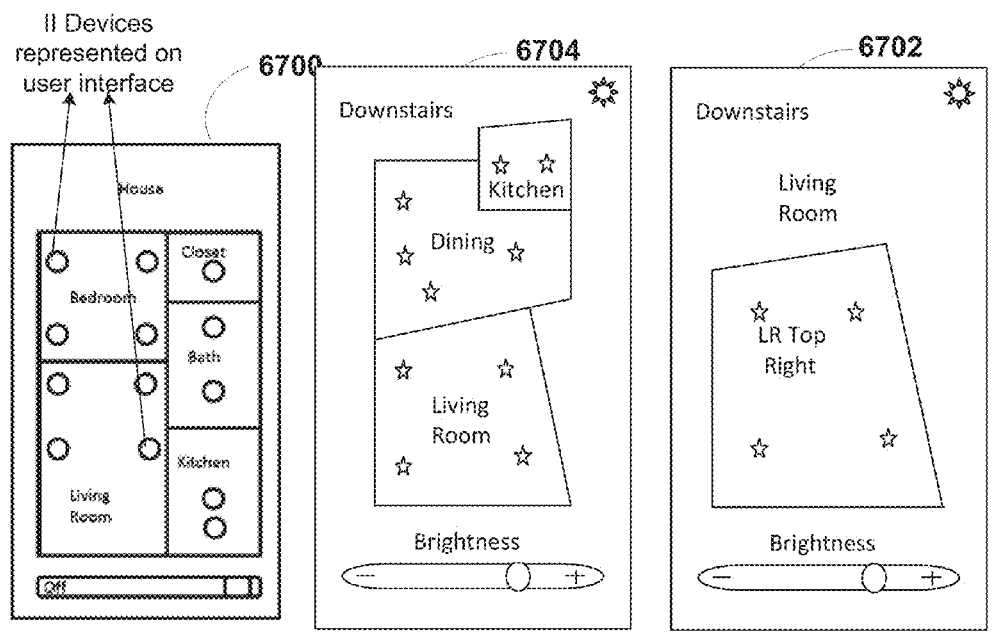
FIG. 67 shows examples of an application interface for controlling one or more lights in accordance with various embodiments of the present invention.

Referring to FIG. 67, in terms of representation, the II Devices 140 can be set-up in a representation 6700 similar to that of an overhead view of the space in which the II Devices are installed (i.e., a visual or virtual representation). In this case there can be a user led or automated process to place II Devices in respective locations on the screen. In addition, there might be a user generated or automated process where a user set's up their II Devices within the framework of rooms such as living room 6702 in the figure. Here a user would be prompted to create an approximate representation of the walls of a room then drag or input where the II Devices are related to the room layout 6702. The creation of the walls can be done in multiple ways using direct user input (dragging, using corners, or using predefined shapes) as well as camera functionality and estimation tools. Once a room is defined and II Devices within a room are defined a user can select the room as a whole or drill into individual lights within the room.

Further, a user can add II Devices to an existing room or create new rooms as representations and add other II Devices into that room. Here multiple rooms could be joined together to create a full overhead layout with walls or spaces in between as per representation 6700 in the figure. Multiple rooms can be joined together to create different floors, so that a user can select between overhead representations of different floors. Further, multiple II Devices can be combined together to create smaller clusters or groups of II Devices. Here the cluster would be editable but treated at the layer in the general user interface as one II Device.

This provides a scalable user interface depending on the number of II Devices and the number of rooms configured by the user, but also provides an easy representation of all lights at any time. A user can select a whole house, a floor, a room, or individual lights within the selection area by zooming in or zooming out. In addition, a user can select any combination of floors, rooms, or lights to select or create a quick grouping at any time. The overhead representation would include whether each individual II Device is on or off, the brightness, and potentially any active or scheduled programs or lighting effects. In addition to working as a representation of multiple II Devices, the overhead representation can be utilized for other intelligent devices or sensors related to the environment.

Figure 68:
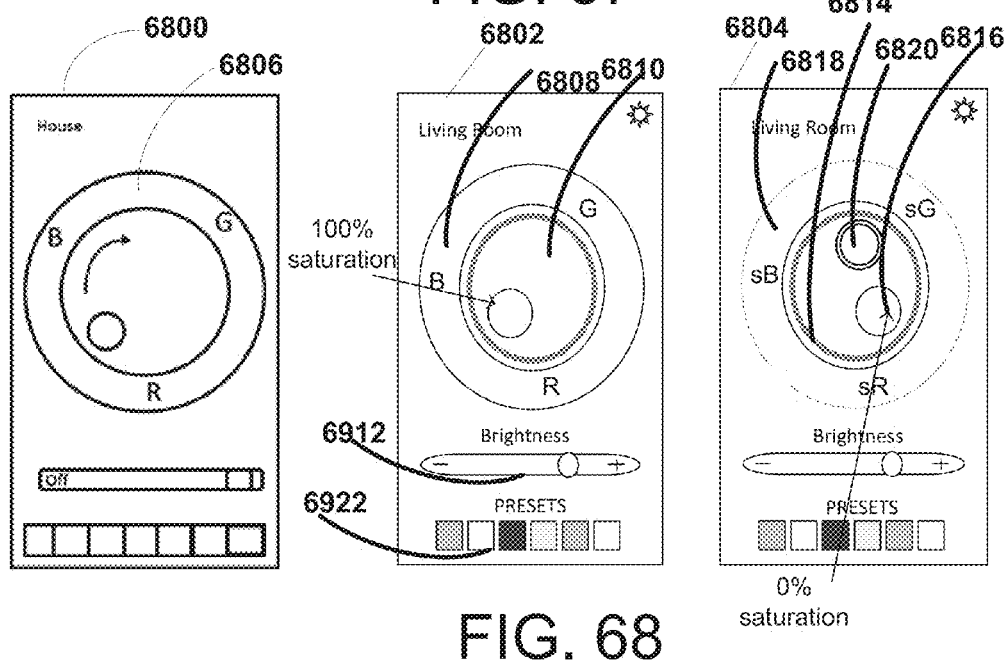
FIG. 68 shows examples of an application interface for color wheel control in accordance with various embodiments of the present invention.

As the II Devices can represent colors as well as variations of white with different saturation levels, the application representation in the controlling device needs to have a similar representation. Referring to FIG. 68, in the application interface, this can be represented by having a color area 6806, 6808, a white light amplitude/saturation area 6810 and brightness area 6812. The color area could be a color wheel 6806, 6808 or box representative of the available color combinations, the white area could be a rotating or directional level 6810. When the white light area is at the lowest level 6814, the color area would be fully saturated with bright colors shown as R, G and B. When the white light area is at its highest level 6816, the color area would be almost completely white. In between, incremental increases in the white light level 6820 would have an effect to add less saturation to the color area, looking like a white gradient overlaid on the color area 6818 shown with sB, sG and sR (stands for less saturation of R, G and B). Here if multiple II Devices with differing ranges in color saturation are present, the controlling device will note this and only allow the white light level to reduce to the appropriate level representative of the less flexible II Devices range.

Any selection could also be saved by the user to a default area on the screen for quick selection such as presets 6822 i.e. when user presses defined preset the selected II Device would emit the color, brightness and saturation of the selected preset. In addition brightness could also be adjusted independently as a proportional amount of brightness emitted by the II Devices by controlling the brightness area 6812. All these representation areas could be given different intuition, however, the concept of controlling the color, saturation and brightness of II Device(s) through user interface would remain the same.

As an alternative to wireless control through a controlling device, some embodiments might rather or also have a manual hue adjustment option with some mechanical input, such as a button, a knob, or the like. A user can adjust the hue, color, or brightness of the II Device. One example of a button would be a rotating ring around the edge of the II Device that in different positions would relate to different hues or colors. With torque a user could turn the ring to create different ring effects. Another example would be a very low voltage conductive area on the outside of the light that when touched would change the color or hue. Again another version might be a button or switch somewhere on the embodiment that when turned would create a different hue, brightness, or color.

Figure 69:
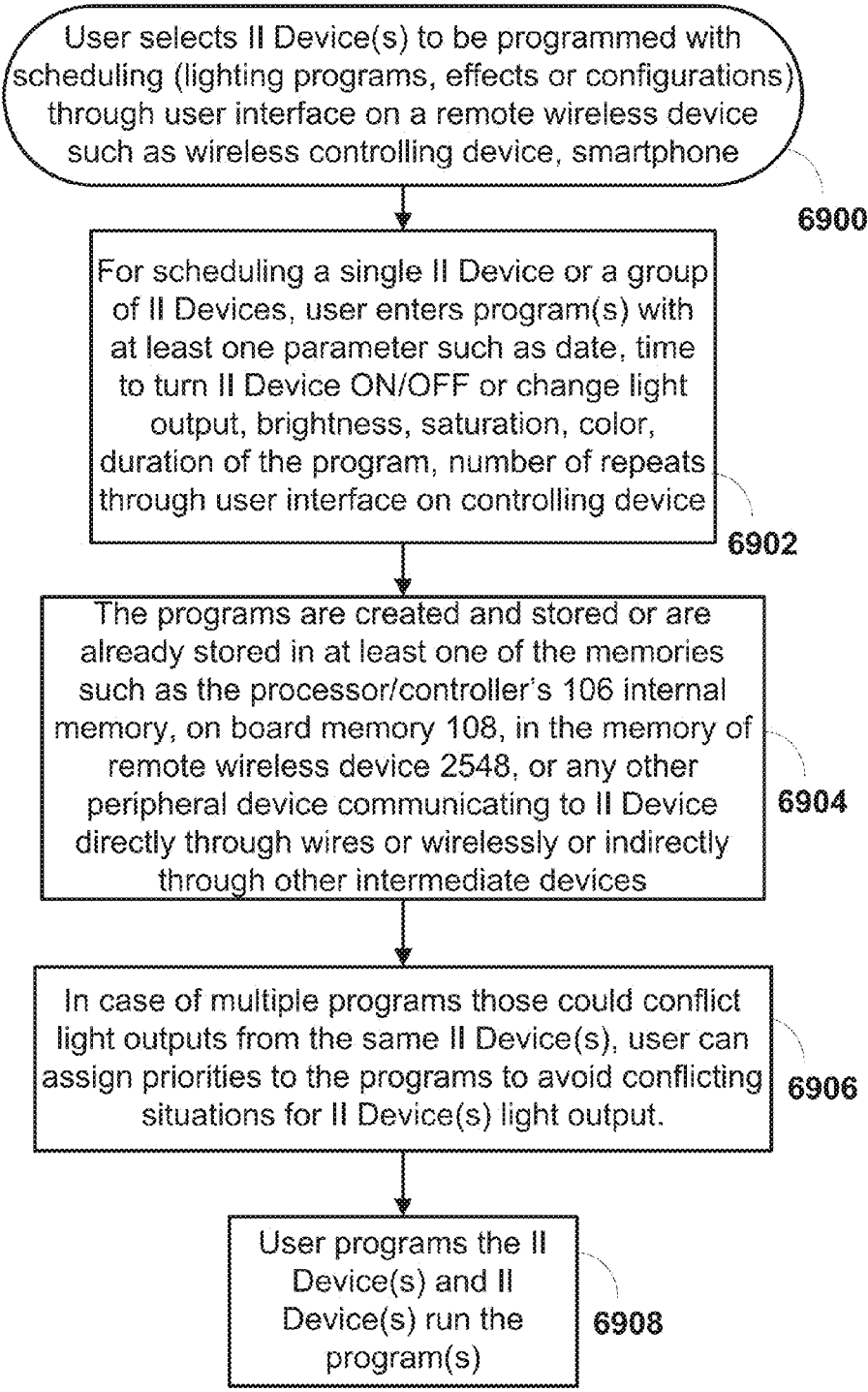
FIG. 69 is a flow chart of scheduling programs for operating a lighting device in accordance with one embodiment of the present invention.

Now referring to FIG. 69, a flow chart of scheduling programs for operating a lighting device in accordance with one embodiment of the present invention is shown. The user selects II Device(s) to be programmed with scheduling (lighting programs, effects or configurations) through user interface on a remote wireless device such as wireless controlling device or smartphone in block 6900. For scheduling a single II Device or a group of II Devices, the user enters program(s) with at least one parameter such as date, time to turn II Device ON/OFF or change light output, brightness, saturation, color, duration of the program, number of repeats through user interface on controlling device in block 6902. The programs are created and stored or are already stored in at least one of the memories such as the processor/controller's 106 internal memory, on board memory 108, in the memory of remote wireless device 2548, or any other peripheral device communicating to II Device directly through wires or wirelessly or indirectly through other intermediate devices in block 6904. In case of multiple programs those could conflict light outputs from the same II Device(s), the user can assign priorities to the programs to avoid conflicting situations for II Device(s) light output in block 6906. The user programs the II Device(s) and II Device(s) run the program(s) in block 6908.

Figure 70:
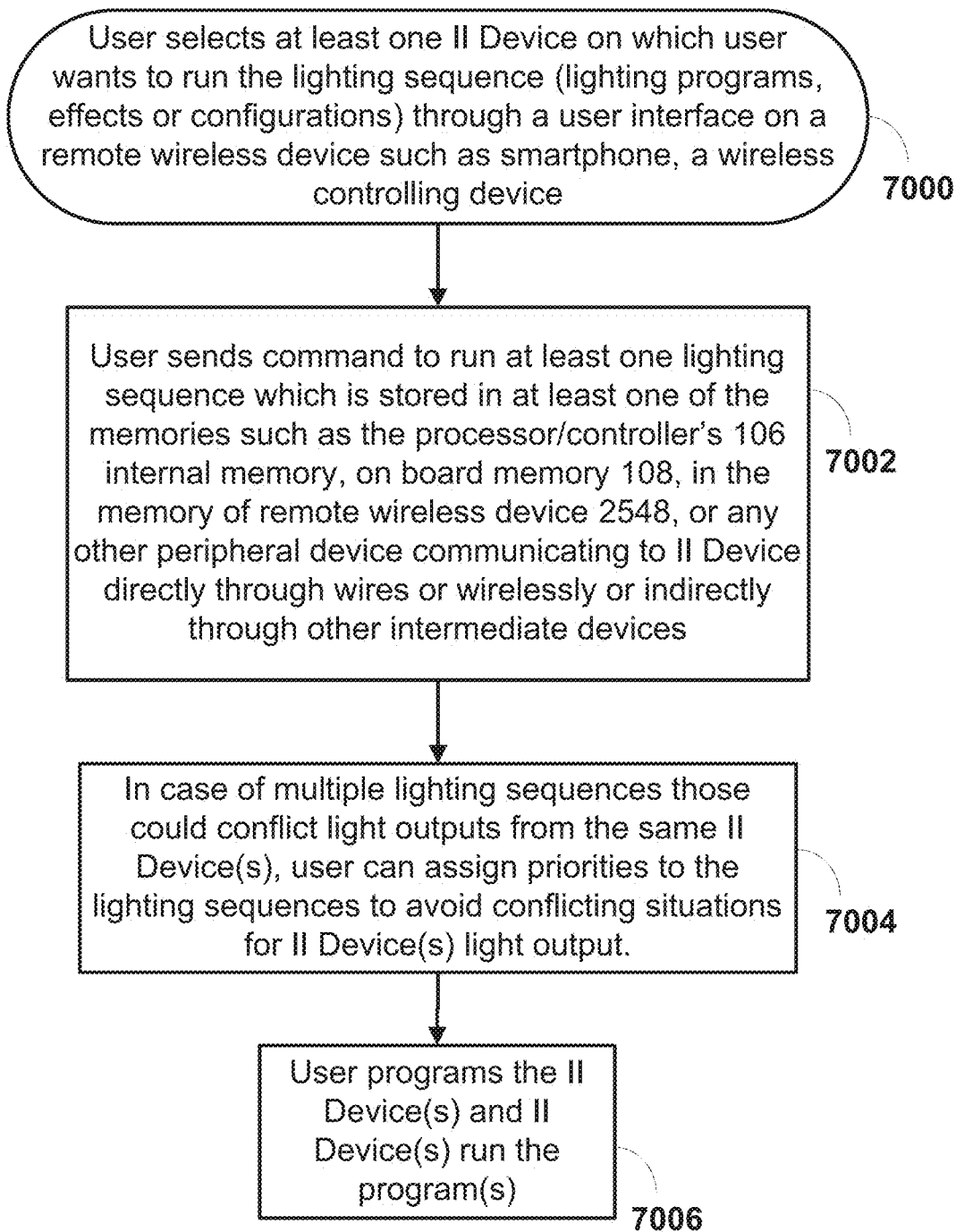
FIG. 70 is a flow chart of selecting a lighting sequence of a lighting device in accordance with one embodiment of the present invention.

Referring now to FIG. 70, a flow chart of selecting a lighting sequence of a lighting device in accordance with one embodiment of the present invention is shown. The user selects at least one II Device on which user wants to run the lighting sequence (lighting programs, effects or configurations) through a user interface on a remote wireless device such as smartphone or a wireless controlling device in block 7000. The user sends command to run at least one lighting sequence which is stored in at least one of the memories such as the processor/controller's 106 internal memory, on board memory 108, in the memory of remote wireless device 2548, or any other peripheral device communicating to II Device directly through wires or wirelessly or indirectly through other intermediate devices in block 7002. In case of multiple lighting sequences those could conflict light outputs from the same II Device(s), the user can assign priorities to the lighting sequences to avoid conflicting situations for II Device(s) light output in block 7004. Thereafter, the user programs the II Device(s) and II Device(s) run the program(s) in block 7006.

Figure 71:
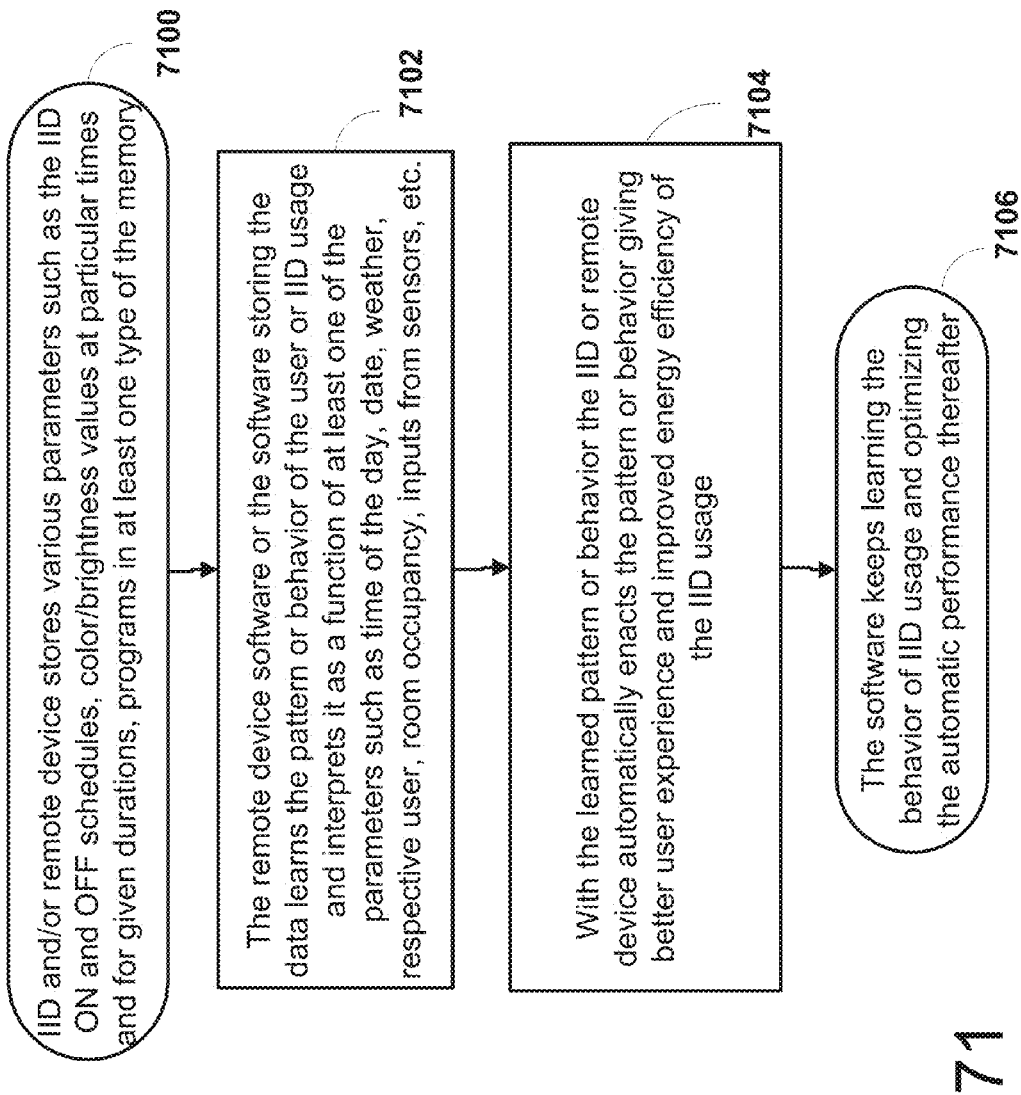
FIG. 71 is a flow chart of storing various parameters for a lighting device in accordance with the present invention.

Now referring to FIG. 71, a flow chart of storing various parameters for a lighting device in accordance with the present invention is shown. The II Device and/or remote device stores various parameters such as the II Device ON and OFF schedules, color/brightness values at particular times and for given durations, programs in at least one type of the memory beginning in block 7100. The remote device software or the software storing the data learns the pattern or behavior of the user or II Device usage and interprets it as a function of at least one of the parameters such as time of the day, date, weather, respective user, room occupancy, inputs from sensors, etc. in block 7102. With the learned pattern or behavior the II Device or remote device automatically enacts the pattern or behavior giving better user experience and improved energy efficiency of the II Device usage in block 7104. The software keeps learning the behavior of II Device usage and optimizing the automatic performance thereafter in block 7106.

Figure 72:
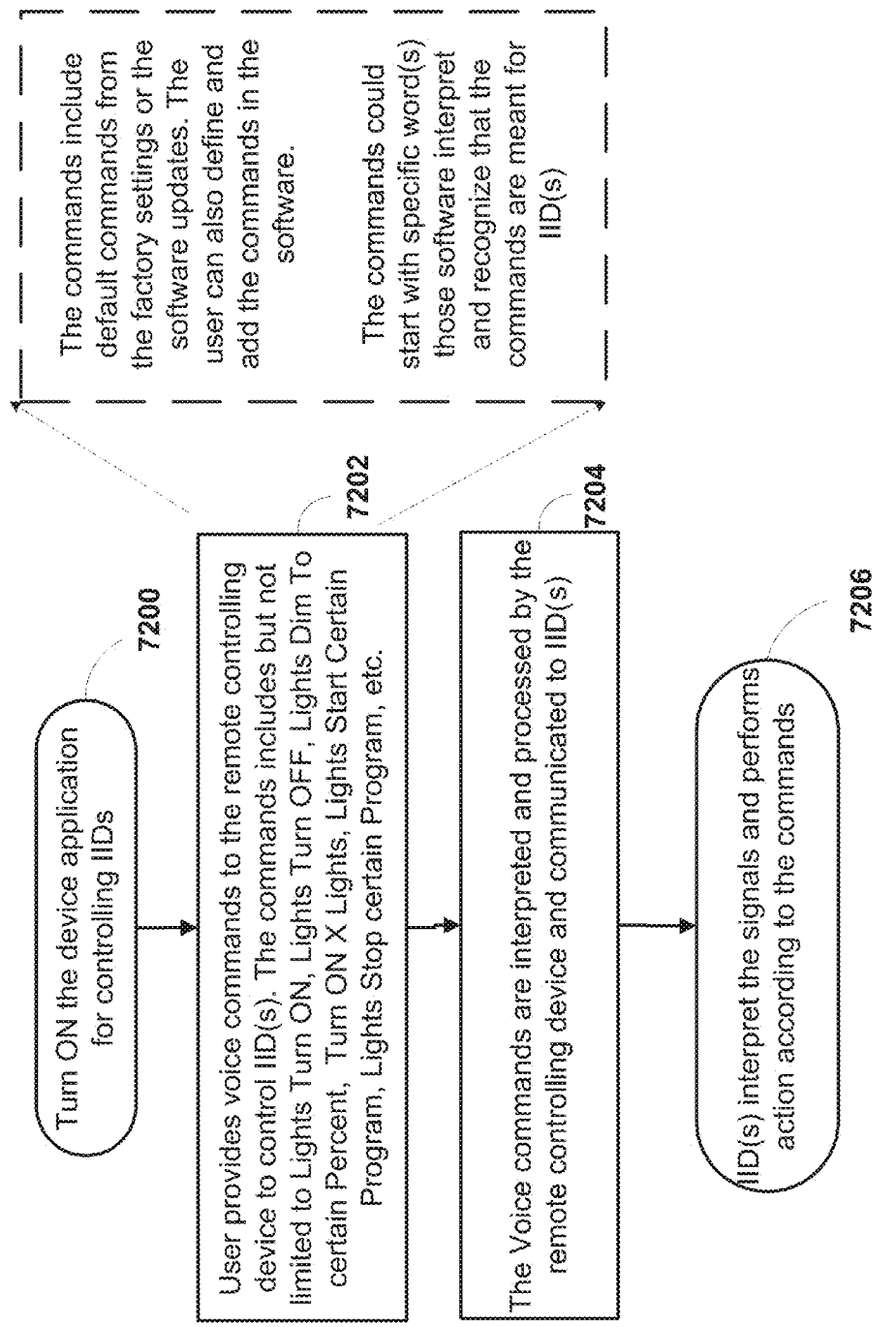
FIG. 72 is a flow chart illustrating using voice commands to control a lighting device in accordance with the present invention.

Referring to FIG. 72, instead of a user interacting directly via touch with the application on the controlling device, alternatively a user could use voice commands to execute and control one or many II Devices. The user turns ON the device application for controlling II Device(s) in block 7200, and provides voice commands to the remote controlling device to control II Device(s) in block 7202. Example voice commands can include, but are not limited to, Lights Turn ON, Lights Turn OFF, Lights Dim To certain Percent, Turn ON X Lights, Lights Start Certain Program, Lights Stop certain Program, etc. The voice command can also act as general setting and configurations, executing a program, executing a scene, or setting a schedule those could be default commands with factory settings or user created commands.

The voice service could be integrated into the device application or use the controlling device's own voice service. Popular voice commands such as 'Turn on X light' could be added to the reference database. The X in this consideration could be related to the level of control the user is selecting. For example, 'Turn on All lights' would turn on all II Devices. 'Turn on Bedroom lights' would turn on those II Devices in the room named 'bedroom'. The step 7204 includes that software interprets and recognizes the voice commands and convert those to specific electrical signals if the commands are meant for IID(s). Another step 7206 includes the remote device sending the commands to the II Device(s) and II Device(s) acting according to the commands. The commands can also always start with specific word or set of words so that the software recognizes the voice commands are for controlling the II Device(s) that also helps it ignore other unrelated voice inputs.

Figure 73:
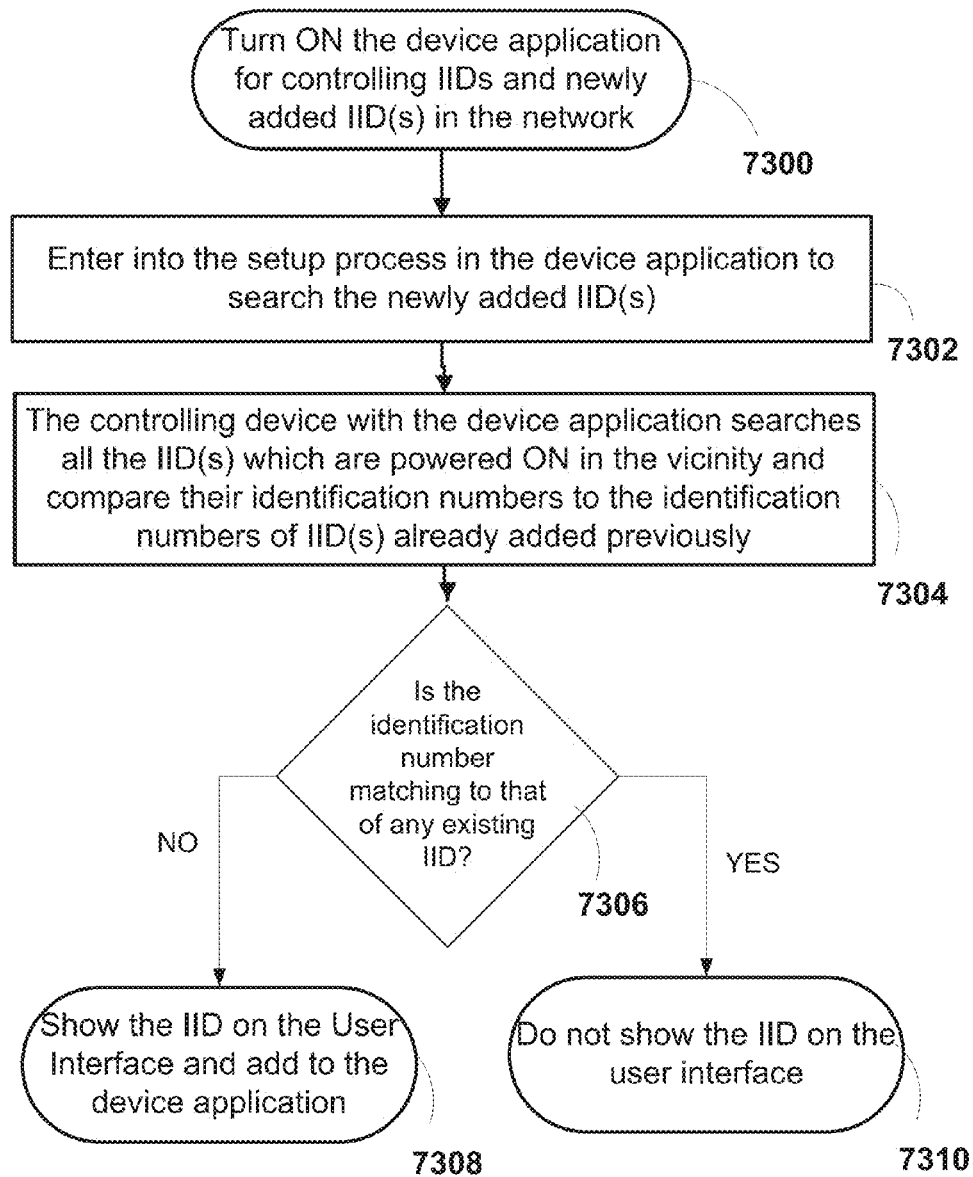
FIG. 73 is a flow chart illustrating setting up a network of lighting devices in accordance with one embodiment of the present invention.

Forming a network of II Devices with its controlling device (s) and adding II Device(s) in the existing network of its wireless controlling devices(s) such as Smartphone will now be described. Referring to FIG. 73, the setup process may include the wireless controlling device that is able to control the II Devices 140 in which wireless controlling device searches for powered II Devices 140 and adds them into its network. When a user wants to add new II Device(s) 140 to the existing network, the controlling device searches for all the II Devices 140 in the vicinity but shows only ones that are not part of the existing network, and user can add these new ones to the network. User can specifically ask device to search for new II Devices in the vicinity by going into the setup mode onto the device application 7302. This way it is convenient for the user to look and add only the new II Device(s) 140 instead of looking at the entire list of the devices and finding the right ones to add into the network. This is achieved by comparing the identification numbers of the existing II Devices into the network with II Devices to be added into the network 7304, 7306, 7308, 7310.

Figure 74:
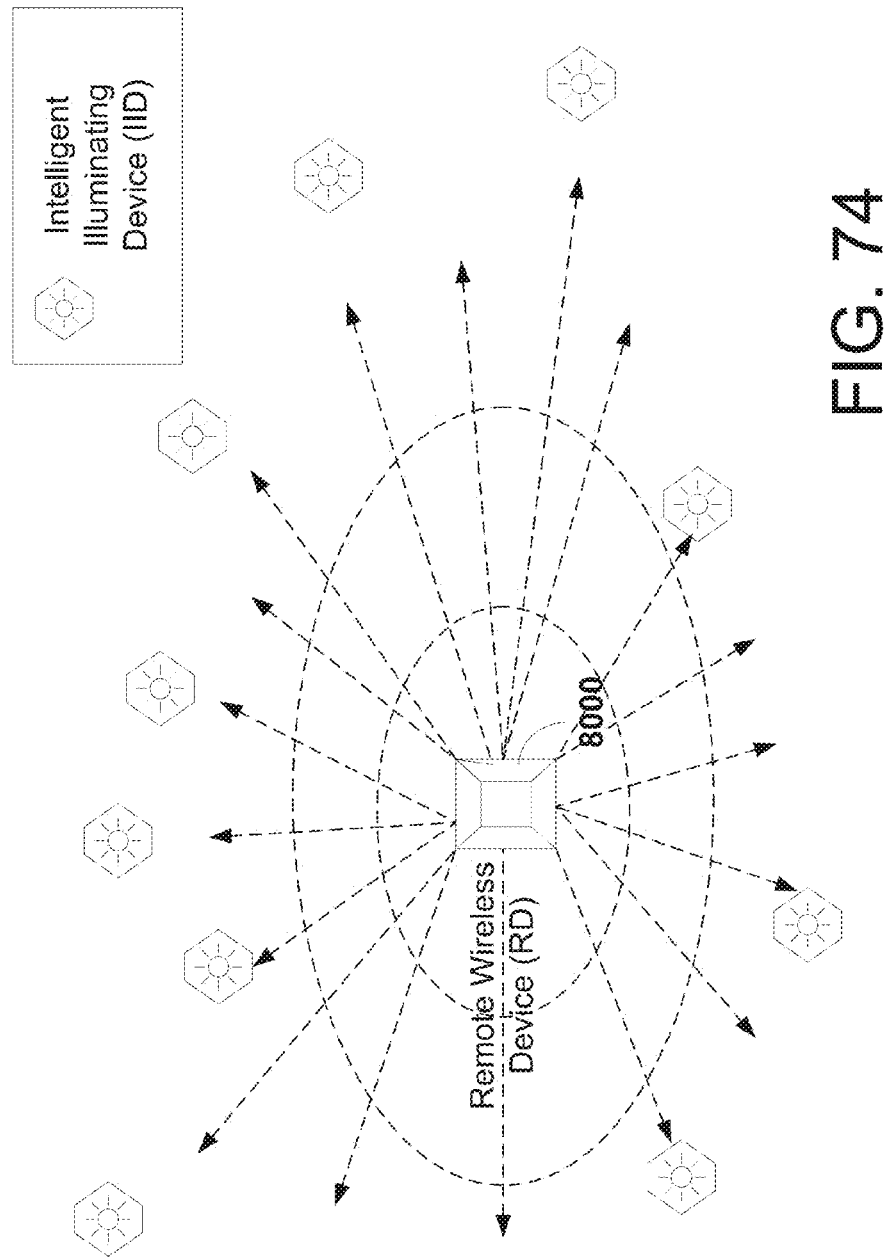
FIGS. 74 and 75 are a block diagram and flow chart for broadcasting commands in accordance with one embodiment of the present invention.
Figure 75:
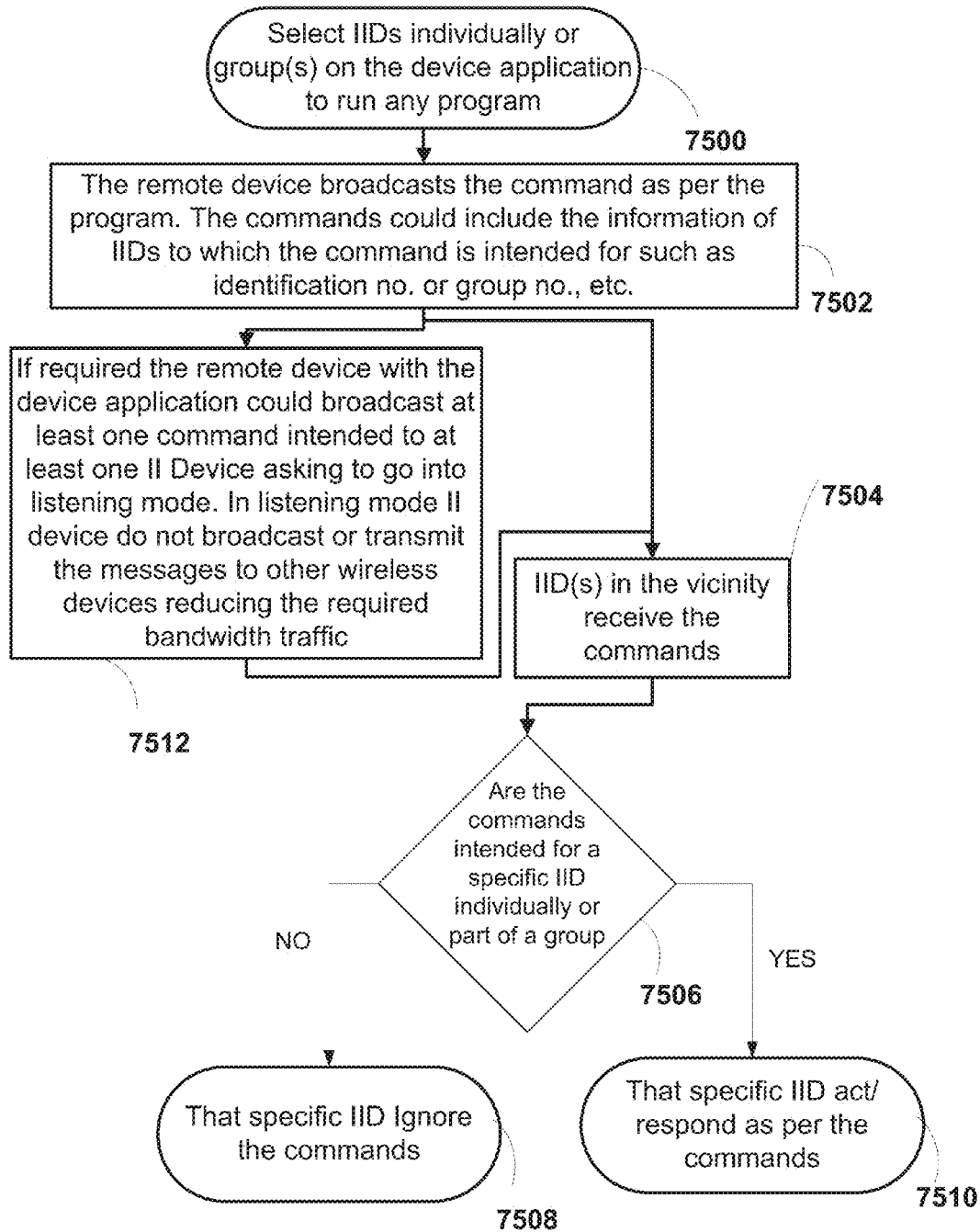

In some scenarios such entertainment stage where multiple lights are part of the system on the stage, very precise synchronization of the light effects may be required, i.e. no or very minimal delay in the light output changes of various lights is required. There are two ways where the remote wireless device (RD) controls or communicate with various II Devices 140. First, RD is connected to all II Devices in the vicinity and send commands or communicates with one by one in a serial fashion. Second, RD communicates with one or few of the II Devices in the vicinity and asks connected II Devices to communicate with other devices such as by forming a mesh network. In both the cases all II Devices 140 may not get commands simultaneously or in parallel because of which II Devices actions might not look synchronized even for the same command. More the number of II Devices, more the time required to send command to each II Device in the vicinity and worse the synchronization will be. This could be solved with wireless protocols such as Bluetooth Low Energy or BLE4.0 which support broadcasting. With this technique the Remote Wireless Device will broadcast the commands and all the II Devices in the vicinity within the range would get the commands simultaneously and act as per the commands. Referring to FIGS. 74 and 75, the Remote Controlling Device (RD) 7400 broadcasts the data or commands 7502 and all II Devices within the range receive it and act accordingly at the same time. In broadcast method here, II Devices 140 could be only in listening mode and need not send any acknowledgement to any other device or need not connect to any other device including RD 7400. With this there is less traffic of the wireless data flow providing better control over limited bandwidth availability, less communication error and less lost packets of data transmitted. In addition, there could be various individual or groups of II Devices that RD 7400 want to send commands at a time using broadcast method 7502. With broadcast all II Devices within the range receive the data/command 7504 from RD. The II Devices would check if the commands are intended for them as individually or part of a group 7506. And only those II DEVICE(s) would act/respond as per the commands to whom the command is intended for 7508, 7510. This is possible by having an identification number such as for individual II DEVICE(s) or group of II DEVICE(s) in the broadcast commands from RD 7400. In addition, if required the remote device with the device application could broadcast at least one command intended to at least one II Device asking to go into listening mode 7512. In listening mode II Device do not broadcast or transmit the messages to other wireless devices reducing the required bandwidth traffic. This may be required especially if II Devices are broadcasting any information or communicating to other devices causing increase in traffic in the available communication bandwidth. With II Devices going into the listening mode, the traffic will reduce helping reliability of the message transfer from remote wireless device to II Devices.

Figure 76:
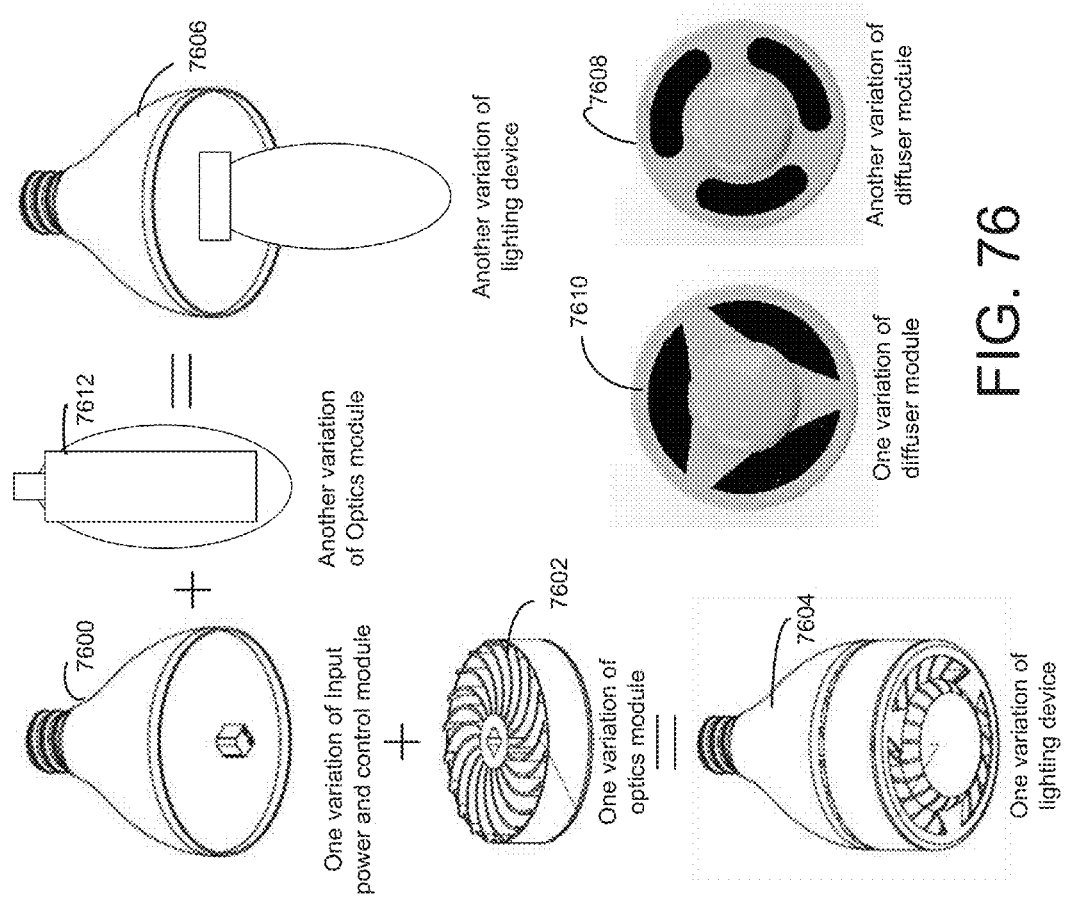
FIG. 76 illustrates an example of forming lighting devices from various parts in accordance with one embodiment of the present invention.

The modularity so that one can build his/her own lighting fixture will now be described. The lighting industry has been dependent on the existing form factors of lighting devices such as bulb, specific fixture, strip light, panels, etc. which are manufactured by the lighting companies and specified to designers. There is no easy tool where form factors of lights can be designed and produced at a unit level and can be installed in the infrastructure as required. With this there are limitations at the lighting installations level because of dependencies on the available form factors which also define the light output in terms of beam angle, lumens, color temperature, number of colors that can be produced, input socket, size and other dimensions, etc. Access to chose and use various parts of any light system in various capabilities and forms would give any individual or designer to design a specific light required for a specific area or room of an infrastructure. For example, with various forms having different specifications of different parts of any light such as input power module, optics module, control module, diffuser, lens, types of LEDs, form factors of LEDs such as on strip, on different shape of printed circuit boards meant for bulb, fixtures, panels, etc. designer would be able to design his own lighting devices as per his requirements. Various parts of a lighting device with different specifications where each part with at least one function such as providing input power trough mains input, controlling device, etc. could be made compatible to at least one other part performing different function so that when these parts come together they can form different variations of lighting device with permutations and combinations. Referring to FIG. 76 an example is shown of forming lighting devices from various parts. An input power and control module 7600 when combined with one variation of optics module 7602 gives one variation of lighting device 7604. Similarly when one variation of input power and control module 7600 combined with another variation of optics module 7612 gives another variation of lighting device 7606. Furthermore, the optic module 7602 could be of different parts with one diffuser lens 7610 or another diffuser lens 7608 part of it giving variations in optics module, here in terms of light output.

Figure 77:
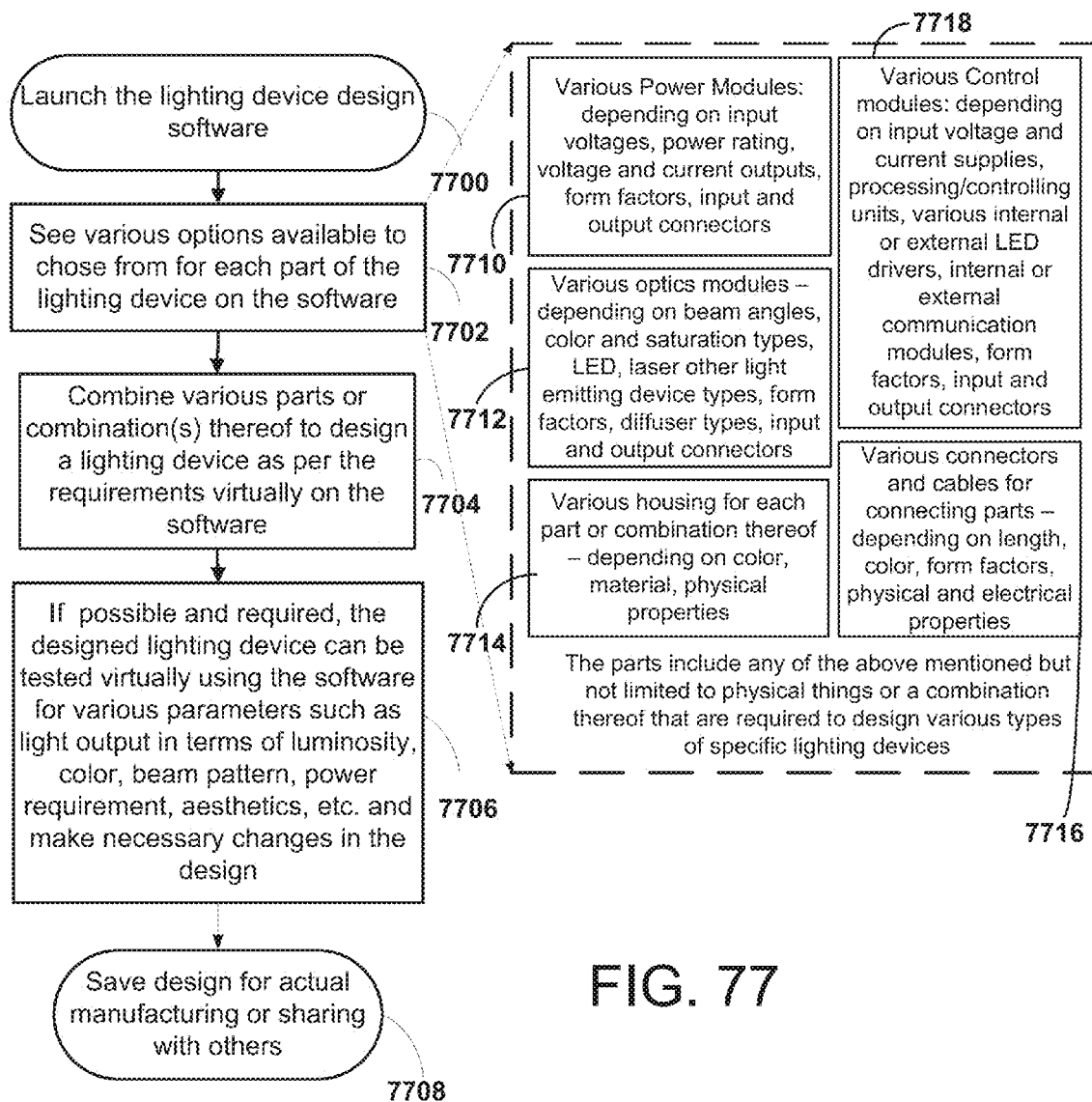
FIG. 77 is a flow chart illustrating a program for designing a lighting device in accordance with one embodiment of the present invention.

A software tool can provide a user or designer with all variations of all parts/modules that can be used to virtually form or design or create multiple different lighting devices through permutations and combinations. The user is able to select the various parts/modules required to design the lighting device using the software and potentially able to test the design for various parameters. Referring to FIG. 77, the user or designer can launch the software 7700 for designing the lighting device. On the software tool, the user can see various available parts/modules or combinations thereof 7702 which can be chosen and combined with different permutations and combinations 7704 to form at least one lighting device. The parts include but not limited to:

1. Various power modules 7710—Various Power Modules are formed based on different input voltages, power rating, voltage and current outputs, form factors, input and output connectors, etc.
2. Various control modules 7718—Various Control modules are formed based on different input voltage and current supplies, processing/controlling units, various internal or external LED drivers, internal or external communication modules, form factors, input and output connectors, etc.
3. Various optics modules 7712—Various optics modules are formed based on different beam angles, color and saturation types, LED, laser other light emitting device types, form factors, diffuser types, input and output connectors, etc.
4. Various housing modules 7714—Various housing for each part or combination thereof based on color, material, physical properties, entire housing in terms of various fixtures, panels, etc.
5. Various modular connectors and cables for connecting parts or combination(s) thereof 7716—Various connectors and cables for connecting parts based on length, color, form factors, physical and electrical properties, etc.

Once the lighting device is designed virtually on the software, user could test it for at least one parameter 7706 and make necessary changes in the design. The parameters include but not limited to light output in terms of luminosity, color and beam pattern, power requirement, aesthetics, etc.

Figure 78:
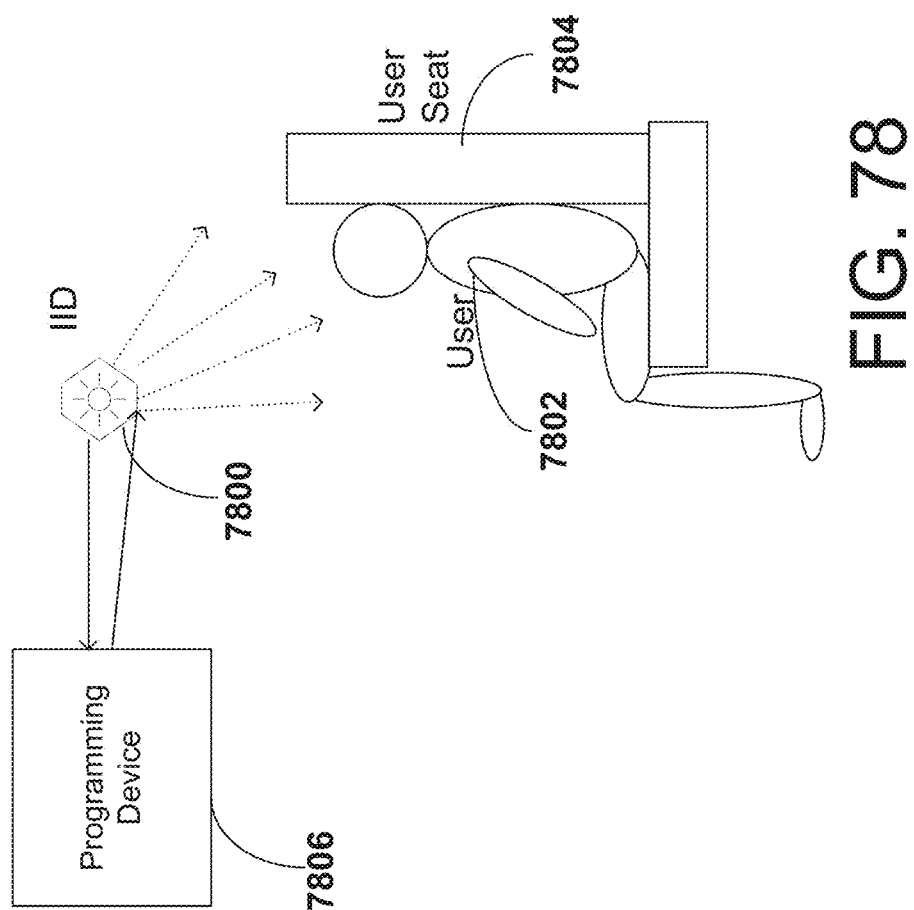
FIG. 78 is a block diagram showing a lighting device for geographical or space travel in accordance with one embodiment of the present invention.

Now referring to FIG. 78, a block diagram showing a lighting device for geographical travel, especially from one time zone to the other or space travel. The overhead light 7800 on a passenger seat 7804 could be made intelligent such as II Device 140 which can be programmed to provide simulated cycle of the sunlight throughout the day which could help reduce the effect of jet lag or other travel fatigue especially when the geographical locations of travel are far affecting the circadian clock of the user. The user can program the II Device 7800 to provide the simulated light based on his travel locations and day and times of the travel. Or user can input the information such as travel destinations and travel timings so that software controlling the II device calculates and provide required simulated light output. The II Device here need not be wireless, but could be wired directly to the controlling or programming device 7806 which provides the user interface for providing the inputs or directly programming the II Device 7800. There are numerous applications of such system such as in airplanes where user with simulated lighting could have better sleep pattern and minimize the jet lag effect.

Figure 79:
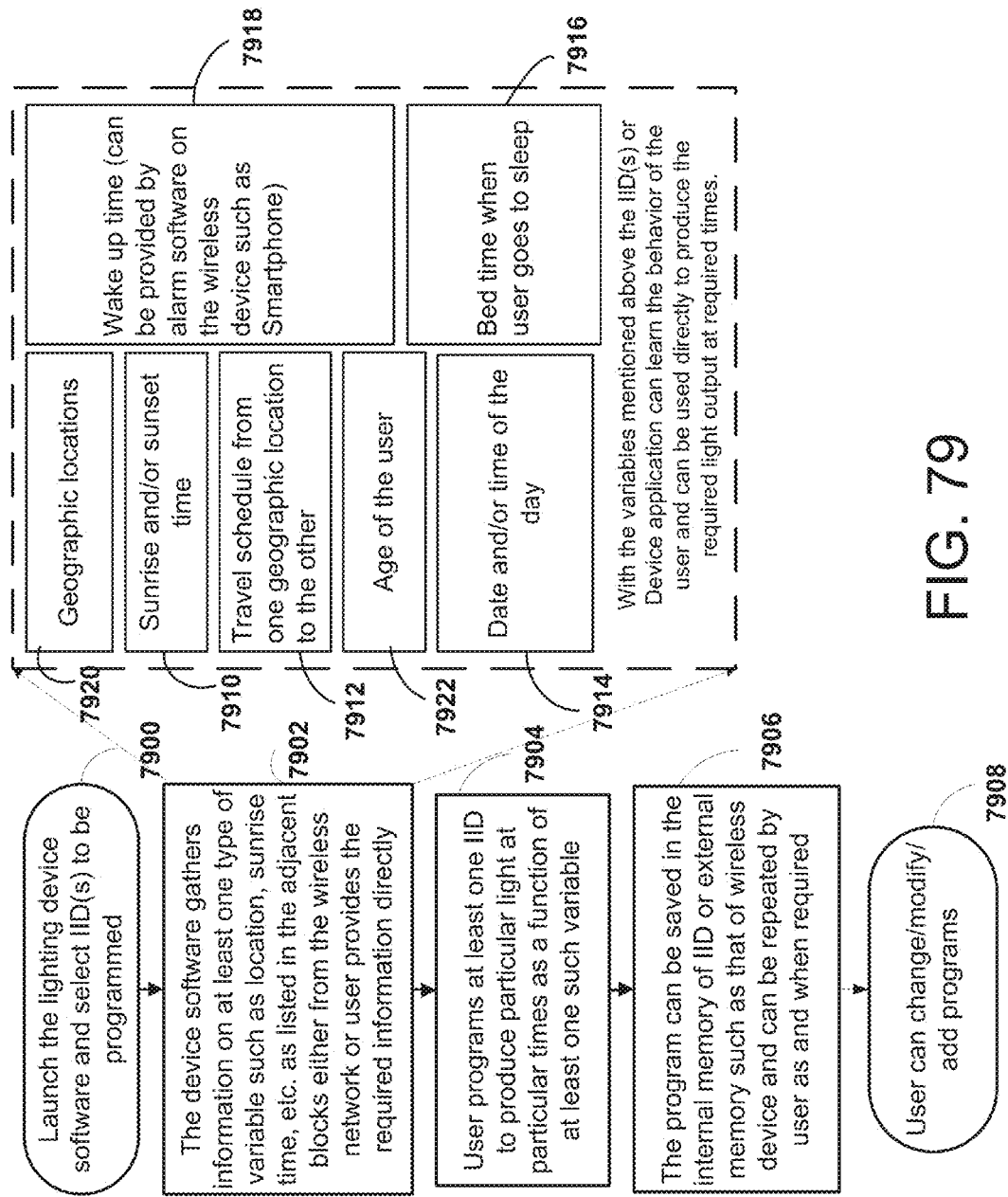
FIG. 79 is a flow chart illustrating how a user might want to program a lighting device to produce light as a function of at least one variable in accordance with one embodiment of the present invention.

Referring to FIG. 79, a flow chart illustrating how a user might want to program at least one II DEVICE 140 to produce light as a function of at least one variable is shown. The variables are such that when changed could affect user's daily activities and may include, but are not limited to:

1. Geographic location 7920;
2. Sunrise time 7910;
3. Sunset time 7910;
4. Date 7914;
5. Time of the day 7914;
6. Wake up time (can be provided by alarm software on the wireless device such as Smartphone) 7918;
7. Bed time when user goes to sleep 7916;
8. Travel schedule from one geographic location to the other 7912;
9. Age of the user 7922;
10. Light with warm and cool color temperature light.

There are multiple steps to create such programs for II DEVICE 140. First step involves launching the lighting device software on a wireless device 7900, while in the next step 7902 the device software gathers information on at least one type of variables mentioned above either from the wireless network or user provides the required information directly. Another step 7904 involves user programming at least one II DEVICE 140 to produce particular light at particular times as a function of at least one such variable mentioned above. The program(s) can be saved in the internal memory 108 of II DEVICE 140 or external memory such as that of wireless device and can be repeated by user as and when required as shown in step 7906.

The user can also program the II DEVICE as a function of at least one variable mentioned above and at least one variable as below:

1. Maximum warmness in terms of color temperature, such as light with 2300K color temperature is considered as a warm light;
2. Maximum coolness in terms of color temperature, such as light with 6000K color temperature is considered as a cool light;
3. Sensor input such as that from temperature information from a temperature sensor in a particular room.

Referring to FIG. 80, the user can define the color temperature of the light output as a function of time 8002. For example, the user can define the cool color temperature light output from the morning wake up time till the afternoon and later on day light color temperature light output till the evening and then warm temperature until the user goes to sleep. The function could be step function as described or could also be defined to gradually change the color temperature light output from one point of time to the other 8004. For example, the cooler temperature to the warmer temperature change could be with some function such as linear or exponential 8004. In addition with the variables mentioned above the II Device(s) 140 or Device application can learn the behavior of the user that can be used directly to create program(s) to produce the required light output at required times. This program can be a default program and user could customize it with the inputs of various times, color temperature changes at those times and function for gradual change in the color temperature from the one color temperature to the other. The user interface on the wireless device communicating with the II Device(s) 140 would provide the ability to the user to provide the time, color temperature and function inputs. The programs created could be stored in the internal memory 108 or external memory such as that of the wireless device 8006.

In addition, the programs could be modified or more programs could be added as and when required through the user interface on the wireless device 8008.

There could be multiple programs running for at least one II DEVICE 140 either internally in II DEVICE 140 itself or in external wireless devices such as Smartphone running application for II DEVICE 140. These programs could be function of time with which there may be conflicts while running various programs. The priority needs to be assigned to ensure the important programs override the less important programs for II DEVICE(s) 140. Referring to FIG. 81, this can be achieved by having user assign the priority for various programs through the user interface software running on the wireless device for controlling II DEVICE(s) 8104. The priority can be assigned in terms of numerical values or level such as "High", "Medium", "Less" 8104. There could be pre-defined or default programs with assigned priority which cannot be changed. On the user interface, the user can see all programs running for single or multiple II Devices in a list or grid or any other format and can assign the priority as required 8102. The priority can be stored in the internal memory of II Device or the external memory such as memory communicable coupled to the wireless device communicating with the II Device 8106. Different programs can have different priorities as a function of day or sensor input or any other condition 8104. For example, the program of light output in terms of color temperature change as a function of time of the day can have higher priority over the program for light output from II Device as a function of weather changes unless the weather condition becomes very harsh crossing the defined limit and warning has to be given to the user with certain color light output from the II Device(s).

Figure 83:
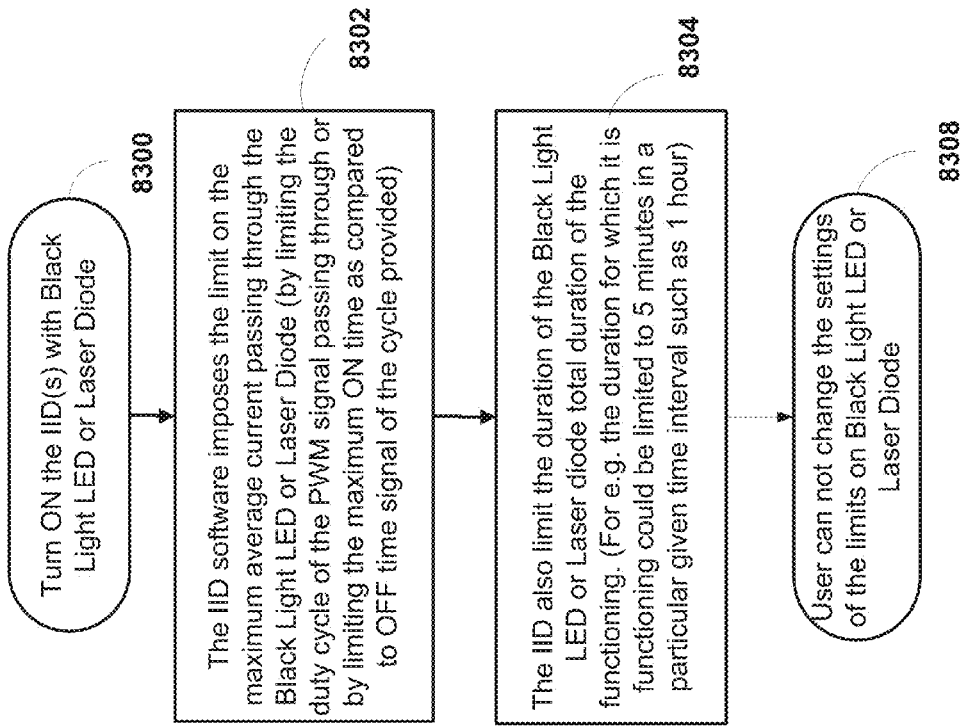
FIG. 83 is a flow chart illustrating how a lighting device can be used with fluorescent objects or laser diodes in accordance with one embodiment of the present invention.
Figure 82:
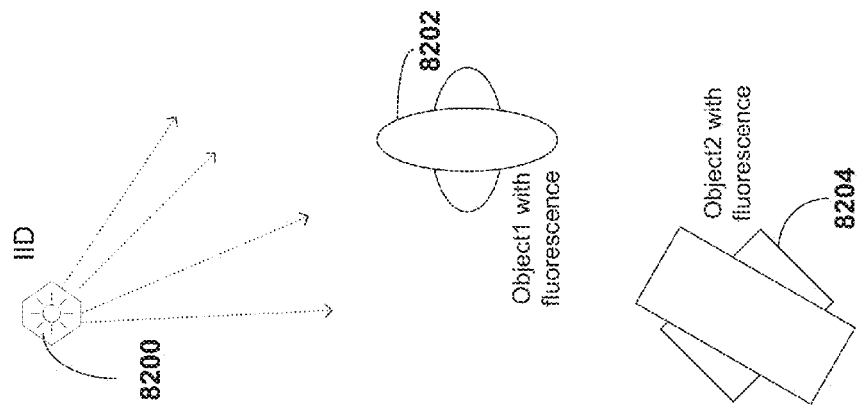
FIG. 82 is a block diagram illustrating how a lighting device can be used with fluorescent objects in accordance with one embodiment of the present invention.

FIG. 82 is a block diagram illustrating how a lighting device can be used with fluorescent objects. Black light also known as ultraviolet light can be part of the II Device 140 or 8200 as at least one type of LED. Black lights are employed for decorative and artistic lighting effects particularly in observing fluorescence, in which illuminating certain materials with UV radiation causes the emission of visible light, causing these substances to glow with various colors. The II Device 140 or 8200 can have the black light LEDs controlled in a similar fashion as other color LEDs are controlled. However, considering the potential health hazards of the UV light an important provision can be made to limit the duration and average current flowing through the black LED. As shown in FIG. 83, the II Device software could impose the limit on the maximum average current passing through the Black Light LED 8302, by limiting the duty cycle of the PWM signal passing through the Black Light LED or by limiting the maximum ON time as compared to OFF time of the signal for Black Light LED 8302. In addition, the IID also limit the duration of the Black Light LED total duration of the functioning 8304. For example, the duration for which it is functioning could be limited to 5 minutes in a particular given time interval such as 1 hour. his could be achieved by using the internal clock of the processor 106 or real time clock 110 of the II Device 140. With black LED one user could provide artistic lighting effect by illuminating various objects with fluorescence abilities.

Laser diode can be a part of the II Device 140 as at least one type of LED. Laser diodes are employed for entertainment lighting effects. The II Device 140 can have the laser diode of one or multiple colors light output controlled in a similar fashion as other color LEDs are controlled. However, considering the potential health hazards of the laser diode output light an important provision can be made to limit the duration and average current flowing through the laser diode. The II Device software could impose the limit on the maximum average current passing through the Laser Diode 8302, by limiting the duty cycle of the PWM signal passing through the Laser Diode or by limiting the maximum ON time as compared to OFF time of the signal for Laser Diode 8302. In addition, the II Device can also limit the duration of the Laser Diode total duration of the functioning 8304. For example, the duration for which it is functioning could be limited to 5 minutes in a particular given time interval such as 1 hour. This could be achieved by using the internal clock of the processor 106 or real time clock 110 of the II Device 140. With Laser Diode a user could provide entertaining lighting effect by emitting the laser beams at various places in the room.

Any selection level of a system, level, room, group, or individual II Device 140 can be set in combination with a command (configuration, program, or effect) to execute at a designated future time as represented in FIG. 84. Similar to a program, here an extension of program is to interpret that a user can schedule any number of II Devices 140 to do certain things at different times outlined in flow chart 8400. Including but not necessarily in this order, the scheduling program (8402) a user would select any combination of II Devices (8404). Then a user would select an automation or time characteristic (8406), including but not limited to time start/end, day start/end, day of the week start/end, or duration. The schedule could then be set to have additional properties (8408) such as repeatability (repeating on some schedule), effect commands such as fade-in or fade-out commands, or the like. Also, the user may specify the light command associated with the schedule select a pre-defined light command (8410). One II Device can have multiple future schedules. Similarly any selection level, such as a room, can have multiple schedules.

The selected schedule may then be stored in the related II Devices (8412), within the user interface (8414), or stored in an outside network like cloud storage (8416). At the appropriate scheduled condition, the II Devices in coordination with the related components of the lighting network would execute the set command in accordance with the additional properties (8418). The schedule may be presented to the user in a variety of ways (a user can see the set future scheduled events for any selection level of II Devices. These scheduled events could be organized and sorted based on the soonest to occur showing first. In addition, the scheduled events could have representations on what the command is, including color, brightness, program, effect or the like. Moreover, the II Device could show inherited schedules from higher levels of hierarchy, such that a single II Device could show a schedule set for a group that it is associated with. Furthermore, the schedule could be associated to a user.

Figure 85:
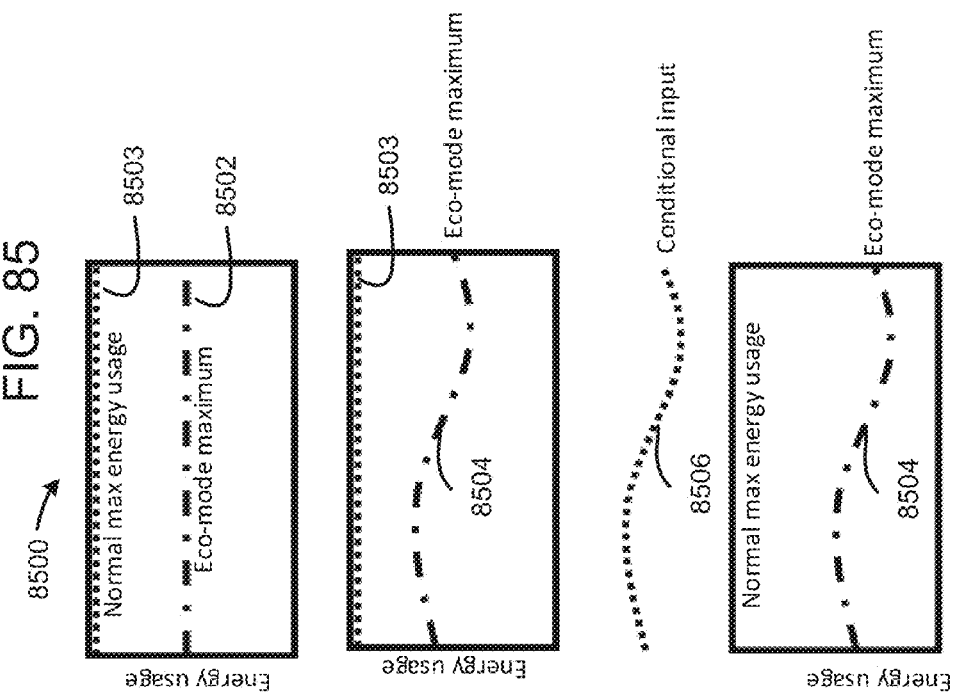
FIG. 85 is a flow chart of an eco mode for a lighting device in accordance with one embodiment of the present invention.

Referring to FIG. 85, an option could be made in the user interface to enact an eco mode for any level of control (8500). The eco mode would be geared towards optimizing efficiency with regards to energy usage. For example, the selected lights would be dimmer using less energy. In addition, other applications like proximity, sunset/sunrise monitoring, ambient light sensing, and other information could be used to create an eco footprint.

For example, when a user selects the eco mode option, it can set a reduced energy usage (8502) for the related II Devices that would be lower than the overall maximum energy usage (8503). The lowered energy usage here could be attributed and associated with a reduction in light output, wireless strength, or light qualities such as CRI or color temperature. In addition, the lowered maximum energy usage might be variable over time (8504) with respect to the general maximum energy usage (8503). This variable energy usage (8504) could be related to an additional condition such as time of day, seasonality, available sunlight, as a proportion of the general energy usage, or with respect to other conditions (8506). For example, the Eco mode might be triggered or controlled with respect to overall power grid demand. Here, a signal could be sent to the WD or directly to the II Devices indicating a high-demand period of energy use as a condition (8506). In response a variable eco-mode maximum energy usage could be set (8504) so that the power consumption of the II Devices is reduced. The Eco mode could be a general selection mode on top of any other command limiting the overall brightness produced by the II Devices. Or, the eco mode could be limited to a set number of II Devices and any other configuration would be in replacement to the Eco configuration.

Figure 86:
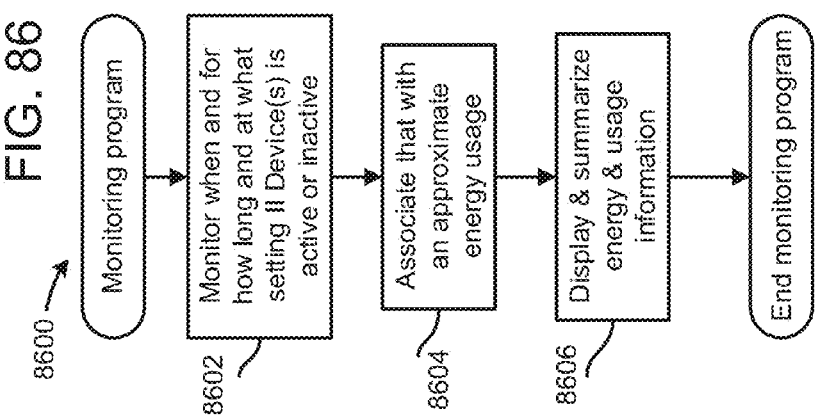
FIG. 86 is a flow chart of monitoring program for a lighting device in accordance with one embodiment of the present invention.

As shown in FIG. 86 in a monitoring program (8600), each II Device or the controlling device has the ability to monitor when and for how long and at what setting the related II Device is active or inactive (8602), and the II Device can associate that with an approximate energy usage required (8604) and relay that information back to the controlling device. The controlling device can then summarize and display that information in a user interface screen (8606) to summarize the energy usage of one or many II Devices. The energy usage might be translated to alternative metrics such as $'s or carbon dioxide offset. This information could be tracked under multiple parameters such as YTD, past week, lifetime, and the like. This information could be stored locally in the app, saved to an associated cloud location, or sent to an alternate source such as a utility monitoring program or the like.

Figure 87:
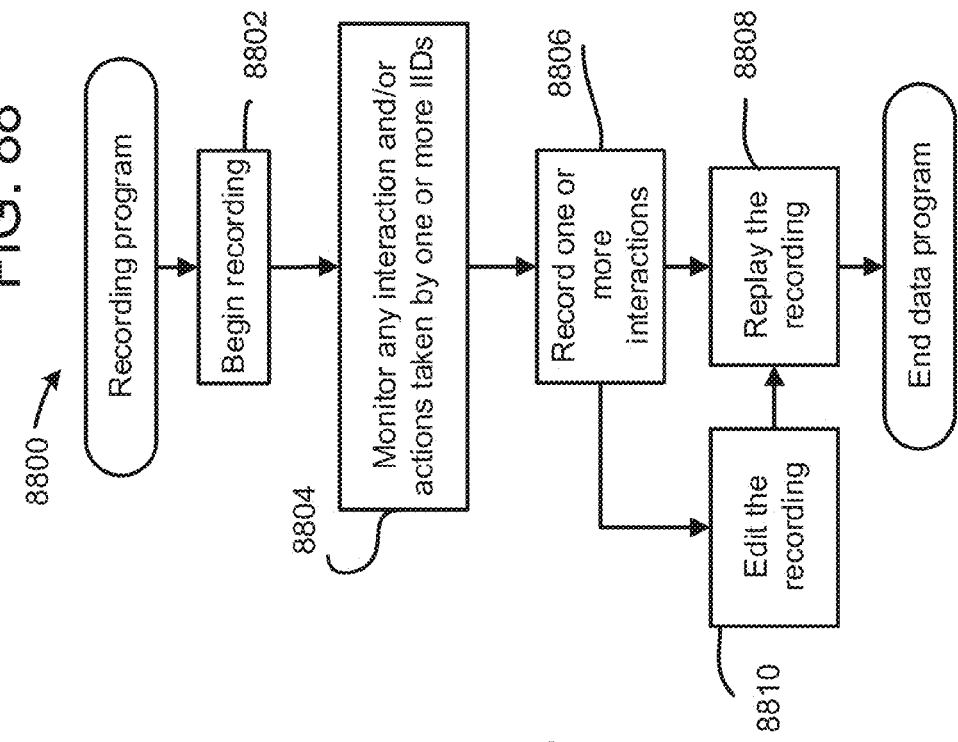
FIG. 87 is a flow chart of a data program for a lighting device in accordance with one embodiment of the present invention.

As the connected device has access to the web either through a local area network or a wireless network, the application could access various data feeds via the connected device on the web that can be used as programming inputs to one or more II Devices as referenced in FIG. 87 (8700). The data feed (8701) would be accessed by the IID or connected device (8702). Alternatively, there could be a bridge or secondary connected device within the lighting network that is connected to the web and has access to the web service data feeds (8703). The data would then be mapped and interpreted into one or more light settings for the one or more IIDs (8704). The mapping and interpretation could be through a combination of predefined or user defined methods.

The data feeds could be accessed with one or more data access settings (8706) including but not limited to a one-time access, continuously accessed, accessed upon a condition or event, or upon user input. Example conditions for the data programming could be defined from a time of day, calendar day, day of week, additional data condition, additional program, or any combination thereof. For example, various local weather data feeds could be accessed through various web services on the connected device. This information could then be used to create different lighting configurations or settings, such as a light being bluer or redder based on the temperature. In addition, the weather information could be used to assume the overall overcast conditions and level of brightness and similarly adjust any number of II Devices accordingly.

A user could schedule the data programming functions for a set time or reoccurring dates/times associated to any number of II Devices. For example, a user could set a weather program to have an II Device to reflect the weather outside on weekdays from 7 am to 8 am. Only at that time would the II Device and the controlling devices look for the data information, send it to the associated II Device and the associated command.

Other forms of data include but are not limited to, stock or commodity trading or market information, incoming phone calls or messages, application or web alerts such as those from social media applications, sunset/sunrise times, or any other data feed indicators.

Figure 88:
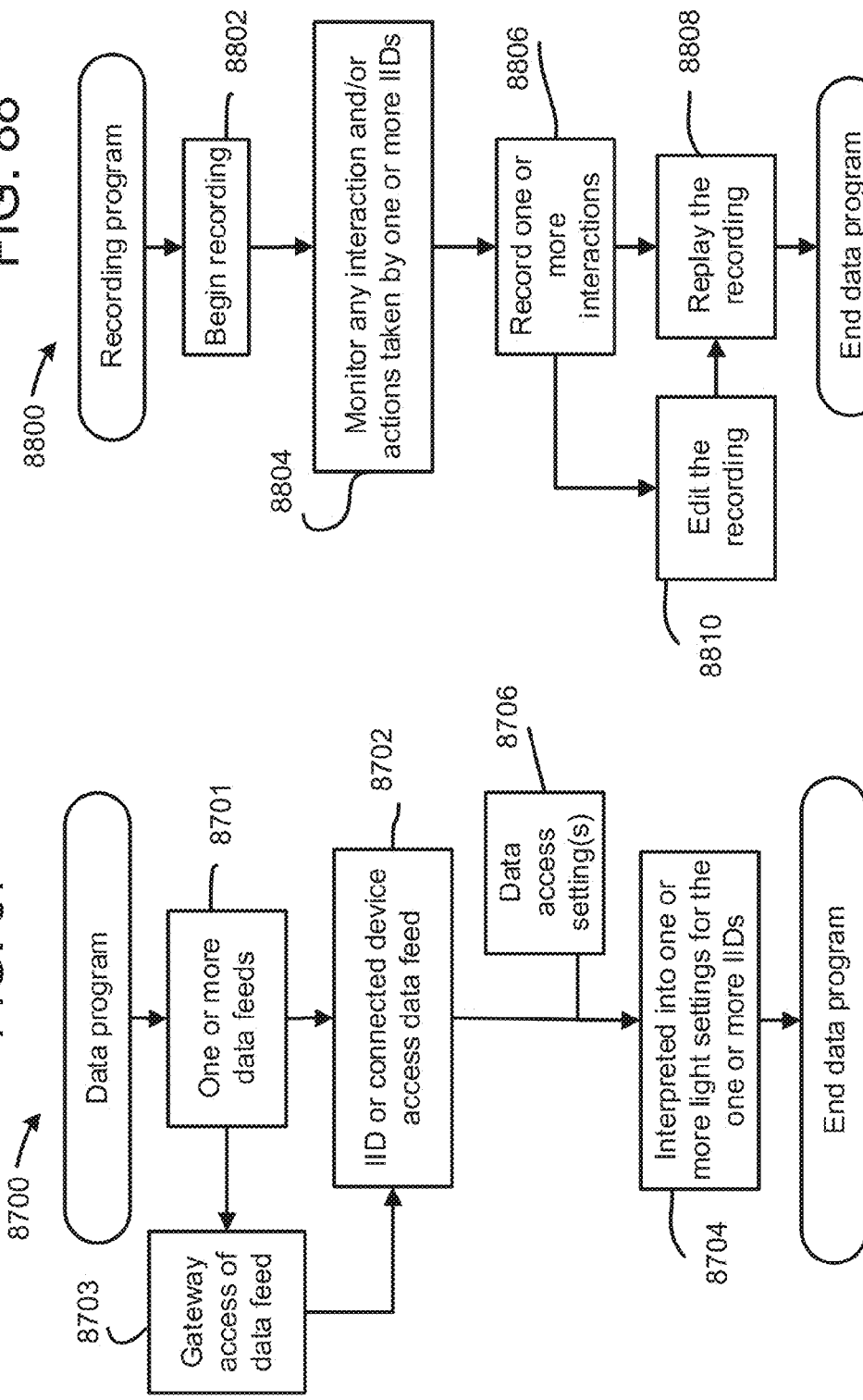
FIG. 88 is a flow chart of recording program for a lighting device in accordance with one embodiment of the present invention.

There can be a program as shown in FIG. 88 where the application device can be set to record a series of actions executed by the II Devices and played back at a later time (8800). Initially, a setting would be selected within the controlling device to begin the recording (8802). The controlling device and/or II Devices would then monitor any interaction and/or actions taken by one or more II Devices (8804). The user's interaction and actions could come from an outside program or through direct user interaction through the controlling device to one or many II Devices over a time period. The intended one or more series of interactions and actions can then be recorded and committed to memory (8806). Afterwards the recording of the sequence of one or more commands can be replayed upon a user request or through some other program (8808). This would allow someone to set-up favorite effect or program sequences and recall the sequence of settings at any time. The sequence could be a function of a general step-by-step sequence or it may be a function of time between each step of the sequence. A user could have the ability after recording to edit the recording in various ways (8810), cropping, cutting, adjusting the time, or changing any number of different aspects of the recorded lighting sequence as required.

Within the device application a user can create or have access to predefined lighting effects. These effects can simulate certain environments, ambiances, or functional aspects. A user can select an effect, select any number of II Devices (either through groups/rooms, or individual control), then execute that effect at that time or upon a further schedule. These effects range from simulating certain environments, such as a moving blue ocean, flickering orange candlelight, a strobe, or other effects, to other lighting effects beneficial for film or general use such as, fire, television, lightning, headlights, flashes of light from explosions/gun fire. Further, the effect might be linked to some other event such as taking a photo and having a flash effect.

A photo or video is composed of a series of pixels that have an associated color. In this sense, these pixels can be extracted to relate to a command given to one or many II Devices in an image reflection program as referenced in FIG. 89 (8900). The associated commands could be similar all relating to a general type of pixel or each different with different selected pixels associated to different II Devices. From photo or video (8901), an image including content and information relating to color elements or pixels within that photo or video will be obtained either through the controlling device, the application interface, a display signal, or an outside means (8902). The image and associated color element could be broken out into one or more different areas of the picture (8904). Additionally, the image could be compressed, converted, or modified as needed. This break-up could be done based on contrasting dominant color schemes, x & y coordinates or quadrants within the image, a user selection, a random sampling of the image, or some combination of the previous. These various broken out areas can then be interpreted either via an average, modal, or other approach into one or more colors (8906). These colors can then be mapped to one or more II Devices (8908). In addition, the assignment of pixels to one or many II Devices can be user generated or automated. If automated, the device application could use information on the layout of the II Devices in the proximity location to help identify spatial relationships where the II Devices are related to a frame. The related II Devices would then emit a light associated with the interpreted colors (8910).

A sequence of pictures or video could similarly be monitored as a sequence of images or frames over time (8912). This could be done based on every frame or a defined number of frames to optimize the performance. The photo or video could be viewed directly on the connected device or a separate display, such as a television. If in a separate display, the connected device could be an intermediary between the display and the II Devices. Alternatively, the display can be directly connected to the II Devices or have a connected router or bridge that can monitor the display and send a command directly to the II Devices. The overall effect would provide a light setting or sequence that extends the visual display of an image to the ambient environment. This would immerse a user within an image or video and create the potential for a surround effect with lighting.

Referring to FIG. 90, a process for creating a scene in a quick and convenient fashion is described (9000). Through general use, a user will go through the effort of personalizing and creating a combination of light settings in relation to one or more II Devices, or scenes. It would therefore be convenient to the user to easily save and replay these scenes without going through the process of returning each individual II Device. Instead, the wireless device working with the device application can at any time capture the scene as the current state of the one or more II Devices and their respective light setting (9002). The capture can either be through a manual user interaction with the device application (9003) or upon some other event such as through an automated timeframe or as part of a program (9004). Additionally, the capture of the scene could be taken from a static lighting setting or as a single frame from within a dynamic light setting. The one or more II Devices could be captured in an individual or a group form.

After capturing the scene, the one or more II Devices and their related light settings could be saved to the device or application memory as a new scene (9005). The process of saving could be automatic or require manual input or interaction to save. The saved new scene could then be viewed or edited (9006) to adjust any metadata or settings related to the one or more II Devices and their related light settings. The scene could also be replayed or executed at a later time either through a user interaction within the device application or through some user or pre-defined program (9008). At which point, the one or more II Devices will then emit the saved light settings as originally captured and stored within the scene (9010).

As lighting is fairly well and universally distributed, the function of the II Devices 140 might be used to provide various location services and interactions as represented in FIG. 91. Here, one or more II Devices 140 could be placed in an area (9102). The II Devices defined at a minimum of requiring a wireless transceiver/receiver and one or more LEDs. The II Devices would be set to send out a periodic message that includes an identifier for each specific II Device (9104). The identifier could be user defined or predefined. Similarly, the II Devices could monitor or listen for the presence of other wirelessly addressable devices within range (9106), as example if the II Device uses Bluetooth then the II Device 140 would look for all available Bluetooth devices within range. Also, the II Devices could alternate between a sending and listening mode (9108).

The II Device could then find one or more compatible wirelessly addressable device within range or the wirelessly addressable device could find one or more II Devices within range (9110). After the one or more II Devices and the one or more wirelessly addressable devices find each other, a predefined or user defined action may result (9112). One example action includes prompting the wirelessly addressable device with a message or advertisement (9114). Another example action includes matching the II Device identifier with some other information stored within the wirelessly addressable device or a related device application (9116). Here, the II Device identifier could be associated to a specific location key within the space. Another example action includes the wirelessly addressable device sending a command to the one or more II Device to change to a different light setting (9118). At the same time, a sequence within a device application on the wirelessly addressable device could be triggered that changes the view of the device application to bring up location specific content (9120). Similarly, the one or more II Devices could change to draw attention to that space, perhaps changing color, brightness, or executing a lighting effect.

There might also be a sequence of actions taken as a combination or result of any of the predefined actions between the one or more II Devices and the wirelessly addressable devices (9122). As example, after a first action between an II Device and the wirelessly addressable device where the II Device identifier is recorded by the wirelessly addressable device, the wirelessly addressable device could send a message through the web to a separate database that records the interaction taking place along with other metadata including the time of the interaction, the length of the interaction, the signal strength of the interaction, or other information.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A lighting device comprising:
   a housing;
   an AC/DC or DC/DC power converter disposed within the housing;

a controller/processor electrically connected to the AC/DC or DC/DC power converter and disposed within the housing;

a light emitting diode (LED) current control circuit communicably coupled to the controller/processor and electrically connected to the AC/DC or DC/DC power converter and disposed within the housing; and one or more LEDs electrically connected to the LED current control circuit and disposed proximate to or within an aperture of the housing.

2. The lighting device as recited in claim 1, wherein the one or more LEDs comprise at least a first type or color LED and a second type or color LED.

3. The lighting device as recited in claim 1, wherein the housing has a bi-pin connector electrically connected to the AC/DC or DC/DC power converter.

4. The lighting device as recited in claim 1, wherein the housing has a plug-in connector electrically connected to the AC/DC or DC/DC power converter.

5. The lighting device as recited in claim 1, wherein the housing has a battery connector electrically connected to the AC/DC or DC/DC power converter.

6. The lighting device as recited in claim 1, further comprising a heat sink disposed within or outside the housing.

7. The lighting device as recited in claim 1, further comprising:

the housing comprises a can light housing;

a wire, a cable or a connecting strip electrically connected to the AC/DC or DC/DC power converter;

an electrical connector electrically connected to the wire, the cable or the connecting strip; and a heat sink disposed within or integrated into the can light housing.

8. The lighting device as recited in claim 1, further comprising a reflector disposed within the aperture of the housing and around the two or more LEDs.

9. The lighting device as recited in claim 1, further comprising a diffuser or lens sealing the aperture of the housing.

10. The lighting device as recited in claim 1, the one or more LEDs comprising two or more LEDs having different type or colors, and the LED current control circuit provides an on/off signal having a cycle time to each LED in response to one or more control signals received from the controller/processor such that two or more LEDs produce a blended light having a specified color based on how long each LED is turned ON and/or OFF during the cycle time.

11. The lighting device as recited in claim 10, wherein the specified color is produced by turning ON the first color LED for a first portion of the cycle time and turning ON the second color LED for a second portion of the cycle time.

12. The lighting device as recited in claim 1, the one or more LEDs comprising two or more LEDs having different colors and the two or more LEDs are not turned ON at the same time.

13. The lighting device as recited in claim 1, the one or more LEDs comprising two or more LEDs having different colors and each LED is turned ON and OFF for a time period calculated using a count corresponding to a color and brightness combination.

14. The lighting device as recited in claim 1, wherein the LED comprises a series of LEDs, a group of LEDs, an array of LEDs, two or more series-connected LEDs, two or more parallel-connected LEDs or a combination thereof.

15. The lighting device as recited in claim 1, wherein the one or more LEDs comprise a blacklight or ultraviolet LED selected to illuminate one or more fluorescent objects.

16. The lighting device as recited in claim 1, wherein the one or more LEDs comprise a laser diode selected to illuminate one or more objects based a current or timing limitation of the laser diode.

17. The lighting device as recited in claim 1, further comprising a memory communicably coupled to or integrated into the controller/processor.

18. The lighting device as recited in claim 1, wherein the LED current control circuit comprises a PWM driver, a switching or multiplexer circuit, or one or more LED driver circuit.

19. The lighting device as recited in claim 1, further comprising an ambient light sensor circuit communicably coupled to the controller/processor.

20. The lighting device as recited in claim 19, the ambient light sensor detects a level of one or more color components of an ambient light, wherein the one or more color components comprise a red, a green, a blue, a cyan, a yellow, a magenta, or a black.

21. The lighting device as recited in claim 19, the ambient light sensor is located to detect an ambient light and a light emitted by the lighting device such that the controller/processor adjusts one or more of the on/off signals provided to the two or more LEDs.

22. The lighting device as recited in claim 19, wherein the ambient light sensor is disposed on a LED board with the one or more LEDs.

23. The lighting device as recited in claim 1, further comprising a hard reset circuit communicably coupled to the controller/processor.

24. The lighting device as recited in claim 1, the DC/DC or AC/DC power converter comprising a battery, a battery backup or a rechargeable battery.

25. The lighting device as recited in claim 1, further comprising a wireless energy receiver connected to the DC/DC or AC/DC power converter.

26. The lighting device as recited in claim 1, further comprising an external switch communicably coupled to the controller/processor that controls the lighting device based a program triggered by a specified number of ON/OFF combinations from the external switch within a specified period of time.

27. The lighting device as recited in claim 1, further comprising:

a wireless transceiver circuit communicably coupled to the controller/processor; and an antenna communicably coupled to the wireless transceiver circuit.

28. The lighting device as recited in claim 27, the antenna is external to the lighting device.

29. The lighting device as recited in claim 27, further comprising a signal booster or repeater communicably coupled to the antenna.

30. The lighting device as recited in claim 27, further comprising one or more other lighting devices, remote controllers, wireless controllers, wireless devices, sensors, other devices, or a combination thereof that communicates with the controller/processor of the lighting device using the wireless transceiver circuit, the antenna and one or more communication protocols.

31. The lighting device as recited in claim 30, further comprising a group of lighting devices comprising the lighting device and at least two or more of the other lighting devices.

32. The lighting device as recited in claim 30, wherein one or more parameters of the lighting device or the one or more other lighting devices are displayed on the remote controller, wireless controller or wireless device.

33. The lighting device as recited in claim 30, wherein the lighting device or the one or more lighting devices are displayed on the remote controller, wireless controller or wireless device in accordance with a user-defined filter or a user-defined sorting based on one or more criteria.

34. The lighting device as recited in claim 30, the one or more communication protocols comprising multiple simultaneous communication protocols.

35. The lighting device as recited in claim 30, wherein a communication or discovery of the one or more other lighting devices, remote controllers, sensors, other devices, or a combination thereof are based on a signal strength.

36. The lighting device as recited in claim 30, the controller/processor controls the one or more LEDs based on data received from the one or more sensors.

37. The lighting device as recited in claim 36, further comprising an intermediate device communicably coupled between the controller/processor and the one or more sensors.

38. The lighting device as recited in claim 30, wherein the one or more sensors comprise a motion or accelerometer sensor.

39. The lighting device as recited in claim 30, the controller/processor receives and executes one or more commands from the one or more other lighting devices, remote controllers, sensors, other devices, or a combination thereof.

40. The lighting device as recited in claim 39, the one or more commands comprise one or more voice commands.

41. The lighting device as recited in claim 39, the one or more commands comprise one or more broadcast commands.

42. The lighting device as recited in claim 39, wherein the one or more commands select and control one or more groups of lighting devices using a user interface on the wireless controller or wireless device.

43. The lighting device as recited in claim 39, wherein the one or more commands select and control one or more favorites of lighting devices or one or more screens of lighting devices using a user interface on the wireless controller or wireless device.

44. The lighting device as recited in claim 39, wherein the one or more commands select and control one or more modes or programs of lighting devices using a user interface on the wireless controller or wireless device.

45. The lighting device as recited in claim 39, wherein the one or more commands select and control a color, a brightness or a saturation of one or more groups of lighting devices using a user interface on the wireless controller or wireless device.

46. The lighting device as recited in claim 39, wherein the one or more commands select and control a color, a brightness or a saturation of one or more favorites of lighting devices using a user interface on the wireless controller or wireless device.

47. The lighting device as recited in claim 30, wherein the lighting device and the other lighting devices are part of a mesh network, a group or a combination thereof.

48. The lighting device as recited in claim 47, wherein the controller/processor provides a status information to the other lighting devices, remote controllers or other devices within the mesh network or group.

49. The lighting device as recited in claim 47, wherein the controller/processor receives a status information from the other lighting devices, remote controllers or other devices within the mesh network and uses the status information as an input to execute one or more commands, change the on/off signals, trigger a communication or command to the mesh network or group, or a combination thereof.

50. The lighting device as recited in claim 47, wherein the controller/processor enters a discovery mode to detect the other lighting devices within the mesh network or group when the lighting device is turned on.

51. The lighting device as recited in claim 30, wherein the one or more other devices relay and/or transmit one or more commands.

52. The lighting device as recited in claim 30, the one or more other devices comprising an access point, a repeater or a booster.

53. The lighting device as recited in claim 1, wherein the controller/processor executes one or more modes or programs to control the LED current control circuit to produce a light in accordance with the one or more modes or programs.

54. The lighting device as recited in claim 53, wherein the one or more modes or programs comprise one or more default modes or programs, one or more user created modes or programs, one or more user profiles, an application programming interface program, a diagnostic/testing program, a user interface, or a combination thereof.

55. The lighting device as recited in claim 54, wherein the application programming interface program include a memory read/write function, a sensor communication setup function, a color adjustment function, a brightness adjustment function, an amplitude/saturation function communications setup function, or a combination thereof.

56. The lighting device as recited in claim 54, wherein the one or more user profiles are shared between the lighting device and the one or more other lighting devices.

57. The lighting device as recited in claim 53, wherein the one or more modes or programs include a reintegration mode that when executed reconnects the lighting device to the one or more other lighting devices.

58. The lighting device as recited in claim 53, wherein the one or more modes or programs when executed selects a level of control of the lighting device, converts the selected level of control into one or more light control settings, and transmits the one or more light control settings to the lighting device for execution by the controller/processor.

59. The lighting device as recited in claim 53, wherein the one or more modes or programs when executed selects the lighting device or one or more other lighting devices, and assigns the selected lighting device(s) to a new or existing group of lighting devices.

60. The lighting device as recited in claim 53, wherein the one or more modes or programs when executed selects the lighting device, one or more other lighting devices or one or more groups of lighting devices, selects a configuration or one or more settings for the selected lighting device(s), selects a timing condition when the selected configuration or settings are to executed, and saves the selected timing condition and selected configurations or settings as an automated mode or program.

61. The lighting device as recited in claim 53, wherein the one or more modes or programs includes a soft reset process.

62. The lighting device as recited in claim 53, wherein the one or more modes or programs includes a visual or virtual representation of the lighting device located within one or more spaces.

63. The lighting device as recited in claim 53, wherein the controller/processor includes a security program that when executed prevents unauthorized access to the one or more modes or programs.

64. The lighting device as recited in claim 53, wherein at least one of the one or more modes or programs are assigned a priority.

65. The lighting device as recited in claim 53, wherein the one or more modes or programs comprise a learning program that when executed learns an activity, routine or behavior of a user and operates the lighting device in accordance with the activity, routine or behavior of the user.

66. The lighting device as recited in claim 53, wherein the one or more modes or programs comprise a circadian clock program.

67. The lighting device as recited in claim 53, wherein the one or more modes or programs when executed adjust the lighting device as a function of a color temperature and a time.

68. The lighting device as recited in claim 53, wherein the one or more modes or programs comprise a scheduling program.

69. The lighting device as recited in claim 53, wherein the one or more modes or programs comprise an energy reduction program, energy monitoring program, energy reporting program, or a combination thereof.

70. The lighting device as recited in claim 53, wherein the one or more modes or programs comprise a data program that when executed translates a data feed into one or more light settings or commands based on one or more user-defined or default settings.

71. The lighting device as recited in claim 53, wherein the one or more modes or programs comprise a recording program that when executed captures and plays back one or more commands received by the lighting device.

72. The lighting device as recited in claim 53, wherein the one or more modes or programs comprise an image reflection program that when executed translates one or more images, sequences of images or characteristics of images into one or more lighting conditions.

73. The lighting device as recited in claim 53, wherein the one or more modes or programs comprise a quick scene creation program that when executed captures, saves and executes one or more scenes or settings.

74. The lighting device as recited in claim 53, wherein the one or more modes or programs comprise a location services and interactions program.

75. The lighting device as recited in claim 1, the controller/processor includes a mode or program that when executed provides two or more layers of control over the lighting device.

76. The lighting device as recited in claim 1, further comprising a control connector, a programming connector or a diagnostics connector communicably connected to the controller/processor.

77. The lighting device as recited in claim 1, wherein the AC/DC or DC/DC power converter, the controller/processor, the light emitting diode (LED) current control circuit and the one or more LEDs are configured into two or more modules.

78. The lighting device as recited in claim 77, further comprising a program for virtually designing the lighting device using a set of modules selected from the two or more modules and a set of parameters.

79. The lighting device as recited in claim 78, the program further comprising testing one or more parameters of the virtual lighting device.

80. A lighting device comprising:
a panel housing;
an AC/DC or DC/DC power converter disposed within the panel housing;
a controller/processor disposed within the panel housing;
a light emitting diode (LED) current control circuit disposed within the panel housing and communicably coupled to the controller/processor and electrically connected to the AC/DC or DC/DC power converter;
a wire, a cable or a connecting strip electrically connected to the AC/DC or DC/DC power converter;
an electrical connector electrically connected to the wire, the cable or the connecting strip; and
one or more LEDs affixed to the panel housing and electrically connected to the LED current control circuit.

81. A lighting device comprising:
an AC/DC or DC/DC power converter;
a controller/processor electrically connected to the AC/DC or DC/DC power converter;
a light emitting diode (LED) current control circuit communicably coupled to the controller/processor and electrically connected to the AC/DC or DC/DC power converter; and
a strip wherein one or more LEDs are affixed to the strip;
a first electrical connector affixed to the strip and electrically connected to the one or more LEDs; and
wherein the AC/DC or DC/DC power converter, the controller/processor and the LED current control circuit are remotely located with respect to the strip and electrically connected to the first electrical connector via a wire, a cable or a connecting strip.

82. The lighting device as recited in claim 81, further comprising a second electrical connector affixed to the strip and electrically connected to at least the first electrical connector and one or more other lighting devices.

83. A lighting system comprising:
two or lighting devices, wherein each lighting device comprises:
an AC/DC or DC/DC power converter,
a controller/processor electrically connected to the AC/DC or DC/DC power converter,
a light emitting diode (LED) current control circuit communicably coupled to the controller/processor and electrically connected to the AC/DC or DC/DC power converter,
one or more LEDs electrically connected to the LED current control circuit, a wireless transceiver circuit communicably coupled to the controller/processor, and
an antenna communicably coupled to the wireless transceiver circuit; and
wherein the controller/processors of the two or more lighting devices communicate with one another using the wireless transceivers and antennas of the two or more lighting devices.

84. A method for controlling one or more lighting devices comprising the steps of:
providing the one or lighting devices, wherein each lighting device comprises:
an AC/DC or DC/DC power converter,
a controller/processor electrically connected to the AC/DC or DC/DC power converter,
a light emitting diode (LED) current control circuit communicably coupled to the controller/processor and electrically connected to the AC/DC or DC/DC power converter, and
one or more LEDs electrically connected to the LED current control circuit;
sending one or more control signals from the controller/processor to the LED current control circuit corresponding to a blended light having a specified color; and
sending an on/off signal having a cycle time from the LED current control circuit to each LED in response to the one or more control signals such that the two or more LEDs produce the blended light having the specified color based on how long each LED is turned ON and/or OFF during the cycle time.

* * * * *